United States Patent [19]

Bishop et al.

[11] 3,920,896

[45] Nov. 18, 1975

[54] COMMUNICATIONS SYSTEMS HAVING A SELECTIVE FACSIMILE OUTPUT

[75] Inventors: Sarah-Ann Bishop, Rochester, N.Y.; Joseph D. Marmion, Denton, Tex.; Alan R. Montante, Penfield, N.Y.

[73] Assignee: Xerox Corporation, Stamford, Conn.

[22] Filed: Mar. 29, 1974

[21] Appl. No.: 456,427

[52] U.S. Cl. .................... 178/26 R; 178/2 R; 178/3; 178/6; 178/30

[51] Int. Cl.$^2$.. G06F 3/14; H04L 15/34; H04N 1/32

[58] Field of Search .......... 179/3, 4, 2 DP; 178/2 R, 178/2 B, 2 C, 2 D, 2 E, 3, 4.1 R, 4.1 B, 17.5, 5, 6, 26 R, 26 A; 360/61; 340/347 DD

[56] References Cited

UNITED STATES PATENTS

| | | | |
|---|---|---|---|
| 3,403,383 | 9/1968 | Kienzle et al. | 179/3 |
| 3,558,811 | 1/1971 | Montevecchio et al. | 178/6 |
| 3,631,455 | 12/1971 | Gregg, Jr. | 340/347 DD |
| 3,751,582 | 8/1973 | Wernikoff et al. | 178/6 |
| 3,830,962 | 8/1974 | Mailloux | 178/6 |
| 3,869,571 | 3/1975 | Delavie | 178/30 |

*Primary Examiner*—Thomas A. Robinson
*Attorney, Agent, or Firm*—Marn & Jangarathis

[57] ABSTRACT

A switched communications system including store and forward facilities is provided in accordance with the teachings of the present invention wherein, in an exemplary embodiment, any of a plurality of teleprinter or teletypewriter peripherals may be given access to the communication system and input information thereto destined for one or more peripherals thereof. Input information from a transmitting peripheral is stored under the control of a central switching system which acts to inspect the destination information associated therewith. If a destination peripheral employing facsimile equipment has been designated, a facsimile controller is enabled and destination information associated with the facsimile pheripheral defined is provided thereto from the central switching system. In response to the destination information, telephone communication to the defined facsimile peripheral is initiated by said facsimile controller and an indication is provided thereby to the central switching system when a communications link with the defined facsimile peripheral has been established and the defined facsimile peripheral is ready to receive facsimile information. Phasing information is then exchanged between said facsimile controller and the defined facsimile peripheral and thereafter stored information destined for the facsimile peripheral defined is transformed into a digital signal capable of being decoded into a baseband signal and applied to said facsimile controller. The digital signals applied to the facsimile controller are decoded into a baseband signal which is then transformed into a suitable facsimile format and transmitted to the defined facsimile peripheral. Upon transmission of all of the stored information for the defined facsimile peripheral, the communications link established between the facsimile controller and the defined facsimile peripheral is terminated.

70 Claims, 18 Drawing Figures

COMMUNICATIONS SYSTEMS HAVING A SELECTIVE FACSIMILE OUTPUT

This invention relates to switched communications systems including store and forward facilities for teleprinter apparatus and the like and more particularly to switched communications systems capable of selectively translating messages received from said teleprinter apparatus to stations employing facsimile equipment.

Communications systems which include store and forward facilities for teleprinter apparatus are conventionally employed to provide low cost, high speed information translation between remote locations where it is desired that the information translated be received in a hard copy format and telephony communication is not warranted, necessary or desirable due to such factors as time differences which may obtain between such remote locations, the nature of the information transmitted or the standard message volume involved. Where message volume does not justify substantial expenditures, access to such communications systems is available for intracompany communications through services provided for this purpose such as Western Union Telex service. However, where message traffic is substantial, private communications systems employing leased lines for transmission are frequently developed.

Generally, switched communications systems including store and forward facilities for teleprinter apparatus and the like take either the form of a contention or polling arrangement wherein remotely located terminals, when given access to a line, transmit destination and message data to a central computer which functions to provide line access to each peripheral, receives and stores destination and message data therefrom and thereafter causes the transmission of such message data as has been received and stored to each destination peripheral defined by the destination data associated with a given message. In this manner, messages may not only be transmitted to a plurality of remotely located peripherals in a highly efficient manner, but in addition should certain specified destination peripherals be temporarily unavailable due to such factors as equipment or line malfunction, busy status conditions or inoperativeness due to the unavailability of equipment capable of operating in an unattended mode at locations not yet open due to existing time differences or the like, the stored message may be subsequently forwarded when the defined destination peripheral subsequently becomes available through the establishment of an interrupt or other return condition at the central computer. In addition, should a later retransmission of a message be required by a specified destination peripheral, a previously stored message may be retransmitted from storage and such retransmission limited to previously defined destination peripherals through a scanning of the destination information stored with said message information. As will be appreciated by those of ordinary skill in the art, the message information transmitted to a central computer from a remote peripheral which includes teleprinter or teletypwriter apparatus will normally take the form 8 bit ASCII code groups representing the alphanumeric character information in the message to be conveyed.

In switched communications systems of the foregoing type which are organized according to a contention arrangement, each remotely located peripheral when requesting service may generate an interrupt at the central computer which is responded to in accordance with a fixed priority arrangement and the present availability of the central computer for the service requested. In a polling arrangement, the central computer periodically polls each peripheral on the line and any peripheral having a message to be transmitted when polled is given access to the line whereupon the message is transmitted to the central computer for storage and subsequent forwarding. Switched communications systems similar to those discussed above and suitable for adaptation in a private, intracompany or intra-agency dedicated system are disclosed in U.S. Pat. No. 3,403,383, which issued to H. G. KIENZLE, et al. on Sept. 24, 1968 and is assigned to Bell Telephone Laboratories, Inc.; in *The Bell System Data Communications Technical Reference* directed to the "85A1 Data Selective Calling System," dated April 1968 and published by the American Telephone and Telegraph Co.; and the articles devoted to the "Tele-Net" data communications network appearing in the May 26th, 1972 issue of *The Digest" as published by the Manufacturing Division Information Technology Group of Xerox Corporation and the December* 1970 issue of the *D.P. Newsletter* published by the Xerox Corporation.

Where dedicated or private switched communications systems including store and forward facilities have been established, messages which have been received at a designated destination peripheral, as printed by the teleprinter or teletypewriter apparatus in place thereat, are usually hand delivered to designated recipients without substantial delay. However, where the destination peripheral is at an extremely busy location, the destination peripheral is established at a highly populated location or the message is of extreme urgency, delivery time may become excessive and prompt telephone reporting may be insufficient due to the need for a hard copy. Furthermore, in dedicated systems such as those discussed above, the establishment of peripheral locations is dictated by traffic and usage considerations and hence locations which may be advantageously served by a peripheral device may not be deemed to warrant the same due to insufficient usage. This is particularly so in intraagency or intracompany systems where a central location which may frequently house the central computer for the system to proximate to several outlying facilities which might otherwise have system peripherals located thereat but due to insufficient traffic patterns are required to rely upon a peripheral located at such central location whereby the intracompany or intra-agency telephone system is relied upon to provide initial advisory service that a message has been received at the central location with delivery of the hard copy of the message occurring subsequently through an intra location delivery service or the like. Furthermore, once dedicated or private switched communications systems including store and forward facilities have been established, the addition of peripheral stations to meet subsequent or temporary user requirements is often a costly and time consuming process and hence is generally avoided unless a well-defined and sustaininng need is plainly demonstrated.

Those business or governmental users whose communication needs are such as to justify the establishment of a private or dedicated switched communications system which includes store and forward capabilities will invariably have an intracompany or agency telephone system in place at major sites and frequently such major sites will be linked by watts lines or the like to facilitate the substantial volume of telephone communication which must of necessity take place within the company or agency. In addition, the wide proliferation of portable facsimile equipment such as the Xerox 400 Telecopier series, provides another mode of information transmission which is readily available and produces a hard copy message format at relatively low equipment cost but at message cost levels which substantially exceed those associated with volume justified peripherals employing teleprinter or teletypewriter apparatus.

Facsimile apparatus such as relied upon in the Xerox 400 Telecopier series and the like basically transmit intelligence in the form of a modulated base band signal and to this extent facsimile information as transmitted is incompatible in format with that transmitted through a private or dedicated switched communication system relying upon peripherals which include teleprinter or teletypewriter apparatus. In addition, facsimile equipment requires the completion of a plurality of handshaking functions between communicating transceivers prior to transmission to ensure that appropriate phasing and transmitter-receiver relationships are established and these handshaking functions too are basically inconsistent with the operation of a private or dedicated switched communication system including store and forward facilities and relying upon teleprinter or teletypewriter apparatus at the peripherals thereof. However, as facsimile apparatus such as represented by the Xerox 400 Telecopier series provides low apparatus cost, is easy to operate, exhibits low noise and may be placed in communication with a compatible transmitter through the telephone system in place by a mere dialing of the destination location and the subsequent placement of the telephone handset in the acoustic coupler thereof; it will be appreciated that if the same could be rendered compatible with information transmitted by a switched communications system employing teleprinter or teletypewriter apparatus it would represent an ideal, low cost, easy to operate peripheral for locations not warranting the installation of a peripheral employing teleprinter or teletypewriter apparatus. Furthermore, if only a receive mode peripheral is considered it will be appreciated that additional remote peripherals may be added to a dedicated or private system merely by adding appropriate telephone numbers to be dialed and where facsimile apparatus is normally maintained for other purposes, as is increasingly the case, the telephone numbers of each such location could be maintained in association with the dialing apparatus as a matter of course and employed, in conjunction with a company or public telephone system, for urgent messages even when a teleprinter or teletypewriter peripheral is available but not sufficiently close to the designated receiver to assure sufficiently rapid delivery. In addition, where the control computer and system dialing equipment was located at a central site surrounded by local peripheral plants or agencies, facsimile equipment in place at such peripheral plants or agencies could be relied upon, as a part of the switched communications system, to form a segment of the local distribution system in that messages received by teleprinter or teletypewriter apparatus at such central site could be reintroduced to said switched communication system and transmitted through the system and local telephone lines or telephone lines rented for a company or agency system directly to the desk of the designated addressee. Further, as such receive only peripherals when operating as a part of a switched communication system, would only be responsive to line information forwarded from teleprinter or teletypewriter peripherals through the store and forward facility, transmission time could be reduced as extensive information associated with document margins and the like is avoided while when not being employed in this manner as a receive mode peripheral, the overall utility of the facsimile apparatus acting in its own right would be retained. Thus, the ability to selectively incorporate facsimile stations into a switched communication system for teleprinter apparatus and the like would expand the flexibility of the resulting system to a wide degree while the expansion of the system to meet temporary or low level traffic requirements in a receive only mode could be achieved at relatively small additional expense.

Therefore, it is an object of the present invention to provide a switched communication system capable of accepting information in a digital format to be forwarded to a designated destination peripheral and forwarding such information in either a digital format or a facsimile format depending upon whether said designated destination peripheral is defined as a facsimile location or a digital location.

It is an additional object of the present invention to provide apparatus for receiving an input in the form of an ASCII code, for converting such ASCII code into an analog signal, for transforming said analog signal into a suitable facsimile format and for transmitting said transformed analog signal to a designated facsimile peripheral.

It is a further object of the present invention to provide controller apparatus for a switched communications system for enabling said switched communications system to transmit message information to facsimile equipment present at a designated peripheral.

It is another object of the present invention to provide controller apparatus for a switched communications system for accepting destination information and message information from a switching system and for responding to said destination information to establish a communications relationship with a designated facsimile peripheral and after said communications relationship has been established for converting said message information into a facsimile format, for transmitting said message information in facsimile format to said designated facsimile peripheral and for thereafter terminating said communications relationship.

It is an additional object of the present invention to provide a switched communications system having store and forward facilities for teleprinter apparatus and for facsimile apparatus acting in a receive-only mode.

It is a further object of the present invention to provide software controlled switching apparatus for a switched communications system wherein said software controlled switching apparatus is active to ascertain when a designated destination peripheral comprises facsimile apparatus and whenever such a designated destination peripheral is ascertained to transform message information designated therefor into a digital code which is decodeable into an analog baseband signal.

It is another object of the present invention to provide a program for switched communications systems for causing message information designated for a facsimile peripheral to be transformed into a digital code which is decodeable into an analog baseband signal.

It is an additional object of the present invention to provide controller apparatus responsive to a switched communications system for accepting control information and message information from a switching system and for responding to said control information to establish a communications link to a designated facsimile peripheral, to indicate when said communications link has been established and to issue pulsing signals to said designated facsimile peripheral and thereafter for converting said message information into a facsimile format, for transmitting said message information in facsimile format to said designated facsimile peripheral and for subsequently terminating said communications link.

It is a further object of the present invention to provide a program for a switched communications system for recognizing message information designated for a facsimile peripheral, enabling facsimile controller apparatus whenever such recognition occurs, issuing destination information to said facsimile controller apparatus to cause a communications link to be established and issuing said message information to said facsimile controller apparatus for transmission.

Various other objects and advantages of the present invention will become clear from the following detailed description of an exemplary embodiment thereof, and the novel features will be particularly pointed out in conjunction with the appended claims.

In accordance with the teachings of the present invention a switched communications system, including store and forward facilities, is provided wherein any of a plurality of teleprinter or teletypewriter peripherals may be given access to the communication system and input information thereto destined for one or more peripherals thereof; input information from a transmitting peripheral is stored under the control of a central switching system which acts to inspect the destination information associated therewith; if a destination peripheral employing facsimile equipment has been designated, facsimile controller means is enabled and destination information associated with the facsimile peripheral defined is provided thereto from said central switching system; in response to said destination information telephone communication to said defined facsimile peripheral is initiated by said facsimile controller means and an indication is provided thereby to said central switching system when a communications link with said defined facsimile peripheral has been established and said defined facsimile peripheral is ready to receive facsimile information; phasing information is then exchanged between said facsimile controller means and said defined facsimile peripheral and thereafter stored information destined for the facsimile peripheral defined is transformed into a digital signal capable of being decoded into a baseband signal and applied to said facsimile controller means; the digital signals applied to said facsimile controller means are decoded into a baseband signal which is then transformed into a suitable facsimile format and transmitted to said defined facsimile peripheral; upon transmission of all of the stored information for said defined facsimile peripheral, the communications link established between said facsimile controller means and said defined facsimile peripheral is terminated.

The invention will be more clearly understood by reference to the following detailed description thereof in conjunction with the accompanying drawings in which.

Figure 1:
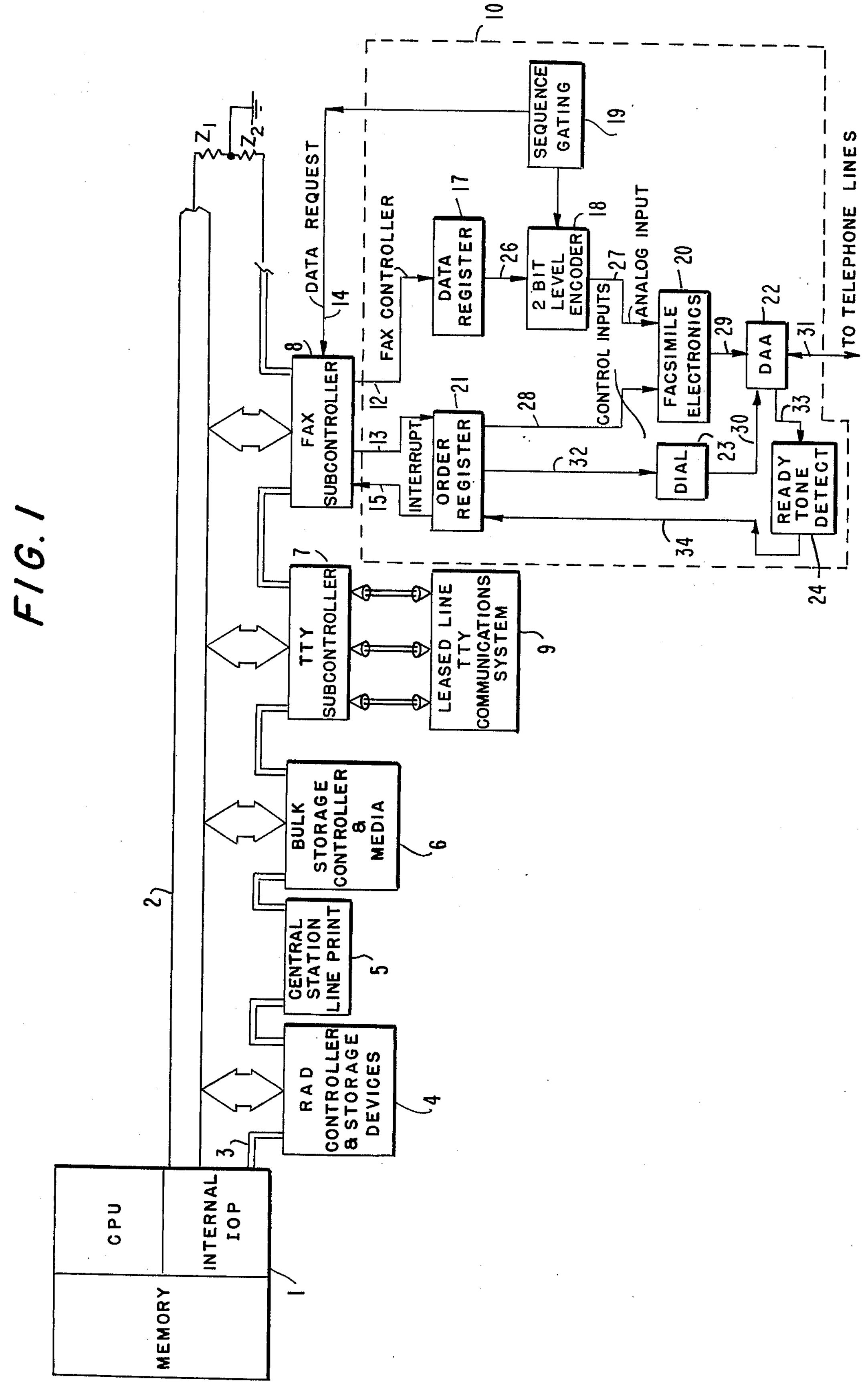
FIG. 1 is a schematic diagram illustrating an exemplary embodiment of a switched communications system including a facsimile output terminal in accordance with the teachings of the present invention.

Referring now to the drawings and more particularly to FIG. 1 thereof, there is shown a schematic diagram of an exemplary embodiment of a switched communications system which includes facsimile output terminal apparatus in accordance with the teachings of the present invention. More particularly, FIG. 1 illustrates a switched communications system including store and forward facilities for message and destination information which may have been received from any of a plurality of remotely located sending peripherals which may take the form of conventional teleprinter or teletypewriter stations. Such sending peripherals are selectively given access to the line as a function of the switching initiated by a control computer which may operate according to a polling or contention arrangement. After a selected sending peripheral has been given access to the line, destination and message information therefrom is transmitted to the central computer where time and date information is appended thereto and the same is stored and the destination information associated therewith is analyzed. Should the destination information analyzed indicate that the desired receiving location is a remotely located teleprinter or teletypewriter peripheral, the designated, remotely located teleprinter or teletypewriter is contacted by the central computer and the stored time, date and message information forwarded thereto as soon as such peripheral becomes available in much the same manner as is achieved in conventional store and forward telegraphy systems. However, should the analysis of the destination information conducted indicate that a facsimile device is the desired destination peripheral, a specialized mode of operation is initiated under program control.

In this specialized mode of operation of the switched communications system according to the present invention, a facsimile controller which is connected to a public and/or private telephone network through a data access arrangement is actuated under program control. The facsimile controller includes conventional facsimile electronics which are compatible with the facsimile apparatus present at the destination peripheral, means for initiating a telephone communication and means for detecting a responsive state at a remotely located facsimile terminal which has been contacted. When the facsimile controller is actuated, the means for initiating a telephone communication is enabled under program control and an attempt is made to establish a communications link to the remotely located facsimile terminal designated. If the attempt to establish a telephone communications link is successful and a designation is received to indicate that the remotely located facsimile terminal is in a condition to receive facsimile information, this condition is detected at said facsimile controller and an interrupt is generated in response thereto. The central computer will then return to service the facsimile controller to place the facsimile electronics therein in a send mode so that phasing information is supplied to the facsimile apparatus at the remotely located facsimile terminal designated. Upon the completion of the phasing interval, message information destined for the facsimile terminal is transformed, under software control, into a digital code representative of facsimile information and forwarded to the facsimile controller. As each byte of the digital code is received at the facsimile controller it is encoded into a suitable analog baseband signal and supplied to the facsimile electronics for application to the telephone communications link established in precisely the same manner as would occur were document information being scanned at an individual facsimile device. When all of the message information stored has been forwarded to the facsimile controller, the end of message signal is supplied from the control computer and thereafter stop tone is broadcast by the facsimile controller to the remotely located facsimile peripheral. Upon the expiration of a predetermined interval, the facsimile controller is caused to disconnect the telephone communications link established, under program control, whereupon the facsimile controller is deactivated and the communications system may continue with the further interchange of message information between selected, remotely located peripherals.

Although a specific switched communications system will be described in conjunction with FIG. 1 to acquaint a reader with a preferred embodiment of the present invention, it will be appreciated by those of ordinary skill in the art that one of the principal aspects of the present invention is the provision of a switched teleprinter communications system with the capability to selectively establish communication with and transmit message information in a facsimile format to designated, remotely located peripherals having facsimile apparatus present thereat. For this reason even though an exemplary switched communications system is set forth in its entirety herein, the primary thrust of this application is directed to the techniques, apparatus, methodology and programming requisite to providing a switched teleprinter communications system with the capability to selectively establish communication with and transmit message information which has been transformed into a facsimile format to designated facsimile peripherals. Furthermore, it will be appreciated by those of ordinary skill in the art that the techniques, apparatus, methods and programs disclosed herein as employed to provide a switched teleprinter communications system with a capability to selectively establish communication with and transmit message information in a facsimile format to designated facsimile peripherals are fully applicable to other conventional switched teleprinter or teletypewriter communications systems without an exercise of inventive skill even though programs and programming and encoding techniques may require modification to fulfill the requirements of particular equipments or system organization or protocols. Accordingly, it will be appreciated that the inventive concepts set forth herein should not be construed as limited to the details of the particular switched teleprinter communications set forth.

The Switched Communications System

The exemplary embodiment of a switched communications system in accordance with the teachings of the present invention schematically illustrated in FIG. 1 comprises a central switching means 1, a common data bus means 2, priority bus means 3, central station storage and monitoring facilities 4–6, teleprinter subcontroller means 7 and facsimile subcontroller means 8. The central switching means 1 may take the form of a conventional digital computer which acts to control all access by remotely located terminals to the switched communications system illustrated in FIG. 1. Although a relatively small scale digital computer providing 4,000 16-bit words of storage may be employed as the central switching means 1, a somewhat larger device would ordinarily be preferred to enable the switched communications system as a single entity to control a rather large scale store and forward teleprinter communications system. For this reason the central switching means 1 may take the form of Sigma 3 or Sigma 5 computer system conventionally available from Xerox Data Systems of El Segundo, Cal. The Sigma 3 or Sigma 5 computer system, as indicated in FIG. 1, would include a memory, a central processor (CPU) and an input/output processor (IOP) which may be integral. Typical appropriate memory, central processor and input/output processor configurations for the Sigma 3 or Sigma 5 computer system selected for use as the central switching means 1 are described in detail in the "Xerox Sigma Computer Systems/Interface Design Manual", published by Xerox Data Systems, Vol. No. 900973E, June, 1973. The Sigma 5 computer system is here selected for purposes of discussion and in fact is employed in switched teleprinter communications systems suitable for modification into a switched communications system according to the instant invention, such as the "Tele Net" teleprinter communications system serving the Xerox Corporation, because these computer systems are highly versatile and provide substantial operating advantages over other systems when employed as a line control station for a communications system such as the "85a1 Data Selective Calling System" described in *The Bell System Data Communications Technical Reference*, published by A T & T. It will be appreciated by those of ordinary skill in the art that although Sigma series systems have here been selected for purposes of discussion, any computer system manifesting appropriate storage and processing capabilities could be employed as the central switching means 1 to act, when appropriately programmed, as the central switching means 1. However, the selection of Sigma series systems, as will be appreciated by those of ordinary skill in the art does impose certain organizational requirements on the system and hence the configuration of the communications system illustrated in FIG. 1 is tailored to reflect such organizational requirements so that, should an alternate form of central switching means 1 be employed, the system configuration hereinafter described in conjunction with FIG. 1 would be varied to reflect the organizational needs thereof.

The organization of the central switching means 1 is such that when a Sigma system is employed, the memory and interface therefor are characterized by simplicity, high data transfer rates and substantial flexibility. In addition, the central processing unit (CPU) and the input/output processor (IOP) are provided with direct connections to memory so that each processor may carry out functions independently of the other. The input/output processor (IOP) provides lines through which peripheral units are controlled by the central processor (CPU) and is characterized by automatic operation. Following program initiation, data transfers occur automatically and without further direct program intervention unless required for input/output operations. The input/output processor is provided with an interface which consists of data lines, function lines, status lines, control lines for strobes, acknowledgements and the like, priority determination lines, service request lines and miscellaneous lines so that all transactions with external peripheral interfaces are handled therethrough.

The switched communications system illustrated in FIG. 1 is in the exemplary communications system set forth, organized according to a polling arrangement and hence the central switching means 1 periodically polls or invites each peripheral which in this case takes the form of remotely located teleprinter or teletypewriter stations to carry a message. Furthermore, these polling activities may be carried on in a parallel mode to render input or output activity on a given line independenet of similar activities on other lines. When a station having message information to be transmitted is ascertained by the central switching means 1, the central switching means 1 acting under program control assigns an input sequence number to the message to be received, develops a time and date stamp therefor and activates the station's transmitter to thereby provide access to the common data bus 2. As the message transmitted is received at the central switching means 1, it is stored in a buffer for the line associated therewith. When the message buffer is full, appropriate forward and backward message links are inserted to provide message chaining among the various portions of each message received and the contents of the buffer are stored on a high speed storage device. These activities are continued by the central switching means 1, acting under program control, until an end of transmission indicator is received from the accessed station. At this point the central switching means 1, acting under program control, causes the message or destination information associated with the received message to be released to an analysis sequence where the destination information contained therein is validated as to format and routing requirements. If the message received is acceptable, an output header is generated under program control to replace the input header and it is placed in an output line queue for the destinaation peripherals listed in the header. The output line queue is relieved and the message transmitted on a first in first out basis. As each header cycles to the top of the output queue, an attempt is made to access and transmit to the addressed destination peripheral and if such destination peripheral is available in a receive mode, the message stored is forwarded thereto. However, if the designated destination peripheral is unavailable, the message is held until such time as transmission can take place.

The central switching means or more particularly, the interface of input/output processor (IOP) thereof is connected to the common data bus means 2 and the priority bus means 3. The common data bus means 2 typically comprises three 14-wire cables as described in the "Xerox Sigma Computer Systems/Interface Design Manual", supra and acts as a conduit through which all order and data information as well as function indicator, acknowledgment, function response, service call, interrupt, end data and end service information is conveyed. In this manner, the common data bus means 2 provides eight information channels which are available on a time shared basis for conveying information between the central switching means 1 and designated ones of the peripherals connected thereto. Each of the peripherals illustrated for the switched communications system depicted in FIG. 1, as well as the central switching means 1, is connected to the common data bus means 2 in parallel and it is through the common data bus means 2 that central switching means 1 controls the activities of each peripheral in addition to exchanging information therewith in a manner well known to those of ordinary skill in the art.

The priority bus means 3 comprises a cable containing approximately thirty (30) wires which is connected to the input/output processor (IOP) portion of the central switching means and in series to each of the peripherals of communications systems depicted in FIG. 1. The priority arrangement with Sigma series equipment, as is well known to those of ordinary skill in the art, is such that the last serially connected peripheral has priority over those preceding it and hence may gain access to the central switching means 1 to the exclusion of peripherals preceding it in the serial chain associated with the priority bus means 3 in the absence of a higher priority interrupt. On this basis, the facsimile subcontroller means 8 has priority over the teleprinter subcontroller means 7; however, this arrangement is merely a choice of design which may be varied to suit design expediency. Of course, should IBM systems be employed for the control switching means 1, an oppositely ordered priority arrangement would be associated with the priority bus means 3 so that priority is a function of the order of connection. This difference, however, relates to the normally closed character of the priority bus arrangemenet employed in Sigma series systems and the open arrangement employed with IBM equipments. However, once the choice of the central switching system 1 is made, the nature and character of the common data bus means 2 and the priority bus means 3 would be determined and the connections of peripherals thereto as well as subcontrollers therefor are ascertained. The nature of the priority bus means 3 is fully detailed in the "Xerox Sigma Computer Systems-/Interface Design Manual", supra whose contents are incorporated herein by reference; however, for the purposes of the instant disclosure it is sufficienet to appreciate that in the case of simultaneous service calls or interrupts for the switched communications system described, the peripheral having highest priority in a closed system would be that connected most remotely in the serial chain from the central switching means 1.

In essence, four signals designated HPI, HPS, AVI and AVO may be carried on the priority bus means 3 wherein HPI stands for high priority interrupt, HPS stands for high priority service, AVI stands for available input and AVO stands for available output. The common data bus means 2 and the priority bus means 3 are terminated through impedances $Z_1$ and $Z_2$ to ground as shown in FIG. 1. As both the common data bus means 2 and the priority bus means 3 may be considered to be 33 ohm cables, impedances $Z_1$ and $Z_2$ may be 33 ohm resistors so that each cable is terminated by its characteristic impedance.

The central station storage and monitoring facilities may comprise, as shown in FIG. 1, a controller and high speed storage means 4, central station line print monitoring means 5 and bulk storage controller and media means 6. The controller and high speed storage means 4 may take the form of a Model 7201 RAD controller and a plurality of Model 7204, 3.0 MB RAD each of which is available from Xerox Data Systems. The 3.0 MB RAD or Rapid Address Devices, well known to those of ordinary skill in the art, are high speed, fixed head disc storage devices which store information in designated address locations, defined in terms of a track number and sector. Each RAD is capable of storage for up to 3 megabytes wherein storage is arranged in 512 tracks, each track containing 16 sectors each of which is capable of holding 360 bytes. In a typical embodiment of the instant invention three RAD units were employed. The Model 7201 RAD controller is connected intermediate the plurality of RAD units and the common data bus means 2 and is employed to interface, in a well-known manner, the plurality of Model 7204 RAD units with the common data bus means 2 and the priority bus means 3 so that information may be taken from the common data bus means 2 and placed in storage for subsequent modification and forwarding. The RAD controller acts, in essence, to provide queueing by device before and after input/output execution exits, error recovery and automatic flip-flop between RAD units in allocating and accessing file space. The controller and high speed storage means 4 is employed at the central station to provide the switched communications system depicted in FIG. 1 with a store and forward capability as well as being relied upon to establish a message queue for the central switching means 1. Additionally, infrequently utilized programs may be stored on the RAD and periodically fetched by a nonresident program controller.

It will be recalled from the brief description of the operation of the central switching means 1, set forth above, that as each character is transmitteed by a sending peripheral it is loaded into a buffer at the central switching means 1 associated with that line and when the buffer is full, appropriate backward and forward links are inserted to chain each message together and then the contents of the buffer are logged on a RAD and this activity continues until an end of transmission indicater is received. Thus, any message transmitted within the switched communication system depicted in FIG. 1 is initially logged on the RAD together with the destination information, in the form of an input header, forwarded therewith. At this point, the header information is released to header analysis where, under program control, an output header is generated to replace the input header and such output header is placed in the output line queue for the destination peripherals listed in the header. More particularly, if a single destination is specified, the output header is employed to replace the first sector of the message logged on the RAD which contained the input header. Similarly in multicharacter messages, an output header plus enough message information to fill a sector on the RAD is generated and recorded on the RAD for each destination peripheral with one destination peripheral header being employed to replace the input header. If the message information exceeds the storage available in one sector on the RAD, the remainder of such message information is stored in a second sector to which all output sectors are threaded or linked. In addition, all output headers are threaded one to the other to establish a desired message queue which is then relieved on a first in first out basis. Thus in this manner the controller and high speed storage means 4 is employed at the central station to provide the switched communications system depicted in FIG. 1 with a store and forward capability in addition to being utilized to form the message queue for the central switching means 1.

The central station line print monitoring means 5 may comprise one or more conventional line printer units, such as a Model 7440 line printer, available from Xerox Data Systems and is employed at the central station to monitor through printing and operator inspection all information conveyed through the switched communications system depicted in FIG. 1. The function of the control station line print monitoring means 5 is to print all message information forwarded to the central switching means 1 and all information forwarded therefrom so that the operation of the system as a whole may be reviewed or inspected at any time by an operator to assure appropriate transmission is taking place. In addition, though not illustrated in FIG. 1, a central location may be provided with teleprinter or teletypewriter apparatus whose principal function is to monitor transmissions from certain peripherals whose operation and/or leased line communications links are continuously suspect. Furthermore, additional teleprinter or teletypewriter apparatus may be employed to complement the action of the line printer monitoring means 5 to provide multiple inspection sites at a central location; however, this redundancy in apparatus may be avoided by the designation of the central station as a teleprinter or teletypewriter peripheral. The central station line print monitoring means 5 is connected in parallel to the common data bus means 2 and in series to the priority bus means 3.

The bulk storage controller and media means 6 may comprise a Model 1320 Tape Control unit and a plurality of Model 7322 Tape Units which are available from Xerox Data Systems, employ nine tracks and exhibit a bit density for storage purposes of eight hundred bits per inch (800 bpi). The Model 7320 Tape Control unit is connected intermediate the plurality of Model 7322 Tape Units and the common data bus means 2 and the priority bus means 3 so as to serve as an interface therefor whose operation is controlled by the central switching means 1 acting under program control. The function of the bulk storage controller and media means 6 is to act as a mass storage device for the switched communications system depicted in FIG. 1 for storage of such data as may be designated as overflow from RAD devices during the course of daily operation and to provide short term message files for subsequent retrieval. For instance, in the exemplary embodiment of the switched communications system depicted in FIG. 1, message information together with destination headers recorded on the RAD devices may be routinely transferred to the bulk storage controller and media means 6 at the termination of a given period of operation such as a day or 72 hours for retention for a designated interval of time such as a 3, 20 or 30 day period. During this interval of time, the message information will be available for retransmission or look up at the central station through a designation of date, time and destination or sequence and destination information associated with a desired message. After an expiration of the designated interval of time, the message tapes may be erased for reuse or removed and placed in storage for a further period.

The teleprinter subcontroller means 9 may comprise a conventional communications controller device such as a Model 7611 Communications Controller, available from Xerox Data Systems. The teleprinter subcontroller means 9 acts within the switched communications system depicted in FIG. 1 as an interface between the common data bus means 2 and a leased line TTY communications system 9 wherein access to the common data bus means 2 is provided through operation of the priority bus means 3 in response to a requirement at the central switching means 1 that message information be transmitted to a designated teleprinter or teletypewriter peripheral within the leased line TTY communications system 9 or conversely in a response by the central switching means 1 to an interrupt or a service request following polling, generated at the teleprinter subcontroller means 7 reflecting a transmission requirement at a teleprinter or teletypewriter within the leased line TTY communications system 9. The Model 7611 Communications Controller, as well known to those of ordinary skill in the art, may accommodate up to 64 leased telephone lines or the like having data conveyancing speeds ranging up to 1800 baud; however, in the Tele-Net system presently in place only 18 to 22 110-baud, half-duplex circuits are relied upon in the leased line TTY communications system even though the present Tele-Net system is designed for expansion to support a full controller complement of 64 lines. In brief, the teleprinter subcontroller means 7 is associated with only a single data channel within the common data bus means 2, as defined on a real time basis as aforesaid, and acts, in response to commands issued by the central switching means 1, to establish communication between the common data bus means 2 and a requesting or designated teleprinter or teletypewriter peripheral by simulating the action of a multiplexer serving each communications circuit connected thereto as though it resided on a dedicated input/output line or circuit. In addition, specialized programming devoted to the teleprinter subcontroller means 7 may act within the central switching means 1 to perform an ASC II to EBCDIC conversion and priority check for message information transmitted from an actuated teleprinter or teletypewriter peripheral to the common data bus means 2 while an opposite conversion is performed for message information translated through the teleprinter subcontroller means 7 from the common data bus means 2 to a designated teleprinter peripheral. Other than for these functions and establishing the necessary protocols for the communications peripheral as well as the setting of appropriate flags for service requests and the like, the teleprinter subcontroller means 7 appears to a teleprinter or teletypewriter terminal as a device which provides it with appropriate access to the common data bus means 2 and hence to central switching means 1 and thereafter turns transparent for the purposes of data flow between the common data bus means 2 and the requesting or designated teleprinter or teletypewriter peripheral.

The leased line TTY communications system 9 may take the form of a conventional multi-line TTY communications system wherein each line is a dedicated, multi-point facility with a substantial number of peripheral terminals connected to each line or circuit. Each TTY peripheral terminal may take the form of a 33 ASR or 35 ASR teletypewriter for example although various other terminal configurations such as a Univac DCT 500, a Memorex 1240 or 1280, a Bell and Howell Optical Mark Reader or CRT's as available from Hazeltine or Datapoint may be employed. A suitable, conventional leased line TTY communications system such as the 85A1 Data Selective Calling System may be employed for the leased line TTY communications system 9. This system is described in the Bell System Data Communication Technical Reference published by The American Telephone and Telegraph Co., entitled "85A1 Data Selective Calling System," dated April 1968, whose disclosure is incorporated by reference herein, and it will be appreciated by those of ordinary skill in the art that the central switching means 1 together with the common data bus and priority bus means 2 and 3, the central station storage and monitoring facilities 4 and 6 and the subcontroller means 7 form a store and forward station controller or line control station for the calling system described therein. In essence, the 85A1 Data Selective Calling System is a leased or private line selective calling system wherein each of a plurality of communications lines may be connected through various hubbing points to a plurality of remote stations which here take the form of teletypewriter or teleprinter peripherals. Thus, for instance, in the "Tele-Net" System presently serving the Xerox Corporation, twenty half-duplex circuits or lines may be connected to the teleprinter subcontroller means 7 and 175 33-ASR or 35-ASR teletypewriter or teleprinter peripheral terminals are connected thereto to thereby establish a store and forward communications system which serves the needs of this corporation on an international scale. This inplace switched communications system has an average message volume of 5,000 transactions per day with the average message consisting of 600 characters and is readily expandable to 300,000 messages per 16 hour day for the single port network shown, while further expansion to a multiport facility is available.

The employment of the 85A1 Data Selective Calling System for the leased line TTY communications system 9 is highly advantageous because at each remote peripheral station the teleprinter terminal serves as the source and sync for message information signals while the station control unit serves as the source and sync for administrative information. The teletypewriter per se is therefore not actively concerned with the logical organization of the station but merely provides the stimuli regarding traffic-to-send and ready-to-receive conditions required by the station control unit. The station control unit thereby includes all of the character detection and generation capability required along with appropriate logic to complement the on-line administrative procedures of the system. This form of organization is highly advantageous because the separation of the message generation and receiving functions from the control renders the organization of each terminal highly flexible. Furthermore, the utilization of either 33 or 35 ASR teletypewriter means is highly advantageous because messages may be prepared off-line to await system pick-up through polling while a receiving capability is not prohibited during actual message preparation, a familiar keyboard arrangement is provided for operator convenience, data handling rates or throughput is substantially increased over "Telex" hardware and operator time is not wasted by a requirement that contact within the system be manually initiated as through a dialing arrangement or the like. Thus, it is typical of the leased line TTY communications system 9 when the same is viewed as configured along the lines of the 85A1 Data Selective Calling System that a plurality of teleprinter or teletypewriter peripheral terminals may be connected to each of the leased line communication circuits connected to the teleprinter subcontroller means 7 and an individual one or more of such teleprinter or teletypewriter terminals selectively placed in communication with the common data bus means 2.

TELEPRINTER COMMUNICATIONS

The portion of the exemplary switched communications system depicted in FIG. 1 which has thus far been descrbed in essence forms the switched store and forward teleprinter communications system which is known as "Tele-Net" and presently serves the Xerox Corporation on international and domestic levels. A printout of an appropriate program for a Sigma 5 computer, employed as the central switching means 1 for the portion of the switched communication heretofore described, is appended to U.S. Ser. No. 456,201, entitled Communications Systems Having A Selective Facsimile Output, filed in the name of Dr. Bruno Vieri on equal date herewith and assigned to the instant assignee, as Appendix A and is incorporated by reference herein to provide a complete disclosure of this portion of the switched communications system depicted in FIG. 1. However, as the switched store and forward teleprinter communications system known as "Tele-Net" merely comprises a known portion of the combination upon which the instant invention proceeds, a detailed description of the program for enabling this portion of the overall system is not set forth as the same would be apparent to one of ordinary skill in the art. Furthermore, in the interests of conciseness and reader convenience, the operation of the portion of the switched communications system depicted in FIG. 1 which comprises "Tele-Net" or the store and forward teleprinter communications system per se will be briefly summarized at this juncture of the specification prior to a description of the facsimile subcontroller means 8 and the apparatus connected thereto. This mode of disclosure is here adopted because the instant invention depends upon and acts in combination with a switched teleprinter communications system and hence a basic understanding thereof serves as a useful predicate for the remaining subject matter set forth in the instant specification. However, it will be appreciated by those of ordinary skill in the art, that the instant invention does not depend upon the details of a specific switched store and forward teleprinter communications system and hence the switched store and forward teleprinter communications system set forth may be readily modified without the exercise of inventive skill and/or reconfigured to support other than Sigma system central switching means. Furthermore, should other than Sigma system central switching means be relied upon, appropriate programming material may be developed by appropriate modification of the program set forth in Appendix A, supra through language modification within the scope of conventional programming techniques or available on an automatic basic through the use of compiler apparatus.

Briefly, the switched store and forward teleprinter communications system within the exemplary switched communications system depicted in FIG. 1 operates, when otherwise unoccupied, to poll remotely located teleprinter peripheral terminals connected within the leased line TTY communications system 9 to various ones of the plurality of leased telephone or communications circuit inputs applied to the teleprinter subcontroller means 7 and thereby ascertain if a message is to be transmitted. Thus each communications circuit within the leased line TTY communications system 9 terminates in the teleprinter subcontroller means 7 and each communications circuit so terminated has one or more teleprinter or teletypewriter peripheral terminals connected thereto. The central switching means 1 polls each peripheral terminal in the system on a periodic basis as part of the overall line control function exercised thereby under program control, to ascertain whether or not a message is ready to be sent. This activity is carried on in a parallel manner on each communications circuit so that input or output on a given line is independent of activity on any other line. All information conveyed through the teleprinter subcontroller means 7 is buffered into memory through one of the common 8 bit input/output channels of the eight channels available within the common data bus means 2. A direct input/output interface (not shown) associated with the central switching means 1 may be relied upon for output purposes so that input and output operations conducted by the central switching means 1 are rendered independent in nature. The input and output operations at the central switching means 1 are driven by a pair of adjacent external interrupts with the receive interrupt being of higher priority than the transmit interrupt.

The polling function initiated by the central switching means 1 is only a small part of the line control function exercised thereby under program control and it will be appreciated by those of ordinary skill in the art that polling takes place only after a plurality of other conditions have been satisfied. More particularly the responsibilities of the line control exercised by the central switching means 1 includes a send or receive determination for each line, the initiation of appropriate send or receive action either by addressing or polling, acting to receive and log or read and transmit the messages received or the program generated, the requesting of header analysis at appropriate times, the maintenance of statistics regarding line and terminal peripheral activity and the generation of appropriate responses upon the receipt of information indicative of line, terminal peripheral, or control unit malfunction or service requests. The exercise of line control functions are divided into two areas which comprise line scanning and line operations. The most important purpose of line scan is to detect idle lines. Three conditions must be satisfied before any normal activity may be initiated by the line scan. These conditions are the line must be up (operative), the line must be idle, and the line must not have any outstanding error conditions. If an idle line is detected during line scan, a determination is made as to whether to send or poll and then shifting to the appropriate operation routine takes place. The choice of whether to send (address) or poll is made during line scan by a testing of the translate/-receive bit associated with each line and this is accomplished by the operation routines. A secondary purpose of line scan is to detect service requests for a line and to request header analysis, which takes place either at the reception of the end of transmission indicator or after a predetermined number of message segments have been received and detected.

The line operations area includes the functions of polling, addressing, header analysis, relieval/retrieval, file management, etc. The polling operation, when enabled for a line, commences and continues until all terminals on a line have been polled to limit for exhaustion. Polling is accomplished by establishing a polling list in the form of a terminal peripheral index arranged by line. The terminal peripheral being polled is noted through a pointer arrangement and the count is incremented after the number of messages received reaches the polling limit or the terminal responds with a no-traffic response. After polling for the last terminal peripheral is completed for a given line, the pointer is reset so that a new polling cycle may be initiated. Polling and response requires several character times and the completion thereof is indicated by an interrupt.

In the store and forward teletype portion of the switched communications system, output queues established on the RAD means within the controller and high speed storage means 4 are arranged by line under program control. Therefore, terminal peripheral address information will not be available to an address routine until destination header information has been read from the RAD unit. For this reason actual addressing in a line operation is not done until after such header information has been read from the RAD. The address information from the output header is saved for possible error conditions and for normal traffic, the line queue is updated with the chaining address in the header segment. If the terminal is indicated as being down, no messages will be sent to it. In addition, if a down terminal does not have intercepted traffic indicated, a terminal trouble overlay may be enabled to start intercept.

Header analysis functions on a system basis processing headers from the queue on a first in first out basis. Header analysis is not performed in synchronization with line control on a per line basis but reads input headers from the RAD units into a work area. As the input header information is analyzed under program control, output header information is created in an output work area and is then written onto a RAD unit in a pre-assigned location which forms the output queue for the destination line. The RAD location of the input header is then free for reuse. One of the functions of the line control is to scan the queues established for output lines and to initiate transmission if a line is idle and a message queue has been established for that line. If addressing is successful, the message will be sent by first translating the output header segment followed by each text segment associated therewith. The output queue is updated to reflect that the message was sent, but the message stored on the RAD unit is retained as a log and may be subsequently retrieved if desirable.

Relieval and retrieval programs are employed when messages which are already logged in a prior chain on a RAD unit must be transmitted. Relieval is employed to permit message information designated for a down terminal peripheral to be saved and later sent when the defined terminal peripheral becomes operative. Retrieval allows access to any message logged on the RAD for conditions such as when a destination terminal peripheral requests the retransmission of a previously forwarded message. Relieval is necessary because in a switched, store and forward teleprinter communications system, traffic cannot be halted for other terminal peripherals on the same line as a down terminal peripheral. For this reason the line queue controls must be able to skip over messages for a disabled terminal peripheral. To achieve this function, traffic for a down terminal peripheral is intercepted by retaining the RAD unit address for the next output message for that terminal peripheral. Subsequently, when the down terminal peripheral is restored to normal operations, this address may be employed by the relieval program to locate all messages waiting to be sent to that terminal peripheral. This is possible because even after a message is removed from an output queue, it remains chained to the same messages as when it was queued, in that once an output header is established, it remains a fixed link in the chain attached to the output line so that the relieval program merely has to forward scan the chain establishing looking for messages pertaining to the terminal peripheral after relieval until it catches up with the line queue controls. Under the retrieval program access to any message logged on a RAD unit is available and any message may be retrieved to any terminal; however, because of the significant impact upon overall system performance and integrity, all requests for retrieval must be made by supervisor console order. Message retransmissions under retrieval may be requested by specifying the original destination and sequence number. The retrieval program locates the designated message by first locating the last message placed into the appropriate output queue of the designated line. The chaining address in the header segment of this message is then employed to backward scan the chain until the requested message is found. If more than one message is specified, a chain is scanned backward until all the messages are set so that messages are retrieved in a reverse or a last in, first out order.

File arrangement within the switched store and forward teleprinter communications system is such that files are maintained in a manner to enable messages to be placed in queues if the destination lines are busy handling previous messages or are otherwise unable to accept traffic. Retransmission of all messages is made possible by uniquely identifying each message. To render file management highly efficient, messages are logged in sequence of 360 bytes to conform with the sector size of the RAD units. Thus, a message 600 characters in length will occupy two message segments on the RAD unit; however, the segments of a message need not occupy adjacent sectors on the RAD units. A routine in the main body program controls the dynamic allocation of sectors on the RAD units. Operating upon all of the parallel connected communications lines connected to the teleprinter subcontroller means 7, this program assigns a sector to a message segment that has not been written upon. Sector allocation on the RAD units is a sequential operation and message logging is essentially random in nature. If a message segment cannot be logged on an assigned sector, an override function is performed and a new sector assigned. To link the various segments of a logged message together, a chaining technique is employed. The header of a message contains the RAD unit address of the first segment of the text and each text segment is chained to the next logical text segment. These chaining addresses are inserted into the control field of each record by header analysis. Each header contains the RAD address of the next and previous header in the same queue to thus achieve complete forward and backward chaining. All output headers are formed on a line basis and when a multiple destination addressed message is received, one output header is created for each destination address and is logged in the appropriate line queue. The message text need be logged only once as each of the associated output headers in the respective line queues contains the RAD unit address of the same first text segment. Various error overlay and check point programs may also be included for additional line operations.

Returning now to the discussion of the polling activity carried out by the central switching means 1 on a periodic basis and in parallel on each communications line connected to the teleprinter subcontroller means 7, it will be appreciated that if a terminal peripheral has message information to send, the central switching means 1 assigns an input sequence number thereto, develops a time and data stamp therefor and activates the transmitter at the requesting terminal peripheral. The central switching means 1 also acts to consecutively number each message picked up from each station and transmitted to each station on a daily basis to facilitate error correction and retrieval. Thus the automatic entry of time data and a sequence number for each message received and transmitted greatly enhances the maintenance of message integrity. When the transmitter at a requesting terminal peripheral is activated, the teleprinter message which has been prepared thereat and is normally in the form of a punched paper tape defining sender, destination and message information in the form of 8 bit ASC II code groups is applied through the communications lines associated therewith as one of the inputs to the teleprinter subcontroller means 7. Thus, a typical teleprinter message to be forwarded would be organized in such manner that, for instance, an initial two letter code would identify the sending terminal peripheral, one or more additional sets of two letter codes for example, would identify designated destination peripherals to be employed during header analysis for the development of output headers and this information would be followed by the actual message text. As each character is applied to an associated communications line or circuit, to the teleprinter subcontroller means 7 and subsequently to the central switching means 1 the single communications channel associated therewith is examined by the central switching means 1 and may be translated to EBCDIC and checked for parity. Thereafter, each character transmitted through the single 8 bit data channel within the common data bus means 2 associated, as aforesaid, with the teleprinter subcontroller means 7 is loaded in a message buffer within the central switching means 1. When the line buffer being employed for message information is full, appropriate backward and forward links are inserted to chain the various segments of a message together and the contents of the line buffer are logged on a sector of a RAD unit. This activity continues until an end of transmission indicator is received from the transmitting terminal peripheral.

After an end of transmission indicator is received from the transmitting terminal peripheral, the received message header which was initially logged on a RAD unit is released to header analysis where the header format and routing or destination information is validated. If the message is acceptable to the system, i.e., a valid sender, valid destination information and error free message information, an output header is generated to replace the input header and it is placed in the output line queue for the destination terminal peripherals listed in the header. The output queues are relieved on a first in, first out basis on that as each header cycles to the top of the output queue, an attempt is made to select and transmit to the addressed output terminal peripheral. If the terminal peripheral defined by the output header is in a condition to receive, the message information is forwarded thereto; while if the terminal peripheral is unavailable for transmission, the message is intercepted and held until the terminal subsequently becomes available. Thereafter it is sent in accordance with the relieval program described above.

From the foregoing brief description of the portion of the switched communications system illustrated in FIG. 1 which is devoted to a store and forward teleprinter communications system, it will be seen that each teleprinter or teletypewriter terminal therein is periodically polled and if a message is present it is transmitted to the central switching means 1 where the same is stored. The message transmitted includes destination information and such destination information may designate a single remotely located terminal peripheral or a plurality thereof so that a broadcast mode of operation is effectively available. At any rate, the destination information associated with each message received and logged is analyzed and thereafter the stored message information is transmitted to the designated destination terminal peripherals as soon as the same are available for receive mode operations. However, if a designated peripheral terminal is unavailable, the message information destined therefor is intercepted and subsequently transmitted when availability is indicated without any inhibiting of the normal processing operations of the store and forward teleprinter communications system. This is highly advantageous because the normal operations of the large scale teleprinter communications systems are not disrupted while the eventual delivery of all message information transmitted by a remotely located teleprinter or teletypewriter peripheral is assured. Furthermore, the switched store and forward teleprinter communications system provides a wide ambit of operator convenience because once appropriate destination and message information is prepared at a remotely located teleprinter or teletypewriter terminal peripheral, the message is picked up and automatically transmitted to desired destination peripherals without the operator establishing the necessary communications links and regardless of the present availability of such destination peripherals.

FACSIMILE COMMUNICATIONS

The remaining apparatus depicted in FIG. 1 together with the appropriate additional programming of the central switching means 1, to be described hereinafter, is devoted to the provision of the switched store and forward communications system in accordance with the teachings of the instant invention with a capability to transmit message information which has been stored to remotely located peripherals employing facsimile equipment. Thus, the remaining portions of the exemplary communications system must perform at least the functions of contacting a designated remotely located peripheral through the communications link employed thereby, which in this case is assumed to be a public or private telephony system, to conduct the necessary handshaking functions with the remotely located facsimile peripheral contacted, to transmit message information in a format acceptable to said facsimile peripheral contacted and to terminate communications upon the completion of transmission.

The remaining apparatus depicted in FIG. 1 comprises facsimile subcontroller means 8 and facsimile controller means 10. The facsimile subcontroller means 8 may comprise a conventional subcontroller device which acts, in the well known manner, to interface the facsimile controller means 10 to the central switching means 1 through the common data bus means 2 and the priority bus means 3. As the facsimile controller means 8 is connected to the priority bus means 3 at a later point in the serial chain established than the teleprinter subcontroller means 7, it will be appreciated by those of ordinary skill in the art that facsimile subcontroller means 8 and the apparatus connected thereto have been assigned a higher priority within the exemplary embodiment of the instant invention than the teleprinter subcontroller means 7 and the leased line TTY communications system associated therewith. In the instant embodiment of the switched store and forward communications system according to the present invention, the facsimile subcontroller means 8 may be considered to take the form of a conventional Model 7902 extended device subcontroller as available from Xerox Data Systems and described in detail in the technical manual entitled "Model 7902 Extended Device Subcontroller," whose disclosure is incorporated herein by reference, which is dated June, 1973, bears publication No. 980393E and was published by Xerox Computer Systems of El Segundo, Calif. The "Model 7902 Extended Device Subcontroller" acts, in essence to interface the facsimile controller 10 with the IOP portion of the central switching means 1 through a single one of the eight data channels available on a time shared basis through the common data bus means 2. The Model 7902 is here selected as the same is highly adaptable in meeting the requirements of the facsimile controller means 10 as shall be seen below, and is particularly well orientated for incorporation into a communications system employing other Sigma series equipment provided by Xerox Data Corporation. However, as will be appreciated by those of ordinary skill in the art, should other central switching means or data network organizations be employed, other well known forms of subcontrollers may be advantageously adopted for use within the instant invention. The detailed functions of the facsimile subcontroller means 8 in providing extensive protocols and the requisite control signals to the central switching means 1 will be apparent to those of ordinary skill in the art from a perusal of the technical manual devoted thereto as referenced above. Here, however, it is sufficient for an appreciation of the instant invention to understand that the facsimile controller means 10, as employed within the instant invention, is essentially only a transmitting device which is therefore addressed by the central switching means 1 only at such times as message information is to be transmitted to remotely located peripherals employing facsimile equipment. Therefore, the facsimile controller means 10 is addressed by the central switching means 1 by the issuance of an SIO (start input/output) instruction containing the address of the facsimile controller 10. The address is preset on switches provided for this purpose in the facsimile subcontroller means 8.

For any SIO instruction issued on the single data channel associated with the facsimile subcontroller means 8, the facsimile subcontroller means 8 acts to compare the address portion of this instruction with the preset address and when a favorable comparison results, the clock within the facsimile subcontroller means 8 is started. Thereafter, the facsimile controller means 8, which here may be assumed to take the form of a Model 7902 Extended Device Subcontroller, effectively becomes transparent for the purpose of data flow in that data is conveyed between the common data bus means 2 and the facsimile controller means 10 therethrough. In addition, it should be noted, as will be understood by those of ordinary skill in the art, that the employment of a Model 7902 Extended Device Subcontroller as the facsimile subcontroller means 8 imposes certain constraints in the operation of the switched store and forward communications system according to the instant invention. More particularly, this subcontroller has essentially four modes of exchange with a central computer such as the central switching means 1. Thus, orders and data are exchanged and each exchange may take the form of information translation from the central switching means 1 to the facsimile subcontroller means 8 or information translation from the facsimile subcontroller means 8 to the central switching means 1. Thus, when viewed from the standpoint of the facsimile subcontroller means 8, order out or data out information may be supplied from the central switching means 1 to the facsimile subcontroller means 8 and order in or data in information may be supplied from the facsimile subcontroller means 8 to the central switching means 1. Furthermore, a constraint imposed by the use of the 7902 Extended Device Subcontroller for the facsimile subcontroller means 8 is a requirement that the receipt of an order must be followed by a request for data by the facsimile subcontroller means 8. Operation within this constraint is readily achieved by the facsimile controller means 10 according to the instant invention, as shall be seen below; however, it should be here noted that as the facsimile controller means 10 is essentially a transmit only device, only order in, order out, and data out modes of exchange are employed as no data is provided from the facsimile controller means 10 through the facsimile subcontroller means 8 to the central switching means 1. Thus it will be appreciated by those of ordinary skill in the art that the facsimile subcontroller means 8 acts to appropriately interface the facsimile controller means 10 with the central switching means 1 in that it provides appropriate protocols for the input/output processor section of the central switching means 1 while providing appropriate control information and information format transformations so that both the central switching means 1 and the facsimile controller means 10 receive all information in a form fully compatible with the operation thereof.

The facsimile controller means 10 is connected to facsimile subcontroller means 8 through a plurality of cables 12–15. More particularly, the facsimile subcontroller means 8 acts to separate data and order information supplied from the central switching means and to apply the eight bit order or data information to the facsimile controller means 10 through individual input cables devoted thereto. Thus for instance, groups of eight bits in parallel representing data to be acted upon by the facsimile controller means 10 are supplied through cable 12 to the facsimile controller means 10 while groups of eight bits in parallel representing order information are applied to the facsimile controller means 10 through the cable 13 which also may comprise a plurality of parallel conductors. In addition, service information generated at the facsimile controller means 10 is provided to the facsimile subcontroller means 8 through cables 14 and 15 while other information in the form of control or advisory signals are supplied through the facsimile subcontroller means 10 through individual conductors, not illustrated in FIG. 1. Various ones of such control and advisory signals will be described in detail in conjunction with FIGS. 2 and 3 below.

For instance, whenever the facsimile subcontroller means 8 is rendered operative by an SIO issued by the central switching means 1, it is automatically placed in an Order Out mode wherein order information is requested from the central switching means 1 and when such Order Out information is forwarded to the facsimile controller means 10, the facsimile controller means 10, as shall be seen below, makes a data request on cable 14 which is forwarded through the facsimile subcontroller means 8 to the central switching means 1. Similar data requests are made by the facsimile controller means 8 each time an eight bit group of data forwarded from the facsimile subcontroller means 8 is processed thereby until such time as the facsimile controller means 10 receives an indication that all data associated with the command double word then being processed at the central switching means 1 has been issued, whereupon the facsimile subcontroller means 8 subsequently reverts into an Order Out mode wherein a terminal order is requested from the central switching means 1 and processed upon receipt by the facsimile subcontroller means 8 and the facsimile controller means 10. Furthermore, as shall be seen below, there are intervals during the operation of the facsimile controller means 10 wherein an order has been issued and responded to by the facsimile controller means 10 which require further operations to terminate until a certain external event occurs. Under these conditions when such external event occurs, as detected by the facsimile controller means 10, an interrupt is generated at the facsimile controller means 10 and supplied through cable 15 to the facsimile subcontroller means 8 whereupon an interrupt to the central switching means 1 is generated. However, for the purposes of appreciating the nature of the information conveyed between the facsimile subcontroller means 8 and the facsimile controller means 10, it is here sufficient to understand that order information and data information are separated by the facsimile subcontroller means and separately applied through individual cables 12 and 13 to the facsimile controller means 10 while requests for additional data are made by the facsimile controller means 10 through cable 14 and an interrupt condition advisory of the occurrence of a designated external event is generated at the facsimile controller means and supplied through the cable 15 to the facsimile subcontroller means 8 where it is employed to generate an interrupt for the central switching means 1.

The facsimile controller means 10 comprises data register means 17, two bit level encoder means 18, sequence gating means 19, facsimile chassis means 20, order register means 21, a data access arrangement 22, dialing means 23, and ready tone detector means 24. The facsimile controller means 10 acts in response to data and order information provided by the facsimile subcontroller means 8 to contact a designated remotely located terminal employing facsimile equipment, to perform appropriate hand shaking operations therewith, to transmit information in a suitable facsimile format therefor, and to thereafter terminate the communications link established. Furthermore, for the purposes of understanding the operation and apparatus employed within the facsimile controller means 10 it should be appreciated at the outset that in essence, the facsimile controller means 10 is organized to process either data or order information received from the facsimile subcontroller means 8 on separate input cables 12 and 13 and to respond thereto in providing its designated functions as set forth above. More particularly, the data information provided to the facsimile controller means 10 through the cable 12 is representative of facsimile information which is to be appropriately decoded and transmitted to a remotely located facsimile peripheral once communication and hand shaking functions are completed. Conversely, order information received from the facsimile subcontroller means 8 through cable 13 is appropriately decoded by the facsimile controller means 10 and employed therein to initate such functions as the establishment of a communication link with a designated remotely located peripheral employing facsimile equipment, the initiation and completion of hand shaking functions therewith and the termination of communications once all facsimile information to be transmitted has been sent. However, order information does not associate itself with the actual facsimile information conveyed and conversely data supplied through the cable 12 is associated solely with the facsimile information to be transmitted.

The data responsive portion of the facsimile controller means 10 comprises the data register means 17, the two bit level encoder means 18, the sequence gating means 19, and the portion of the facsimile chassis means 20 associated with the transmission of a baseband analog signal representing facsimile information to be conveyed. Thus, although the data portion of the facsimile controller means 10 will be described in much greater detail in conjunction with FIG. 2, it may here be appreciated that the data register means 17 comprises an 8 bit or single byte buffer which acts, when enabled, to store each 8 bit byte supplied through the cable 12 from the facsimile subcontroller means 8 to the facsimile controller means 10. As each 8 bit byte is received during a Data Out mode of operation at the facsimile subcontroller means 8, it is read from the data register and applied 2 bits at a time to the 2 bit level encoder means 18. Thus, the 2 bit level encoder means 18 is connected to the output of the data register means 17 through an 8 bit data cable 26 so that each 8 bit byte loaded into the data register means 17 is applied to the 8 bit data cable 26. The 8 bit data cable 26 may be connected through a conventional pair of 4:1 multiplexer means within the two bit level encoder means 18 which act in essence to apply two of the eight bits of each byte applied to the 8 bit data cable 26 to the output thereof under the control of sequence gating means 19 which may take the form of a conventional 4 bit counter means. The sequence gating means 19, in turn, may be driven by a clock which causes a different pair of outputs of the multiplexer means within the 2 bit level encoder means 18 to be enabled for each clock pulse received. Thus, after four clock pulses have been received by the sequence gating means 19 all 8 bits of data byte loaded into the data register means 17 will have been applied to the outputs of the multiplexer means present within the 2 bit level encoder means 18 in four 2 bit pairs wherein one 2 bit pair is produced for each clock pulse received by the sequence gating means 19.

Figure 2:
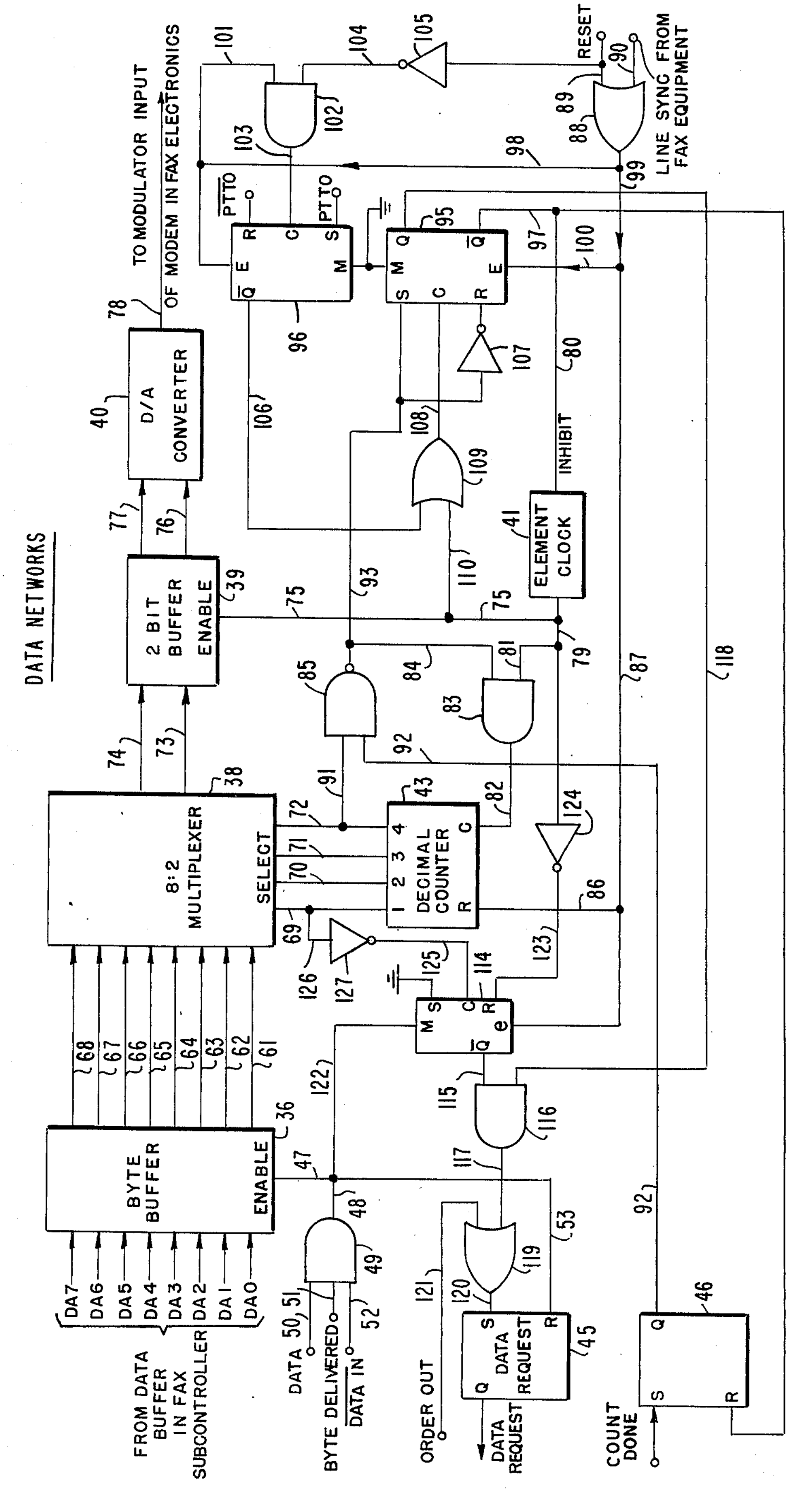
FIG. 2 is a schematic diagram illustrating an exemplary data network in accordance with the teachings of the present invention for the facsimile output terminal of the switched communications system illustrated in FIG. 1.

Each two bit pair of outputs present at the output of the multiplexer means present within the 2 bit level encoder means 18 is applied to the input of a digital to analog converter present therein which acts, as shall be seen in greater detail in conjunction with FIG. 2, to transform the pair of digital inputs applied thereto into an analog value which may vary between 5 and 11 volts depending on the nature of the digital input applied thereto. This analog value is applied to conductor 27 as a synthesized baseband signal to the input portion of the facsimile chassis means 20 where it is transformed into a suitable format for application to a telephone communications link or the like and this format will vary depending upon the nature of the facsimile equipment selected. As the nature of the 2 bit level encoder means 18, described in greater detail in conjunction with FIG. 2, is such that 2 bit pairs are encoded thereby, a four level analog encoding technique is essentially employed so that up to four analog levels may be developed and utilized for application through conductors 27 as an analog baseband signal to the facsimile chassis means 20. Furthermore since the pair of multiplexers within the two bit level encoder 18 are controlled by the 4 bit counter within the sequence gating means 19, it will be appreciated by those of ordinary skill in the art that each time four clock pulses have been received by the sequence gating means 19, the entire byte initially loaded into the data register means 17 will have been read and encoded according to the two bit level encoding technique described above. Therefore, after four clock pulses have been received by the sequence gating means 19, as will be more clearly described in conjunction with FIG. 2, a data request level is applied thereby to the cable 14 to generate a request to the facsimile subcontroller means and subsequently to the central switching means 1 for more data in the form of the next 8 bit byte which in turn is again loaded into the data register means 17.

If any of the current state of the art facsimile equipments conventionally available in the marketplace are analyzed according to their broadest aspects, it will be appreciated by those of ordinary skill in the art that the same may be reduced to one input which is responsive to an analog baseband signal for the development of suitable facsimile information to be transmitted and additional inputs which are in effect control inputs which are employed to control the operation of the designated facsimile equipment. Typically, the analog baseband signal would be developed from whatever means are employed in the selected facsimile equipment to scan a document whose information is to be transmitted and the analog baseband signal developed would be representative of the black, white and gray scale information present on the document being scanned. If the facsimile equipment selected operates in an FM mode, such baseband information would be generally applied to a voltage controlled oscillator which in turn would develop an FM signal representative of the baseband information which is suitable for transmission over a communications link such as a telephone line or the like. Conversely, should amplitude modulation equipments be selected, the baseband signal representative of the black, white and gray scale information on the document being scanned would be applied to a suitable modulator for developing amplitude modulated information while the same holds true for equipments employing phase or angle modulation and in each case the resultant modulated signal obtained would be in a suitable format for transmission over the communication link employed by such facsimile equipment and readily decodable by corresponding receive mode facsimile equipment disposed at a remotely located terminal.

Similarly, the control portions of the facsimile chassis means 20 would ordinarily take the form of condition inputs such as switch inputs which are actuated in response to a readying of the facsimile equipment selected for a transmitting mode of operation. Such switch inputs might conceivably take the form of open and closed door interlock inputs, send/receive/switch inputs, transmission mode inputs, acoustic coupler inputs for those machines relying upon acoustic coupling to a telephone line or the like, as well as any other readiness monitoring inputs supplied on the facsimile equipment chosen. For the purposes of disclosing the instant invention, it will be assumed that a Model 400 Telecopier apparatus or other compatible telecopier equipment, as conventionally available from the Xerox Corporation, has been selected as the remotely located facsimile equipment to which a transmitting capability is to be provided and hence the facsimile chassis means 20 will essentially comprise pertinent portions of a Model 400 Telecopier chassis although, as will be appreciated by those of ordinary skill in the art, any suitable facsimile equipment may be selected and as a matter of fact, several types of facsimile equipment may be incorporated within the facsimile controller means 10 such as FM and AM facsimile equipments with selection being governed by orders issued by the central switching means 1 as a function of the destination information supplied thereto by the initially transmitting teleprinter peripheral terminal. Alternatively, a plurality of facsimile subcontrollers and fascimile controllers could be employed wherein each facsimile controller means employs a different type of facsimile chassis means 20 such that the mode of facsimile communications selected is strictly a function of the destination information provided by the originating teleprinter in the system and all prevalent forms of facsimile terminals such as FM, AM and high speed leased systems such as LDX could be accommodated. However, as it has been assumed, as aforesaid, that remotely located facsimile peripherals employing Model 400 Telecopier apparatus, as well as other compatible facsimile equipments are to be serviced by the communications system according to the instant invention, it may be assumed for purposes of disclosure that the facsimile chassis means 20 may comprise relevant portions of a Model 400 Telecopier.

The nature, apparatus and modes of operation of a Model 400 Telecopier, as conventionally available from the Xerox Corporation, are set forth in detail in the service manual therefor entitled "406/400 Telecopier" published by the Business Products Group of the Xerox Corporation, Rochester, N.Y., under publication No. 600P80227 Rev. B. and the disclosure materials within this service manual are incorporated herein by reference to provide complete disclosure materials regarding the substance of the facsimile equipments selected for illustrative purposes in the disclosure of the instant invention. However, the operation which takes place between a pair of communicating facsimile machines in the form of Model 400 Telecopier transceivers will be summarized so that the functions and handshaking requirements which must be synthesized in the switched store and forward communications system according to the instant invention, when operating in a facsimile mode, will be apparent to a reader. Briefly the Model 400 Telecopier is a facsimile transceiver, which is a small, portable, acoustically coupled device that requires only the availability of an AC power line and a telephone handset for operation. The Telecopier, may operate in either a four or six minute mode and relies upon certain functions which are performed by an operator to assure that appropriate initial conditions, known as handshaking conditions, are established prior to operation to achieve appropriate communications.

The operation of a Model 400 Telecopier may be best appreciated by dividing the consideration thereof into aspects which are devoted to the conveyance of facsimile information and those aspects devoted to the control functions necessary to the establishment and maintenance of an appropriate communicating relationship. For facsimile communications to take place, it is necessary for an operator to establish certain initial conditions, to be described below at a transceiver and thereafter to place a telephone call to the location of the desired transceiver which is to receive the communication. From the standpoint of the facsimile information conveyed, a document containing the information to be transmitted is loaded upon a drum while a blank sheet of paper which has been treated to exhibit an electro resistive characteristic is loaded at the receiving transceiver. Once appropriate handshaking conventions have been completed between the receive and send mode transceivers, to be described below, and a phasing interval is initiated to assure that the document/copy drums of each transceiver is appropriately phased, the actual transmission of facsimile information between the send mode and receive mode transceivers takes place through the telephone link established. To send an image, the model 400 Telecopier transceiver acts to scan the light and dark areas on a document placed on the rotating drum thereof by projecting the light from a scanning lamp onto the rotating drum bearing the document having the information to be conveyed. This light is reflected back into the optics of the transceiver and is subsequently translated by an electro-optical transducer into electrical signals that vary in relation to the light reflected from the document to thereby produce an analog baseband signal whose amplitude varies as a function of the light and dark information present on the document loaded. The baseband signal as thus developed by the send mode transceiver is applied to a modem within the transceiver which acts, during send mode, as a voltage controlled oscillator to thereby frequency modulate the amplitude modulated baseband signal applied thereto in such manner that a 1500 Hz signal is developed for white, 2425 Hz signal is developed for black information while continuous tones of gray scale are established for all frequencies therebetween.

After a frequency modulated signal representing the black and white information present on the document loaded has been produced by the modem within the send mode transceiver, as described above, the FM signal developed is applied to an electroacoustic transducer where it is acoustically coupled to a telephone handset and transmitted through a telephone link established to the receive mode transceiver. At the receive mode transceiver, the FM signal conveyed through the telephone line is acoustically transduced into an electrical signal and then applied to the modem therein where it is effectively demodulated from the FM signal received from the telephone line into an amplitude modulated baseband signal which is representative of the original baseband signal developed upon the scanning of the document loaded at the send mode transceiver. The amplitude modulated baseband signal developed at the output of the modem at the receive mode transceiver is then applied to a stylus which traverses the rotating copy drum located at the receive mode transceiver. Thus, in this manner, the light and dark information of the original image present on the document loaded at the send transceiver is recreated at the receive mode transceiver on the recording paper as the same is traversed by the stylus.

To promote appropriate facsimile communication between a pair of communicating facsimile transceivers, certain handshaking functions are initiated prior to transmission to ensure that proper readiness conditions have been established at both transceivers for their respective send and receive roles, a phasing interval is established to assure that the transducing which takes place at both the send and receive mode transceivers occurs on the same point on the document/copy drum being scanned and a stop tone is produced at the send mode transceiver and will be detected at the receive mode transceiver to thereby terminate the operation thereof whenever scanning has been completed or one of the appropriate ready conditions at the send mode transceiver is terminated. The handshaking functions necessary to the appropriate transfer of facsimile information between communicating transceivers is achieved by ready condition monitoring apparatus in conjunction with certain functions which are performed by an operator. The ready condition monitoring apparatus relied upon in the Model 400 Telecopier system functions to ensure that each transceiver about to be employed in a transmitting or receiving role within a facsimile relationship is conditioned to a predetermined level of readiness for its role, prior to its entry into such relationship. In addition, apparatus is provided for causing a properly conditioned receiving transceiver to emit a ready tone or beep so that the operator of the transmitting transceiver, when following the recommended operating sequence established, is apprised of the ready condition of the receiving transceiver whereby facsimile transmission may be initiated at the sending device. The ready condition monitoring apparatus employed in each Model 400 Telecopier device thereby acts to facilitate the placement of appropriately conditioned transceivers into a transmission relationship and the initiating of transmission therebetween while prohibiting the operation of the transceivers employed whenever proper preconditioning has not occurred. This avoids many operator induced errors which would otherwise prevent the proper transmission and receipt of information and aids in ensuring the proper use of the equipment in the hands of an inexperienced operator.

In the switched store and forward communications system according to the instant invention, it will be appreciated that both the send mode functions of the ready condition monitoring apparatus relied upon in the Model 400 Telecopier system and the functions provided by an operator must be synthesized. More particularly, each Model 400 Telecopier includes a cylindrical rotating document/copy drum and transducer apparatus adapted to traverse such drum in the axial direction to accomplish scanning and printing, a send/receive mode switch to condition the transceiver for either the transmitting or receive mode of operation and an acoustic coupler to enable each transceiver to be directly coupled to ordinary telephone lines through the handset provided with conventional desk type telephone equipment. Access to the cylindrical document/copy drum for the purposes of mounting a document or copy paper thereon is obtained through a door in the portion of the housing overlying the copy/document drum. This door is provided with a switch for indicating the opened or closed condition thereof while right-hand and left-hand limit switches are provided to indicate the zero and end displacement positions respectively of the transducer apparatus which traverses the cylindrical rotating document/copy drum in the axial direction. Similarly, the acoustic coupler is provided with switch means to indicate whether or not a hand set is disposed therein. As the door switch, left hand limit switch and coupler switch must be in predetermined conditions each time a transceiver is to be utilized, the condition of these switches may be employed to monitor the readiness of a transceiver prior to use. If the transceiver is to be employed in a transmitting role, as indicated by the position of the send/receive mode switch, only the condition of the door interlock, left-hand limit and coupler switches are relied upon to determine the ready condition of the transceivers; however, when the transceiver is to be utilized as a receiver, the transducer apparatus must be placed to its zero displacement condition and hence the condition of the right-hand limit switch is also utilized. The condition of the acoustic coupler switch is employed to control the application of operating potential from the power supply to the transceiver to effectively couple and uncouple the system to the telephone line while the conditions of the remaining switches which are monitored are applied to various logic circuits to control the operation of the transceiver.

In a typical facsimile operation carried out between a par of Model 400 Telecopiers, the operator at the sending station will open the drum door to load the document/copy drum, then close the drum door and establish communications with an operator at the desired receiving site. Once communication is established, the operator will state that facsimile transmission is desired and ascertain from the operator at the receiving site the speed at which facsimile transmission is to occur. In this regard, it should be noted that the Model 400 Telecopier may selectively operate at 4 and 6 minute speeds so as to be compatible with other facsimile equipment and to accommodate various types of documents to be transmitted. The sending operator then sets the controls of the transceiver for the appropriate speeds, sets the send/receive switch to the send position and moves the transducer apparatus carriage position control to a position which is sufficiently to the right of its end position to accommodate the information on the document to be transmitted. This action appropriately conditions the left hand limit switch and may or may not place the right hand switch in the closed condition depending upon whether or not the transducer apparatus carriage position control is displaced to the zero or maximum right position which would occur when the subject matter on the document to be transmitted occupies the full length dimension of the 8 by 10 document area. The transmitting operator then listens for the ready beep on the telephone handset which indicates that the receiving transceiver is in a ready condition. The transmitting operator's previous action, however, has resulted in the closure of the door interlock switch and left hand limit switch and the placement of the transceiver in the send mode and these conditions would be established by this action whether or not a physical document for transmission was loaded.

When the operator at the receiving site is apprised that a facsimile transmission is to occur, the transceiver is loaded with copy paper and the drum door is closed. In addition, the transmission speed control is set to that previously decided upon, the send/receive mode switch is placed in the receive condition and the transducer apparatus carriage position control is displaced to the extreme right or zero position to place both the left and right hand limit switches in a closed condition. This action places the door and left and right hand limit switches in the closed condition as well as placing the transceiver in the receive mode. Thereafter, the operator at the receiving location places the telephone handset in the acoustic coupler which, as aforesaid, applies energizing potential thereto. As the receiving transceiver is in the receive mode and the door, left hand and right hand limit switches are in a closed condition, the application of power to the transceiver which occurs upon the closure of the acoustic coupler switch results in the production of a ready beep by this properly energized and conditioned receive mode transceiver. In the switched communications system according to the instant invention, all conditioning of the receive mode transceiver would be accomplished by an operator as only send mode functions are achieved by the exemplary embodiment of the switched communications system disclosed. However, where an operator located at the send mode transceiver would normally detect the ready beep, this function must here be performed by the communications system. This ready beep, which takes the form of a 1500 Hz. signal, is produced for an interval of 1.85 seconds and is applied to the telephone line through the acoustic coupler and the telephone hand set disposed therein at the receive mode transceiver. Alternate versions of the Telecopier system repeat ready beep intervals until phasing information is received. Upon the termination of the ready beep interval, the receive mode transceiver such as in the 400 Telecopier system is placed in a passive condition and awaits the receipt of phasing information from the send transceiver.

When the operator at the send location hears the ready beep from the telephone handset through which communication with the receiving site was established, the operator is apprised that the remotely located receive mode transceiver is in the prescribed ready condition. The sending operator then places the telephone handset in the acoustic coupler of the already conditioned send mode transceiver to thereby apply energizing potential thereto to accompany the function of effectively coupling the facsimile transceiver to the telephone line. As the transmitting receiver is in a transmit mode and has its door interlock switch and at least the left hand limit switch in their closed conditions, the application of power to the transceiver upon the closure of the switch on the acoustic coupler and the effective coupling of the transceiver to the telephone line immediately results in the activation of the transmit mode transceiver and the initiation of transmission in the transmit cycle of operation wherein, in the case of the Model 400 Telecopier system being discussed, FM signals from the transmit mode transceiver are applied through the acoustic coupler and the telephone handset to the established telephone communications channel and hence to the receive mode transceiver. When the carrier associated with the FM output of the transmitting transceiver is detected by the receive mode transceiver, the receive mode transceiver is again activated to begin the receive cycle of operation. In the transmission cycle of operation which now occurs between the transmitting and receiving transceivers, the first 15 secs of transmission time are devoted to the transmission of phasing signals to achieve proper phasing between the transmitting and receiving transceivers and thereafter data associated with facsimile information transmission begins.

The purpose of the phasing employed in any facsimile system is to assure that a point at which scanning is initiated on the document being scanned at the transmitting transceiver corresponds identically to the point at which copy reproduction is initiated on the copy paper being scanned by the stylus or transducer at the receiving transceiver so that, if an 8½× 11 document format is considered, the portion of an image which is located at the left hand margin of the document being scanned is reproduced precisely at the left hand margin of the copy being reproduced whereupon the facsimile information conveyed and produced at the receive location corresponds in format to that originally present on the document being scanned. As will be apparent to those of ordinary skill in the art, should such phasing techniques not be employed, it would be possible for the left hand portion of a document being transmitted to be reproduced on the right hand portion of the copy and the converse thereof so that satisfactory copies would not be produced at the receiving location.

The phasing concepts employed within the Model 400 Telecopier System are such that a 15 second phasing interval is established in which the receive mode transceiver is provided with an opportunity to phase the rotating document/copy drum thereof with that present at the transmitting transceiver. After this interval has terminated, the apparatus assumes that phasing has been satisfactorily completed and the transmission of video information takes place. In actuality, this 15 sec interval, as established by a phasing timer, is more than sufficient for phasing to be achieved and hence appropriate phasing will always occur. During the phasing period, the send mode transceiver transmits a continuous 2425 Hz. (black) signal which is periodically interspaced by a 1500 Hz. (white) signal timed to occur during the interval of each rotation of the document/copy drum where the gripper bar, employed to hold the document or copy paper in a fixed relationship to the drum, is passing beneath the scanning head. This periodic white signal is necessary to enable the receive mode device to determine the location of the gripper bar of the send mode transceiver and to phase its drum accordingly. Furthermore, this periodic white signal is always produced during the operation of the transmit mode transceiver to serve as a blanking signal and is timed to occur at the edge of the paper mounted under the gripper bar and thereby corresponds to the end of a line of facsimile information. This signal, known as line sync is, in actuality, produced by a pair of mirrors mounted on the drum; however, it is here sufficient to appreciate that when a transceiver is actuated in a transmit mode of operation 333ms are required for one complete drum rotation wherein 320 ms are occupied by the surface of the drum and 13ms are occupied by a scanning of the gripper bar. Therefore, during the phasing period, for each 333 millisecond interval, corresponding to a drum rotation within the phasing period established, 320 ms. of 2425 Hz. or black is transmitted interspaced by 13ms. of 1500 Hz. or white information and this sequence of information is repeated throughout the 15 second phasing period established.

The drum motors at both the transmitting and receiving transceivers are normally driven by a 120 Hz. signal and it will be appreciated that the receive mode transceiver is capable of internally generating a demodulated version of the phasing information transmitted thereto by the transmitting transceiver, viz., logic 0 for black having a duration of approximately 323 ms. and approximately a 10 ms. white of logic 1 level for each drum rotation wherein the information for the 10 ms. interval occurs during the scanning of the gripper bar thereat as aforesaid. Therefore, during the first 15 seconds of operation. or the phasing period established by the phasing timer, the occurrence of the white signal for each revolution as transmitted by the transmitting transceiver is compared in time with the occurrence of the logic 1 signal generated in the receive mode transceiver and during any interval therebetween the drum at the receive mode transceiver is driven by a 90 Hz. signal so that in effect, the drum at the receive mode transceiver is allowed to slip back to come into phase with that present at the send mode transceiver. As the drum at the receive mode transceiver continues to slip back in response to a time displacement between the line sync or white signal transmitted and the logic 1 signal produced at the receive mode transceiver, the drums of both transceivers are brought into phase and at the end of the 15 second phasing interval established, both drums will be appropriately phased so that scanning at each device is initiated at the same point. Thereafter, the transmitting transceiver initiates a scanning of the document while the line sync or white signal is transmitted during the occurrence of the scanning of the gripper bar.

The transmission of data or facsimile information continues for the four or six minute interval established, assuming that the transducer at the transmitter was fully displaced to its maximum or zero starting position. At the end of the data transmission interval, the left hand limit switch at the transmitting transceiver will open when the transducer thereat reaches its end position and this results in the transmission of a stop tone, an 1100 Hz. signal, from the transmitting transceiver to the receiving transceiver. The stop tone signal would also be transmitted at any time during the operation of the transmitting transceiver that the door interlock switch was opened. The receipt of a stop tone by the receiving transceiver is detected and would cause the receiving transceiver to stop. Similarly, the absence of carrier will result in the stopping of the receiving transceiver under normal conditions. Any time the receiving transceiver is stopped, an audible end of message signal is produced to apprise the operator that the facsimile transmission has ended. The receiving transceiver will also stop any time the door interlock switch is opened or it is de-energized by the removal of the telephone hand set from the acoustic coupler; however, no stop tone is produced thereby unless the door interlock switch is opened during the interval when ready signal is being produced. In any event, the transmitting transceiver is not responsive to stop tone. Thus, once the transmitting operator is apprised by the audible ready tone that the receiving transducer is in a ready condition, transmission is initiated and controlled by the transmitting transceiver.

In the switched store and forward communications system according to the present invention, the facsimile subcontroller means 8 and the facsimile controller means 10 act, under the program control initiated by the central switching means 1 to perform all functions of a transmitting facsimile transceiver including the enabling of those functions performed automatically by the transceiver in response to the establishment of appropriate ready conditions by an operator as well as those functions normally provided solely by the operator such as the establishment of a telephone communications link to a desired receiving site and the coupling of the modem to an established telephone link once ready tone from the receiving transceiver is detected. From the discussion of the facsimile controller means 10 and more particularly, that previously set forth in regard to the data register means 17, the 2 bit level encoder means 18, and the sequence gating means 19; it will be appreciated by those of ordinary skill in the art that message information inserted into the exemplary embodiment of the switched store and forward communications system according to the instant invention is transformed into a suitable decodable facsimile format and subsequently converted into a baseband analog signal whereupon the same is applied through conductor 27 to the facsimile chassis means 20. The description of the Model 400 Telecopier system set out above will now render it apparent that the same baseband analog signal provided upon the scanning of a document mounted on the rotating drum is effectively synthesized at the output of the 2 bit level encoder means 18 and applied through conductor 27 to the facsimile chassis means 20. Furthermore, it will now also be appreciated, that due to such synthesis, the facsimile chassis means 20 does not require the utilization or even the presence of an optical scanner and the rotating drum means described above. Thus, the analog input synthesized within the instant invention may be applied directly to the modem of the facsimile chassis means 20 where the same is frequency modulated and coupled to a telephone line. Thus, the portion of the facsimile controller means 10 which acts upon data transmitted through the facsimile subcontroller means 8 is effective, as shall be seen in greater detail in conjunction with FIG. 2, to transform such data into an analog baseband signal which approaches that developed by the scanner in Model 400 Telecopier facsimile machine, or any other scanning facsimile device for that matter and hence, may be applied directly to the modem of the facsimile chassis means 20 for subsequent application to a previously established telephone communications link.

The requisite readiness monitoring functions of the facsimile apparatus, as well as those initiating functions performed by an operator are synthesized, under program control, by the orders issued by the central switching means 1 and applied through the facsimile subcontroller means 8 to the order register means 21. As was previously discussed, orders issued by the central switching means 1 are separated from data by the facsimile subcontroller means 8 and separately applied to the facsimile controller means 10 by the facsimile subcontroller means 8. More particularly, order information received from the common data bus means 2 is supplied by the facsimile subcontroller means 8 through the cable 13 to an input of the order register 21. The order register 21 will be described in much greater detail in conjunction with FIG. 3 so that it is here sufficient to appreciate that the order register 21 comprises, in essence, a gating arrangement which acts to decode a plurality of orders issued by the central switching means 1 and develop therefrom a plurality of control levels employed to enable the readiness monitoring inputs on the facsimile chassis means 20 as well as control inputs employed to perform such functions as dialing and ready tone detection. Thus, from the description of the Model 400 Telecopier apparatus described above, it will be appreciated by those of ordinary skill in the art that certain readiness monitoring features are controlled by the control levels associated with switches used to monitor the position of the document/copy drum door interlock, the send/receive lever, the 4/6 minute mode lever and the left-hand limit switch. Of these various switches which are employed in the Model 400 Telecopier for appropriate monitoring for readiness or continued readiness conditions, it will be appreciated by those of ordinary skill in the art that as the end of message information may be best controlled by the central switching means 1 which is cognizant of the nature of the data conveyed, the condition of the right hand limit switch may be tied in an opened condition so that this control input to the facsimile chassis means 20 is not operated as a function of the output of the order register means 21. However, the remaining readiness monitoring inputs to the facsimile chassis means 20, i.e., the conditions of the send receive switch, the door interlock switch, the 4/6 minute mode switch and the acoustic coupler switch should be controlled as a function or orders decoded by the order register means 21 so that appropriately timed readiness monitoring information is present at the selected switch inputs to the facsimile chassis means 20 whenever transmission is to take place.

Figure 3:
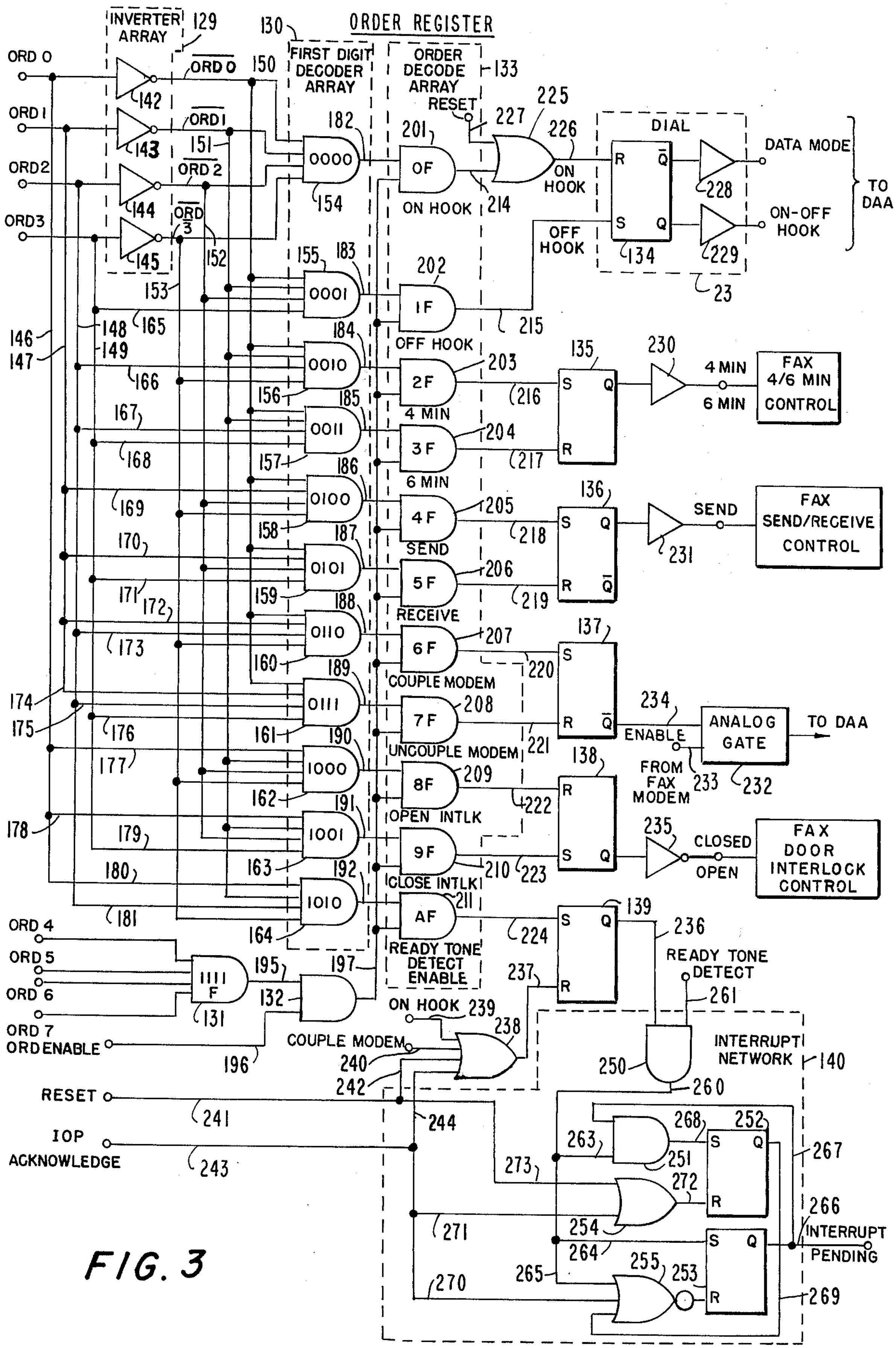
FIG. 3 is a schematic diagram of an exemplary order register suitable for use in the facsimile output terminal of the switched communications system depicted in FIG. 1.

The various inputs dedicated to this purpose are decoded within the order register means 21 and as shall be seen in conjunction with FIG. 3, discrete levels indicative of an open or closed switch condition are applied to the facsimile chassis means 20. It will of course be appreciated by those of ordinary skill in the art that the actual connection of the various outputs of the order register means 21 devoted to this purpose may be implemented at the facsimile chassis means 20 by tieing appropriate conductors having an enable or disable voltage level thereon, as developed in the order register means 21, to the output side of the physical location of the switches employed for this purpose within the facsimile chassis means 20. Therefore, the various control outputs of the order register which are devoted to this purpose are applied through a cable 28 to the facsimile chassis means 20 and it will be appreciated by those of ordinary skill in the art that cable 28 includes one conductor associated with each control input developed and each such conductor is terminated at the output side of the corresponding switch within the facsimile chassis means 20 so that upon receipt of appropriate orders by the facsimile subcontroller means 8 and the appropriate decoding thereof by the order register means 21, switch inputs synthesizing a 4/6 minute lever setting, a send/receive mode control lever setting, a coupled or uncoupled modem setting and an open or closed door interlock control setting may be synthesized and applied to appropriate switch inputs on the facsimile chassis means 20. In this manner all readiness monitoring conditions appropriate for a transmit mode transceiver can be synthesized and applied to the facsimile chassis means 20 and appropriately timed to control the selective enabling of the facsimile electronics within the facsimile chassis means 20 as well as the selective disabling thereof. Thus it will be appreciated by those of ordinary skill in the art that the facsimile chassis means 20 is supplied with an analog baseband signal corresponding to the analog baseband signal which would normally be developed by an actual facsimile device while all readiness monitoring control functions except for the right hand limit switch which is tied, as aforesaid, in an enabled condition are supplied by orders decoded by the order register means 21 and coupled through a multiconductor cable 28.

While an important advantage of the Model 400 Telecopier system is the portability of each transceiver achieved through an acoustic coupling to a telephone line, such an attribute is unnecessary in the switched communication system according to the instant invention as the fasimile electronic included within the facsimile chassis means 20 acts, as shall be further understood below, only in a transmit mode and is essentially fixed in location to the environment of the central station. For this reason, the acoustic coupler thereof is bypassed and the output of the modem is tied through conductor 29 to a conventional data access arrangement 22. The data access arrangement 22 may comprise a conventional PC-1001A data coupler available from Precision Components, Inc. of Addision, Ill. This conventional form of data access arrangement, well known to those of ordinary skill in the art, effectively acts to hard wire the output of the facsimile chassis means 20 to a public and/or private telephone system with selective access being supplied thereto through an on hook/off control input which allows customer equipments to dial pulse for call origination. The on hook/off hook control to the data access arrangement means 22 is supplied through conductor 30 which is connected to the dialing means 23. As is well known to those of ordinary skill in the art, the data access arrangement 22 is enabled for communication with the telephony system connected at the output thereof, as indicated by conductor 31, whenever an off hook control level is applied to conductor 30 while it is disabled from communication therewith whenever an on hook level is supplied on conductor 30. The dialing means 23 may comprise, as shall be seen in more detail in connection with FIG. 3, a conventional latch and driver network which acts in the well known manner to respond to on hook and off hook commands supplied thereto to provide and maintain an on hook or off hook level on conductor 30 until such time as a new control input is supplied to the input thereof. The control inputs to the dialing means 23 are supplied through conductor 32 from another output of the order register means 21 and, as shall be seen in greater detail in conjunction with FIG. 3, orders commanding on hook or off hook control levels are issued by the central switching means 1, decoded by the order register means 21 and supplied through the conductor 32 to the dialing means 23 whereupon such on hook or off hook control levels are applied throuch conductor 32 to the data access arrangement 22 and maintained until the same is changed by a subsequent order. Although the dialing means 23 has been here described as merely comprising a latch and drive arrangement, to be further amplified in conjunction with FIG. 3, it should be noted at this juncture of the specification that this nomenclature has been selected because dialing is achieved in the exemplary emobidment of the invention here being described through the selective application and timing of successive on and off hook commands in a manner well known to those of ordinary skill in the art. It should be noted, however, that alternatively, a touch tone pad or relay driven dialing arrangement could be employed while separate on hook and off hook commands for telephone access could be separately supplied to the data access arrangement 22.

While the input to the data access arrangement 22 is supplied from the facsimile chassis means 20 through input conductor 29, the output thereof representing communications forwarded on the telephone line 31 are applied through conductor 33 to the ready tone detector means 24. From the description of the readiness monitoring conditions associated with the transmitting facsimile transceiver described above, it will be appreciated by those of ordinary skill in the art, that only information received from a receiving location as a necessary predicate to facsimile mode transmission in the receipt of ready tone indicating that the receive mode transceiver is properly conditioned to receive a facsimile mode transmission and has been coupled to the telephone link established. The ready tone detect means 24, is described in detail in conjunction with FIG. 4; however, at this juncture of the specification, it is sufficient to appreciate that the ready tone detector means 24 comprises a bandpass filter whose passband is selected to pass the ready beep forwarded and additionally includes circuit means adapted to ensure that the presence of such ready tone is maintained for a selected interval to assure that spurious noise on the phone line is not mistaken for ready tone. The ready tone detector means 24 is connected through conductor 34 to the order register means 21. Although the function of the output of the ready tone detector means 24 will be described in detail in conjunction with FIG. 3, it is here sufficient to appreciate that the same is employed within the order register means 21 in the generation of an interrupt level which is conveyed through cable 15 and the facsimile subcontroller means 8 to the common data bus means 2 whereupon the same is employed by the central switching means 1 as an interrupt level used to cause the initiation of facsimile transmission from the facsimile controller means 10. Thus, it will be appreciated by those of ordinary skill in the art, that orders decoded by the order register means 21 are employed to provide the facsimile chassis means 20 with appropriate readiness monitoring input conditions through the cable 28, on hook and off hook commands decoded thereby are applied through conductor 32 to cause the dialing means 23 to dial a remotely located receive mode facsimile device through the data access arrangement means 22 while the ready tone detect means 24 acts to determine the presence of ready tone information on the telephone line 31 and hence to ascertain when a remotely located receive mode transceiver has been contacted and the same is in a ready condition to receive a facsimile transmission.

GENERAL FACSIMILE TRANSMISSIONS

Although the detailed structure and operation of the instant invention and more particularly the portions thereof associated and with the facsimile controller means 10 will be best appreciated from the apparatus and program material described in conjunction with succeeding figures, a brief explanation of the mode of operation initiated by the facsimile controller means 10 will here be set forth to acquaint a reader with the overall transmission techniques employed in a facsimile mode of operation. As was briefly outlined above in the description of the operation of the switched communications system depicted in FIG. 1 which is associated with the leased line TTY communications system 9, message information from any one of plurality of teleprinter or teletypewriter devices within the leased line TTY communications system 9 are inputted to the system with header or destination information defining the re- located peripherals to which such message information is to be automatically transmitted under the control of the central switching means 1. Furthermore, as was outlined above, each character transmitted is translated to EBCDIC by the central switching means 1 and stored in a message buffer associated with the line. When the message buffer is full, appropriate backward and forward links are inserted to chain each message together and the buffer contents are logged on a sector of the RAD and this activity is continued until an end of transmission character is received from the transmitting terminal. At this point, the message header is released to header analysis where the header format and routing information is validated. If the message is acceptable to the system, an output header is generated if the destination device or devices specified are teleprinter or teletypewriter terminals; and the output header or headers generated are employed to replace the input header and thereafter placed in the output line queue for the destination terminals listed in the header.

If the destination information associated with the message input to the system should, however, define a remotely located terminal employing facsimile equipment, the foregoing process is somewhat modified so that when the validating process is completed, all facsimile destination information in the input header is logged or written in a fixed position in the input header and during the header analysis routine, a request for facsimile header analysis is queued by the setting of a flag. Thereafter, message information destined for remotely located peripherals employing facsimile equipment are processed by facsimile header analysis in much the same manner described for the header analysis which takes place for message information destined for teleprinter or teletypewriter peripherals, with the exception of multipage messages, i.e., those having more than 72 lines of message information associated therewith, which in essence have an independent message header established for each page of message information associated therewith. However, if it is here assumed for the purposes of a simplified explanation, that only one facsimile destination peripheral is specified and the message is only a single page message, facsimile header analysis will work to replace the input header with an appropriate output header and to log the output header and message in an output line queue for the output line which in this case is the data channel assigned to the facsimile subcontroller means 8. Thus, it will be appreciated that normal teleprinter header analysis acts to validate the input header information associated with a destination peripheral employing facsimile equipment and thereafter facsimile header analysis is initiated to replace the input header with an appropriate output header and establish an output queue for the input header and message information. It should also be noted that the establishment of a line queue on the RAD only requires message replacement of information in the sector of the RAD associated with the input header information as other sectors devoted solely to input message information, as previously logged as the input message was received, are retained and utilized through the insertion of appropriate links from the newly established sector having the output header and only sufficient message information to fill that sector of the RAD. Subsequently, the line queue established for the remotely located peripheral employing facsimile equipment will be relieved by the issuance of an SIO instruction by the central switching means 1 which is appropriate to address the facsimile subcontroller means 8. When the facsimile subcontroller means 8 is addressed, the clock thereof will be started and the SIO issued will be acknowledged. Thereafter, as the central switching means 1 has been advised that the facsimile subcontroller means 8 is available due to the successful SIO, the following series of operations will be initiated to cause the message information established in the line queue associated with the facsimile subcontroller means 8 to be transmitted to a desired destination peripheral which in this case employs facsimile equipments, as aforesaid.

In relieving the line queue established for the facsimile subcontroller means 8, a request is made that the header sector of the queue be read. Thereafter, when the header sector is read, interrupt is generated and when responded to the destination information present in the output header is applied to a look-up table wherein the actual telephone number for the desired remotely located peripheral employing facsimile equipment is obtained. Furthermore, orders are issued by the central switching means 1 to the facsimile controller means 10 through the facsimile subcontroller means 8 to cause the facsimile controller means 10 to be initialized. More particularly, the orders issued for the initialization of the facsimile controller means 10 are decoded in a manner to be described in conjunction with FIG. 3 and applied through conductor 32 and cable 28 to the dialing means 23 and the facsimile chassis means 20. These orders will cause the dialing means 23 to supply an on hook input to the data access arrangement 22 while the facsimile chassis means is initialized by the application of appropriate control levels to the various switch inputs thereof, as described above, to cause the facsimile chassis means to be placed in the four minute send mode, the modem to be placed in an uncoupled mode which may be, in effect, a disabled input on the switch input to the acoustic coupler and to place an open condition on the door interlock switch input. Thus, for this set of initial conditions, it will be seen that the data access arrangement 22 is not effectively connected to the telephone line through conductor 31, while the facsimile chassis means 20 is set to a 4 minute send mode; however, the door interlock reflects an open condition and the modem thereof is uncoupled so that even if the data access arrangement was connected to the telephone line, no output thereto would be provided by the facsimile chassis means 20. Furthermore, at this juncture, it should be noted that in the interest of a simplified description, this disclosure has assumed that all transmissions take place in a 4 minute mode; however, as will be apparent to those of ordinary skill in the art, remotely located facsimile equipment employing compatible six minute apparatus may be defined in the telephone look up table mentioned above and/or message information best transmitted to 4/6 minute equipment in a 6 minute mode could obviously be defined in association with the input header information transmitted.

Once the initialization of the facsimile controller means 10 has been accomplished in the foregoing manner, a telephone call to the desired peripheral employing facsimile equipment is initiated by the issuance of on and off hook commands or orders to the facsimile controller means 10. More particularly, as was briefly mentioned above, dialing through a data access arrangement 22 may be achieved, in a manner well known to those of ordinary skill in the art, by causing the data access arrangement 22 to go off hook for a period which is sufficient to assure the securing of dial tone and then actual dialing may be achieved by causing the data access arrangement 22 to go on hook for sixty milliseconds and off hook for 40 milliseconds for each unit of a digit while successive digits in a designated telephone number have off hook intervals of 1 second therebetween. Thus, for instance, to dial a "2" digit by this technique, an on hook instruction would be issued and followed by an off hook instruction 60 ms. later which in turn would be followed 40 ms. later by an on hook instruction and this would be followed by an off hook instruction 60 ms. which is maintained for an interval of a second. Thereafter, the second digit of the phone number would then be dialed using the same technique.

Upon the completion of the orders in the form of appropriately timed on hook and off hook instructions to achieve the necessary dialing of the location at which the desired facsimile terminal is located, the facsimile controller means 10 would be placed in a condition to apprise an operator located at the dialed site that an automatic facsimile transmission is about to be initiated and hence to ready the equipment thereat. In addition the facsimile controller means 10 must be enabled to detect when a communication link to a ready to receive transceiver has been successfully established. Although other techniques directed to this purpose could be employed, these functions are here achieved by broadcasting stop tone, i.e. an 1100 Hz. signal, in a periodic manner and alternating such broadcasts with listening periods for the ready tone. Thus in this embodiment of the instant invention, operators of remotely located peripherals employing facsimile equipment are advised when their equipment is included in the communications system by a listing of the telephone number and a header designation therefor, any time that location is called and an answer is greeted by the periodic receipt of stop tone, they are to immediately ready their transceiver for a receive mode operation and to place the handset of the phone in the acoustic coupler thereof when this has been done so that ready tone may be broadcast to the transmitting location. Furthermore, it should be noted that this embodiment of the instant invention ascertains that a successful communications link to a designated remotely located facsimile peripheral is established by the receipt of ready tone and hence, the equipment does not merely respond to a successful contacting of an operator as distinguished from the receipt of a busy signal from the remotely located site. Alternatively, as will be appreciated by those of ordinary skill in the art, another form of audible message may be substituted for the intermittent transmission of stop tone and it will further be appreciated that the transmission of stop tone is interleaved with listening periods so that the ready tone detector means 24 may monitor the telephone line during periods of silence at the transmitting site.

The foregoing technique of transmitting stop tone and thereafter listening is accomplished by the issuance of appropriately timed orders by the central switching means 1 which, when decoded by the order register means 21, cause the modem of the facsimile chassis means 20 to be selectively coupled and uncoupled from the data access arrangement 22. More particularly, it will be recalled from the description of the Model 400 Telecopier System described above, that whenever a transceiver is in a send mode, the modem is coupled and the door interlock is opened or the left hand limit switch, here not relevant, is closed, stop tone will be automatically broadcast. Therefore, as the initialization of the facsimile chassis means 20 has already caused the facsimile chassis means to be placed in a 4 minute send mode with the modem in an uncoupled condition and the door interlock switch input in an open condition, the only condition precedent to broadcasting stop tone will be to couple the modem. Accordingly, orders are issued by the central switching means 1 which when decoded cause the modem to be coupled and one half second later, an uncoupled modem order is issued to establish the listening period. This sequence of instructions will, as will be appreciated by those of ordinary skill in the art, cause stop tone to be broadcast for intervals of one half second to the remote site which has been assumed to have been contacted followed by one second listening intervals during which the receipt of a ready tone from such site may be monitored.

In the design of the instant embodiment of the communications system according to the instant invention, it has been assumed that if a successful communication to a remotely located peripheral employing facsimile equipment is achieved, the equipment thereat may be readied and ready tone transmitted within an interval of 30 seconds. This 30 second interval was arbitrarily selected and of course may be varied at will to better accommodate the needs of a given system. However, in the exemplary embodiment of the instant invention being described, the period of alternating the broadcasting of stop tone for a one half second interval followed by a listening interval of 1 second is continued for a 30 second period. If no ready tone is detected within the 30 second monitoring interval established by a real time clocking system established under program control, an on hook instruction is effectively issued whereupon the DAA is caused to hang up on any communication link which may have been established and subsequent transmissions may be initiated on a relieval basis; however, if, during this thirty second interval, ready tone is transmitted, the same will be conveyed through the data access arrangement 22 and through conductor 33 to the ready tone detector means 24. The ready tone detector means 24 is described in greater detail in connection with FIG. 4. Here, however, it is sufficient to appreciate that if a signal whose frequency and duration is appropriate is transmitted during a listening interval, the ready tone detector means 24 will supply a predetermined control level to conductor 34. This control level is supplied to the order register means 21, described in detail in FIG. 3 and employed to generate an interrupt through cable 15 for the central switching means 1. This interrupt will cause the 30 second timer to be disabled and cause the next sequence of instructions in the facsimile transmission sequence being described to take place.

When the central switching means 1 responds to the interrupt generated by the facsimile subcontroller means 8 in response to a detection of ready tone, orders are issued by the central switching means 1, under program control, which when decoded by the order register means 21 result in control levels on cable 28 causing the door interlock switch to exhibit a closed condition and the coupling of the modem within the facsimile chassis means 20. Thus, at this juncture, since the facsimile chassis means 20 was initialized to exhibit a four minute send mode, and the last set of orders resulted in a synthesizing of a closure of the door interlock switch and a coupling of the modem, the facsimile chassis means 20 acts in the same manner as a conventional Model 400 properly conditioned for a send mode of operation when the handset is placed in the acoustic coupler. More particularly, once the modem within the facsimile chassis means 20 is coupled and a closed condition is synthesized for the door interlock switch, the facsimile chassis means 20 goes into a normal mode of transmission. In such normal mode of transmission, as aforesaid, phasing information is transmitted for the first fifteen seconds of operation in the form of the transmission of black information (2425 Hz.), for an interval of 320 ms. interspaced by line sync pulses in the form of a 1500 Hz. frequency having a duration of 13 ms., and timed to correspond to the rotation of the gripper bar past the scanning means in a model 400 Telecopier System.

When the phasing timer times out (PTTO) after the fifteen second phasing interval established thereby, a data service request is made to the central switching means 1 by a level generated on cable 14 and supplied to the facsimile subcontroller means 8 in a manner discussed in detail in conjunction with FIG. 2. In response to each data request, information read from the RAD in the form of EBCDIC and loaded into a sector buffer is transformed under program control within the central switching means 1 into a digital format decodable into facsimile information. The encoding into a digital format decodable into facsimile information is achieved through a matrixing arrangement wherein each alphanumeric character representation is divided into a nine line scan of facsimile information wherein the last two lines are completely white to provide interline spacing. As each line of information loaded into the sector buffer from the RAD is read and transformed into nine lines of facsimile scan information, it is forwarded, in a manner to be described below, through the common data bus means 2 to the facsimile subcontroller means 8 in groups of eight bits in parallel Each 8 bit byte forwarded is applied to the facsimile subcontroller means 8 through the common data bus means 2 and is separated and applied through cable 12 to the data register means 17. Thereafter, each pair of bits therein is applied under the control of the sequence gating means 19 to the 2 bit level encoder means 18 and transformed into an analog level, wherein, a 1-1 digital combination may be taken as black and transformed into an 11 volt analog level, a 0-0 digital combination may be taken, for example, as white and transformed into a 5 volt level while the other two digital combinations available, depending upon the encoding scheme selected, from the pairs sequence may be employed for gray scale designations.

Each analog level developed by the 2 bit level encoder means 18, acting under the control of the sequence gating means 19, is applied through conductor 27 as a portion of the analog baseband signal synthesized to the facsimile chassis means 20. This analog baseband signal is applied to a voltage controlled oscillator in the modem of the facsimile chassis means where it is frequency modulated on the basis of the magnitude of the input and coupled through conductor 29 as an input to the data access arrangement 22. After all four pairs of bits within each byte forwarded from the central switching means 1 are level converted by the 2 bit level encoder means 18, a new byte is requested by the sequence gating means 19 through the cable 14 until all facsimile information associated with the message initially stored has been appropriately transformed into an analog baseband signal, frequency modulated by the modem within the facsimile chassis means 20 and applied through conductors 29 and 31 as well as the data access arrangement 22 to the telephone link established. Upon the completion of the forwarding of the last byte of message information by the central switching means 1, a count done signal is issued by the central switching means 1 and conveyed to the facsimile controller means 10. After an appropriate interval has expired to ensure that information from the last byte of message information transmitted has been encoded and forwarded to the receiving peripheral in the form of facsimile information, an order is issued by the central switching means 1, which when decoded by the order register means 21 and applied through cable 28 to the facsimile chassis means 20, results in the synthesis of an open door interlock switch condition. This causes, as will be appreciated from the description of the Model 400 Telecopier System described above, the issuance of stop tone (1100 Hz) due to a disabling of one of the ready conditions monitored by the facsimile chassis means 20. After a pause of about three seconds to allow stop tone to be transmitted for a sufficient duration to be detected by the receiving facsimile apparatus located at the remotely located peripheral, a second set of orders are issued by the central switching means 1 and applied through the facsimile subcontroller means 8 to the order register means 21. These orders, when decoded by the order register means 21 and applied through cable 28 to the facsimile chassis means 20 and through conductor 32 to the dialing means 23 result in a decoupling of the modem within the facsimile chassis means 20 and the application of an on hook signal through conductor 30 to the data access arrangement 22. Thus, the facsimile controller means 10 is caused to terminate communications by effectively hanging up.

From the foregoing brief explanation of the operation of the portion of the embodiment of the invention depicted in FIG. 1 associated with the transmission of facsimile information, it will be appreciated by those of ordinary skill in the art, that the facsimile controller means 10 operates under the program control implemented by the central switching means 1 to initiate telephone communications with a remotely located peripheral employing facsimile equipment whenever a teleprinter or teletypewriter message is inputted into the switched store and forward communications system according to the instant invention and is designated for forwarding to a remotely located peripheral employing facsimile equipment. Once the telephone number of the location at which a designated peripheral employing facsimile equipment has been dialed, the facsimile controller means 10, acting under program control through orders issued by the central switching means 1, commences the broadcast of identification information, in this case in the form of an 1100 Hz. stop tone, alternated with listening periods on the telephone link established to ascertain the presence of ready tone, indicative that the remotely located facsimile equipment dialed is properly on the line and in a ready condition to receive a facsimile communication. However, should a ready tone not be detected within a predetermined interval, for example 30 seconds, the facsimile controller means 10, acting under program control, will terminate the communications link so that regardless of whether a busy signal is obtained, the telephone at the remote station is unanswered or the facsimile equipment thereof is not ready in the designated interval; the attempt to transmit in a facsimile mode is abandoned in favor of a subsequent attempt.

Should a ready tone be detected, however, an interrupt level is generated at the facsimile controller means 10 and communicated to the central switching means 1 to effect a service request. When the interrupt is responded to, orders are issued which cause the facsimile chassis means 20 to initiate its automatic 15 second phasing mode and thereafter, the message information stored at the central station is transformed into a decodable facsimile format, forwarded to the facsimile controller means 10 and thereafter transformed into an analog baseband signal which is, in this case, subsequently frequency modulated and applied to the telephone line connected to conductor 31 through the data access arrangement means 22. Upon an indication from the central switching means 1 that the last byte of information has been forwarded, and the expiration of an appropriate interval to assure that such information has been transmitted through the telephone line in a facsimile format, the facsimile chassis means 20 is forced, under program control, to broadcast stop tone for a designated interval so that the receiving transceiver is stopped and thereafter the telephone link established is terminated.

In this manner, the exemplary embodiment of the switched store and forward communications system according to the present invention exhibits the desireable capabilities of receiving information from remotely located teleprinter or teletypewriter apparatus and placing the same in a store and forward facility for subsequent forwarding to designated and remotely located peripherals which may take the form of peripherals employing either teleprinter, teletypewriter, or facsimile equipment. In any case, once a designated message is input to the system and accepted thereby, the same is stored and later forwarded to designated destination peripherals on an automatic basis as soon as the same are available for reception purposes. Furthermore, should a designated peripheral be it teletypewriter, teleprinter or facsimile, be unavailable for transmission purposes, the message to be forwarded is intercepted and subsequently transmitted on a relieval basis and such process will continue until such time as the message information is successfully sent to each of the designated destination peripherals, it being appreciated that message information may be destined for one or more of a plurality of peripherals and additionally a broadcast mode of operation may be employed. In addition, RAD unit storage for destination peripherals employing facsimile equipment is maintained in the same manner as was described for header and message information destined for teleprinter terminal peripherals and hence, retrieval of any message previously forwarded to a given destination peripheral employing facsimile equipment may be achieved by calling the central switching station and having an operator thereat initiate a retrievel operation therefor.

Although the operation of the facsimile controller means 10 within the exemplary switched store and forward communication system illustrated in FIG. 1 will be set forth in greater detail hereinafter certain attributes thereof here warrant mention. For instance, it should be noted that in general facsimile operations, a transmitting facsimile device will transmit facsimile information for all portions of a document which is scanned and hence in the case of the Model 400 Telecopier System described above, if the transducer is set to its right most scan position, an entire 8 ½ × 11 document will be scanned even though only a small part thereof may be occupied by message information while the remaining portions thereof are devoted to margin, blank space, or the like. Instead, facsimile communications within the switched store and forward communications system according to the instant invention are message oriented and hence, even though appropriate top and side margins are provided under program control, in a manner to be further described below, stop tone is broadcast at the end of each message forwarded regardless of whether such message occupies an entire page or only a single line thereof. This is highly advantageous because while ordinary facsimile communications will take substantially longer than is necessary for the transmission of the message information on the document, in the switched communications system according to the instant invention, the message orientation associated with the facsimile transmission will result in a substantial reduction in telephone time during transmission. In addition, should the message information inputted from a teleprinter or teletypewriter input peripheral exceed more than one page i.e., 71 lines, in a facsimile mode of communication, the message inputted will be broken up for output purposes under program control, so that appropriately sized pages of facsimile information are transmitted and independent transmissions therefor are established to allow the receiving facsimile equipment to be newly readied for each page transmitted.

Additionally, it will be appreciated by those of ordinary skill in the art that although certain modes of organization, techniques for data translation and approaches to information conversion have been set forth in an effort to provide a detailed disclosure of an exemplary embodiment of the instant invention, many of these techniques constitute mere choice of design in the implementation of the complete system and may be modified to suit other design preferences. For instance, in the generalized disclosure of the overall system depicted in FIG. 1, teleprinter information was inputted to the system according to the conventional ASCII code employed by standardized teleprinter or teletypewriter devices and subsequently translated into EBCDIC code within the central switching means 1 prior to logging on the RAD units. Subsequently, the converse translation was employed in translating to teleprinter equipments and it will be apparent that such code translations could be deleted or other code transformations could be employed if desired. Similarly, in facsimile modes of transmission, translation into suitable digital form for analog encoding was carried out within the central switching means under program control in a manner which will be set forth in greater detail below. It will be apparent, however, to those of ordinary skill in the art, that hardware encoding could be employed therefor within the central switching means 1 or alternatively hardware encoding could be provided at the facsimile controller means 10 whereupon a code translation function at the central switching means 1 could be avoided if desireable or limited memory proved to be a problem. Furthermore, software encoding at the facsimile controller means 10 could be provided by an independent minicomputer if it was desired to tie a facsimile output capability to a switched store and forward teletype system without modifying or adding to the programming present within the central switching means 1. The remaining portions of this disclosure are directed to specific aspects of the switched, store and forward communications system illustrated in FIG. 1 and further modifications available within the instant invention will become apparent to those of ordinary skill in the art as the description thereof proceeds.

DATA TRANSLATION WITHIN THE FACSIMILE CONTROLLER MEANS

Turning now to FIG. 2 there is shown a schematic diagram illustrating exemplary data networks appropriate for the translation of data within the facsimile controller means 10. More particularly, the exemplary data flow networks illustrated in FIG. 2 depict exemplary apparatus for performing the functions of the data register means 17, the 2 bit level encoder means 18 and the sequence gating means 19 depicted in FIG. 1 and hence suitable exemplary apparatus for receiving each data byte supplied by the central switching means 1 through the common data bus means 2 and the facsimile subcontroller means 8 to cable 12 of the facsimile controller means 10 and transforming each pair of bits within each byte delivered into four analog levels suitable for direct application as an appropriately timed analog baseband signal to the modulator input of the modem in the facsimile chassis means 20 as also depicted in FIG. 1. The exemplary data translation networks illustrated in FIG. 2 comprise data byte buffer means 36, 8:2 multiplexer means 38, 2 bit buffer means 39, a digital to analog converter means 40, element clock means 41, decimal counter means 43, data request flip flop means 45, and count done flip flop means 46. The data byte buffer means 36 may comprise a conventional 8 bit or single byte buffer which acts, when enabled, in the well known manner to store an 8 bit byte supplied in parallel to the inputs thereof and maintain any byte loaded therein at the eight outputs thereof until new information is loaded therein. The eight parallel inputs to the data byte buffer means 36, as annotated $DA_0$–$DA_7$, are applied, as well known to those of ordinary skill in the art, at the buffered data output of the facsimile subcontroller means 8 which separates data and order information, as aforesaid, and conveys the data byte to the facsimile controller means 10 through individual conductors within the cable 12. Thus, the eight inputs to the data byte buffer means 36 annotated $DA_0$ –$DA_7$ may be viewed as comprising eight individual conductors within the cable 12 illustrated in FIG. 1. As well known to those of ordinary skill in the art, each time a data byte is delivered by the central switching means 1 through the common data bus means 2 to the facsimile subcontroller means 8, this byte is applied through the cable 12 as a data byte to the facsimile controller means 10 and in the case of the exemplary data translation apparatus depicted in FIG. 2 will be loaded into the data byte buffer means 36 for maintenance therein until the same is appropriately processed and a new data byte provided.

The enable input to the data byte buffer means 36 is connected through conductors 47 and 48 to the output of AND gate 49. The AND gate 49 may take any conventional form of this well known class of device and acts in the well known manner to provide a high at the output thereof connected to conductor 48 whenever all of the inputs thereto are at a high logic level while providing a low level on conductor 48 whenever any of the inputs thereto are low. A high level on conductor 48 may here be viewed as an enabling level for the data byte buffer means 36 and hence whenever the output of AND gate 49 goes high any byte then applied to the inputs of the data byte buffer means 36 annotated $DA_0$–$DA_7$ will be loaded into the data byte buffer means 36 and maintained therein until a new data byte is loaded. The three inputs to the AND gate 49 are supplied on conductors 50 –52 from the facsimile subcontroller means 8 and are derived in the well known manner from various signal levels supplied to the facsimile subcontroller means 8 by the central switching means 1.

The input applied to conductor 50 annoted Data is a level which goes high whenever data information, as distinguished from order information, is being supplied to the facsimile subcontroller means 8 by the central switching means 1. Similarly, the input on conductor 51 annotated Byte Delivered, goes high each time a data byte has in fact been outputted by the central switching means 1. If, as was assumed above, a Model 7902 Extended Device Subcontroller is employed for use as the facsimle subcontroller means 8, the Byte Delivered output thereof applied to conductor 51 is designated PHRSATOOOW in the manual associated therewith while the Data Input on conductor 50 corresponds to the terminology employed therein. The input on conductor 52 which is annotated Data In Not (BAR), is indicative that the facsimile subcontroller means 8 is in a Data Out mode rather than a Data In mode and it will be recalled that if a Model 7902 Extended Device Subcontroller is employed for use as the facsimile subcontroller means 8, four modes of operation are available therewith, i.e. Data In, Data Out, Order In, Order Out, wherein the Data In mode is not employed, as aforesaid, in the instant invention. Thus it will be appreciated by those of ordinary skill in the art that of the three inputs developed by the facsimile subcontroller means 8 and applied to the AND gate 49, the input on conductor 50 indicates that the facsimile subcontroller means 8 is in a Data rather than an Order mode, the input on conductor 52 indicates that the facsimile subcontroller means 8 is in a Data Out rather than a Data In mode while the input on conductor 51 is indicative that a byte has been delivered to the facsimile subcontroller means 51. Therefore, when all of the inputs on conductors 50 – 52 are high, it will be indicative that an 8 bit data byte is present on input conductors $DA_0$ –

$DA_7$ and hence the same should be loaded into the data byte buffer means 36.

The high level present at the output of the AND gate 49 is applied through conductors 48 and 49 to selectively enable the inputs to the data byte buffer means 36 and is additionally applied through conductor 53 to a reset input of the data request flip flop means 45. This input to the data request flip flop means 45 is employed to reset the flip flop and hence terminate any data request which is generated thereby in a manner to be described hereinafter. Here, however, it is sufficient to appreciate that data requests are periodically made to the central switching means 1 through the facsimile subcontroller means 8 and when the output of AND gate 49 goes high it is indicative that the data request made has been satisfied whereupon the data request flag established by the data request flip flop means 45 is reset. Thus it will be appreciated by those of ordinary skill in the art that each time a data byte is supplied to the data byte buffer means 36 on the inputs $DA_0$–$DA_7$ when the facsimile subcontroller means 8 is in a Data Out mode, the data byte supplied is loaded in parallel into the data byte buffer means 36 and maintained therein for application to the outputs thereof until such time as a new data byte is loaded.

The output of the data byte buffer means 36 is applied in parallel through conductors 61 – 68 to 8 parallel inputs of the 8:2 multiplexer means 38. The 8:2 multiplexer means 38 may comprise any of the well known forms of this conventional class of device which acts in the well known manner to couple a selected pair of the 8 inputs applied thereto to the two outputs thereof depending upon which of the select inputs thereto are actuated. As a practical matter, the 8:2 multiplexer means 38 may be formed by a pair of 4:1 multiplexer devices connected in such manner that the even numbered conductors 62, 64, 66 and 68 are connected to the four inputs of one multiplexer device in ascending order and the odd input conductors 61, 63, 65 and 67 are connected to the inputs of the other multiplexer device in a corresponding ascending order. Alternatively, eight AND gates may be arranged into four pairs of commonly enabled AND gates in such manner that a common input to each pair is connected to one of the four select inputs illustrated while the remaining input to each AND gate is connected to a designated one of input conductors 61 – 68. In this manner, as the first select input is enabled, the inputs on conductors 61 and 62 will be applied to the outputs of the multiplexer means formed, when the second input is enabled the outputs will be connected to the inputs on conductors 63 and 64, when the third select input is enabled the inputs on conductors 65 and 66 will be applied to the outputs of the multiplexer means 38 and finally when the fourth select input to the multiplexer means 38 is enabled the inputs on conductors 67 and 68 will be applied to the outputs thereof.

For the exemplary circuitry illustrated in FIG. 2, four distinct select inputs are applied to the 8:2 multiplexer means 38 through conductors 69 – 72 because, as shall be seen below, a decimal counter means 40 is employed to supply an individual selection input for each gated pair of inputs; however, as will be readily appreciated by those of ordinary skill in the art, should a pair of 4:1 multiplexer devices or an 8:2 multiplexer device be directly employed, only two select inputs need be relied upon where the digital combination of the ONE and ZERO information applied to such pair of select inputs would be sufficient to define the four output conditions required. The output of the 8:2 data multiplexer means 38 is connected through conductors 73 and 74 to the inputs of the 2 bit buffer means 39. Thus, as will now be appreciated by those of ordinary skill in the art, the function of the 8:2 multiplexer means 38 is to selectively apply four bit pairs of each 8 bit byte loaded into the data byte buffer means 36 to the 2 bit buffer means 39 and hence, for the purposes of the instant disclosure, it may be assumed that whenever a select level is applied to the select input connected to conductor 69, the first pair of bits present in a byte loaded as reflected on conductors 61 and 62 will be applied to output conductors 73 and 74, while when the select input connected to conductor 70 is enabled, the bit content applied to input conductors 63 and 64 will be applied to conductors 73 and 74. Similarly, when the select input connected to conductor 71 is enabled the bit pair associated with conductors 65 and 66 will be connected to conductors 73 and 74 while when the select input connected to conductor 72 is enabled, the bit output on conductors 67 and 68 will be applied to the 2 bit buffer means 39 through conductors 73 and 74. Furthermore, as shall be seen below, during a facsimile mode of transmission, as each data byte is loaded into the data byte buffer means 36, the select inputs to the 8:2 multiplexer means 38 are sequentially enabled as a function of a system clock so that each pair of bits in each byte loaded are gated through to the 2 bit buffer means 39 for subsequent digital to analog conversion and hence conversion into an analog baseband signal.

The 2 bit buffer means 39 may comprise a conventional 2 bit buffer or two stages of a larger buffer which acts in the well known manner to accept the bit content for the pair of bits supplied on input conductors 73 and 74 when the same are enabled and to retain such pair of bits stored therein until a new pair of bits is subsequently loaded by the application of a new bit pair to conductors 73 and 74 when the 2 bit buffer means 39 is enabled. Thus, the 2 bit buffer means 39 functions in the same manner as the data byte buffer means 36 except only a pair of bits are stored therein, and in fact, should one half of a conventional 8 bit buffer such as a T Series FT 20 Module be employed for use as the data byte buffer means 36, the second half of such conventional buffer means may be utilized as the two bit buffer means 39 wherein only two of the inputs and outputs thereof are employed. The enable input to the 2 bit buffer means 39 is supplied through conductor 75 from an element clock means 41 and, as shall be more clearly seen below, the enabling of the 2 byte buffer means 39 is timed to correspond to the application of a selected pair of bytes to the outputs of the 8:2 multiplexer means 38 so that as each pair of bits within an 8 bit byte loaded into the data byte buffer means 36 is selectively gated through the 8:2 multiplexer means 38, it is loaded into the 2 bit buffer means 39 and maintained at the outputs thereof until the next pair of bits is selectively processed in a similar manner. The outputs of the 2 bit buffer means 39 are supplied through conductors 76 and 77 to the inputs of the digital to analog converter means 40.

The digital to analog converter means 40 may take the conventional form of a level converter which acts in the well known manner to produce an analog voltage level at the output thereof whose value is dependent upon the ONE or ZERO condition of each of the inputs thereto. More particularly, if it is arbitrarily assumed that the digital encoding of 1.1 information is representative of black while a 0.0 digital representation corresponds to white, the digital to analog converter means 40 may be viewed as producing a +11 volt output whenever a 1,1 input is applied to conductors 76 and 77 while producing a 5 volt output whenever the digital combination of inputs on conductors 76 and 77 is 0,0. The output of the digital to analog converter means 40 is connected through conductor 78, as indicated in FIG. 2, directly to the modulator input of the modem in the facsimile chassis means 20 employed. Therefore, the output of the digital to analog converter means 40 acts to essentially synthesize the baseband analog signal which is normally received from a scanning transducer in the facsimile device. Accordingly, as will be apparent to those of ordinary skill in the art, since the initial portions of the disclosure of the instant invention have assumed that the electronics package from a standard Model 400 Telecopier System are employed within the facsimile controller means 10, the output voltage levels provided on conductor 78 from the digital to analog converter means 40 are matched to those for which the modulator input of the facsimile chassis means 20 will produce black and white information. Thus, should it be desired to employ another electronics package from a conventional facsimile system, the outputs of the digital to analog converter means 40 would be appropriately modified in value to accommodate the input analog values thereof required for the production of white and black information. Furthermore, as will be apparent to those of ordinary skill in the art, should the digital to analog converter means 40 have insufficient capability to produce the desired analog voltage levels from the digital input pair supplied thereto, driver stages may be interposed between the output of the digital to analog converter means 40 and the input to the modulator unit of the facsimile chassis means 20. Additionally, threshold and noise reduction stages could also be employed therefor and it will be appreciated that the digital values 0,1 and and 1,0 are available for gray scale encoding purposes.

From the brief description of the operation of the facsimile controller means 10 set forth in conjunction with FIG. 1, it will be appreciated that the data byte buffer means 36, the 8:2 multiplexer means 38, the 2 bit buffer means 39, and the digital to analog converter means 40 cooperate to accept each 8 bit byte of information representing four points or dots of a digital representation of a line scan and to translate each pair of bits therein, which represent a single point in a line scan, to a level encoding device which acts to produce a level encoded analog baseband signal acceptable to the facsimile electronics package as a representation of the black and white information being scanned. However, the operation of these elements within the facsimile controller means 10 must be limited to occur only during such times as data representative of facsimile information to be conveyed is being supplied to the facsimile controller means 10 and the sequencing of the select inputs to the 8:2 multiplexer means 38 must be appropriately ordered and timed to assure that bit pairs are read out in the appropriate sequence and that only four pairs of bits from each byte loaded are read. Additionally, it will also be appreciated that as each data byte is processed, a request for more data must be generated by the facsimile controller means 10 and the importance of each of these functions will be further brought home by a recollection that when a Model 7902 Extended Device Subcontroller is employed for use as the facsimile subcontroller means 8, the receipt of an order byte must be followed by a request for data while if a count done indication is received, a new order sequence is initiated. According, it will be appreciated by those of ordinary skill in the art, that the data network illustrated in FIG. 2 must be operative to process byte information forwarded thereto by the central switching means 1 only after phasing of the facsimile chassis means 20 has been completed, the facsimile controller means 10 must place the facsimile subcontroller means 8 in a data mode after each order sequence is received and new data requests must be timely presented after each data byte is processed. These functions, in essence, are performed by the element clock means 41, the decimal counter means 43 and the data request flip flop means 45.

The element clock means 41 may comprise a conventional clock generator means which acts in the well known manner to generate clock pulses at a predetermined frequency. For a four minute mode of telecopier operation, which has been assumed for the purposes of the instant disclosure, the element clock means 41, when not inhibited, would produce clock pulses at a rate of 1675 Hz., while if a 6 minute transmission mode of operation was selected the clocking rate would be 2400 Hz. Furthermore, as will be apparent to those of ordinary skill in the art, in the majority of applications of the instant invention both a 4 minute and 6 minute mode of transmission would be desireable and is available when the facsimile electronics package is developed from a Model 400 Telecopier chassis. Therefore, the element clock means 41 would ordinarily selectively produce clock pulses at either the 1675 Hz. or 2400 Hz. rate depending upon the speed of facsimile transmission designated in orders issued by the central switching means 1 as briefly discussed above. Furthermore, if Model 400 Telecopier chassis means were employed, as well known to those of ordinary skill in the art, such a package is equipped with an internal clock in the form of 368.64 KHz. crystal which could be employed in place of an independent clock generator. Therefore, under these conditions, it would be preferable to replace the element clock means 41 with appropriate circuit means for dividing down the 368.64 KHz. output of the internal clock within the facsimile chassis means 20 to the desired 1675 or 2400 Hz. rate so that a synchronous mode of operation between the electronics present in the facsimile chassis means 20 and the facsimile controller means 10 as a whole is obtained. The output of the element clock means 41 is connected through conductor 75 to the enable input of the two bit buffer means 39 and hence it will be readily appreciated by those of ordinary skill in the art that each time a clock pulse is provided thereby the two bit buffer means 39 is enabled for the purposes of loading any bit pair presently provided at the outputs of the 8:2 multiplexer means 38 on conductors 73 and 74. Additionally, the clock output is applied to conductor 79 while an inhibit for the element clock means 41 is applied therto on conductor 80.

The output of the element clock means 41 connected to conductor 79 is connected through conductors 81 and 82 as well as the AND gate 83 to the count input of the decimal counter means 43. The AND gate 83 may take any of the well known forms of this conventional class of device and acts, when enabled, to apply either clock level 1 or 0 applied thereto on conductor 81 to the output thereof connected through conductor 82 to the count input of the decimal counter means 43. The enable input to AND gate 83 is connected through conductor 84 to the output of a NAND gate 85 which acts, as shall be seen below, to enable the AND gate 83 through the application of a high level to conductor 84, whenever an end of date signal has not been transmitted by the central switching means 1 and the last bit pair of the last byte loaded has not been supplied by the 8:2 multiplexer means 38 to conductors 74 and 73. Thus, whenever the AND gate 83 is enabled by a high level placed on conductor 84 by the NAND gate 85, each clock pulse supplied by the element clock means 41 to conductors 79 and 81 results in a clocking level being applied through conductor 82 to the count input of the decimal counter means.

The decimal counter means 43 may comprise a conventional count to four counter means which acts in the well known manner to count each clock pulse applied to the clock input thereof and place a high level representative thereof on an appropriate one of the outputs (1 – 4) thereof corresponding to the number of clock pulses received. Upon the application of the fifth clock pulse on conductor 82, the decimal counter means 43 resets so as to place a high level on conductor 69. In practice, the decimal counter means 43 may take the form of a conventional two stage binary counter whose outputs are decoded through a conventional AND gate decoding array to thereby energize an individual line for each of the four digital states thereof, i.e., 00, 01, 10 and 11. The outputs of the decimal counter means 43 are connected through conductors 69 – 72, as aforesaid, to the individual select inputs of the 8:2 multiplexer means 38 and it will be appreciated by those of ordinary skill in the art that should a pair of 4:1 multiplexer devices accepting digital select inputs be employed for the 8:2 multiplexer means 38, the binary output of the two stage counter means employed within the decimal counter means 43 may be directly utilized rather than being decoded to drive for independent output lines. Thus, it will be appreciated that during a facsimile mode of transmission where the element clock means 41 is not inhibited and the AND gate 83 is enabled, each clock pulse applied to the count input of the decimal counter means 43 through conductor 82 will result in the selection and gating of one pair of inputs to the 8:2 multiplexer means 38 onto the output conductors 73 and 74 thereof while these same clock pulses are applied through conductor 75 to the enable input of the 2 bit buffer means 39 to cause the pair of digital inputs which are applied to conductors 73 and 74 to be loaded therein so that the same are available on conductors 76 and 77 for analog encoding by the digital to analog converter means 40.

The decimal counter means 43 is provided with a reset input which acts, when the same is energized, to reset the decimal counter to its zero condition wherein a high level is present on output conductor 69. This reset input is connected through conductors 86 and 87 to the output of OR gate 88. The OR gate 88 may take any conventional form of this well known class of device which acts in the usual manner to produce a high at the output thereof connected to conductor 87 when any of the inputs thereto are high. A first input to the OR gate 88, as indicated in FIG. 2, is connected through conductor 89 to a reset input terminal. The reset input terminal, as will be appreciated by those of ordinary skill in the art, comprises an automatic and/or manual facsimile controller means 10 reset which acts to reset the system each time a facsimile transmission is completed, voided or a malfunction in the system results. The second input to OR gate 88 is connected through conductor 90 to receive the line sync pulse from the facsimile equipment employed within the instant invention, which for the illustrative case described, comprises the facsimile chassis means 20 and may here be assumed to take the form of the electronics package from a Model 400 Telecopier System. From the description of the Model 400 Telecopier system set forth above, it will be recalled that a line sync pulse, which takes the form of a 1500 Hz. burst having a duration of 0.13ms. is produced each time the gripper bar on a drum passes the scanning head. Thus, not only is the lie sync signal periodically produced during phasing, but during an actual facsimile transmission; the same is produced once for each revolution of the drum. In the instant invention, as will be seen below, lines of information are forwarded from the central switching means to the facsimile controller means 10 in the form of multiple eight bit bytes and hence, the resetting of the decimal counter means 43 is appropriate each time a line sync pulse is produced by the facsimile equipment. Furthermore, it should be noted that in an actual model 400 Telecopier System, the actual production of the line sync pulse results through a scanning of the apparatus employed in driving the drum and hence is produced at a time corresponding to the scanning position of the gripper bar during each revolution of the drum. In the facsimile chassis means 20 employed in conjunction with the instant invention, the document copy drum is removed and the line sync pulse is produced by using 1½ cycles of the 120 Hz. drum drive signal generated in the facsimile chassis means 20. Thus it is seen that the decimal counter means 43 is reset to place a high level on conductor 69 any time the facsimile control means 10 according to the instant invention is reset or a line sync corresponding to the end of a line of facsimile information is developed by the facsimile chassis means 20.

One input to NAND gate 85 is connected through conductor 91 to the four outputs of the decimal counter means 43 connected to conductor 72. Thus, each time four clock pulses have been provided by the decimal counter means 43, a high is supplied through conductors 72 and 91 to one input of the NAND gate 85. A second input to the NAND gate 85 is connected through conductor 92 to the Q output of the count done flip flop means 46. The count done flip flop means 46 may take any of the well known forms of conventional bistable flip flop devices which act to produce a high at the Q output whenever the same is placed in a set condition while placing a low at the Q output thererof whenever the same is reset. The set input to the count done flip flop means 46 is connected, as indicated in FIG. 2, to a terminal annotated Count Done and receives a high level thereon whenever the last byte of data, corresponding for instance to the last byte of data in the last scan line of a facsimile message, has been forwarded under the control of the central switching means 1 to the facsimile subcontroller means 8 and the facsimile controller means 10. This signal, is a housekeeping signal which is developed under program control in the central switching means, for example pursuant to a reading of an end of message character, and is automatically supplied from the central switching means 1 to the facsimile controller means 10. Thus it will be appreciated by those or ordinary skill in the art that, for instance, when the last byte of the last scan line of a facsimile message has been forwarded and a count done signal is supplied to the facsimile controller means 10, the set input to the count done flip flot 46 will go high to thereby place a high level at the Q output thereof connected to conductor 92 and hence to the second input of NAND gate 85 which is connected thereto. The NAND gate 85 may take any of the conventional forms of this well known class of device which acts to produce a low level at the output thereof only when both of the inputs thereto are high while producing a high level at the output thereof under all other input conditions. Thus, the output of NAND gate 85, connected to conductors 84 and 93 will be high for all input conditions at the two inputs thereof connected to conductors 91 and 92 except when a count done level has been applied to the S input of the count done flip flop means 46 and four clock pulses have been counted by the decimal counter means 43. Therefore, as the output of NAND gate 85 connected to conductor 84 provides an enabling input for AND gate 83, it will be appreciated by those of ordinary skill in the art, that AND gate 83 will be normally enabled to supply element clock pulses to the count input of the decimal counter means 43 until the count done input indicating that the last byte of a message has been forwarded to the facsimile controller means 10 and hence loaded into the data byte buffer means 36 and, four clock pulses have been counted by the decimal counter means 43 indicating that each of the four bit pairs within the last byte loaded into the data byte buffer means 36 have been gated in sequence through the 8:2 multiplexer means 38, loaded into the 2 bit buffer means 39 and transformed into appropriate analog levels by the digital to analog converter means 4. The output NAND gate 85 is also connected through output conductor 93 to the set input of flip flop means 95.

The flip flop means 95 may comprise a conventional clocked flip flop which here is employed in conjunction with flip flop means 96 to selectively control the inhibiting of the element clock means 41, to achieve a resetting of the count done flip flop means 46 and, as shall be seen below, to make the first legitimate request for data upon the completion of the phasing cycle within a properly enabled send mode facsimile transmitter employed as the facsimile chassis means 20. More particularly, from the description of the operation of a Model 400 Telecopier System as well as the brief description of the cycle of operation of the facsimile controller means 10 during a typical cycle of operation, it will be recalled that after the facsimile controller means 10 has completed a dialing sequence and a ready tone has been detected, the facsimile chassis means 20 will be enabled by an order synthesizing the closure of the door interlock switch, which effectively causes the electronics package appropriated from a Model 400 Telecopier system to go into a phasing mode wherein phasing information is automatically transmitted thereby for a 15 second phasing interval established by a phasing timer. Thereafter, the actual transmission of facsimile information is initiated and hence it will be readily appreciated by those of ordinary skill in the art, that it is at the termination of this 15 second phasing interval that legitimate byte information for synthesis into an analog baseband signal should be supplied to the data byte buffer means 36 and selectively gated to the digital to analog converter means 40 through the operation of the element clock means 41 and the decimal counter means 43. Therefore, it is at the expiration of the 15 second phasing interval that the first request for legitimate facsimile information to be encoded should be made and it is at this time that the element clock means 41 should have the inhibit applied thereto on conductor 80 released. These functions are performed by the conjoint action of the circuit formed by the flip flop means 95 and 96.

The flip flop means 95 and 96 may each comprise conventional clocked flip flops such as Xerox Model 307 clocked IC Flip Flop Assemblies. In essence, each clocked flip flop comprises a pair of DC inputs designated mark (M) and erase (E), which act to set or reset the flip flop upon the application of a high level thereto. Each flip flop has a pair of outputs, designated Q and $\bar{Q}$, wherein the Q output manifests a ONE or high output state whenever the clocked flip flop is placed in a set condition while conversely the $\bar{Q}$ manifests a ONE or high output condition whenever the flip flop is placed in a reset condition. In addition, each flip flop is provided with a set, reset, and clock input which are effective in combination to establish a set or reset condition for the flip flop only when a high is applied to one of the set or reset inputs and the falling edge of a clock is present at the clock input thereto. In addition, the logic conditions established for these flip flops are such that set will always override reset, when appropriate inputs are simultaneously applied to the terminals thereof designated set and reset. Thus, as will be appreciated by those of ordinary skill in the art, the clocked flip flops employed for use as the flip flop means 95 and 96 may be set or reset by the DC inputs applied to conventional bi-stable devices through the use of the mark and erase inputs thereto while setting and resetting which takes place in response to the application of a high level applied to the set or reset inputs thereto is only effective in the presence of a falling edge applied to the clock input thereof.

The $\bar{Q}$ or complemented output of the flip flop means 95 is connected through conductors 97 and 80 to the inhibit input of the element clock means 41 and it will be appreciated by those of ordinary skill in the art from the description of the element clock means 41 set forth above that whenever a high logic level resides on conductor 80 the element clock means 41 will be inhibited. Additionally, the $\bar{Q}$ output of the flip flop means 95 is connected through conductor 97 to the reset input of the count done flip flop means 46 and it will be appreciated each time the count done flip flop means 46 is set by a count done input issued by the central switching means 1 in response to the issuance of the last data byte of the portion of the memory address by the input output command double word being processed, and four clock pulses have been applied to the decimal counter means 43 to cause the output of NAND gate 85 to go low whereupon the element clock means 41 is inhibited by the presence of a high level on conductors 97 and 80, in a manner to be described below, the count done flip flop means 46 is also reset by this high level so that the count done condition signaled thereby is cleared in preparation for the next cycle of operation.

Monitoring of the facsimile chassis means 20 and particularly whether or not phasing has been completed therein is a function performed by the flip flop means 96 while the actual control of the inhibiting of the element clock means 41 is provided by the flip flop means 95. More particularly, in the Model 400 Telecopier System, for example, the timing of a phasing operation which must precede each facsimile transmission is controlled by the fifteen second timer which initiates its cycle of operation when the last ready condition, normally the closure of the door interlock switch, has been completed and the acoustic coupler is placed in the handset which is here synthesized by a couple modem instruction. The operation of the phasing timer is such that a low level is provided thereby during the 15 second timer interval and when the phasing timer times out (PTTO) a high level is provided at the output thereof and in a complete facsimile unit, scanning of the document/copy drum is initiated and the actual transmision of facsimile information begun. The output of the phasing timer is connected to the set input of the flip flop means 96 while the complemented output thereof is connected to the reset input of flip flop means 96 as indicated by the phasing timer timed out and phasing timed out not (PTTO) and ($\overline{PTTO}$) annotations associated therewith. Therefore, it will be appreciated by those of ordinary skill in the art, that a high level is applied to the reset input of the flip flop means 96 and a low level is applied to the set input thereof during the entire 15 second phasing interval initiated in the facsimile chassis means 20 while upon termination of such phasing interval, the set input to the flip flop means 96 goes high and conversely, the reset input thereto goes low.

The mark inputs of both the flip flops 95 and 96 are tied to ground, as indicated in FIG. 2, so that a low level is always established thereat while the erase inputs of both flip flops are connected through conductors 98–100 to the output of the OR gate 88. The OR gate 88, as aforesaid, will produce a high at the output thereof, which in this case maay be viewed as a DC level capable of resetting both of the flip flop means 95 and 96 any time a reset input or a line sync signal from the facsimile equipment is applied thereto. In addition, the output of OR gate 88 is applied through conductors 98 and 101 to one input of an AND gate 102. The output of the AND gate 102 is connected through conductor 103 to the clock input of flip flop means 96 while a second input to AND gate 102 is connected through conductor 104 and a conventional, inverter 105 to the reset input applied to conductor 89 of the OR gate 88, as described above. From the input conditions established for the flip flop means 96 and a recollection that during the 15 second phasing interval established, a phasing signal comprising the transmission of a black level alternated with a line sync signal corresponding to a white frequency for a duration of 13 ms. produced during the portion of each revolution of a drum when the gripper bar would be scanned, is transmitted; it will be appreciated that during a typical mode of facsimile operation when the facsimile chassis means 20 is initially enabled by orders issued from the central switching means 1, the phasing timer will be down and apply a high level to the reset input of flip flop means 96 and a low level to the set input thereof. When the first line sync pulse associated with the transmission of phasing information is produced, this signal is applied to input 90 or OR gate 88 whereupon a high or erase level is applied to the erase input of flip flop means 96 to cause this flip flop to be reset whereupon a high level is present at the $\overline{Q}$ output thereof connected to conductor 106. Furthermore, when the line sync pulse terminates during phasing, upon the expiration of the 13 ms. interval associated therewith and a black signal is again transmitted for the next 320 ms. portion of a drum revolution, the level on conductor 101 will go from a high level associated with the line sync pulse to a low level. Therefore, if it is assumed that no reset level was on conductor 89, it will be seen that during the presence of the line sync pulse both inputs to AND gates 102 were high whereupon a high level is applied through conductor 103 to the clock input of flip flop means 96 and upon the termination of the sync pulse, the clock input to flip flop means 96 goes low to produce a negative trailing edge at the clock input which will act in conjunction with the high level at the reset input to the flip flop means 96 to maintain the reset condition thereof previously established at the erase input by the sync pulse produced. Of course, should a reset level occur during the presence of a line sync pulse, the output of AND gate 102 would immediately go low to establish the state for the flip flop means 96 which is consistent with the input levels applied to the set and reset inputs thereof. Additionally, it should be noted that the sync pulse applied to the erase input of flip flop means 95 through conductor 100 would establish a reset condition for this flip flop and hence inhibit the element clock means 41 and reset the count done flip flop means 46 if this condition had not otherwise been established.

During the entire 15 second phasing interval, it will be appreciated by those of ordinary skill in the art, that both the flip flop means 95 and 96 remain in their reset conditions as the periodic production of line sync pulses and the application of these pulses to the erase inputs thereof will not cause either of these flip flops to change state and the same result occurs in response to the negative edge produced at the clock input of flip flop means 96 at the termination of each line sync pulse since only the reset input thereto is at a high level during the phasing period. Thus for the entire phasing interval, the element clock means 41 is inhibited while the resetting of the count done flip flop means 46 is achieved and these conditions are maintained due to the conjoint action of the flip flop means 95 and 96. Upon termination of the phasing interval established, the conditions imposed at the reset and set inputs to the flip flop means 96 during phasing will reverse in that a high level will now be applied to the set input while a low level is applied to the reset input thereof. Therefore, upon the termination of the first line sync pulse produced after the completion of the phasing interval, it being recalled that line sync pulses are produced for the 13 ms. interval during each rotation of the document/copy drum where the gripper bar is scanned, and assuming no resetting takes place; the negative transition produced at the output of AND gate 102 and applied to the clock input of flip flop means 96 upon the termination of the sync pulse will cause the flip flop means 96 to be placed in set condition whereupon the $\overline{Q}$ output thereof connected to conductor 106 goes from a high to a low level to thus produce a negative transition. Thus, once phasing has been completed, the leading edge of each sync pulse produced will cause a reset level to be applied to the erase inputs of both the flip flop means 95 and 96 while the trailing edge of the sync pulse will cause the setting of the flip flop means 96 due to the negative transition associated with the clock input applied by AND gate 102. However, it will be readily appreciated by those of ordinary skill in the art that should resetting occur after phasing, the low level applied on conductor 104 to AND gate 102 will effectively inhibit this AND gate from applying any clocking pulses to the flip flop means 96.

Since the count done flip flop means 46 is reset whenever the element clock means 41 is inhibited, it will be appreciated by those of ordinary skill in the art that the low level applied from the Q output thereof to conductor 92 will cause the output of AND gate 85 to be high during the phasing interval and to remain high upon the completion of phasing period. Furthermore, as the output of NAND gate 85 is connected through conductor 93 to the set input of the flip flop means 95 while the level thereon is inverted through a conventional inverter means 107 and applied to the reset input of flip flop means 95, the flip flop means 95 will have a high level applied to the reset input thereof during both the phasing operation initiated by the facsimile chassis means 20 and this set of input conditions will be maintained through the completion of phasing. Thus, although the flip flop means 95 is reset by sync pulses produced during phasing as well as by those produced for the 13ms interval associated with the passage of the gripper bar beneath the scanning head during each revolution of the document/copy drum, it will be appreciated by those of ordinary skill in the art that the input conditions associated with the set and reset inputs thereto are appropriate to cause the setting of the flip flop means 95 as soon as a negative transition is applied to the clock input thereof. As the output of the flip flop means 96 associated with the complemented output thereof is connected through conductors 106 and 108 as well as OR gate 109, the negative transition is provided upon the termination of the first sync pulse at the completion of the phasing interval. This position is taken because as well known to those of ordinary skill in the art, the OR gate 109 acts in a conventional manner to provide a high level at the output thereof connected to conductor 108 whenever either of the inputs thereto are high.

This means that a high level is provided at the output or OR gate 109 due to the high level on conductor 106 during the entire phasing interval and upon the completion thereof is continued until the first sync pulse is produced and terminates. Upon the termination of this first sync pulse, however, the negative transition associated therewith will cause the resetting of flip flop means 96, to cause the $\bar{Q}$ output thereof and the level on conductor 106 to go low. The output of OR gate 109 will thereby produce a negative transition in going from a high level to a low level assuming that the second input to OR gate 109 is also low. The second input to OR gate 109 is connected through conductors 110 and 75 to the output of the element clock means 41 which is inhibited during the phasing interval, as aforesaid, and hence a low level will be maintained on conductor 110 for the entire phasing interval as well as the period subsequent thereto in which the element clock means 41 remains inhibited. Therefore, when the level on conductor 106 goes from high to low in response to the setting of the flip flop means 96, a negative transition will be produced on conductor 108 causing the flip floop means 95 to be set in response to the high level on conductor 93 which is connected to the set input thereto. Upon the setting of the flip flop means 95, the Q output thereof will go high while the $\bar{Q}$ output connected to conductors 97 and 80 will go low. Thus, the setting of the flip flop means 95 will release the inhibit applied through conductors 97 and 80 to the element clock means 41 whereupon the same initiates the production of clock pulses which are employed, as aforesaid, to load pairs of bit information into the two bit buffer means 39 and are counted by the decimal counter means 43 to cause the selective gating of pairs of bits associated with each 8 bit byte represented by the outputs of the 8:2 multiplexer means 38. Furthermore, it will be appreciated by those of ordinary skill in the art that the termination of each clock pulse applied to conductors 75 and 110 will now result in a negative transition being applied to the clock input of flip flop means 95 so that whenever the output of NAND gate 85 goes low in response to a count done condition by the count done flip flop means 46 and the counting of four pulses by the decimal counter means 43 to thereby gate the last byte through the digital to analog converter means 40, the termination of the last clock pulse which results in this condition will cause the resetting of the flip flop means 95, due to the high level now established at the reset input thereto and hence, the inhibiting of the element clock means 41 and the resetting of the count done flip flop means 46 to disable the flag respectively established for a last byte sent condition. In addition, although each line sync pulse generated by the facsimile electronics associated with the facsimile chassis means 20 will cause the resetting of both flip flops 95 and 96, the termination of such line sync pulse after the phasing timer has timed out will cause the flip flop means 96 to be set and the transition thereby produced on conductor 106 will cause the flip flop means 95 to be set whereupon the clock element means 41 is again enabled. Thus, if an ordinary facsimile transmission is considered, it will be appreciated by those or ordinary skill in the art that at the termination of each line scanned, a line sync pulse is produced and the element clock means 41 is inhibited for the duration of this pulse so that information is not gated out of the 8:2 multiplexer means during the transmission of a blanking signal for the accommodation of the gripper bar.

The output of the OR gate 88 which is connected, as aforesaid, to the erase inputs of the flip flops 95 and 96 and causes the resetting thereof in response to a line sync pulse produced from the facsimile equipment, as well as automatic resetting in response to the establishment of a reset condition on conductor 89, is also applied through conductors 99 and 87 to the erase input of a flip flop means 114. The flip flop means 114 may comprise a conventional clocked flip flop of the same type described in conjunction with flip flop means 95 and 96 and is here employed for the purposes of making periodic data requests to the facsimile subcontroller means 8 and hence to the central switching means 1 each time all four bit pairs in a data byte forwarded have been processed. However, prior to a detailed description of the operation of the flip flop means 114 in serving in the foregoing role, the manner in which an initial data request is made will discussed. It will be appreciated that as soon as the phasing interval is completed, a data request should be made so that the releasing of the inhibit level on the element clock means 41 will result in the processing of legitimate byte information from facsimile bytes loaded into the data byte buffer means 36. Since the output of OR gate 88 is connected through conductors 99 and 87 to the erase input of the flip flop means 114, it will be appreciated by those of ordinary skill in the art that this flip flop is established in a reset condition during the entire phasing interval and it should be here assumed that the flip flop means 114 is retained in this reset condition until byte information is forwarded. Therefore, it will be appreciated by those of ordinary skill in the art that upon the termination of the phasing interval, a high level will be present at the $\overline{Q}$ output of the flip flop means 114 and as will be apparent from an inspection of FIG. 2, this high level is applied through conductor 115 to one input of an AND gate 116.

The AND gate 116 may take the form of any of the well known types of this conventional class of device and therefore acts to produce a high level at the output thereof connected to conductor 117 only when both of the inputs thereto are high. The second input to AND gate 116 is connected through conductor 118 to the Q output of the flip flop means 95 which, it will be recalled, is placed in a high condition upon the termination of the first sync pulse after the phasing interval has terminated. Therefore, as a high level already resides on conductor 115 due to the reset condition of the flip flop means 114 whenever the inhibit is released on the element clock means 41 due to the setting of the flip flop means 95, a high will be present on conductor 118 whereupon the output of the AND gate 116 connected to one input of an OR gate 119 will go high. The OR gate 119 may take the same form as OR gate 88 described above and acts in the well known manner to provide a high at the output thereof any time one of the inputs thereto is high. The output of the OR gate 119 is connected through a conductor 120 to the set input of the data request flip flop means 45. The data request flip flop means 45, as aforesaid, is a conventional bistable flip flop which acts to place a ONE level on the Q output thereof whenever a high is applied to the set input thereof while providing a low level at the Q output whenever a high is applied to the reset input thereof connected to conductor 43. The Q output of the data request flip flop means 45 is connected through the facsimile subcontroller means 8 and causes a data request flag to be set thereat whereupon the central switching means 1 is advised that a new data byte is required. Thus it will be appreciated that upon the completion of the phasing interval and the termination of the first sync pulse, the setting of the flip flop means 95 not only releases the inhibit on the element clock means 41, but initiates a data request, which, as shall be seen below, is the first data request for legitimate facsimile information made by the facsimile controller means 10.

A second input to the OR gate 119 is connected through conductor 121 to a terminal marked Order Out. The terminal marked Order Out is provided as a conventional output on the facsimile subcontroller means 8 and designates that the subcontroller is in an Order Out mode in precisely the same manner as is done for a Data Out mode by the signals provided on conductors 50 and 52 to AND gate 49. As will be recalled from the description of the Model 7902 Extended Device Subcontroller set forth bove, a particularity of this subcontroller is that receipt of an order byte must be followed by a data request. Therefore, the Order Out input is provided on conductor 121 to the second input of OR gate 119 so that each time an order is issued by the central switching means 1 and delivered for processing, the facsimile controller means 10 automatically makes a data request to place the facsimile subcontroller means 8 in the appropriate Data Out mode. It should be further noted however that this input is provided merely to accommodate the requirements of the facsimile subcontroller means 8 and hence, data requests made subsequent to the receipt of order information result only in the request of a single data byte which although being transmitted and loaded into the data byte buffer means 36 is not further processed as no clocking therefrom takes place. Of course, single data bytes whose contents are of no consequence are loaded into the system for this purpose. Each time a data request is made by the setting of the data request flip flop means 45, data is forwarded from the central switching means 1 and when the same is delivered to the facsimile subcontroller means 8, the output of AND gate 49 goes high to cause the enabling of the data byte buffer means 36 in the manner described above. This high level is also applied through conductor 53 to effect the resetting of the data request flip flop means 45 in the manner aforesaid and through the conductor 122 to the mark input of the clock flip flop means 114. Thus it is seen that while the input to AND gate 116 applied on conductor 115 from the flip flop means 114 is maintained in a high or reset condition so as to enable the AND gate means 116 upon the initial setting of the flip flop means 95 so that the initial legitimate data request may be made thereby upon a termination of the phasing interval, once the first data byte requested is delivered, as indicated by the output of AND gate 49 going high, the flip flop means 114 is set through the mark input thereof connected to conductor 122 so that the condition of the $\overline{Q}$ output of flip flop means 114, as connected on conductor 115, will control subsequent data requests so long as the flip flop means 95 is retained in a set state.

The flip flop means 114 perform the function of requesting a new data byte each time the four bit pairs from the data byte loaded into the data byte buffer means 36 in response to a previous data request have been fully processed as indicated by a complete cycle of the decimal counter means 43. The set input to the flip flop means 114 is connected to ground while the reset input thereof is connected through conductors 123 and 79 and the inverter 124 to the output of the element clock means 41. This means that while the set inpupt thereto is maintained at a low level, the reset input to a flip flop means 114 will go high at the trailing edge of each clock pulse generated by the element clock means 41 while going low at the leading edge thereof and staying low for the complete duration of each clock pulse produced due to the action of the inverter means 124, which is conventional. The clock input to the flip flop means 114 is connected through conductors 125 and 126 and an inverter 127 to the conductor 69 which in turn connects, as aforesaid, to the one output of the decimal counter means 43. The one output of the decimal counter means 43 will go high, as aforesaid, upon the application of the first clock pulse in each four clock pulse sequence to the decimal counter means 43 and will stay high only during the duration of such clock pulse. This means that the inverted output thereof applied to the clock input of the flip flop means 114 through conductor 125 will go high at the termination of the first clock pulse in each four clock pulse sequence applied to the decimal counter means 43 and will stay high until the fourth clock pulse in each sequence applied thereto terminates. Upon the termination of the fourth clock pulse in each four clock pulse sequence applied to the decimal counter means 43, the level on conductor 125 will go low to thereby provide the negative transition which in this case is associated with the trailing edge of the fourth clock pulse in each sequence. As the inverted output of the element clock means 41 is applied to the reset input of the flip flop means 114 through conductor 123, it will thus be seen that as each clock pulse terminates, an appropriate reset input will be applied to the flip flop means 114 and upon the termination of the fourth clock pulse a negative transition is produced at the clock input thereto actually reset the flip flop means 114 and thus cause the $\bar{Q}$ output thereof connected to conductor 115 to go high. As the element clock pulse means 41 under these conditions is not inhibited, the Q output of the flip flop means 95 will be high so that AND gate means 116 will be enabled to make a data request through the OR gate 119 and the data request flip flop means 45. When the data request generated thereby is responded to by the deliverance of an 8 bit data byte to the input lines $DA_0$–$DA_7$ of the data byte buffer means 36, all inputs to AND gate 49 will go high to thereby produce a high on output conductor 48 which, as aforesaid, enables the data byte buffer means 36 to load the byte forwarded, resets the data request flip flop means 45 and supplies a high level to the mark input of the flip flop means 114 to cause the same to be placed in a set condition whereupon a new data request may be generated upon the application and counting of four clock pulses to the decimal counter means 43. Thus it is seen that upon the termination of the phasing interval, the first data byte is requested by the setting of the flip flop means 95 and thereafter, after four clock pulse have been generated whereupon each pair of bits in an 8 bit data byte loaded into the data byte buffer means 36 are gated through the 8:2 multiplexer means 38 into the two bit buffer means 39 for application to the digital to analog converter means 40, a new data request is generated through the conjoint action of the clock input and the decimal counter input to the flip flop means 114.

THE OPERATION OF DATA NETWORK

The data network illustrated in FIG. 2 is operative, for the purposes of processing and synthesizing an analog baseband signal during the portion of the operation of the facsimile controller means 10 which is subsequent to the establishment of a telephone communication to a remotely located facsimile peripheral and the detection of ready tone therefrom as carried out in the manner briefly outlined in conjunction with FIG. 1. Once ready tone is detected, a close door interlock order is issued and the facsimile chassis means 20 automatically initiates a phasing operation. When the close door interlock order is issued, a data request is generated due to the high produced on conductors 121 and 120; however, the data byte loaded into the data byte buffer means 36 in response to the data request generated is not further processed as no clock pulses are generated by the element clock means 41. This view is taken since the clock means 41 will have been inhibited due to the completion of a previous cycle of operation and if not so inhibited, is inhibited upon the initiation of phasing which is initiated by the closed door interlock order. When this data byte is delivered, it should be noted that the data request flag associated with flip flop 45 is cleared and the flip flop means 114 is placed in a set condition. During the phasing interval established, the sync pulses produced by the facsimile chassis means 20 and applied to the input to OR gate 88 on conductor 92 will cause the flip flop means 95, 96 and 114 to be placed in a reset condition whereupon the element clock means 41 is inhibited, and AND gate 116 is primed due to high output exhibited by the $\bar{Q}$ output of the flip flop means 114 so that the initial data request may be made upon the completion of phasing. As no clock pulses are produced, no clock pulses are counted by the decimal counter means 43 and hence the select inputs to the 8:2 multiplexer means 38 are not cycled. Furthermore, as no clock pulses are applied to conductor 75, the 2 bit buffer means 39 is not enabled in a manner to accept any input which may be applied thereto through conductors 73 and 74.

Upon the completion of the phasing interval, the PTTO signal applied to the set input of the flip flop means 96 goes high. Thereafter, upon the occurrence of the trailing edge of the first line sync pulse following the termination of the phasing interval, the flip flop means 96 will be set causing a negative transition on conductor 106. This negative transition is effectively coupled through the OR gate 109 and applied to the clock input of flip flop means 95. As the set input to the flip flop means 95 will be high due to the low levels applied to the inputs of NAND gate 85, in response to the reset condition of the count done flip flop 46 as well as the reset condition of the decimal counter means 43 due to the line sync pulse, as aforesaid; the flip flop means 95 will toggle from a reset condition to a set state. This toggling of the flip flop means 95 is effective through conductors 97 and 80 to release the inhibit on the element clock means 41 while the high level produced thereby on conductor 118 will cause the first data request to be made due to the high generated at the output of AND gate 116 which is effectively coupled through the OR gate 119 to the set input of the data request flip flop means 45 due to the initial conditions established. Thus, at this juncture, the first data byte for facsimile transmission has been requested by the data request flag set by the data request flip flop 45 and the inhibit has been released from the element clock means 41.

When the first data byte in response to the data request flag generated is applied from the data register within the facsimile subcontroller means 8 to conductors $DA_0$–$DA_7$, the three inputs to AND gate 49 will be high causing a high level to be generated thereby for a predetermined interval. This causes the first data byte forwarded to be loaded into the data byte buffer means 36 due to the enable level present on conductor 47. In addition, the data request flag initially generated is cleared due to the reset level applied through conductor 53 to the data request flip flop 45 and the flip flop means 114 is placed in a set state due to the high level applied to the mark input thereof connected to conductor 122. This means AND gate 116 is now conditioned to respond to the action of flip flop means 114 to set new data request flags. As the element clock means 41 is now enabled, the first clock pulse supplied thereby will cause the first 2 bits of the first byte loaded, as present on output conductors 61 and 62, to be applied to conductors 73 and 74 in response to the establishment of a high level on the select input to the 8:2 multiplexer means 38 connected to conductor 69 due to the action of the decimal counter means 43, as aforesaid. In addition, this first clock pulse is applied through conductor 75 to the enable input of the 2 bit buffer means 39 and hence the first pair of bits from the first byte loaded are applied through conductors 76 and 77 to the digital to analog converter means 40 where the same is level encoded into a discrete analog level. Thus, if the first bit pair was a 0,0, a 5 volt level, as aforesaid, would be applied to conductor 78 while if the first bit pair was a 1,1, and 11 volt level is applied to conductor 78 and hence to the voltage controlled oscillator within the modem of the facsimile chassis means 20.

This would continue in such manner that when the second clock pulse was generated, the second pair of bits in the first byte loaded, as reflected on conductors 63 and 64 would be level encoded by the digital to analog converter means 40 and the same action would take place for the pair of bits associated with conductors 65 and 66 upon the production of the third clock pulse while the bit pair associated with conductors 67 and 68 would be gated through for processing upon the occurrence of the fourth clock pulse in the four bit sequence being considered. Furthermore, as each bit pair is gated through the 8:2 multiplexer means 38 in sequence, and loaded into the 2 bit buffer means 39 for level encoding by the digital to analog converter means 40, it is level encoded into an analog level acceptable to the facsimile electronics and thereafter frequency modulated by the voltage controlled oscillator in the modem thereof and applied through the data access arrangement 22 to the telephone link established.

Through this entire sequence, each clock pulse produced is applied through conductors 79, 81 and 82 to the count input of the decimal counter means 43 since a high level is produced at the output of NAND gate 85 for the same reasons described in conjunction with the setting of the flip flop means 95. Upon the occurrence of the trailing edge of the fourth clock pulse generated by the element clock means 41, a high level is applied to the reset input of the flip flop means 114 due to the action of the inverter 120 while the previously high level applied to the clock input thereof on conductor 125 goes low. This causes the flip flop means 114, as will be readily appreciated by those of ordinary skill in the art, to be reset whereupon a high level is applied to conductor 115. As the flip flop means 95 is still in a set condition, the output of AND gate 116 will go high to set the data request flip flop 45 and thereby generate a new data request.

In response to this data request, a new 8 bit byte is delivered by the central switching means 1 whereupon the second 8 bit byte is loaded into the data byte buffer means 36, the data request is cleared and the flip flop means 114 is placed in a set condition. As the next four clock pulses are produced by the element clock means 41, the four bit pairs present within the second byte loaded into the data byte buffer means 36 are processed in the same manner detailed for the four bit pairs associated with the first byte and hence four more analog levels are synthesized at the output of the digital to analog converter means 40 and applied through conductor 78 as a baseband signal to the voltage controlled oscillator within the modem of the facsimile chassis means 20. In addition, a new data request flag is generated by the conjoint operation of the flip flop means 144 and the data request flip flop 45 to get the third data byte and this continues until a count done input for that scan line occurs or until a line sync pulse is produced by the facsimile chassis means 20 indicating the presence of the gripper bar and the end of a line scan.

The generation of a line sync pulse would normally occur after 74 bytes, the length of a normal scan line, have been delivered and appropriately processed. The application of the line sync pulse to input 90 of OR gate 88 will cause the flip flop means 95, 96 and 114 to be reset in the same manner as was described during the phasing operation. However, since the phasing timer has already timed out, PTTO high, the set input of flip flop means 96 will stay high and upon termination of the line sync pulse the negative transition generated by AND gate 102 will cause the flip flop means 96 to be set generating a negative transition on conductor 106. This in turn causes the setting of flip flop means 95 and the generation of a new data request due to the high level applied to conductor 118 and the responsive action of AND gate 116, OR gate 119 and the setting of the data request flip flop 45. In addition, as will now be apparent the element clock means 41 which was temporarily inhibited during the occurrence of line sync will now be enabled whereupon the processing and requesting of legitimate data byte information may continue for the next line scanned in the same manner set forth above for the initial line scanned. This operation continues for each line scan of the message, it being noted that approximately nine facsimile line scans are associated with each line of character-coded line of message information until all bytes associated with the message stored have been forwarded to the facsimile controller means 10. When the last byte has been forwarded to the facsimile controller means 10 for the order being processed, i.e., at the end of each facsimile scan line, the set input to the count done flip flop means 46 goes high to place a high level on conductor 92. The count done setting input for flip flop means 46 will occur after the IOP has passed all data bytes to the facsimile controller means 10 for a specific order. Therefore, a count done input is generated after every scan line of information has been forwarded to place a high level on conductor 92. This primes NAND gate 85 so that when all four bit pairs of the last byte loaded into the data byte buffer means 36 have been processed as indicated by a high level on the output of the decimal counter means 43 connected to conductor 72, the output of the NAND gate 85 will go low. The low level thus produced by NAND gate 85 will cause AND gate 83 to be disabled so that no further counting of clock pulses and sequencing of the 8:2 multiplexer means 38 may be achieved by the decimal counter means 43 and in addition thereto, the low level on conductor 93 will cause the set input to flip flop means 95 to go low while the inverted level thereof due to the action of inverter 107 causes the reset input to the flip flop means 95 to go high at the next trailing edge of the element clock applied through the OR gate 109. Furthermore, it will be seen that the occurrence of the fourth clock pulse, as is true for each clock pulse produced by the element clock means 41 when flip flop means 96 is reset, will cause a high level to be applied through conductors 75 and 110 through the output of OR gate 109 to the clock input of flip flop means 95 connected to conductor 108. Therefore, when this fourth clock pulse which acts to gate the last bit pair of the last byte to be forwarded through the system has been processed, the flip flop means 95 will be reset. When flip flop means 95 resets, the $\overline{Q}$ output thereof goes high to inhibit the element clock means 41 and to reset the count done flip flop 46 in the manner described above while the data requests initiated through the action of AND gate 116 are now disabled due to the low level residing on conductor 118. After the final facsimile scan line of the message is delivered and the count done flip flop means 46 is set in response thereto, a channel end flag (order in) is raised and the command chaining for the IOP will cause the final orders, i.e., Open Door interlock, On Hook etc., to be issued. This means that no further analog baseband synthesis will take place in the data networks illustrated in FIG. 2 whereupon no further actual facsimile information is transmitted through the modem thereof. At this juncture, stop tone production is initiated through orders issued in the manner described above while the data networks illustrated in FIG. 2 are effectively left in this shut down condition to await what is in effect initiation for a new facsimile mode of operation.

Thus it will be seen that the data networks illustrated in FIG. 2 of the facsimile controller means 10 act, once the facsimile electronics within the facsimile chassis means 20 have been appropriately enabled by orders issued by the central switching means 1, to achieve the actual transmission of facsimile format information over a telephone link established to a remotely located peripheral employing facsimile equipment. This is achieved, as now will be understood by those of ordinary skill in the art, by permitting the facsimile chassis means 20 to go through its normal phasing interval which occupies the first 15 seconds of a transmission cycle. Thereafter, after the phasing timer has timed out, the data networks illustrated in FIG. 2 act to initiate the actuation of the element clock and to request that data be forwarded in a digital format from the central switching means 1. As each 8 bit data byte is received, it is loaded into an 8 bit buffer and clocked through the data networks illustrated in such a manner that each pair of bits is employed for the synthesis of an analog level which is subsequently applied to the modulator present in the modem of the facsimile electronics relied upon to thereby synthesize the analog baseband signal developed upon document scanning in conventional facsimile apparatus. This is continued for each of the four bit pairs within each 8 bit byte forwarded and upon exhaustion of the four bit paurs for a given byte forwarded, a new data byte is requested by the data network. The foregoing operation continues until the entire message has been received and thus transmitted although periodic interruptions in the facsimile data synthesis occur each time a line sync pulse, employed to provide gripper bar blanking for each facsimile scan line, is produced and thereafter resumed for the next line of facsimile information to be transmitted. When all of the information in a given message has been forwarded to the facsimile controller means 10, as indicated by the last count done signal supplied to the data networks illustrated in FIG. 2 and the subsequent Open Door Interlock Order, the data networks illustrated in FIG. 2 are automatically shut down so that no further synthesis of facsimile information takes place. Accordingly, it will be seen that the facsimile information synthesized by the data networks illustrated in FIG. 2 provide for the digital to facsimile conversion of teleprinter information stored at a central switching location and that facsimile information transmitted by the facsimile controller means 10 is message oriented so that shut down takes place upon the completion of message transmission rather than the scanning of an entire document portion as would normally occur in the operation of conventional facsimile apparatus. It should be noted, however, that an order to Open Door Interlock which acts to leave the data networks illustrated in FIG. 2 in a closed down condition in the manner described above is merely indicative that the last byte in a given page has been forwarded and need not of necessity indicate that a complete facsimile message has been forwarded. This view is here set forth because for facsimile messages which comprises more than one page, i.e., multipage documents, separate transmissions occur for each page of the message and the separation of lengthy documents is automatically achieved under software control in a manner to be described below. Additionally, it should be noted that each scan line of information forwarded is ended with a white byte of information so that the facsimile controller means 10 completes the right hand margin or ends the line with white information due to the last level applied to the digital to analog converter means 40 even after the element clock means 41 has been shut down by the count done input. Furthermore, it should also be noted that if an all white byte is loaded and a count done input is delayed, under software control, the facsimile controller means 10 will continuously produce all white scan lines of facsimile information. This is highly advantageous since, when so controlled, the facsimile controller means 10 may automatically produce top or bottom margins as well as interline spacing without a requirement for stored byte information.

ORDER TRANSLATION

Referring now to FIG. 3, there is shown suitable exemplary apparatus for responding to order information forwarded from the central switching means 1 and provided to the facsimile controller means 10 from the facsimile subcontroller means 8 on order lines provided as separate outputs, to be distinguished from data lines, from the facsimile subcontroller means 8. More particularly, the exemplary apparatus depicted in FIG. 3 corresponds to the order register means 21 and the dialing means 23 illustrated in FIG. 1 and acts, as shall become apparent below, to receive order information on eight independent order lines, to decode the same and to provide control levels as a result of the decoding operation. These control levels serve as control inputs to the facsimile chassis means 20 illustrated in FIG. 1 and to the data access arrangement 22. In essence, eight order lines designated $ORD_0 - ORD_7$ are provided from the facsimile subcontroller means 8 as an input to the order register means 21 through the multiconductor cable 13 illustrated in FIG. 1 and it will be appreciated by those of ordinary skill in the art that the input conductors annotated $ORD_0 - ORD_7$ as present in the extreme left hand portion of FIG. 3 comprises independent conductors within the cable 13 and that each order furnished by the central switching means 1 takes the form of an eight bit order byte wherein the individual bits therein are applied in sequence to the inputs annotated $ORD_0 - ORD_7$. The order register apparatus depicted in FIG. 3 acts to decode the various orders applied to the facsimile controller means in accordance with the teachings of the instant invention and to provide control inputs to the data access arrangement or the facsimile chassis means 20 in response thereto. More particularly, the order register depicted in FIG. 3 is responsible for decoding the orders in the form of: (1) on hook and off hook instructions, (2) 4 and 6 minute mode instructions, (3) send/receive mode instructions, (4) enable/disable modem instructions, (5) open/close door interlock instructions, as well as appropriately timed instructions for (6) enabling the ready tone detector means 24, as shown in FIG. 1, to generate an appropriately timed interrupt indicative that a ready tone has been detected during the listening interval established, under program control, subsequent to the completion of a dialing operation.

The order register apparatus depicted in FIG. 3 comprises an inverter array 129, a first digit decoder array 130, first and second AND gate decoders 131 and 132, an order decoder array 133, command flip flops 134 – 139 and an interrupt network 140. All of the orders issued by the central switching means 1 for the purposes of controlling the operation of the facsimile controller means 10 may be defined in terms of a two digit hexadecimal code wherein bits O – 3 of each order byte define the first hexadecimal digit while bits 4 – define the second hexadecimal digit of each order and in this case is common to each order issued to the facsimile controller means 10. Thus, it will be appreciated that each 8 bit order byte is conveyed on order lines $ORD_0$ – $ORD_7$ wherein the first four bits defining the first hexadecimal digit are conveyed on order lines $ORD_0$ – $ORD_3$ while the second four bits defining the second hexadecimal digit are conveyed on order lines $ORD_4$ – $ORD_7$. The inverter array 129 may comprise a plurality of conventional inverter means 142 – 145 145 which may take any of the well known forms available. One of the inverter means 142 – 145 in the inverter array 129 is interposed in each of the $ORD_0$ – $ORD_3$ order lines so that the complement of the ONE or ZERO information present on that line is provided at the output thereof. Thus, the inverter means 142 provides an $ORD_0$ NOT output, the inverter means 143 provides an $ORD_1$ NOT output, the inverter means 144 provides an $ORD_2$ NOT output and the inverter means 145 provides an $ORD_3$ NOT output, and in this manner, the imposition of a conventional inverter means 142 – 145 in each of the order lines provides the complement of that line at the output thereof so that the same may be available for decoding purposes. Thus, a plurality of conductors 146 – 153 may be connected directly to the input lines associated with the $ORD_0$ – $ORD_3$ lines as well as the complements developed therefrom at the outputs of the inverter array 129 so that eight logical levels suitable for AND gate decoding techniques are developed. Furthermore, since it will be recalled that order line $ORD_0$ – $ORD_3$ define the first hexadecimal digit of each two digit order issued, it will be appreciated by those of ordinary skill in the art that the four bit levels associated with conductors 146 – 149 directly define ONE conditions on order lines $ORD_0$ – $ORD_3$ for AND gate decoding purposes, while their complements on conductors 150 – 153 define ZEROs in terms of high levels on these lines for the purposes of AND gate decoding.

The first digit decorder array 130 comprises a plurality of AND gates 154 – 164 which are connected to selected ones of the conductors 146 – 153 in such manner as to define input conditions appropriate for the first 11 hexadecimal digits employed as the first digit of each of the 11 orders issued to the order register apparatus according to the instant invention by the central switching means 1. More particularly, the AND gates 154 – 164 within the first digit decorder array 130 each comprises conventional four input AND gate apparatus which acts in the well known manner to provide a high level output whenever each of the four inputs thereto are high while providing a low level output for all other input conditions. The AND gate means 154 acts, as indicated by the annotations associated therewith, to define the ZERO hexadecimal input condition which obtains when all of the four inputs thereto are ZEROs. The four inputs to the AND gate 154 are connected to the four outputs of the inverter array 129 and hence, the output of AND gate 154 will go high only when all of the inputs thereto are high which results when a ZERO is present on each of order lines $ORD_0$ – $ORD_3$. The AND gate 155 acts to define the ONE hexadecimal digit for an order condition where the inputs on order lines $ORD_0$ – $ORD_3$ are 0001. Accordingly, the low order input to AND gate 155 is connected through conductors 165 and 149 directly to the $ORD_3$ input while the remaining inputs to AND gate 155 are connected through conductors 150 – 152 to the inverted outputs of the $ORD_0$ – $ORD_2$ inputs. Therefore, the output of AND gate 155 will go high whenever a ZERO resides on order lines $ORD_0$ – $ORD_2$ and a ONE level resides on order lines $ORD_3$.

Similarly, AND gate 156 acts to define the TWO hexadecimal digit of an order or input conditions wherein a 0010 set of input conditions are present on order lines $ORD_0$-$ORD_3$. Accordingly, the first, second and fourth inputs to the AND gate 156 are connected to the inverted outputs of order lines $ORD_0$, $ORD_1$ and $ORD_3$ through conductors 150, 151 and 153 while the third input to this AND gate is connected through conductors 166 and 148 directly to the $ORD_2$ input. Thus, the output of AND gate 156 will go high whenever the input conditions on order lines $ORD_0$ – $ORD_3$ is 0010. The AND gate 157 acts to define the Three hexadecimal digit or input conditions on the order lines $ORD_0$ – $ORD_3$ wherein a 0011 set of input conditions are present thereon. For this reason, the first two inputs to AND gate 157 are connected to the inverted outputs of the $ORD_0$ and $ORD_1$ order lines through conductors 150 and 151 while the two low order inputs thereof are connected through conductors 167 and 168 directly to the inputs of order lines $ORD_2$ and $ORD_3$ through conductors 148 and 149 respectively. Thus it will be appreciated by those of ordinary skill in the art that the output of AND gate 157 will go high whenever the input conditions on order lines $ORD_0$ – $ORD_3$ are 0011 respectively.

The AND gate 158 within the first digit decoder array 130 acts to define the Four hexadecimal digit or a 0100 set of input conditions. For this reason, the first, third and fourth inputs to AND gate 158 are connected, as shown in FIG. 3, to the inverted outputs of order lines $ORD_0$, $ORD_2$, and $ORD_3$ through conductors 150, 152 and 153 respectively while the second input to AND gate 158 is connected through conductors 169 and 147 directly to the order line designated $ORD_1$. Thus, it will be seen that the output of AND gate 158 will go high whenever the input conditions associated with order lines $ORD_0$ – $ORD_3$ are 0100. The AND gate 159 acts to define the Five hexadecimal digit or a set of input conditions on the order lines associated with a 0101 set of input conditions. For this reason, as plainly indicated in FIG. 3, the first and third inputs to AND gate 159 are connected through conductors 150 and 152 respectively to the inverted outputs of the $ORD_0$ and $ORD_2$ order lines while the second and fourth inputs thereto are connected through conductors 170, 171, 147 and 149 directly to the inputs of order lines $ORD_1$ and $ORD_3$. Thus it will be seen that the output of AND gate 159 will go high whenever the input conditions on order lines $ORD_0$ – $ORD_3$ are 0101 to thereby define the Five hexadecimal digit.

The AND gate 160 functions to define the Six hexadecimal digit and thus provides a high level at the output thereof in response to a 0110 set of input conditions on order lines $ORD_0$ – $ORD_3$. For this reason, the highest and lowest order inputs to AND gate 160 are connected through conductors 150 and 153 to the inverted outputs of order lines $ORD_0$ – $ORD_3$ while the center two inputs to AND gate 160 are connected through conductors 172, 173, 147, and 148 directly to order lines $ORD_1$ and $ORD_2$. In this manner, AND gate 160 will produce a high at the output thereof in response to high levels at each of the inputs thereto wherever the input conditions on order lines $ORD_0$ –$ORD_3$ are 0110. The AND gate 161 acts to define the Seven hexadecimal digit and hence the output thereof should go high whenever a 0111 set of input conditions are present on order lines $ORD_0$ – $ORD_3$. For this reason, the high order input to AND gate 161 is connected directly to conductor 150 and hence to the inverted output of the $ORD_0$ order line while the remaining three inputs thereto are connected through conductors 174 – 176 and conductors 147 – 149 directly to the order lines $ORD_1$–$ORD_3$. In this manner, all of the inputs to AND gate 161 will go high whenever a 0111 set of input conditions reside on order lines $ORD_0$ – $ORD_3$.

The AND gate 162 defines the Eight hexadecimal digit and hence the output thereof should go high whenever a 1000 set of input conditions reside on order lines $ORD_1$ – $ORD_3$. In this manner, all of the inputs to all high input conditions on AND gate 162 whenever the input conditions on order lines $ORD_0$ –$ORD_3$ are 1000, the high order input to AND gate 162 is connected through conductors 177 and 146 directly to the input of the $ORD_0$ order line while the remaining three inputs thereto are connected, as shown in FIG. 3, to the inverted inputs associated with order lines $ORD_1$–$ORD_3$ through conductors 151 – 153. Therefore, the output of AND gate 162 will go high to define the Eight hexadecimal digit whenever the input conditions on order lines $ORD_0$ – $ORD_3$ are 1000. The AND gate 163 acts to define the Nine hexadecimal digit or input conditions on order lines $ORD_0$ –$ORD_3$ corresponding to 1001. Therefore, to ensure that all of the inputs to AND gate 163 go high whenever a 1001 set of input conditions are present on order lines $ORD_0$ – $ORD_3$, the high and low level inputs to AND gate 163 are connected through conductors 178, 179 and 146 and 149 directly to order lines $ORD_0$ – $ORD_3$ while the middle two inputs to AND gate 163 are connected through conductors 152 and 151 to the inverted outputs of order lines $ORD_2$ and $ORD_1$. Thus, the four inputs to AND gate 163 will be high to provide a high at the output thereof whenever the inputs on order lines $ORD_0$ – $ORD_3$ are 1001. The AND gate 164 acts to define the A hexadecimal digit and hence the output thereof should go high whenever the input conditions on order lines $ORD_0$ – $ORD_3$ are 1010. To ensure that all highs are applied to the inputs of AND gate 164 under this set of input conditions, the first and third inputs to AND gate 164 are connected through conductors 180, 181, 146 and 148 directly to order lines $ORD_0$ and $ORD_2$ while the remaining inputs to AND gate 164 are connected through conductors 151 and 153 to the complemented inputs associated with order lines $ORD_1$ and $ORD_3$. Thus, in this manner, the output of AND gate 164 will go high whenever the input conditions on order lines $ORD_0$ – $ORD_3$ are 1010. The outputs of each of the AND gates 154 – 164 present within the first digit decoder array 130 are connected through conductors 182 – 192 to respective inputs of the order decoder array 133 and it will be appreciated by those of ordinary skill in the art, that whenever a high level is present on any one of the output conductors 182 – 192 of the first digit decoder array 130, the first digit of a designated order comprising a pair of hexadecimal digits is present on orders lines $ORD_0$ – $ORD_3$.

Of the orders employed for the operation of the facsimile controller means 10 within the instant invention, each order is made up, as aforesaid, of a pair of hexadecimal digits wherein the first hexadecimal digit may comprise the digits 0 – A while the second hexadecimal digit for each order to be decoded by the order register illustrated in FIG. 3 comprises the single hexadecimal F. Further, the second hexadecimal digit for each order to be decoded is presented at the output of the facsimile subcontroller means on order lines $ORD_4$ – $ORD_7$. Therefore, as only a single hexadecimal digit is to be decoded for the order register being described from order lines $ORD_4$ – $ORD_7$, each of these order lines is connected to the inputs of AND gate 131. Thus, as will be readily appreciated by those of ordinary skill in the art, the AND gate 131 acts to define the F hexadecimal digit for input conditions on order lines $ORD_4$ – $ORD_7$ wherein a ONE or high level is present on each order line to thereby define a set of input conditions corresponding to 1111. Accordingly, it will be seen that when each of the inputs to order lines $ORD_4$ – $ORD_7$ is high, the requisite second digit of an order to be decoded is present and is signalled by the output of AND gate 131 going high.

The output of AND gate 131 is connected through conductor 195 to the input of AND gate 132. The first input to AND gate 132 is connected, as aforesaid, to conductor 195 while the second input of AND gate 132 is connected through conductor 196 to a terminal annotated ORD Enable in FIG. 3. The ORD Enable input to the facsimile controller means 10 is provided as an output of the facsimile subcontroller means each time an order has been provided by the central switching means 1 thereto, has been separated thereby and applied to the order lines $ORD_0$ – $ORD_7$. Thus, it will be appreciated by those of ordinary skill in the art that the ORD Enable output generated by the facsimile subcontroller means 8 is an advisory signal indicative that an order is being supplied on order lines $ORD_0$ – $ORD_7$, and hence may be employed to gate inputs on these lines into the order register as the input on conductor 196 is appropriately timed to occur in a coincident manner with the presence of order information on order lines $ORD_0$ – $ORD_7$. The AND gate 132 acts in the conventional manner to provide a high level on the output thereof whenever both of the inputs thereto go high and hence, it will be appreciated by those of ordinary skill in the art that the output of AND gate 132 goes high only at such times as the hexadecimal digit F is decoded from order lines $ORD_4$ – $ORD_7$ by the action of AND gate 131, as aforesaid, and an order enable output is provided by the facsimile subcontroller means 8 to indicate that information present on order line $ORD_0$ – $ORD_7$ is in fact order information presently being supplied to the facsimile controller means 10 by the facsimile subcontroller means 8.

The output of AND gate 132 is applied to conductor 197 which is commonly connected to a plurality of inputs of the order decoder array 133. More particularly, as shown in FIG. 3, the order decoder array 133 comprises a plurality of AND gates 201 – 211 which each acts to decode and thereby identify one of the plurality of orders issued in the form of a pair of hexadecimal digits to which the facsimile controller means 10 is to respond. Thus, each of the outputs of each of the AND gates 201 – 211 within the order decoder array 133 acts to define one of the several orders which are decoded by the order register means depicted in FIG. 3 and are employed to actuate one of the control inputs on either the facsimile chassis means 20 or the data access arrangement 22 through the dialing means 23 illustrated in FIG. 1 and further described hereinafter. Each of the AND gates 201 – 211 comprises a conventional AND gate which acts in the well known manner to produce a high level at the output thereof, signaling the receipt and appropriate decoding of a given one of a plurality of orders, whenever both of the inputs thereto are high. Further, as indicated by the annotations associated with each gate, each order to be decoded comprises a two digit hexadecimal order wherein the second hexadecimal digit in each case is the F hexadecimal digit. Therefore, the output of AND gate 132 as present on conductor 197 is connected in common to one input of each of the AND gates 201 – 211 present within the order decoder array 133 it will be appreciated by those of ordinary skill in the art that whenever the output of AND gate 132 goes high to thereby provide a high to the lower input of each of the AND gates 201 – 211 connected to conductor 197, the F digit will be present on order lines $ORD_4 - ORD_7$ and an order enable output will have been issued by the facsimile subcontroller means 8 on conductor 196 to indicate that an order has been presented.

The second input to each of the AND gates 201 – 211 within the order decoder array 133 is connected to a respective one of the outputs of the first digit decoder array through conductors 182 – 192. 192. Therefore, it will be appreciated by those of ordinary skill in the art that when one of the hexadecimal digits, O–A as presented on order lines $ORD_0 - ORD_3$, is present has been decoded, a high will be present on appropriate one of the output conductors 182 – 192 of the first digit decoder array 130 to thereby define the first digit of the plurality of orders to be decoded which are defined in terms of a pair of hexadecimal digits, as aforesaid. Thus, any time that both of the inputs to one of AND gates 201 – 211 within the order decoder array 133 goes high, a designated one of the orders to be decoded by the order register depicted in FIG. 3 is present and will cause the output of the gate defining that order to go high. Accordingly, AND gate 201 within the order decoder array 133 defines an on hook order in terms of the pair of hexadecimal digits OF wherein the first digit is defined by the output of AND gate 154 within the first digit decoder array 130 while the F digit and the presence of a valid order is defined by the output of AND gate 132. Similarly, an off hook order is defined by a high at the output of AND gate 202, a 4 minute order is defined by the output of AND gate 203, a 6 minute order is defined by the output of AND gate 204, a second mode order is defined by the output of AND gate 205, a receive mode order is defined by the output of AND gate 206, a couple modem order is define by the output of AND gate 207, an uncouple modem order is defined by the output of AND gate 208, an open door interlock order is defined by the output of AND gate 209, a closed door interlock order is defined by the output of AND gate 210 and a ready tone detect enable order is defined by the output of AND gate 211. Thus, each of the 11 orders which are employed to control the operation of the facsimile controller means 10, as employed within the exemplary embodiment of the instant invention, are provided at the outputs of the plurality of AND gates 201 – 211 within the order decoder array 133 and shall be employed, in a manner to be described below, to control the operation of the facsimile chassis means 20 and the data access arrangement 22 through the operation of the dialing means 23.

It should be noted, as will be readily appreciated by those of ordinary skill in the art that should additional orders be desired or required due to an alternate implementation of the instant invention or due to the requirements of another type of facsimile device selected, further orders may be defined through an increase in the number of gates present within the first digit decoder array 133 while a very substantial increase in the number of orders is also available through an increase in the number of hexadecimal digits employed for the second digit of each order as presented on order lines $ORD_4 - ORD_7$. Should this mide of alternative implementation be employed, it will be appreciated by those of ordinary skill in the art that a second digit decoder array similar to decoder array 130 would be relied upon in place of the AND gate 131 which here acts simply to decode the hexadecimal digit F. The output of each of the plurality of AND gates within the order decoder array 133 is connected to conductors 214 – 224 and it will be appreciated by those of ordinary skill in the art that whenever a high resides on one of these conductors, the requisite order has been received on order lines $ORD_0 - ORD_7$ during a time when an order has been issued to define the pair of hexadecimal digits associated with each of the AND gates 201 – 211 within the order decoder array 133.

Once the presence of an order has been detected by the order decoder array 133 and signaled as a high level on one of the conductors 214 – 224, it is employed, in a manner to be described below, to furnish control inputs to the data access arrangement 22 or the facsimile chassis electronics 20. However, as the presence of an order is only signaled on one of output conductors 214 – 224 for the relatively short duration associated with an instruction cycle and various combinations and permutations of orders are required for the appropriate operation of the facsimile chassis means 20 and the data access arrangement 22 during the various phases of operation of the facsimile controller means 10; each order and its complement is employed to toggle a latching arrangement so that once a given order is issued, the same persists until modified by a complementary order in a manner highly reminiscent of the opening and closure of actual switches associated with the operation of conventional facsimile equipments. More particularly, the output of AND gate 201 as present on conductor 214 is applied through an OR gate 225 to one input of command flip flop 134 while the output of AND gate 202 as present on conductor 215 is connected to a second input of command flip flop 134. The command flip flop 134 may take the form of a conventional bistable flip flop which acts in the well known manner to be placed in a set condition whenever a high is applied to the set input thereof while, conversely, being reset whenever a high is applied to the reset input thereof. The set input to the command flip flop 134 is connected, as indicated in FIG. 3, to the output of AND gate 202 through conductor 215 while the reset input thereof is connected through conductor 226 to the output of OR gate 225. Therefore, as it will be recalled that the AND gate 202 acts to decode Off Hook instructions in the form of a 1F command, whenever the command flip flop 134 is placed in its set state in response to the decoding of an off hook order by AND gate 202, the Q output of the command flip flop 134 will go high to designate an Off Hook instruction and will remain in this condition until subsequently reset. Conversely, the AND gate 201 acts to decode On Hook instructions in the form of OF hexadecimal orders and to provide a high level through conductor 214, the OR gate 225 and conductor 226 to the reset input of the command flip flop 134. Thus, each time an On Hook command is decoded by the AND gate 201, the command flip flop 134 will be reset to place a high at the $\overline{Q}$ output indicative of this condition and it will remain in a reset state until subsequently set by the decoding of an Off Hook instruction.

An additional input to the OR gate 225 is provided through conductor 227 from the terminal marked Reset. Therefore, as it will be appreciated that the OR gate 225 acts in the conventional manner to place a high at the output thereof, connected to conductor 226, any time either one of the inputs thereto goes high, it will be seen that the command flip flop 134 will be reset to an on hook or hand up condition any time an ON Hook command is decoded by the AND gate 201 or a reset signal is applied to conductor 227 in response to a resetting of the facsimile controller means 10. The Q and $\overline{Q}$ outputs of the command flip flop 134 are connected through a pair of conventional driver stages 228 and 229 to the terminals annotated Data Mode and On/Off Hook illustrated in FIG. 3 and it will be appreciated by those of ordinary skill in the art that such terminals may be directly connected to correspondingly annotated terminals on the conventional data access arrangement 22 as shown in FIG. 1 or if otherwise required, inverted and applied to such terminals.

The conventional data access arrangement 22, as described briefly above, is provided with two control inputs which govern the operation thereof. More particularly, when an On Hook or Off Hook instruction is produced by the output of driver 229, the data access arrangement 22 is connected or disconnected respectively from the telephony line connected thereto while a Data Mode instruction is appropriate whenever data is being coupled therethrough It will be appreciated by those of ordinary skill in the art that for an Off Hook instruction, a high level at the Q output of command flip flop 134 is translated to an appropriate positive level by the driver 229 and whenever such an off hook instruction is present assuming no inversions are necessary, the $\overline{Q}$ output of the command flip flop 134 will be low. This low may be translated to an appropriate negative voltage by the driver 228 so that for data coupling purposes, a high level at the output of driver 229 and a negative or low level at the output of driver 228 is appropriate for coupling to a telephone line through the data access arrangement 22 while a low level at the output of driver 229 and a high level at the output of driver 228 is representative of a disconnect level applied to the data access arrangement 22. It should be additionally noted that in the exemplary embodiment of the present invention here being described, dialing is accomplished by selectively issuing On Hook and Off Hook instructions to the data access arrangement 22, as aforesaid, and for this reason the command flip flop 134 and the drivers 228 and 229 have been indicated as comprising the dialing arrangement 23. Thus it will be seen that when an Off Hook instruction is decoded by AND gate 202, and Off Hook command coupled with a Data command is applied to the data access arrangement 22 and this pair of inputs is maintained until the command flip flop 134 is subsequently reset by the decoding of an On Hook instruction by the AND gate 201 or the application of a reset system command on input conductor 227. Accordingly, once an On Hook or Off Hook command is issued, such command is appropriately decoded and applied as a control input to the data access arrangement 22 and the control levels associated with these commands are maintained until such time as a further command is issued and decoded to cause the command flip flop 134 to toggle. The orders in the form of On Hook and Off Hook instructions which are decoded by AND gates 201 and 202 are the only two orders employed to control the operation of the data access arrangement 22 and it will be appreciated by those of ordinary skill in the art that the response to an Off Hook command, access to the telephone line is achieved while an On Hook instructions is effectively a disconnect order to the data access arrangement 22 to thereby allow selective connection and disconnection from the telephone line.

The command flip flop 135 receives the Four and Six Minute Mode commands decoded by the AND gates 203 and 204 and acts, in response thereto, to exhibit a set state wherein a high level is present at the Q output thereof whenever a Four Minute Mode command is decoded by AND gate 203 while being reset to exhibit a low at the Q output thereof whenever a Six Minute Mode order is decoded by the AND gate 157. The command flip flop 135 may comprise the same form of conventional bi-stable device discussed in conjunction with the command flip flop 134 and here acts as a latch to maintain a speed of transmission designation for the facsimile chassis means 20 once the same has been decoded from an order issued. The Q output of the command flip flop 135 is connected through a conventional driver 230 to the time of transmission mode switch input of the facsimile chassis means 20 illustrated in FIG. 1. More particularly, as was described in conjunction with FIG. 1, conventional facsimile apparatus such as the Model 400 Telecopier System described above, may exhibit multiple transmission speeds which effectively act to govern the speed at which document and copy scanning takes place and effectively control the resolution of the image information conveyed. The speed of transmission is normally set in a Model 400 Telecopier System by placing a transmission time switch in either a four or six minute position and hence, to accommodate the output of driver 230; the output side of the speed switch in the facsimile chassis means 20 is directly connected to the terminal annotated 4/6 Minute in FIG. 3. Thus, it will be understood by those of ordinary skill in the art that when a high level resides at the Q output of the control flip flop 135 a 4 minute mode of operation is defined to the facsimile chassis means 20 while when a low level resides thereat a 6 minute mode of transmission is specified. The driver means 230, may take any conventional format and here merely acts to raise the logic level provided at the output of the control flip flop 135 to voltage levels acceptable to the control inputs of the facsimile chassis means 20. Accordingly, it will be seen that once an appropriate order defining the transmission speed of the facsimile electronics has been decoded by one of the AND gates 203 or 204, the control level associated therewith is latched by the command flip flop 135 whereupon the appropriate speed designating level is applied at the output of the driver 230 to the speed control input of the facsimile electronics and is retained in this condition until subsequently modified by a new speed designating order.

The command flip flop 136 acts to define a send or receive mode of transmission to the facsimile chassis means 20 employed within the facsimile controller means 10. More particularly, the command flip flop means 136 may take the form of a bistable flip flop, as was described above for command flip flops 134 and 135, which has the Q output thereof connected through a conventional driver 231 to the output side of the send/receive switch in the facsimile chassis means 20. When a high level is applied to the terminal annotated Send, a Send Mode of operation is defined for the facsimile transceiver while when a low level is applied thereto, the transceiver is placed in a Receive Mode of operation by the control level synthesized. The set input to the command flip flop 136 is connected through conductor 218 to the output of AND gate 205 which, it will be recalled, acts to decode Send orders issued by the central switching means 1. Conversely, the reset input to the command flip flop 136 is connected through conductor 219 to the output of AND gate 206 which acts to decode Receive Mode instructions from the central switching means 1. Therefore, in similar manner to that described above, whenever a Send Mode instruction is decoded by AND gate 205 the output provided thereby on conductor 218 acts to set a high at the Q output of the command flip flop 136 and the command flip flop 136 is retained in this state until subsequently reset by the decoding of a Receive command by the AND gate 206. Once set, the command flip flop 136 acts as a latch to maintain the transceiver portion of the facsimile chassis means 20 in a Send Mode of operation until subsequently reset by a receive order or alternatively, the apparatus illustrated is de-energized.

The command flip flop 137 may take the conventional form of a bi-stable device such as described for command flip flops 134–136 and here acts to couple and uncouple the modem present in the facsimile chassis means 20 to the data input of the data access arrangement 22. If the description of the Model 400 Telecopier system set forth above is recalled, it will be appreciated that coupling to a telephone line there takes place through an acoustic coupler having a switch therein which is depressed upon the insertion of a telephone handset therein. This switch acts to energize the transceiver and if all other readiness conditions monitored are enabled, actuate phasing followed by data transmission in response to the placement of a telephone handset into the acoustic coupler. The facsimile chassis means 20 employed within the facsimile controller means 10 is, however, hard wired to the telephone circuits through the data access arrangement 22 and hence, although the switch input present in the acoustic coupler could be modified to respond to couple and uncouple orders being decoded, it is here preferable that the acoustic coupler switch together with the acoustic coupler be bypassed and an analog gate be provided for the selective coupling of the output of the modem present in the facsimile chassis means to the data input of the data access arrangement 22. Such an analog gate is indicated in FIG. 3 by the appropriately annotated block 232 and it will be appreciated by those of ordinary skill in the art that the analog gate 232 may comprise any of the well known switch devices, such as an FET or other conventional gating arrangement, which acts, when selectively enabled, to apply an analog input provided thereto to the output thereof.

The analog input to the analog gate 232 from the modem present in the facsimile chassis means 20 is applied thereto through conductor 233 while an enabling input to the analog gate 232 is applied from the $\overline{Q}$ output of the command flip flop 137 through conductor 234 and it will be appreciated by those of ordinary skill in the art that whenever an enable level is applied to conductor 234, the analog gating arrangement 232 will be placed in a closed condition whereupon the output of the modem present within the facsimile chassis means 20, as present on conductor 233 will be applied to the output thereof and hence to the data input of the data access arrangement 22 while when no enabling input is present on conductor 234, the output of the analog gate 232 will be effectively disabled. The input conditions on the analog gate 232 are such that when a low level is present on conductor 234, the analog gate 232 is enabled while when a high level is applied thereto, the analog gate 232 will be disabled. The conductor 234 is connected to the $\overline{Q}$ output of the command flip flop 137 and hence analog gate 232 will be enabled whenever the command flip flop 137 is in a set condition while being disabled whenever the command flip flop 137 is placed in a reset state. The set input to command flip flop 137 is connected through conductor 220 to the output of AND gate 207 which acts, as aforesaid, to decode Couple Modem commands issued by the central switching means 1 while the reset input thereto is connected through conductor 221 to the output of AND gate 208 which acts to decode Uncouple Modem orders. Accordingly, it will be appreciated by those of ordinary skill in the art that whenever a Couple Modem instruction is decoded by AND gate 207, the command flip flop 137 will be placed in its set state to thereby enable the analog gate 232 and such enabled state will be latched by the command flip flop 137 until it is subsequently changed by the decoding of an Uncouple Modem order by the AND gate 208 which would thereupon act to reset the command flip flop 137 and hence disable analog gate 232.

The command flip flop 138 may take the same form of bisatable flip flop as described for command flip flops 134–137 and is connected through a conventional driver 235 to the output side of the door interlock switch present within the facsimile chassis means 20. The set input to the command flip flop 138 is connected through conductor 223 to the output of the AND gate 210 which acts, as aforesaid, to decode Closed Door Interlock instructions while the reset input thereto is connected through conductor 222 to the output of AND gate 209 which acts, as aforesaid, to decode Open Door Interlock instructions. The condition of the door interlock switch in a Model 400 Telecopier System, as aforesaid, is one of the readiness conditions monitored by the logic present within the facsimile chassis means 20 and will cause the same to broadcast stop tone any time an open switch condition is indicated once the transceiver has been enabled in a send mode. Therefore, the synthesis of Open and Close Door Interlock switch commands by the instant invention may be employed once the modem is in a coupled condition to cause the selective issuance of stop tone such as is done during any facsimile transmission upon the completion of the entire message and within the instant invention during the interval when dialing has been completed and the transmission of stop tone interleaved with a listening period is relied upon to both apprise an operator at a receiving site that a facsimile transmission is about to occur while detection of ready tone is initiated. Thus it will be appreciated by those of ordinary skill in the art that while the On Hook and Off Hook instructions latched by the command flip flop 134 control selective connection to the telephone network in addition to dialing through multiple repetitions of selectively timed On Hook and Off Hook commands, the command flip flops 135 – 138 synthesize and provide control inputs to the facsimile chassis means 20 to place the same in an appropriate mode for transmission at a desired rate as well as to selectively cause the readiness conditions monitored to be selectively fulfilled or omitted and to cause the coupling of the output of the modem therein to be applied to the data access arrangement 22.

The command flip flop 139 acts to provide an enabling level during intervals when the detection of ready tone by the ready tone detector means 24 may act to cause the generation of an interrupt at the facsimile subcontroller means 8 so that the central switching means 1 will return to service the facsimile controller means 10 for the purposes of facsimile transmission. More particularly, it will be recalled from the overall operation of the facsimile mode of communication employed within the instant invention, as briefly set forth in conjunction with FIG. 1, that after dialing has been completed by the fascimile controller means 10, under program control, that the central switching means 1 terminates the servicing of the facsimile controller means 10 except for providing periodic orders thereto until the expiration of a 30 second interval occurs or an interrupt is detected indicative that the facsimile controller means has established communication with a remotely located facsimile peripheral and ready tone therefrom has been detected. Thus, it will be recalled that after dialing has been completed, stop tone is generated for one fifth of a second and then a one half second listening interval is established for ready tone detection and the interleaving of stop tone generation with listening intervals continues for the thirty second interval established for the detection of ready tone before the attempt to communicate with the remotely located peripheral employing facsimile equipment is abandoned. As now will be appreciated, stop tone is broadcast during these intervals by applying On Hook instructions to the data access arrangement while the facsimile chassis means is controlled in such manner that four minute send mode and couple modem orders are applied thereto while an open interlock condition is synthesized by the command flip flop 138. However, during the alternative listening interval, the modem is uncoupled and a ready tone detect enable order is issued by the central switching means 1. Such a ready tone detect enable order is decoded by AND gate 211 and results, as aforesaid, in the application of a high level to the output thereof connected to conductor 224. The output of AND gate 211 is applied through conductor 224 to the set input of command flip flop 139, and acts, as shall be seen below, to enable an AND gate, through which the output of the ready tone detector means 24, as shown in FIG. 1, is applied to the interrupt generating network indicated by the dashed block 140. Thus, whenever the command flip flop 139 is placed in a set condition, the Q output thereof, connected to conductor 236 will go high to provide an enabling level for the ready tone detection input to the interrupt network indicated by the dashed block 140.

The reset input to the command flip flop 139 is connected through the conductor 237 to the output of an OR gate 238. The OR gate may comprise any of the conventional forms of this well known class of logic device which acts in the well known manner to generate a high or resetting input at the output thereto connected to the reset input of command flip flop 139 any time any of the inputs thereto go high. The command flip flop 139 acts as a latch in the same manner as any of the other command flip flops 134–138 described above and hence effectively retains the state imposed by a decoded command until such time as resetting occurs. In the cases of the latches formed by command flip flop 134 – 138, such resetting occurs in response to the issuance of complementary commands by the central switching means 1. Here, however, the function of the command flip flop 139 is to enable the interrupt network 140 to generate an interrupt any time ready tone is detected during a properly established listening interval and hence there are a plurality of conditions which may occur and each of such conditions should effectively reset the command flip flop 139 to void the enable for the ready tone detect to the interrupt network 140. As ready tone detection should only occur during the listening portions of the 30 second interval established between dialing and a termination of the attempt to establish a telephone link to a facsimile transceiver in a ready condition, it will be appreciated that the command flip flop 139 should be reset any time an On Hook command is issued to effectively terminate access to the telephone line. Therefore, a first input to OR gate 238 on conductor 239 indicates that an On Hook instruction has been issued and this input, as will be readily appreciated by those of ordinary skill in the art, is available from the $\overline{Q}$ output of command flip flop 134. Thus, whenever a high is applied to conductor 239 indicating an On Hook command has been issued, a high will be generated by the OR gate 238 and applied as a resetting level to command flip flop 139.

Similarly, any time the modem is coupled, stop tone or other information is being generated by the modem and applied to the data access arrangement 22 and hence a listening interval is not established. Therefore, the presence of a couple modem order is indicated by a high level on the input to OR gate 238 connected to conductor 240 and the same will cause the resettinf of the command flip flop in the same manner mentioned above for the high input level on conductor 239 so that a high level indicating that a Couple Modem order has been issued would be available from the Q output of command flip flop 139. In addition, resetting of the command flip flop 139 should occur any time the facsimile controller means 10 is reset as indicated by a reset input applied to conductor 241 and applied to the input of OR gate 238 through conductor 242. Such resetting level may comprise a similar input to that applied to conductor 227 of OR gate 225 and it will act to cause the resetting of command flip flop 139 in the same manner as the previously discussed issuance of an On Hook or Couple Modem order. Furthermore, as shall be seen below, once ready tone has been detected and an interrupt has been generated by the interrupt network 140 and subsequently acknowledged by the central switching means 1 prior to providing the requested service, the interrupt generated must be appropriately cleared. Whenever such an acknowledgement signal is provided through the facsimile subcontroller means 8, no further listening intervals should occur and hence if the command flip flip 139 is in a set condition, it is reset by the application of the IOP acknowledge input through conductors 243 and 244 to a further input of OR gate 238. Thus it will be seen that the command flip flop 139 acts to enable the interrupt network indicated by the dashed block 140 to respond to ready tone detection during appropriate listening intervals as defined by Ready Tone Detect Enable commands issued by the central switching means 1 and decoded by the AND gate 211 which are latched by the command flip flop 139 and subsequently relieved, at the end of a listening interval by a Couple Modem command which would indicate the initiation of stop tone generation, or otherwise, by an interrupt acknowledgement indicating the end of the stop tone and listening intervals or otherwise by a disconnect or controller resetting input as provided to the inputs of OR gate 238.

The interrupt network indicated by the dashed block 140 acts to perform the function of a generation of an interrupt for application to the facsimile subcontroller means 8 and hence to the central switching means 1 whenever ready tone is detected during the establishment of a listening interval. In addition, the interrupt network indicated by the dashed block 140 is responsible to interrupt acknowledgement signals generated by the central switching, means 1 and supplied thereto from the facsimile subcontroller means 8 to clear any interrupt generated in the peculiar manner required by the facsimile subcontroller means 8 which imposes the condition that interrupts not be cleared until an acknowledgement is received and has terminated. The interrupt network indicated by the dashed block 140 comprises AND gates 250 and 251, flip flops 252 and 253, OR gate 254 and NOR gate 255. The AND gate 250 may take any of the well known forms of this conventional class of device which acts in the usual manner to generate a high at the output thereof connected to conductor 260 whenever both of the inputs thereto are high while generating a low level output on conductor 260 for all other sets of input conditions. One input to AND gate 250 is connected through conductor 236 to the output of the command flip flop 139 and hence, if the operation of the AND gate 211 and the command flip flop 139 is recalled, it will be appreciated by those of ordinary skill in the art that a high or printing level is applied through conductor 236 to one input of AND gate 250 during listening intervals established by the central switching means 1 for the purposes of ready tone detection.

The second input to AND gate 250 is connected through conductor 261 to a terminal annotated Ready Tone Detect and it will be appreciated by those of ordinary skill in the art that this terminal connects to the output of the ready tone detector means 24 as illustrated in FIG. 1. The ready tone detector means 24, is described in detail in conjunction with FIG. 4; however, it is here sufficient for an appreciation of the interrupt network indicated by the dashed block 140 to appreciate that a high level is generated by the ready tone detector means 24 each time ready tone, as generated by the ready condition of a receive mode facsimile transceiver contacted through a communication link is detected. Therefore, it will be appreciated by those of ordinary skill in the art that the output of AND gate 250 which is connected to conductor 260 goes high whenever a listening interval for the purposes of ready tone detection has been established under program control by the central switching means, as indicated by the output of the command flip flop 139 on conductor 236, and ready tone has actually been detected, as indicated by a high on conductor 261, so that subsequent to dialing and prior to the expiration of the 30 second interval precedent to attempt termination; the output of AND gate 250 going high will indicate that a receive mode transceiver in an appropriate ready condition has been contacted.

The output of AND gate 250 on conductor 260 is connected through conductors 263 – 265 to one input of AND gate 251, the set input of flip flop 253 and one input of NOR gate 255. The AND gate 251 and the flip flop 253 may take the same conventional form as the AND gate 250 and the command flip flop 139, respectively, described above in that the AND gate 251 will produce a high at the output thereof only when both inputs thereto are high while producing a low level output for all other sets of input conditions while the flip flop 253 is a conventional bistable device which is placed in a set state whereupon a high level is exhibited at the Q output thereof whenever a high level input is applied to the set input while being toggled to a reset condition whenever a high is applied to the reset input thereto whereupon the Q output thereof goes low. The NOR gate 255 is also conventional and may take any of the well known forms of this well known class of logic device available in the marketplace today. Therefore, it will be appreciated by those of ordinary skill in the art that NOR gate 255 acts in the conventional manner to produce a low at the output thereof any time any of the inputs thereto go high while providing a high level output only when all of the inputs thereto are low. When a high level is produced at the output of AND gate 250 on conductor 260, such high level output will be applied through conductor 264 to the set input of flip flop 253 and cause this flip flop to be placed in a set condition whereupon a high level is produced at the Q output thereof connected to conductor 266. However, when the output of AND gate 250 initially goes high, no secondary enabling level will be applied to AND gate 251 so that the output thereof will remain low while the high level applied on conductor 265 to one input of NOR gate 255 will cause the output thereof to go low and release any resetting input which may have been applied to the flip flop means 253.

When the flip flop 253 is initially set in response to the initial generation of a high on conductor 260, the output thereof goes high and hence, an interrupt pending level is generated at the output terminal connected thereto as indicated in FIG. 3. This output of the flip flop 253 is applied through cable 15 as shown in FIG. 1, to the facsimile subxontroller means 8 where the same acts to generate an interrupt for the central switching means 1 in the well known manner. As will be appreciated by those of ordinary skill in the art, the interrupt thereby generated by the output of AND gate 250 initially going high will be subsequently acknowledged by the central switching means 1 and followed by subsequent operations thereby calculated to achieve the actual forwarding of facsimile information from the central switching means 1 through the facsimile controller means 10 to the remotely located facsimile peripheral which has now been contacted and has indicated that it is in a ready condition. The Q output of the flip flop 253 is also connected through conductors 266 and 267 to the second input of AND gate 251. Therefore, once the flip flop 253 has been placed in a set condition by the output of AND gate 250 on conductor 260 going high, the AND gate 251 is subsequently enabled to provide a high at the output thereof due to the setting of the flip flop 253 and hence the pair of high inputs applied to AND gate 251 on conductors 263 and 267.

The output of AND gate 251 is connected through conductors 268 to the set input of a flip flop 252. The flip flop 252 may take the same form of conventional bistable flip flop device described in conjunction with flip flop means 253 and hence acts whenever the output of AND gate 251 goes high to be set whereupon a high level is provided at the Q output thereof connected to conductor 269. Thus it will be appreciated that whenever the output of AND gate 250 goes high on conductor 260 indicating that a ready tone detect signal has been acquired during an appropriate listening interval, the flip flop means 253 is initially set thereby and upon setting of this flip flop, an interrupt pending is generated and the AND gate 251 is enabled whereupon the flip flop 252 is set to place a high on output conductor 269. The Q output of the flip flop 252 is connected through output conductor 269 to a second input of NOR gate 255. As it will be recalled that the output conditions of NOR gate 255 are such that a high will only be produced at the output thereof when all of the inputs thereto are low, and a high level is the requisite level to cause the resetting of flip flop 253 which is now in a set condition, it will be appreciated that the setting of flip flop 252 will continue the output of NOR gate 255 in a low level as may have been initially established by the high output on conductor 260 which would of course periodically terminate due to the disabling of AND gate 250 at the end of each listening interval or through a possible termination of the high level from the ready tone detector means 25. Thus it will be seen that once ready tone is detected during an appropriate listening interval, the output of AND gate 250 will go high to cause the setting of the flip flop means 253 whereupon an interrupt pending signal is supplied to the facsimile subcontroller means 8, the flip flop 252 is subsequently set and these conditions are maintained until the interrupt is subsequently cleared.

Once an interrupt is generated, the same will be responded to by the central switching means 1 in accordance with the priority established for that interrupt. In the case of an interrupt generated at the facsimile subcontroller means 8, the priority assigned thereto is relatively high and hence this interrupt will be promptly responded to by the central switching means 1. As is well known to those of ordinary skill in the art, when an interrupt is generated, the nature of the interrupt is first ascertained and if externally generated by a remote peripheral the address of the interrupting remote peripheral is garnered through an addressing and status operation of each peripheral on the line. Once the interrupting peripheral is determined, the interrupt is acknowledged by the central switching means 1 and the service requested is provided. In the instant case, once the interrupt is acknowledged by the generation of an appropriate signal by the central switching means 1 and the application of such signal to the facsimile subcontroller means 8, an interrupt acknowledgment signal is applied by the facsimile subcontroller means 8 to the facsimile controller means 10. This interrupt pending acknowledgment signal, as developed by the facsimile subcontroller means 8 is applied to the IOP Acknowledged terminal connected to conductor 243 in FIG. 3 where the same is employed to eventually achieve the clearing of the interrupt pending level on conductor 266. However, such clearing is accomplished in accordance with the protocol established for the facsimile subcontroller means 8 in that such interrupt pending level may not be cleared until the acknowledgment level terminates so that the IOP may read the nature of the interrupt contained on the status lines. Thus, when an IOP acknowledgment signal is applied to conductor 243, a high level will reside thereon and is applied through conductors 270 and 271 to a further input of NOR gate 255 and one input of an OR gate 254.

It will be appreciated by those of ordinary skill in the art that when the interrupt pending signal is acknowledged and conductor 243 goes high, the high level applied through conductor 270 to one input of NOR gate 255 will not change the output conditions of this gate from the low level previously established by the output of AND gate 250 going high and the flip flop 252 being set. This position is here taken because the output conditions for NOR gate 255 are such that the output thereof will go low whenever any input thereto is high and hence since a low level output was initially established by the output of AND gate 250 going high and was subsequently maintained by the setting of flip flop 252, the high level applied thereto on conductors 243 and 270 will merely add an additional high input which will not here change the low output condition thereof. Thus, when the interrupt is initially acknowledged by the central switching means 1, the set state of the flip flop 253 is not changed. The high level applied through conductor 271 under these input conditions to the input of OR gate 254 will, however, cause a resetting of the flip flop 252. The OR gate 254 may comprise any of the well known forms of this conventional class of device which acts to produce a high at the output thereof any time any of the inputs thereto go high. Therefore, as the output of OR gate 254 is connected through conductor 272 to the reset input of the flip flop 252, a high level is applied to the reset input of the flip flop 252 whenever conductor 271 goes high and will cause the flip flop 252 to be toggled to its reset condition, when the interrupt pending is acknowledged by the central switching means 1.

When the flip flop 252 is reset, the Q output thereof goes low and hence a low is applied through conductor 269 to an input of NOR gate 255. In addition, the input to NOR gate 255 connected through conductors 260 and 265 respresenting the output of AND gate 250 will also have gone low as the high level on conductor 243 is coupled through conductors 244 and 237 as well as OR gate 238 to cause a resetting of command flip flop 139 and hence, the disabling of AND gate 250. Thus, lows will be applied, under these conditions to both the inputs of NOR gate 255 connected to conductors 265 and 269; however, the output of NOR gate 255 will stay low as long as the high level on conductor 270, representing the acknowledgement signal persists. When, however, the IOP acknowledgment signal terminates, a low level will reside on conductors 243 and 270 whereupon all three inputs, under these conditions, to the NOR gate 255 are low. When all three inputs to NOR gate 255 go low, the output thereof connected to the reset input of flip flop 253 goes high and thus, under these conditions, the state of the flip flop 253 will be toggled to its reset condition whereupon the Q output thereof connected to conductor 266 and the interrupt pending terminal goes low to clear the interrupt; it being appreciated that the interrupt is cleared with the trailing edge of the interrupt acknowledgment pulse and hence the facsimile subcontroller means 8 protocol that the interrupt be cleared when the acknowledgment signal terminates is satisfied. A reset input supplied on conductor 241, as aforesaid, is additionally applied through conductor 273 to a second input of OR gate 254 where the same acts to reset the flip flop 252 in the same manner outlined above. However, the reset input applied to conductor 241 will only cause the flip flop means 253 to be reset and hence clear any interrupt which may have been generated under conditions where no acknowledgment signal was produced or the acknowledgment signal on conductor 243 has terminated. This position is here set forth because, as will be appreciated by those of ordinary skill in the art, a reset level on conductor 241 will cause a low to be applied to the inputs of NOR gate 255 connected to conductors 265 and 269; however, the input level on conductor 270 will be unaffected thereby and hence for a high level to be generated at the output of NOR gate 255, the input level on conductors 243 and 270 must be low.

OPERATION OF THE ORDER REGISTER

In operation, the order register depicted in FIG. 3 acts to decode and implement orders issued by the central switching means 1 during a facsimile mode of operation. More particularly, if the sequence of events initiated under program control by the central switching means 1 for a facsimile mode of operation, as set forth in conjunction with FIG. 1, are recalled; it will be appreciated that whenever message information is to be translated to a remotely located peripheral employing facsimile equipment, the central switching means 1 acts, under program control, to initialize the facsimile subcontroller means 8 and through the orders and data issued through the common data bus means 2 to cause the initialization and subsequent operation of the facsimile controller means 10. The initialization and subsequent operation of the facsimile controller means 10 is such that the facsimile controller means 10 is initialized, communication to a designated remotely located peripheral employing facsimile equipment is initiated and thereafter, a 30 second interval is established, under program control, during which the presence of a remotely located facsimile transceiver in a condition to receive facsimile information is sought to be obtained. If no ready tone from a remotely located transceiver is detected within this interval, the communication link sought to be established is terminated through a hang up operation at the data access arrangement 22 while if ready tone is detected within the 30 second interval established, successful dialing through a telephone communications link to a facsimile transceiver in a ready condition for a receive mode operation is assured. Thus, if ready tone is detected, the facsimile chassis means 20 is enabled for the purposes of initiating phasing for the 15 second interval established by the electronics therein and thereafter information in a form decodable into an analog baseband signal by the data register illustrated in FIG. 2 is forwarded to the facsimile controller means 10 for translation through the telephone communications link estalished to the receive mode transceiver. Upon the completion of all message information to be forwarded, the facsimile chassis means 20 present in the facsimile controller means 10 is caused to broadcast stop tone for a three second interval to cause the operation of the contacted receive mode transceiver to terminate and thereafter the telephone communications link established is terminated by causing the data access arrangement to effectively hang up. Each of these sequences of events occurs in response to orders issued by the central switching means 1, which orders are separated from the common data bus means 2 by the facsimile subcontroller means 8 and applied to the order register depicted in FIG. 3 where the same are decoded and appropriately applied to the data access arrangement 22 and the facsimile chassis means 20 in the form of discrete control levels calculated to selectively enable various input conditions on the data access arrangement or the facsimile chassis means 20 to cause the operation thereof in the mode desired.

More particularly, it will be recalled that once a facsimile mode transmission sequence has been initiated within the central switching means 1, an SIO (start input/output) command is issued on the common data bus means 2 which causes the clock within the facsimile subcontroller means 8 to start. Effectively, what occurs when an SIO command is issued is that each subcontroller connected as a peripheral within the illustrated communications system compares the address present therein with its own address until an appropriate comparison results. Thereafter, the clock within the subcontroller, which in this case corresponds to the facsimile subcontroller means 8 starts, the appropriate channels are seized and a flag is generated by the appropriate subcontroller to indicate a successful SIO and various status conditions. After the clock within the facsimile subcontroller means 8 is started, the facsimile controller means 10 comes on line while the processing operations carried on between the IOP within the central switching means 1 and the facsimile subcontroller means 8 cycle through Order Out, Data Out and Order In modes indicating the device is finished, as order information and data information is alternatively supplied, as aforesaid, to the facsimile subcontroller means 8 in response to the various requests made thereby. The order information and data information is separated by the facsimile subcontroller means 8 and separately applied to the facsimile controller means 10, as aforesaid, it being noted that the receipt of each order precipitates a data request in the manner explained in conjunction with OR gate 119 and the data request flip flop 45 illustrated in FIG. 2. Focusing now solely on the order information supplied to the order register means illustrated in FIG. 3, typical sequences of orders which are issued to initiate various cycles of operation taking place during an exemplary facsimile transmission operation carried on within the communications sytem according to the instant invention will be described.

After a successful SIO the initial sequence of orders issued by the central switching means 1 are devoted to an initializing of the facsimile controller means 10. Typically, such an initial sequence of orders would comprise an On Hook (OF) order, a 4 Minute Mode (2F) order, a Send Mode (4F) order, an Uncouple Modem (7F) order and an Open Door Interlock (8F) order. As each order is issued and applied to the order lines $ORD_0$– $ORD_7$ in FIG. 3, it will be decoded by the first digit decoder array 130, the first and second AND gate decoders 131 and 132 and the order decoder array 133, it being recalled that each order is accompanied by an ORD enable input applied to conductor 196 in FIG. 3 to apprise the facsimile controller means 10 that a designated order has been delivered and is present on order lines $ORD_0$ – $ORD_7$. Furthermore, it will be recalled from a description of FIG. 2 that each order issued is followed by a data request; however, all data requests generated in response to the delivery of an order are merely made to accommodate a requirement that orders and data be interleaved in their application to the facsimile subcontroller means 8 and hence it will be appreciated that all data requests generated in response to the delivery of orders results in an 8 bit byte being delivered which is loaded into the data byte buffer means 36 but is not further processed and is immediately followed by a count done signal to return the facsimile subcontroller means 8 to an order mode.

When the On Hook order is decoded by the AND gate 201 present in the order decoder array 133, it will result in a high level being applied through conductors 214 and 226 as well as the OR gate 225 to cause a resetting of the command flip flop 134. With the command flip flop 134 placed in a reset condition, the control levels applied to the data access arrangement 22 are such that it is effectively disconnected from the telephone line in the same manner as is associated with a conventional telephone set when the handset thereof is placed in the cradle. Thus, the On Hook order issued during the initialization sequence effectively ensures that the data access arrangement is not connecting the remaining portions of the facsimile controller means 10 to the telephone network connected thereto. When the 4 Minute Mode order (2F) and the Send Mode order (4F) are decoded by the AND gates 203 and 205 present within the order decoder array 133, the command flip flops 135 and 136 will be placed in their set conditions whereupon high levels are applied at the Q outputs thereof to the driver stages 230 and 231 to provide appropriate control levels to the output sides of the 4/6 minute and send/receive mode switches present within the facsimile chassis means 20. Thus, the decoding of these two orders acts to place the facsimile chassis means 20 into a 4 minute send mode whereupon the transceiver chassis acts as a facsimile transmitter requiring 4 minute transmission speeds for the information content of an 8×10 document. Finally, when the Uncouple Modem (7F) and the Open Door Interlock (8F) orders are decoded by the AND gates 208 and 209 within the order decoder array 133, both the command flip flops 137 and 138 are placed in their reset conditions whereupon the door interlock switch present within the facsimile chassis means 20 has an opened condition synthesized therefor while the output of the modem present within the facsimile chassis means 20 is effectively disconnected from the data input to the data access arrangement 22. Thus, the five orders issued to initialize the facsimile controller means 10 act to ensure that the data access arrangement is in an On Hook condition, the facsimile chassis means 20 is placed in a 4 minute send mode, however, the door interlock switch has an opened condition synthesized therefor and the modem thereof is uncoupled so that the readiness conditions required thereof for transmission have not been completed.

After the facsimile controller means 10 has been initialized by orders issued by the central switching means 1 and decoded by the order register illustrated in FIG. 3 in the foregoing arrangement, a telephone call to the designated remotely located peripheral employing facsimile equipment is initiated under software control by the issuance of selected On Hook and Off Hook orders to the facsimile controller means 10. Furthermore, it should be here noted that while the previously described orders issued for the initialization of the facsimile controller means 10 were provided in a rapid sequential manner, the orders described hereinafter in association with calling occur in a timed manner and processing by the central switching means 1 may occur on a time shared basis. The first order issued in the calling sequence is an Off Hook (1F) order which is devoted, as will be appreciated by those of ordinary skill in the art, to the acquisition of dial tone on the telephone line to which the data access arrangement 22 is connected. Upon application of the Off Hook order to the order lines $ORD_0$– $ORD_7$ and an order enable input, the 1F command defined thereby is decoded by AND gate 202 whereupon a high or setting level is applied to the set input of command flip flop 134. This high level on input conductor 215 causes the command flip flop 134 to be placed in its set condition whereupon a high level is applied to driver stage 229 and hence to the On/Off Hook input to the data access arrangement 22 while a low level is applied to driver stage 228 so that a low or data mode condition is applied to the data mode input of the data access arrangement 22. Thus, in this manner, the data access arrangement 22 is caused to go Off Hook in an attempt to acquire dial tone in the same manner as is acquired by a conventional telephone when the handset is lifted from the cradle thereof. As the initial Off Hook instruction issued is an attempt to acquire dial tone, no further orders are issued to the facsimile controller means 10 from the central switching means 1 until a 3 second interval, as timed by timer means within the central switching means 1, has expired. Upon the expiration of the 3 second interval it is assumed that dial tone has been acquired, it being noted that once an order has been issued which causes the command flip flop 134 to be set, this condition is latched thereby and hence maintained until subsequent resetting occurs in response to an On Hook command decoded by the AND gate 201 within the order decoder array 133.

After three seconds has expired, the actual dialing sequence may be initiated. Dialing, is accomplished within the facsimile controller means 10, as described above, by causing the data access arrangement 22 to go On Hook for 60 ms. followed by an Off Hook instruction for 40ms. for each unit of a digit to be dialed while one second Off Hook periods are established intermediate instructions for different digits of a phone number. Thus, as will be appreciated by those of ordinary skill in the art, dialing is accomplished by the issuance of appropriately timed On Hook and Off Hook instructions to the facsimile controller means 10 by the central switching means 1 whereupon these instructions are decoded by AND gates 201 and 202 to cause On Hook and Off Hook control levels to be issued by the command flip flop 134 to the data access arrangement 22. The timing associated with the issuance of On Hook and Off Hook instructions during a dialing sequence is provided by timer means present within the central switching means 1 and it should be here noted that the telephone number index provided for appropriate designation of a specified remotely located peripheral employing facsimile equipment as well as the telephone number look up table provided therefor may include area code information for communication over long distance networks as well as prefixed information such as the numeral 9 or the like necessary to define internal and external destinations where both an in house and public telephone network are associated with the input connection to the data access arrangement 22. After all of the appropriate On Hook and Off Hook instructions have been issued for all units and digits of the telephone number associated with the remotely located facsimile peripheral defined, the third sequence of orders are issued by the central switching means 1.

In the third sequence of orders issued by the central switching means 1, advisory information calculated to apprise an operator at a receiving location that a facsimile message is about to be transmitted by the instant invention is broadcast and alternated with the establishment of listening intervals wherein the acquisition of ready tone may be detected within the facsimile controller means 10. This third sequence of orders is accompanied by the setting of a 30 second timer within the central switching means 1 and should an interrupt not be generated by the facsimile controller means 10 prior to the expiration of such 30 second interval, the attempt to transmit the facsimile communication is abandoned by an On Hook instruction issued to the data access arrangement 22. More particularly, it will be recalled that as the facsimile chassis means 20 was initialized in such manner that it is placed in a 4 minute send mode operation with an open condition synthesized for the door interlock switch, and since the data access arrangement is presently in an Off Hook condition, it will be recalled from the operation of a conventional Model 400 Telecopier system described above that if a couple modem instruction is applied to the facsimile controller means 10 stop tone will be issued by the facsimile chassis means 20 due to the open condition of the door interlock switch while if the modem remains uncoupled no input is supplied to the data access arrangement 22 and hence the data access arrangement may act in a receive mode to listen for the presence of ready tone on the telephone line. Accordingly, during this third sequence of orders, a Couple Modem instruction (6F) is initially conveyed as an order by the central switching means 1 to the facsimile controller means 10 and decoded by AND gate 207 within the order decoder array 133. This results in command flip flop 137 being set to thereby enable analog gate 232 whereupon the modem present within the facsimile chassis means 20 causes stop tone (1100 Hz.) to be transmitted due to the open condition synthesized for the door interlock switch by the condition of command flip flop 138.

Once this order is issued and latched by the command flip flop 137 the central switching means 1 sets a one-fifth second timer and continues other duties which may be required by the communications system according to the instant invention. Upon expiration of the one-fifth second interval established, the central switching means 1 returns to a servicing of the facsimile controller means 10 and issues an Uncouple Modem (7F) order thereto followed by an Enable Tone Detector order (AF). The Uncouple Modem order will be decoded by AND gate 208 and will cause the command flip flop 137 to be reset and thereby disable analog gate 232 whereby the modem present within the facsimile chassis means 20 is effectively disconnected from the data input to the data access arrangement 22. Furthermore, the ready tone detect enable order is decoded by AND gate 211 and employed to set command flip flop 139 which in turn places an enabling level on conductor 236 to thereby allow an interrupt to be generated by the interrupt network 140 should ready tone be detected by the ready tone detector means 24 and applied to the second input to AND gate 250 on conductor 261 in the manner aforesaid. In addition, a 1 second timer at the central switching means 1 is set so that the central switching means may return to other duties required of it by the communications system according to the instant invention while a 1 second listening interval has been established.

Upon the expiration of the one second interval established for the listening period, a Couple Modem order, (6F) is again issued and the one-fifth second timer again set. When the Couple Modem instruction is issued, it will be appreciated by those of ordinary skill in the art that both the conditions of command flip flop 137 and 139 will be toggled so not only is the stop tone again broadcase through the coupling of the modem present in the facsimile chassis means 20 due to the open condition still synthesized for the door interlock switch, but the ready tone detect enable level generated by command flip flop 139 is removed due to the resetting action of the couple modem instruction applied to OR gate 238 and the reset input of the flip flop 139. Thus, a second cycle of broadcasting stop tone for one-fifth of a second followed by a 1 second listening interval during which ready tone may be detected and an interrupt generated in response thereto is initiated, and these alternating intervals of stop tone broadcasting followed by listening for ready tone are continued until the 30 second timer set by the central switching means 1 times out or ready tone is detected and an interrupt generated. If the 30 second timer times out without a detection of ready tone and the consequent generation of an interrupt to apprise the central switching means 1 of this condition, an On Hook order will be issued by the central switching means whereupon the attempt to establish a communications link with a remotely located peripheral employing facsimile equipment which is in a ready condition is terminated. However, any time ready tone is detected by the ready tone detecting means 24 during an appropriately established listening interval, an interrupt will be generated by the interrupt network 140 in the manner described above. This interrupt will be acknowledged by the central switching means 1 which acts to clear the interrupt in the manner set forth above and the 30 second timer initially set will be disabled.

The hardward triggered interrupt generated by the interrupt network indicated by the dashed block 140 in response to a detection of ready tone during a properly established listening interval returns the attention of the central switching means 1 to the facsimile controller means 10 for the purposes of the service requested. More particularly, when an interrupt is signaled by the facsimile subcontroller means 8, the IOP within the central switching means ascertains the address of the interrupting peripheral, the interrupt is cleared through an acknowledgement level and the interrupting peripheral, in this case, the facsimile subcontroller means 8, supplies its address and status to the common data bus means 2 to fully apprise the central switching means 1 of the service requested by the interrupting peripheral. Thereafter, the service provided by the central switching means 1 to the interrupting peripheral occurs in much the same manner as transactions initiated by the central switching means 1. In the instant case, a Close Door Interlock order (9F) and a Couple Modem order (6F) are issued to the facsimile controller means 10. These orders, when decoded by AND gates 210 and 207, respectively, within the order decoder array 133 result in the command flip flops 138 and 137 being set to cause the analog gate means 232 to be enabled and thereby couple the modem present in the facsimile chassis means 20 to the data input of the data access arrangement 22 while a Close Door Interlock input is synthesized to the switch output of the door interlock switch present in the facsimile chassis means 20. Sequentially, the Closed Door Interlock order is first initiated and upon a decoding of this order, it will be appreciated that all ready conditions, except for a coupling of the modem, necessary to initiate operation of the facsimile chassis means 20 in a 4 minute send mode have been established. Therefore, when the Couple Modem order is subsequently issued and decoded, the facsimile chassis means 20 immediately initiates a phasing operation and the phasing information generated, as described above, is broadcast over the telephone communications link established to the remotely located peripheral employing facsimile equipment. Up to this point all data requests generated in response to the receipt of orders by the facsimile controller means 10, in the manner described in conjunction with FIG. 2, cause the addressing and forwarding of a single byte of data information which was not further processed and was immediately followed by a count done input. However, subsequent to the completion of the 15 second phasing interval and the timing out of the phasing timer (PTTO), requests for legitimate data are made in the manner described in conjunction with FIG. 2. Thereafter, 8 bit data bytes for the synthesis of an analog baseband signal are forwarded to the data translation network described in FIG. 2, decoded into appropriate bit pairs for level encoding, are level encoded and subsequently applied to the modem within the facsimile chassis means 20 whereupon the appropriately modulated analog baseband signal synthesized is applied through the data access arrangement to the telephone communications link established and hence to the designated remotely located peripheral employing facsimile equipment. Thus, in the manner explained in conjunction with FIG. 2, data service calls are repeatedly made to the switching means 1, a count done input is received at the end of each scan line while the command chaining of the IOP provides for the forwarding of successive scan lines of information.

When the count done input for the last scan line of information is received and the last byte of data information is appropriately processed and forwarded, a request is made by the facsimile subcontroller means 8 to the IOP for a further order. As the last byte of facsimile information has been processed and forwarded, the central switching means 1 issues an Open Interlock order (8F) to the facsimile controller means 10. This Open Door Interlock order (8F) is decoded by AND gate 209 and results in the resetting of command flip flop 138 whereupon an Open Door Interlock switch input is synthesized at the facsimile chassis means 20. As one of the ready conditions necessary to appropriate send mode transceiver operation has now been disabled, the modem present within the facsimile chassis means 20 is clamped to an appropriate reference level and an 1100 Hz. stop tone is transmitted thereby. The stop tone generated by the modem within the facsimile chassis means 20 is coupled through the data access arrangement 22 to the telephone communications link established and upon receipt at the receiving transceiver will cause the operation thereof to terminate. When the Open Door Interlock switch order is issued a three second timer is set at the central switching means 1 so that stop tone is effectively transmitted to the receiving transceiver for an interval of three seconds which is sufficient to cause the operation thereof to terminate. After the expiration of the interval set by the 3 second timer, an On Hook order (0F) followed by an Uncouple Modem order (7F) is issued by the central switching means 1. These orders, when decoded by AND gates 201 and 208 within the order decoder array 133 cause the resetting of command flip flops 134 and 137 whereupon the modem within the facsimile chassis means 20 is disconnected from the input to the data access arrangement 22 while an On Hook input is supplied thereto. This means that the data access arrangement 22 is caused to terminate the communications link established in the same manner as one terminates a telephone call by hanging up and hence the facsimile mode of communication established is terminated upon the successful communication of the message information in a facsimile format to a contacted receive mode transceiver.

Accordingly, it will now be appreciated that the order register illustrated in FIG. 3 acts in response to commands issued by the central switching means 1 to establish a set of initial conditions precedent to a facsimile mode of operation being initiated at the facsimile controller means 10 whenever a facsimile mode of operation is defined by the header analysis of message information stored within the central station. Subsequent to the initiation of the facsimile controller means 10, orders are issued by the central switching means 1 and decoded by the order register means illustrated in FIG. 3 to cause the data access arrangement 22 to acquire dial tone by a connection to the telephone network associated therewith and thereafter, the telephone number of a designated remotely located peripheral employing facsimile equipment is dialed through the successive application of appropriately timed On Hook and Off Hook instructions to the order register. These instructions are subsequently decoded and employed to cause the data access arrangement 22 to be selectively gated to Off Hook and On Hook conditions for appropriate intervals to achieve dialing. As will be appreciated by those of ordinary skill in the art, although a blind dialing technique and a direct pulsing of the data access arrangement 22 are employed for the purposes of the instant invention, other techniques well known to those of ordinary skill in the art could be alternatively employed. For instance, rather than a blind dialing technique, i.e., waiting for a three second interval to expire subsequent to the issuance of an Off Hook command to the data access arrangement 22 and thereafter assuming that dial tone has been acquired, an actual detection scan for dial tone may be employed in much the same manner as is utilized for ready tone detection. In addition, rather than employing the actual pulsing of the data access arrangement 22 for dialing purposes, a mechanical dialing arrangement responsive to individual digit orders for decoded outputs from AND gates 201 and 202 may be substituted for the dialing arrangement indicated by the dashed block 23 in FIG. 3. Furthermore, the exemplary time intervals during which On Hook and Off Hook instructions persist at the data access arrangement 22 for dialing the various units of a digit as well as the exemplary intervals between digit pulses which were set forth for purposes of illustration may be widely varied within the tolerances established by the manufacturer of the data access arrangement selected.

After the dialing to the location of the designated remotely located peripheral employing facsimile equipment has been completed by the software control exercised by the central switching means 1 and the decoding of orders issued thereby by the data register illustrated in FIG. 3, a 30 second interval is established for ascertaining whether the desired remotely located peripheral has been contacted and whether the same is in an appropriately readied receive mode for accepting the facsimile information to be transmitted. During this interval stop tone is broadcast periodically, under program control, to perform the function of apprising an operator at the receive location that a facsimile message from the switched communications system according to this invention is about to be transmitted. The alternation of stop tone broadcasts with intervals in which ready detection is enabled, is highly advantageous because stop tone is readily available from the facsimile chassis means 20 when the same is in a send mode and all of the readiness conditions monitored by the logic therein are not appropriately completed while the establishment of listening intervals for ready tone detection accomplishes both the functions of assuring that a telephone link to a designated receive mode peripheral employing facsimile equipment has been established and that the transceiver thereat is in a condition to function in a receive mode. However, as will be apparent to those of ordinary skill in the art, means for apprising an operator that a facsimile mode transmission is about to take place which is more distinctive than a periodic broadcasting of stop tone may be substituted for the techniques employed herein should it be deemed desirable to include additional apparatus expressly devoted to this purpose, while separate apparatus for detecting an answer at a receive location as well as ready tone detection may be utilized in place of the efficient and highly simplified techniques relied upon herein. In addition, apparatus for detecting busy signals on the telephone link and immediately issuing orders for hanging up may be added if desired.

If ready tone is not detected within the thirty second interval arbitrarily established, the attempt to secure a telephone communications link to a facsimile mode transceiver in an appropriate ready condition is abandoned and further attempts are subsequently made to complete a facsimile transmission to that peripheral through relieval techniques. The 30 second interval established was selected upon the basis of a determination as to adequate time for an operator at a receive location to answer a telephone and ready a facsimile transceiver for a receive mode of operation with appropriate consideration being given to not tying up the facsimile controller means 10 for undue periods of time. However, it will be appreciated by those or ordinary skill in the art that the 30 second interval established is merely a design consideration that may be readily varied to fit the requirements of a particular system or accommodate more slowly responding peripherals employing facsimile equipment. If ready tone is detected during a listening interval prior to the termination of the thirty second period established, an interrupt is generated to return the central switching means 1 to the facsimile mode processing operations initiated. Interrupt operation is highly advantageous because the central switching means 1 may be operated on a real time basis and hence the communications system as a whole will not be kept waiting for a successful communications link to a readied receive mode transceiver to be established. However, should the employment of other central switching means 1 be desired, the return of the attention of the central switching means 1 may be solicited by the facsimile peripheral through a contention or polling arrangement while the real time nature of the system is retained or otherwise, the real time approach to the employment of the central switching means 1 may be abandoned.

After an interrupt advising of the acquisition of ready tone has been generated, orders are issued to complete the readiness conditions of the facsimile chassis means 20 through a synthesis of a Closed Interlock Door condition and a Couple Modem control level so that the facsimile chassis means 20 may automatically initiate phasing in the same manner as facsimile devices within a stand alone system once all ready conditions have been completed. Upon the completion of the phasing interval, the data register illustrated in FIG. 2 takes over to request digital data which is decodable into an analog baseband signal so that an analog baseband signal may be synthesized and applied to the modem of the facsimile chassis means 20. Thus, through the operation of the data register illustrated in FIG. 2, analog baseband information representing the message to be transmitted in a facsimile format is synthesized and applied to the modem present within the facsimile chassis means 20 so that the modem within the facsimile chassis means 20 acts as if it's dealing with the output from the scanner in conventional facsimile equipment.

When all facsimile information has been transmitted, stop tone is issued by the modem present within the facsimile chassis means 20 due to the receipt and decoding of an order causing an Open Door Interlock switch condition to be synthesized. In the normal operation of conventional facsimile equipment such as is associated with a Mode 400 system for instance, stop tone is broadcast at the end of a document due to the opening of the left hand limit switch. However, the same result is achieved within the instant inention by the issuance and subsequent decoding of an Open Door Interlock command which removes a requisite ready condition and hence clamps the modem present within the facsimile chassis means 20 to a condition where stop tone is broadcast. After stop tone has been broadcast for an appropriate interval to stop the receive mode transceiver and apprise the operator thereat that the transmission of facsimile information has terminated, orders are issued to disable the telephone link established and uncouple the modem so that the instant facsimile transmission operation is effectively terminated and the switched communications system according to the instant invention may return to other functions. Thus, the order register depicted in FIG. 3 acts to decode and hence develop control outputs for implementing all communications and data transmission functions of the facsimile controller means 10 under program control while the actual handling and forwarding of data is achieved through the operation of the data register illustrated in FIG. 2.

READY TONE DETECTION

Figure 4:
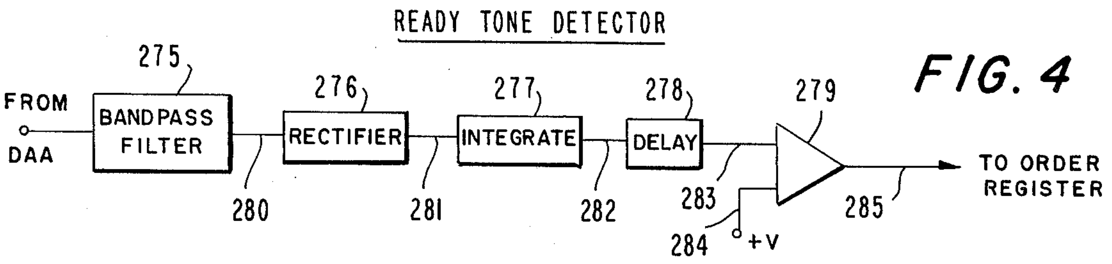
FIG. 4 is a schematic diagram showing an exemplary ready tone detector circuit suitable for employment in the facsimile output terminal of the switched communications system shown in FIG. 1.

Referring now to FIG. 4 there is shown a schematic diagram of an exemplary ready tone detector circuit suitable for employment in the facimile output terminal of the switched communications system illustrated in FIG. 1 within the operative role of the ready tone detector means 24 and it will be appreciated by those of ordinary skill in the art that the output of the ready tone detector means is connected through conductor 261 to an input of AND gate 250 within the interrupt network 140 illustrated in FIG. 3 while the input thereto is connected to the data output of the data access arrangement 22. The function of the ready tone detector circuit illustrated in FIG. 4 is to ascertain the presence of a ready tone or ready beep on the telephone communications link established to a designated remotely located facsimile peripheral and it will be appreciated from the subject matter disclosed above that the ready tone detector acts to determine the establishment of an operative communications link to a receive mode facsimile transceiver in an appropriate ready condition and hence must be sufficiently precise in operation to avoid the interpretation of spurious noise on the telephone line and the like as ready tone. In addition, the ready tone detector circuit illustrated in FIG. 4 should be able to distinguish ready tone from such signals on the telephone line as dial tone and busy signals, and its connection to the data access arrangement 22 should be sufficiently isolated from the output of the modem present within the facsimile chassis means 20 to inhibit actuation thereof in response to signals outputted from the modem. For this reason, the ready tone detector circuit illustrated in FIG. 4 may be connected to the output of the data access arrangement 22 through a hybrid type coupling so that the introduction of the output of the modem thereinto is avoided.

The exemplary ready tone detector circuit illustrated in FIG. 4 comprises bandpass filter means 275, rectifier means 276, integrator means 277, delay means 278 and comparator means 279. The bandpass filter means 275 may comprise a conventional bandpass filter whose passband is centered at the frequency of the ready tone to be detected and exhibits rather sharp attenuation characteristics on either side of the center frequency so that only frequencies at or close to that of the ready tone are passed thereby while all other frequencies introduced onto the phone line such as busy signal information or spurious noise are attenuated. For instance, in the Model 400 Telecopier System, the ready tone generated by a receive mode transceiver in a ready condition is a 1500 Hz. (white tone) signal which is transmitted for the first 1.85 seconds after the hand set of a telephone is introduced into the coupler at the receive location and all the remaining ready conditions required for a receive mode transceiver have been met. Therefore, the passband filter means 275 may in this case comprise, for example, a multistage filter having its passband centered at 1500 Hz. and having a passband extending from 1450 Hz. to 1550 Hz. Each stage of the filter may be formed with conventional OP Amps arranged in a filter configuration or alternatively, any well known active or passive filtering arrangements may be employed. Thus it will be seen that the passband filter means 275 acts to pass only signals received at the data access arrangement 22 within the passband thereof which is centered at the ready tone while sharply attenuating all other frequencies applied thereto.

The output of the bandpass filter means 275 is applied through conductor 280 to the input of the rectifier means 276. The rectifier means 276 may comprise a conventional fullwave rectifying configuration formed by a pair of oppositely polled diodes, a bridge arrangement or similar well known rectifying configurations and acts in the conventional manner to rectify the output of the bandpass filter means 275 into a unipolar periodic waveform. The output of the rectifier means 276 is connected through conductor 281 to the input of integrator means 277. The integrator means 277 may take the form of any of the well known integrator configurations employing OP amps or various RC combinations which act to time average the characteristic of an input waveform applied thereto. As the output of the rectifier means 276 would ordinarily take the form of a fullwave rectified sinusoid, it will be appreciated that the output of the integrator means 277 would take the form of a DC level when ready tone is being detected. The output of the integrator means is applied through conductor 282 to the input of delay means 278.

The delay means 278 may take the conventional form of an RC circuit whose time constant governs the charging rate of a capacitor employed therein. The function of the delay means 278 is to ensure that any 1500 Hz. signal detected by the exemplary ready tone detector circuit illustrated in FIG. 4 persists for a sufficient interval of time to assure that ready tone is in fact being detected rather than a spurious noise input which may be present on the telephone line or the like. Therefore, it will be appreciated by those of ordinary skill in the art that the delay means 278 acts to accept the output of the integrator means 277 and if a DC level is being provided thereby, to produce an output after such level has been present at the input thereof connected to conductor 282 for a designated interval established by the RC time constant thereof. The output of the delay means 278 is connected through conductor 283 to one input of the comparator means 279. The comparator means 279 may take any of the well known forms of comparator, differential amplifier, or threshold devices well known to those of ordinary skill in the art and acts in the conventional manner to compare a signal provided at the output of delay means 278 with a reference voltage and to provide an output only when a favorable comparison results. A second input to the comparator means 279 is connected through conductor 284 to a reference level designated +V and it will be appreciated by those of ordinary skill in the art that the comparator means 279 here acts as a threshold device to effectively compare the output of the delay means 278 with a predetermined threshold level and to provide an output on conductor 285 only when a favorable comparison obtains. The output of the comparison means 279 represents the output of the ready tone detector circuit illustrated in FIG. 4 and would be connected to the input of the AND gate 250 connected to conductor 261, as illustrated in FIG. 3.

In operation, it will be appreciated by those of ordinary skill in the art that whenever the data access arrangement 22 is coupled to the telephone line, signals being transmitted to the data access arrangement 22 on such telephone lines will be applied to the input of the bandpass filter means 275. However, it should be recalled at the outset that as the output of AND gate 250 in FIG. 3 is only enabled during established listening intervals, it is only during these intervals that the output of the ready tone detector circuitry illustrated in FIG. 4 is capable of producing an output which can result in initiating the generation of an interrupt. If ready tone is present on the telephone line, the 1500 Hz. frequency associated therewith will be passed by the bandpass filter means 275 and applied through conductor 280 to the rectifying means 276. The rectifying means 276 will perform a fullwave rectification of the sinusoidal input applied thereto, in the well known manner, and hence when ready tone is being detected, will apply a unipolar periodic signal through conductor 281 to the input of integrator means 277. This signal is time averaged by the integrator means 277 and applied to the input of the delay means 278 through conductor 282 wherein the capacitor present in the RC charging circuit thereof will charge at a rate determined by the RC constant selected.

The charge on the capacitor within the delay means 278 increases as the output of the integrator means 277 persists and this charge level is applied through conductor 283 to one input of the comparator means 279. No output, however, will be produced by the comparator means 279 on conductor 285 until the level on conductor 283 exceeds the threshold level established by potential +V which is applied to the input thereto connected to conductor 284. If, however, it is assumed that legitimate ready tone is being detected, the charge on the capacitor within the delay means 278 will eventually charge to the threshold level of the comparator means 279 whereupon the comparator means 279 will generate a high level at the output thereof. This level will be applied, as described in conjunction with FIG. 3 to the input to AND gate 250 connected to conductor 261 and hence if this gate is otherwise enabled during a listening interval, an interrupt will be generated in the manner described above. However, if spurious noise or the like was passed by the bandpass filter means 275, it is doubtful that the output of the integrator means 277 will persist for a sufficient interval of time to cause the output of the delay means 278 to favorably compare with the threshold established for the comparator means 279. Under these conditions no ready tone detect input will be applied to the AND gate 250 and hence generation of a ready tone detect signal must await the detection of legitimate ready tone information.

Thus it will be appreciated by those of ordinary skill in the art that the facsimile controller means 10 depicted in FIG. 1 acts in response to orders and data bytes issued by the central switching means 1 in response to the receipt and processing of destination information and message information defining a remotely located peripheral employing facsimile equipment to establish communication with a defined peripheral through a telephone communication link. Thereafter control levels are synthesized for a facsimile chassis means 20 located therein to provide signal periods and listening periods calculated to advise an operator at the defined peripheral location that a facsimile transmission is to occur and to detect a ready condition at the receive location indicative that such receive location is ready to receive a facsimile transmission. Subsequently, an initiation of phasing is achieved through a decoding of orders appropriate to enable the facsimile chassis means 20 located at the facsimile controller means 10 for a facsimile transmission operation and data in the form of digital information decodable into facsimile information is forwarded to the facsimile chassis means 20 and decoded by the data register therein whereupon an analog baseband signal is synthesized representing the desired facsimile message information and applied to the modem within the facsimile chassis means 20 for application to the telephone line. Upon the receipt of the last byte of information to be transmitted, one ready condition in the facsimile chassis means 20 is disabled whereupon stop tone is issued to the remote receive location for a designated interval and thereafter the facsimile controller means 10 is caused to terminate the communication link established. The programming of the central switching means 1 which is appropriate to control the operation of the facsimile controller means 10 in the foregoing manner is described below.

FACSIMILE MODE DATA FLOW

A printout of the requisite exemplary program to achieve and implement the operation of the switched communications system according to the instant invention in a facsimile mode when the same is transmitting through the facsimile controller means 10, as described above, is attached to U.S. Ser. No. 456,201 supra, which is incorporated herein by reference as Appendix B. This program, like that for the teleprinter only mode of operation, referred to as Appendix A and also incorporated herein by reference, is exemplary and is configured to meet the requirements of a central switching means 1 in the form of a Sigma 5 system, but may be readily modified to accommodate other computer systems employed in the role of the central switching means 1 through recourse to conventional compiling techniques. The exemplary program printout referenced as Appendix B has been supplied with detailed commentary so as to readily enable one of ordinary skill in the programming arts to fully appreciate the same and thereby implement and practice the instant invention. However, to further facilitate full appreciation of the instant invention without an initial review of the detailed exemplary program material supplied, a highly simplefied data flow diagram and similarly simplified program flow charts directed to system output operations associated with the facsimile controller means 10 are described below. It should be noted, however, that for a complete understanding as to the nature of the exemplary programs employed as well as the programming techniques relied upon therein, recourse should be had to the detailed program printouts referenced herein as Appendix B.

Figure 5:
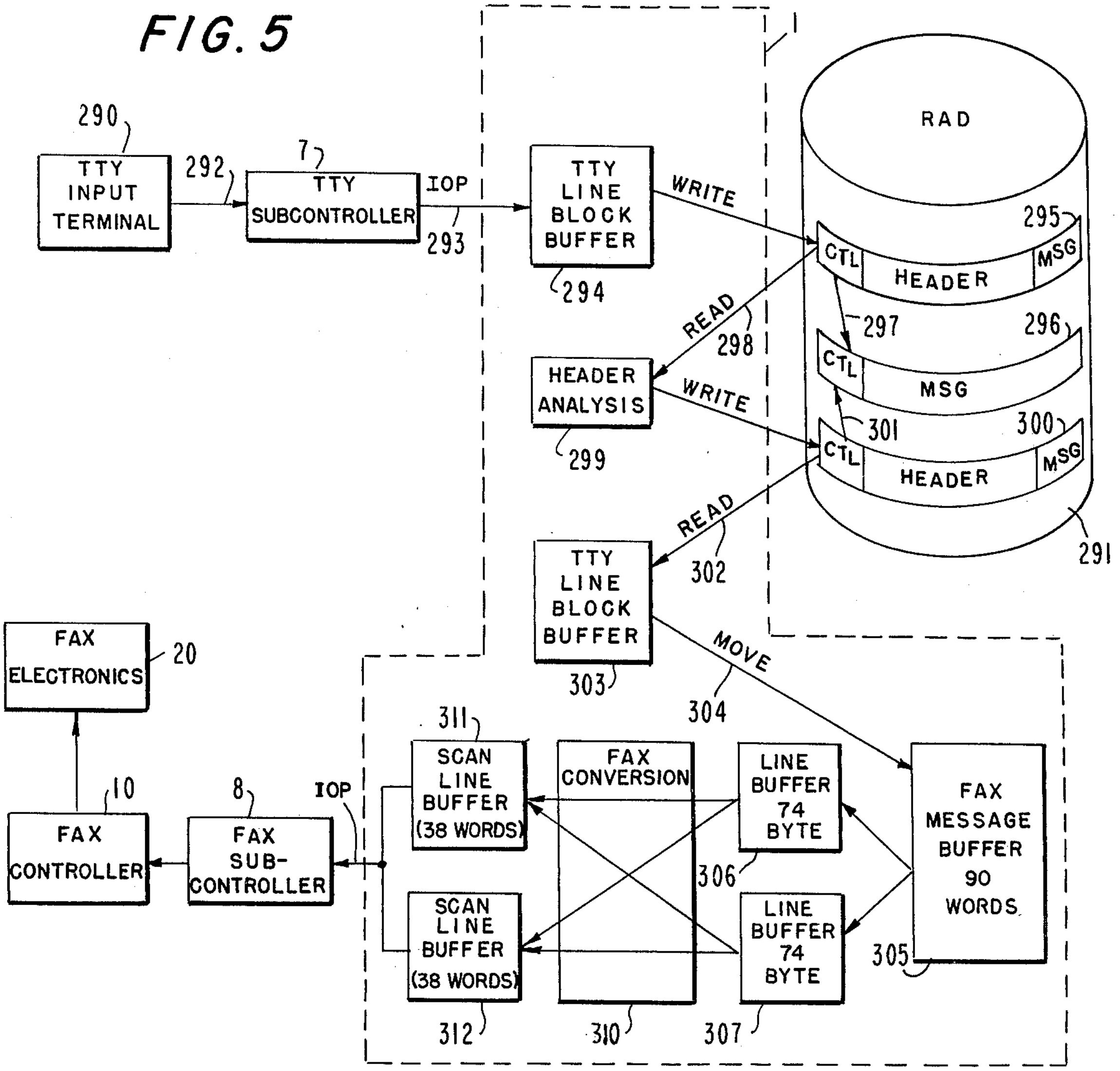
FIG. 5 is a generalized system flow diagram illustrating in a highly simplified manner, data flow through an exemplary switched communications system according to the instant invention when the same is engaged in the transmission of facsimile information.

Referring now to FIG. 5, there is shown a generalized system flow diagram illustrating, in a highly simplified manner, data flow through an exemplary switched communications system according to the instant invention when the same is engaged in the transmission of facsimile information. As the principal focus of FIG. 5 is directed to data flow through the switched communications system according to the instant invention when the same is in a facsimile mode of operation, it will be appreciated by those of ordinary skill in the art that the structure illustrated in FIG. 5 is simplified and configured in accordance with that encountered in the translation of data through the switched communications system depicted in FIG. 1 and hence will not necessarily correspond to the structural format there set forth. Furthermore, it should be noted that the data flow diagram illustrated in FIG. 5 is principally directed to the flow and processing of message or textual information within the switched, store and forward communications system according to the instant invention and hence order and control information as well as various processing, advisory and formatting functions which take place within the various peripherals and the central switching means 1 have not been indicated.

The generalized system data flow diagram depicted in FIG. 5 assumes that a remotely located teleprinter peripheral acting as an input device has been given access to the central switching means 1 and hence is inputting message information to the system for eventual application to a remotely located facsimile transceiver which is to be contacted by the facsimile controller means 10 so that such message or textual information may be transmitted in a facsimile format thereto. Accordingly, the apparatus depicted in FIG. 5 comprises a TTY input peripheral means 290, teleprinter subcontroller means 7, central switching means indicated by the dashed block 1, RAD storage means 291, facsimile subcontroller means 8, facsimile controller means 10, and facsimile chassis means 20, and, as will be apparent to those of ordinary skill in the art, wherever applicable, structure previously described and identified in conjunction with FIG. 1 has been accorded the same reference numerals previously relied upon and it should be understood at the outset that wherever such corresponding reference numerals have been utilized the apparatus so identified performs the functions and takes the form of correspondingly annotated structure illustrated in FIG. 1. The data flow diagram illustrated in FIG. 5 further assumes that an operator at a remotely located teleprinter or teletypewriter peripheral is desirous of sending message or textual information to a remotely located peripheral employing facsimile equipment through the switched store and forward communications system according to the instant invention. Therefore, the TTY input peripheral means 290 should here be assumed to be a remotely located teleprinter or teletypewriter terminal within the leased line TTY communications system 9, illustrated in FIG. 1, which has had a message prepared thereat by an operator and upon polling by the central switching means indicated by the dashed block 1 has been given access to the central switching means through the common data bus means 2, as also illustrated in FIG. 1.

The TTY input terminal means 290 is connected through conductor 292 to one input of the TTY subcontroller means 7 which was described in conjunction with FIG. 1. Here, however, it is sufficient to appreciate that the TTY subcontroller means 7 may accept up to 64 input/output circuits or lines from the leased line communication system 9, described in conjunction with FIG. 1, and each such line may have a plurality of remotely located TTY terminals connected thereto. Therefore, the TTY input terminal means 290 illustrated in FIG. 5 may be assumed to comprise one remotely located terminal associated with one line, which terminal has been given access to the central switching means 1; however, it should also be recalled that although only one remote terminal associated with a given line may be accessed at a given time, activity on all of the up to 64 inputs to the TTY subcontroller means 7 may be occurring simultaneously. Accordingly, in an actual store and forward switched communication system according to the instant invention, the activity to be described in association with the TTY input terminal means 290 and its corresponding input through conductor 292 to the TTY subcontroller means 7 may be carried out simultaneously on up to 64 inputs. The operation of the TTY subcontroller means 7, as will be recalled from the description of FIG. 1, is such as to simulate the action of a multiplexer device which provides an independent channel to each of the up to 64 inputs supplied thereto, to provide appropriate protocols and control levels to the central switching means indicated by the dashed block 1 and to otherwise turn transparent once access to a given remotely located terminal has been established so that message information, here in the form of an 8 bit ASCII code, may be transmitted therethrough to the input/output processor portion of the central switching means 1. In FIG. 5, the output of the TTY subcontroller means 7 is shown as connected to the input of the central switching means 1 through a conductor 293 which will here be appreciated to comprise an 8 bit channel within the common data bus 2 and is connected to the IOP portion of the central switching means 1 as was described in connection with FIG. 1.

When a message is to be sent from a remotely located TTY input terminal means 290, the central switching means 1 assigns an input sequence number, applies a time and date stamp and activates the remotely located terminal's transmitter in the manner described above. Thereafter, for the purposes of appreciating information translation, the TTY subcontroller means 7 may be considered to be rendered transparent with respect to data flow and hence message information in the form of an 8 bit ASCII code is supplied through conductors 292 and 293 in a parallel format to the input/output processor section of the central switching means indicated by the dashed block 1. As input information is received by to central switching means indicated by the dashed block 1, it is examined as to parity and translated into EBCDIC through the action of programming associated with the server portion of the teleprinter subcontroller means 7, not indicated in FIG. 5. Thereafter, each message byte received on conductor 293 is moved to a TTY line block buffer means 294 which is associated, as aforesaid, with the line on which the TTY input terminal means 290 resides. Thus, if it is assumed for the purposes of illustration that 64 TTY input lines are employed as inputs for the TTY subcontroller means 7, there would also be 64 TTY line block buffer means 294 wherein each line buffer means is associated with one input line and information being received from each of such lines would be multiplexed on the input line 293 and thereafter separated out for insertion into the appropriate TTY line buffer means associated with the input line on which the transmitting TTY input peripheral means 290 resides.

The TTY line block buffer means 294 takes the form of a 90 word buffer established in the CPU portion of the central switching means 1 wherein each word comprises 32 bits so that the effective storage manifested by the TTY line block buffer means 294 corresponds to the full storage available on one sector of a RAD storage means 291. When the TTY line block buffer means 294 is full, appropriate backward and forward links, i.e., cross text links (CTL), are inserted to chain each message together and the contents of the buffer are logged on an appropriate sector of the RAD storage means 291. Thus, the first time the TTY line block buffer means 294 is filled with input message information initiated from the TTY input terminal means 290, it is recorded on the RAD storage means 291 in the manner indicated by the block 295 in such manner that the recorded sector includes appropriate cross links CTL, the input header information which was inserted at the TTY input terminal means 290, generally in the form of alphanumeric character pairs or sacs designating one or more specified destination peripherals and the originating peripheral, and the remaining portion of the initial sector recorded is devoted to message or textual information and includes the input sequence number as well as the time and data stamp appended by the central switching means indicated by the dashed block 1.

This activity, as will be appreciated by those of ordinary skill in the art, continues until an end of transmission indicator is received from the TTY input peripheral means 290 and hence should one sector of the RAD, which provides storage for approximately five lines of information, not provide sufficient storage for the information transmitted, the second time the TTY line block buffer means 294 is full, the remaining portion of the message or textual material together with appropriate cross links to chain it to the next sector on the RAD to be employed is recorded on another sector of the RAD, indicated by block 296. As indicated by the block 296, succeeding portions on the RAD which are required for a given message would be similar to the input portion indicated by block 295 except no header information would be provided. Thus, the initial sector recorded includes cross text links, input header information and message information while succeeding sectors recorded on the RAD for a given message being inputted will contain, as indicated by block 296, only appropriate forward links to chain that portion of the message to remaining message portions on other sections of the RAD devoted to this message. Therefore, if for the purposes of discussion an eight line message is assumed, the first four lines of such message might be recorded on the initial RAD sector employed, indicated by block 295 while the remaining lines of the message would be recorded on the succeeding sector on the RAD, indicated by block 296 and both sectors devoted to this common message would be chained by appropriate cross text links CTL as indicated by the arrow 297. Accordingly, as will now be appreciated by those of ordinary skill in the art, the blocks 295 and 296 as illustrated in FIG. 5 would contain the input message and header information provided by the accessed TTY input peripheral means 290 wherein block 295 includes both input header information and message information while block 296, corresponding to a full sector, includes only residual information not accommodated by the initially recorded sector represented by block 295.

When the transmission of a given message has been completed, as indicated by the receipt of an end of transmission (EOT) character, the message header is released to header analysis where the header format and routing information is validated. Thus, in the case of the data flow diagram being described in conjunction with FIG.5, the header information present within the initially recorded section 295 on the RAD is read, as indicated by the arrow 298, and applied to header analysis which is here represented by block 299. Since message information inputted into the switched store and forward communications system according to the instant invention may be translated to both TTY remotely located peripherals associated with the leased line communication system 9 connected to the TTY subcontroller means 7 and remotely located facsimile peripherals employing facsimile equipment through the facsimile controller means 10 connected to the facsimile subcontroller means 8; it will be appreciated that the header analysis employed must initially conduct a review of the destination information present in the input header associated with sector 295 to ascertain the nature of the destination peripheral specified. Such destination peripherals, as will now be readily appreciated by those of ordinary skill in the art, may comprise either or both TTY terminals employing teleprinter or teletypewriter equipments connected to the TTY subcontroller means 7 or peripheral terminals employing facsimile equipment which are contacted through the facsimile controller means 10 connected to the facsimile subcontroller means 8. As was explained above, in conjunction with the teleprinter or teletypewriter portion of the switched store and forward communications system illustrated in FIG. 1, if TTY destination peripherals are specified in the input header recorded with sector 295, the header format and routing information is first validated and if the message is accepted by the system, an output header is generated to replace the input header and it is placed in the output line queue for the destination terminal or terminals listed in the input header. Thereafter, the queue is relieved on a first in, first out basis and as each header cycles to the top of the output queue an attempt will be made to select the output terminal addressed. Thereafter, if the addressed output terminal is available for receiving purposes, the message will be forwarded; however, should that output terminal not be so available, the message will be intercepted and held until the terminal subsequently becomes available under relieval techniques.

In the program provided for the switched communication system according to the instant invention, as shall be readily appreciated by those of ordinary skill in the art upon a perusal of the program materials referenced as Appendices A and B, separate header analysis routines are provided for message information destined for TTY peripherals and those employing facsimile equipment. More particularly, when the input header recorded in the sector of the RAD represented by block 295 is read and released to header analysis, each destination header listed therein is initially processed under TTY header analysis where each header and the routing information associated therewith is validated. Thereafter, destination headers associated with TTY equipment are processed in the manner outlined above while headers defining destination peripherals employing facsimile equipment are released and processed under a separate facsimile header analysis routine. In essence, facsimile header analysis acts initially to scan the number of lines associated with a message to be transmitted to one or more destination facsimile devices and if an end of text (EOT) character is detected prior to the scanning of 72 lines, facsimile header anslysis acts in much the same manner as header analysis employed in the formation of output headers for designated TTY peripherals. Thus, if an end of text (EOT) character is detected prior to the scanning of 72 lines, an output header is generated for each destination peripheral specified in the input header and is employed to replace both the header and message information present in the input header.

A typical output header together with any message information on which may have been in the input header and appropriate cross links is recorded on a sector of the RAD to form an output queue for the facsimile controller means 10 and such an output header may here be taken as represented by the block 300 and viewed as including appropriate cross links to one or more sectors on the RAD containing the remainder of the message, here represented by block 296. The header information recorded in block 300 will here include the facsimile peripheral destination, the input RAD sector address, a start of text position character and a designation as to whether or not the message is to be transmitted to only remotely located peripherals employing facsimile equipment or remotely located peripherals employing both facsimile and teleprinter or teletypewriter equipments. Thus, under facsimile header analysis, an output header is developed and recorded on a sector of the RAD together with the message portion initially recorded on the input header and appropriate cross links to remaining message portions recorded on other sectors of the RAD for each output destination peripheral specified in the input header in much the same manner as is done, as aforesaid, under the header analysis routine employed for normal teleprinter or teletypewriter output operations. Furthermore, as will be readily appreciated by those of ordinary skill in the art, whether or not the designated message recorded is to be provided to only peripherals employing facsimile equipment or remotely located output peripherals employing both TTY and facsimile equipments, one output header generated and established as a sector on the RAD will be recorded on the sector previously employed for the input header so that storage space allocation on the RAD is efficiently utilized. Accordingly, it will be appreciated by those of ordinary skill in the art that input information including an initial sector including an input header comprising each destination sac specified will be recorded on the RAD and thereafter header analysis acts to establish a new output header together with appropriate cross links and message information associated therewith in the input header for each destination peripheral specified while the remaining sectors recorded for the message information are retained in the form in which they were originally submitted so that upon transmission, each output sector established in a queue is read and thereafter each succeeding message portion cross linked thereto is read out and the process is continued for each output header sector cross linked in the output queue established.

When, however, the facsimile header analysis routine established ascertains that the message comprises more than 72 lines, which corresponds as will be appreciated by those of ordinary skill in the art to a full page of facsimile information, a specialized program routine is initiated to segment the message recorded and destined for facsimile peripherals into individual pages including not more than 72 lines so that each 72 line portion of the message established may be transmitted as an independent message requiring a separate calling and processing sequence associated with a complete cycle of operation of the facsimile controller means 10. This is done, as will be appreciated by those of ordinary skill in the art, because the exemplary receive mode facsimile equipment essentially acts to record only a single page of facsimile information on an 8 ½×11 document during a continuous sequence of operations. Thereafter, the operation of a receive mode facsimile device must be terminated, the initial document information transmitted, as now present on a copy sheet loaded on the copy drum removed, and a new sheet of copy paper loaded thereon. The equipment then must be readied and ready tone broadcast before a phasing and receive mode of operation can be again initiated. Thus, although the instant invention is capable of processing facsimile information for application to the facsimile controller means 10 on a continuous basis until an end of text character is detected, receiving equipment which has been contacted is only capable of receiving one page at a time and then such equipment must be reinitialized for each page of information transmitted. Therefore, for messages involving more than 72 lines of facsimile information, facsimile header analysis will act to divide such messages into discrete segments including not more than 72 lines and each segment is provided with its own output header in the message queue established to that successive pages of a message are transmitted as independent facsimile broadcasts in the switched communications system according to the instant invention.

Such segmenting of long messages is accomplished under the facsimile header analysis routines set forth in detail in Appendix B by what is tantamount to a scanning and counting of the number of lines of document information in each message. Whenever more than 72 lines are counted before the occurrence of an end of text (EOT) character, the segmenting operation is performed on the message as the same has been ascertained to be too lengthy to be accommodated by a single facsimile mode transmitting operation. When such lengthy messages are ascertained during facsimile header analysis, the message sector recorded on the RAD which has the 71st line is read back into a buffer and truncated at the 71st line. This truncated information is then recorded on a sector of the RAD, the word continued is added as the 72nd line and an end of text (EOT) character is appended thereto to terminate that portion of the message queue established. Thereafter, a new output header for the designated remotely located peripheral employing facsimile equipment is generated, a "Page 2" advisory message is added as a first line of message information so as to appear at the top of the second page and this new output header together with any remaining message information from the previous sector read, i.e., lines 72+ as recorded in that RAD sector containing line 71, are recorded on a new sector of the RAD and the remaining portions of the sector are filled with deletes. In addition, this new output header is provided with appropriate cross links to chain the new header and partial message portion of that sector to any suceeding message sectors on the RAD so that in effect, a second page message queue for that message is established and may be transmitted independently of the transmission of the first page of information. Furthermore, facsimile header analysis will continue this same process of segmenting lengthy information so that for each 71 lines of message information, an independent output header is established whereby an independent message for the same destination peripheral is established for each page of a message to be transmitted to that peripheral.

It should be additionally noted that the portion of the output header established during facsimile header analysis, which designates whether or not transmissions are to be provided solely to output peripherals employing facsimile equipment is checked during the segmenting operation conducted for lengthy messages, as aforesaid, and dependent upon the condition of this flag, the number of sectors on the RAD employed for such segmenting will vary. More particularly, in the segmenting operation described above, it will be appreciated by those of ordinary skill in the art, that since each sector of the RAD may provide storage for approximately five lines of message information, a lengthy message involving more than one page of information may require 15 sectors on the RAD for the recordation of such message information and the 15th RAD sector might have message lines 71 – 75 recorded therein. Therefore, in a typical segmenting operation, conducted under facsimile header analysis, the 15th sector would be read and segmented. If the message to be transmitted is to be forwarded to remotely located peripherals employing both TTY and facsimile equipment, this sector of the RAD storage must be left intact as it forms an integral portion of the message chain established in the output queues for the TTY peripheral. Under these conditions, line 71, the Message Continued Advisory which forms line 72 and the EOT would be recorded on one RAD sector which has the remaining empty portions thereof filled with deletes, while the new output header generated and lines 72–75, for example, are recorded on a second RAD sector together with a sufficient number of deletes to fill that sector and the new output sector would be provided with appropriate cross links to establish a facsimile message queue for the second page of the message to be transmitted. Furthermore, all text portions would be recorded on new sectors so that the TTY message queue is left intact while a new facsimile message queue is established. Thus when a given message is destined for both TTY and facsimile equipment, the segmenting operation performed by the facsimile header analysis routine will effectively rely upon at least three sectors on the RAD to achieve appropriate message segmenting and the retention of the originally recorded sector or sectors for the purposes of TTY transmissions.

If, however, no TTY transmissions are required, the initially recorded RAD sector, i.e., that containing lines 71–75 for the exemplary case being discussed, may be operated upon as the retention of the same is here not required. Therefore, under these conditions, the information on that sector of the RAD may be obliterated and this RAD sector employed for one of the truncated message segments formed so that the message segmenting achieved through header analysis will here require only one additional RAD sector for implementation. Accordingly, facsimile header analysis which operates on the message information input and recorded upon the sectors of the RAD represented by blocks 295 and 296 acts to establish an output queue which in the case of a single destination peripheral may be represented by blocks 300 and 296 so that the same may be further processed and eventually transmitted in a facsimile mode of operation. Furthermore, it will be appreciated that regardless of the nature of the header analysis performed, optimum storage techniques on the RAD are utilized in that as each 90 word segment of a message is received in the TTY line block buffer 294, it is written onto a segment of the RAD and only the input header sector is replaced by a necessary number of output header sectors while the remaining portions of the recorded message on succeeding sectors are retained and entered into the various message queues which may be established through cross links to form the necessary output chains.

For the purposes of the facsimile mode of operation being discussed, it will be assumed that the message input at the TTY input terminal 290 is destined only for a single peripheral employing facsimile equipment, that no TTY peripheral is to receive the message inputted into the switched communications system according to the instant invention and that the message length is relatively short so that only two sectors on the RAD are required for the storage thereof. Under these conditions, it will be seen that the input header and the initial portion of the message, that appropriate to fill the TTY line block buffer means 294, is recorded on the sector of the RAD indicated by block 295 together with appropriate links to chain it to the remaining portion of the message indicated by the block 296 which also contains the end of text character and these two sectors of the RAD are chained through the CTL links established as indicated by arrow 297. Thereafter, when the input header is read as indicated by arrow 298 and operated upon by the facsimile header analysis indicated by block 299, a new header, in the form of an output header will be generated and recorded on a sector of the RAD together with message information associated with the input header and appropriate links CTL to chain it to the remaining message portion as indicated by arrow 301. Thus, for purposes of facsimile transmission, the complete message queue would here be represented by blocks 300 and 296 on the RAD 291 and would be read in that order. It should also be noted that the block 300 would normally be employed to replace the input header 295 as this is no longer necessary; however, such substitution is not illustrated in FIG. 5 to facilitate the explanation of the data flow present herein. Of course should more than one page or destination peripheral be involved, an additional output header would be established and cross linked to remaining message portions as well as other output headers.

Under the conditions of message translation herein assumed, i.e., that a single page message destined only for one facsimile peripheral was input by the TTY input terminal means 290 and processed in the foregoing manner, the output message queue on the RAD, as represented by blocks 300 and 296 will be relieved, under program control, as soon as the facsimile controller means 10 becomes available. Thus, the RAD sector containing the output header and the initial portion of the message as represented by block 300 is read as indicated by the appropriately annotated arrow 302 and loaded into a TTY line buffer means 303 associated with the output line relied upon for the facsimile controller means 10. The TTY line block buffer means 303 may take the same form of buffer as the input TTY line buffer means 294 previously described and hence, it will be appreciated by those of ordinary skill in the art, that the TTY line buffer means 303 comprises a 90 word buffer established by the CPU in the extensive buffering available within memory or Core and represents the line buffer established for the output line associated with the facsimile subcontroller means 8 which here may be considered to correspond to a line 0 designation. As the TTY line buffer means 303 comprises a 90 word buffer, it will be readily appreciated by those of ordinary skill in the art that each sector read from a RAD may be loaded therein in its entirety as each sector of the RAD includes storage for 90 words. Thus, for the message queue being discussed in association with FIG. 5, it will be appreciated that the RAD sector represented by block 300 will be initially read from the RAD and loaded into the TTY line buffer means 303 and subsequently processed in a manner to be described hereinafter. Upon the completion of such processing, the sector on the RAD represented by block 296, whose address was provided through the links present within the sector represented by block 300, is read and processed in the same manner as information obtained from block 300. Thereafter, as an end of text (EOT) character is present within sector 296, processing within this message queue would terminate and the switched communications system according to this invention would continue to other duties.

Once the initial message sector present on the RAD, as here represented by block 300, has been read, an external interrupt will secure dial tone on the output line and cause the telephone number of the destination peripheral employing facsimile equipment to be dialed under a programmed sequence of commands to be described below. Thereafter, a 30 second interval wherein stop tone is broadcast and interleaved with listening intervals for ready tone detection is entered under program control to ascertain whether or not the destination peripheral has been contacted and if the same is in a ready condition to act as a receive mode transceiver. If ready tone is not detected within the 30 second interval established, the message is put under intercept, unless the operation taking place was a retrieval operation which will cause a retrieval aborted message to be output to the operator at the central station. If ready tone is received, the 15 second phasing interval is initialized under program control and when the same is completed, the message is converted line by line to facsimile scan line information and transmitted through the operation of the facsimile controller means 10 in the manner described above. The transmission of the last scan line will be followed by a termination of the telephone link established so that the communication link is effectively terminated. The manner in which orders are implemented and data is translated through the facsimile controller means 10 was described in detail in conjunction with FIGS. 2 and 3 while the programming appropriate to accomplish the issuance of these orders as well as the remaining functions performed by the facsimile controller means 10 will be described in conjunction with succeeding figures. FIG. 5, however, relates to data flow through the system and hence it will be appreciated by those of ordinary skill in the art that the descriptive material which follows is principally directed to the handling and processing of message information read from the RAD and eventually supplied to the facsimile controller means 10 in a digital format so that it may be decoded and translated thereby into an analog baseband signal in the manner described in connection with FIG. 2.

Each sector of the RAD which is read and loaded into the TTY line block buffer means 303 is subsequently moved, as indicated by arrow 304, to a facsimile message buffer 305 which acts as the RAD sector buffer assigned to the facsimile controller means 10. The facsimile message buffer 305 may comprise a 90 word buffer, wherein each word comprises 32 bits or four bytes of information and is again formed, under program control, within the extensive buffering available within the Core section of the central switching means 1. Thus, the storage available in the facsimile message buffer means 305 corresponds to that of the TTY line buffer means 303 and hence a full sector of information read from the RAD is loaded therein. Accordingly, once the sector of the RAD containing the output header has been loaded into the facsimile message buffer 305, this buffer includes header information identifying both the facsimile destination peripheral to be contacted, as well as information defining the position within the information read of the start of text (STX) character and additionally includes the portion of the input message recorded with the output header which is presently in the form of an EBCDIC code. Since message information associated with the actual facsimile message to be translated was recorded on the RAD and hence loaded into the facsimile message buffer 305 in accordance with the storage capability of the TTY line buffer means 294 and each sector of the RAD, rather than in association with the organization of the message per se; the message information is initially broken down into lines of alphanumeric character information as represented by lines input at the originating peripheral. Thereafter, each line of message information is broken down into 9 lines of facsimile scan information wherein the first seven scan lines are devoted to a matrix encoding of the alphanumeric character information present in each line of message and scan lines 8 and 9 are devoted to white information appropriate to interline spacing. This is necessary, as will be appreciated by those of ordinary skill in the art, because facsimile transmission has a scan line orientation and hence lines of information must be configured to admit of reproduction on copy paper having a limited scan line capability and appropriate margins must be provided therefor.

The message information thus loaded into the facsimile message buffer 305 is read on the basis of lines of alphanumeric information into a pair of line buffer means 306 and 307 which act to achieve line separation of the message information recorded on the RAD. This pair of buffers is employed in flip flop fashion so that while one line buffer means 306 or 307 is being utilized for processing, a second line of information is available in the second line buffer means 307 or 306 for further processing whereupon, when the contents of the facsimile message buffer 305 have been exhausted, the next sector of the RAD associated with the message being processed may be loaded thereinto while previously read message information is held in a back up line buffer to permit additional time for translating the message information read from subsequent sectors in the RAD. The line buffer means 306 and 307, as indicated in FIG. 5, may comprise 74 byte buffers independently formed within the Core section of the central switching means 1 and it will be appreciated by those of ordinary skill in the art that a first line of message information will be read from the facsimile message buffer means 305 into line buffer 306, for instance, while the second line of alphanumeric character information read from the facsimile message buffer means 305 is loaded into line buffer means 307. Thereafter, line information from line buffer means 306 is processed and upon the termination thereof the third line of message information present within the facsimile message buffer means 305 is loaded thereinto while output processing immediately switches to line buffer means 307 and the pair of line buffer means 306 and 307 are continuously flip flopped in the manner well known to those of ordinary skill in the art so that a back up register of line information is always available.

For the purposes of the instant invention, a line of message information received from the TTY input terminal means 290 in an ASCII code format and later converted to EBCDIC for purposes of storage on the RAD and internal processing within the central switching means 1 is defined as the data which resides between carriage control codes such as a carriage return and/or line feed character; it being appreciated by those of ordinary skill in the art that a carriage return character is associated with the operation of a teletypewriter wherein the print position of the carriage is returned to the left hand margin position while a line feed character relates to indexing functions. As thus defined, data characters representing lines of message information are loaded in flip flop fashion into the line buffer means 306 and 307. However, in recognition of the fact that the length of a line of facsimile information should be limited to approximately 72 alphanumeric characters when 8×10 copy document formats are employed and that teleprinter or teletypewriter operators will frequently enter lines of information which exceed this limitation through overstriking and the like, the definition of a line of alphanumeric information within a message is further limited, under program control, so that no line of information may exceed 72 characters. This is achieved by counting, under program control, each EBCDIC character which comprises 8 bits as the same is loaded into the line buffer and should a line exceed 72 characters, the line is terminated and the remaining characters are put into the alternate line buffer means at the next call to the appropriate subroutine so that the same results in the establishment of a second line of information for the initial line of message information inserted. Thus, in effect, the message line extraction subroutine ($S_2$) acts to define lines of information as lines of message information, not to exceed 72 characters, terminated by a carriage return and/or line feed character and should a carriage return character not be accompanied by a line feed character the same is automatically assumed by the program. In this manner, lines of information are inserted into line buffer means 306 and 307 in flip flop fashion in such manner that they correspond to lines of information inserted at the inputting peripheral unless such lines of information exceed a predetermined character length which here has been assumed to be 72 characters. Should such lines of character information exceed 72 characters in length, they are automatically truncated under program control to form the substance of a succeeding line of information so that in no case will a line of facsimile information result which has a character width exceeding 72 alphanumeric characters.

Each line of message information loaded into the line buffer means 306 and 307 is subsequently converted, under program control to a series of raster scan lines prior to outputting. More particularly, each line of message information loaded into one of the line buffer means 306 and 307 is converted into seven raster scans or seven scan lines of digital information which is decodable by the facsimile controller means 10, in the manner described above, into an analog baseband signal suitable for application to the modem present in the facsimile chassis means 20. Thereafter, two scan lines of white information, decodable into an analog baseband facsimile signal, are output and the next line loaded into the alternate line buffer means 306 and 307 is similarly converted. This operation continues until the entire message has been supplied to the facsimile controller means 10 be it in the form of the original message transmitted or a truncated portion thereof corresponding to one page, i.e., 72 lines, of message information.

In essence, the conversion to raster scan lines achieved under software control by the instant invention employs encoding techniques associated with 7×9 dot matrix array. Nine separate scans are needed to totally describe each character or line including the intercharacter and interline spacing and each element in the 7×9 dot matrix employed represents a discrete point on the document/copy drum of the receiving transceiver. The elements are comprised of space (white) or mark (black) information and each element is described, as aforesaid, by two bits of information in such manner that binary 00 equals white or space information, binary 11 equals black or mark information while the remaining two binary levels available may be employed in other embodiments of the instant invention to represent various levels of gray scale information. Since each line of message information in EBCDIC format loaded into one of the line buffer means 306 and 307 must be converted to nine individual scan lines, the composition of each scan line is a function of both the various characters in the message line being operated upon and the relative scan line being output.

The software encoding operation implemented under software control is represented by the facsimile conversion block 310 depicted in FIG. 5 and from the description of the operation thereof which is subsequently set forth it will be appreciated by those of ordinary skill in the art that the same could be replaced through a utilization of a read only memory wherein the appropriate output bits for a given scan line portion associated with a given alphanumeric character are output in response to input coordinates associated with the alphanumeric character defined by the EBCDIC character loaded into the appropriate line buffer means 306 and 307 and the line scan being established for the message line loaded. This same operation is, in the instant embodiment of the present invention, synthesized under software control in that the eight bit EBCDIC code associated with each character in a line of information loaded into the line buffer means 306 or 307 whose contents are being processed are analyzed and a 14 bit character is produced by the program indicated by the facsimile conversion block 310 which is appropriate for that scan line of the character.

Each 14 bit character produced for each scan line of a character in a data message loaded into one of the line buffer means 306 and 307 is loaded into a scan line buffer means 311 or 312 so that the 14 bit digital codes associated with one scan line of a line of message information are assembled therein. As shown in FIG. 5, a pair of scan line buffer means 311 and 312, as formed by the CPU portion of the central switching means 1, are employed so that the same may be employed in a flip flop manner corresponding to the loading of the line buffer means 306 and 307. Thus, for instance, if it is assumed for the purposes of discussion that a line of message information corresponding to the alphanumeric characters A,B,C has been loaded into the line buffer means 306 the fourteen bit character representing the first scan line of each of the 3 alphanumeric characters assumed, wherein each pair of bits represents a discrete element of black or white information, will be generated by the program control exercised by the facsimile conversion block 310 and loaded into scan line buffer means 311. Thereafter the second scan line would be generated by cycling the 3 characters present in the line buffer 306 through the facsimile conversion table indicated by block 310 for the second scan line and this scan line would be loaded into the second scan line buffer means 312. After the bit information loaded into scan line buffer means 311 has been processed, in a manner to be described below, the third scan line for the line of message information loaded into line buffer means 306 would be generated and loaded in flip flop fashion into scan line buffer means 311 and the same process would continue through the flip flop utilization of scan line buffers means 311 and 312 until 7 scan lines of message information corresponding to the single line of message information loaded into line buffer means 306 were generated and processed. Subsequently, a character comprising all white information would be loaded into both of the scan line buffers means 311 and 312 and forwarded to the facsimile controller means 10 where the same would be utilized in the generation of two lines of white information to provide appropriate interline spacing. Thereafter, assuming a second line of message information is loaded into line buffer means 307, 7 lines of scan information would be generated therefor and loaded in flip flop fashion into the scan line buffer means 311 and 312 for further processing and this would continue until all lines of message information in the facsimile message buffer 305 were similarly processed whereupon a new sector of the RAD would be read if appropriate.

The pair of scan line buffer means 311 and 312 may each comprise 38 word buffers formed within the Core section of the central switching means 1 so as to readily accommodate a full line of message information which may have been loaded into the line buffer means 306 and 307. Since a word of information includes 32 bits while a byte of information includes 8 bits it will be seen that the scan line buffer means 311 and 312 have more storage available than is actually required for a full line of message information. This is here done because even though lines of facsimile information as were defined for the purposes of loading the line buffer means 306 and 307 are limited to 72 characters in length, appropriate left hand and right hand margin information must be provided for formatting purposes in the coding of message information into facsimile decodable digital format since for the purposes of facsimile transmission, an entire 8×10 document is scanned and hence each point on the document to be scanned must be designated. Thus, while for teleprinter or teletypewriter information only alphanumeric character information must be specified, in a facsimile mode of operation, white space, such as present in left, right or top margins as well as in interline spacing is a necessary prerequisite to information translation. In the instant invention, an appropriate left hand margin is specified by loading each line scan presented to the scan line buffer means 311 and 312 in such manner that actual scan line encoded message information is preceded by a plurality of white elements and terminated by at least a white byte so that the last byte loaded for a scan line into the facsimile controller means 10 will be automatically continued by the data translation networks therein, as white information, until a line sync pulse is generated indicating the end of a line. Such a line sync pulse, it will be recalled, acts to terminate the clock if it has not already been stopped by a count done input and the same is subsequently started together with a legitimate data request whereupon the information present in the next scan line is forwarded from the alternate scan line buffer means 311 or 312. Thus, for the exemplary purposes of the instant invention, as will be seen in greater detail hereinafter, 28 elements of white information are loaded into each scan line buffer means 311 and 312 prior to the entry of any encoded scan line information. This means as 2 bits define a black or white element, the first 56 bit positions within each scan line buffer means 311 and 312 are occupied by Zero information to thereby define a uniform left hand margin which is 28 scan elements wide. Similarly, after a scan line of encoded message information is loaded into the bit positions of the scan line buffer means 311 and 312 which follow the first 56 bit locations therein, the final 8 bits therein are occupied by Zeros so that the last byte forwarded to the data register within the facsimile controller means 10 is an all white byte which may be extended thereby automatically until a line sync pulse marking the right hand edge of the document being scanned is produced.

Additionally, it may here be noted that the program control associated with the encoding of line information is such that the first 32 lines of information processed by the facsimile controller means 10 comprise all white information so that an appropriate top margin for the document being transmitted is presented. The processing of such 32 scan lines of white information will result, however, from the forwarding of single bytes of all white data and the automatic extension thereof by the facsimile controller means 10 rather than by an actual forwarding of 32 scan lines worth of 00 bit pairs so that processing operations carried on within the central switching means 1 are efficiently conducted. Thus it will be appreciated by those of ordinary skill in the art, that message information recorded on each sector of the RAD is loaded on a per sector basis into the facsimile message buffer means 305 and thereafter each sector is divided into lines of message information and loaded in a flip flop manner into the line buffer means 306 and 307 wherein a line of message information is defined as a series of EBCDIC characters, not exceeding 72 characters, terminated by a line feed and/or an end of transmission character, a line feed character being assumed to follow a carriage return character if not otherwise present. Thereafter, each line loaded into the line buffer means 306 and 307 is converted into a facsimile format through a 7×9 matrixing technique implemented under program control. As each scan line generated is produced, the same is loaded into selected ones of the pair of scan line buffer means 311 and 312 in a flip flop manner highly reminiscent of the mode in which the line buffer means 306 and 307 are loaded.

The contents of the scan line buffer means 311 and 312 are then read in an ordered sequence in a manner so as to apply an 8 bit data byte through the facsimile subcontroller means 8 to the facsimile controller means 10 in response to each data request generated thereby. When the data thereby loaded into one of the scan line buffer means 311 and 312 has been processed to exhaustion, reading switches to the alternate scan line buffer while the emptied scan line buffer is filled with a succeeding line of scan element information. This is continued until an end of text (EOT) character is detected by the processing routines being employed. The detection of an end of text (EOT) character causes the issuance of a count done signal upon the processing of all information preceding the end of text character which, it will be recalled, is followed by orders calculated to achieve the issuance of stop tone and a subsequent hang up routine. Thus, under the program control associated with the operation of the facsimile message buffer 305, the line buffer means 306 and 307, and the scan line buffer means 311 and 312, lines of message information in EBCDIC are encoded into a 7×9 raster scan of digital information which may be readily decodable by the facsimile controller means 10. Furthermore, line geometry and formatting is relatively simple while appropriate margin information is provided for the facsimile document being transmitted. In addition, all data elements up to 536 are printed and the value of the last element issued in each line will be continued to be transmitted until the physical end of the line is indicated by the production of a line scan pulse in the facsimile controller means 10. Accordingly, each line may be viewed as formatted by a left hand margin comprising 28 white elements, character information representing an appropriate scan line associated with the message line being produced and a last white element which is extended to the end of the line. A complete scan line of white or black, as will be recalled, may be fully defined by the issuance of a single byte of data devoted thereto followed by the subsequent timely production of a count done signal.

As each byte of data is issued by the central switching means 1 through the common data bus means 2 connected to the IOP portion thereof, it is transmitted through the facsimile subcontroller means 8, which may be viewed as transparent for the purposes of data transmission in that it only acts to identify data and to load each byte forwarded into a register from which such byte may be accepted by the facsimile controller means 10. Thereafter, the facsimile controller means 10 operating in conjunction with the electronics package present within the facsimile chassis means 20 which forms an integral part thereof, is processed in the manner described in conjunction with FIGS. 2 and 3 so that a transmission acceptable to a remotely located and contacted facsimile device is produced. Accordingly, it will be appreciated by those of ordinary skill in the art that the data flow associated with the transmission of facsimile information to a designated, remotely located peripheral employing facsimile equipment is closely tied to the normal operations of the switched store and forward communications system associated with teleprinter or teletypewriter only communications and hence, such close integration readily lends itself to a system organization which is highly efficient and flexible. Furthermore, the data flow diagram illustrated in FIG. 5 renders it apparent that the facsimile mode processing which takes place under program control and is implemented through the use of the facsimile message buffer 305, the line buffer means 306 and 307, the facsimile conversion block 310 and the pair of scan line buffer means 311 and 312 could be separately handled by a mini computer associated with the input side of the facsimile controller means 10 so that a multitude of the concepts employed by the instant invention could be separately developed to enhance the capabilities of conventional switched store and forward communications systems devoted solely to the transmission of teleprinter information. In addition, the concepts employed in this invention could be separately applied to remotely located peripherals employing facsimile equipment so that message information could be communicated thereto in an ASCII or EBCDIC code format suitable for ordinary teleprinter peripherals and thereafter transformed and processed through the facsimile encoding techniques set forth herein.

OVERVIEW OF FACSIMILE MODE OUTPUT PROGRAMS

Figures 6A, 6B:
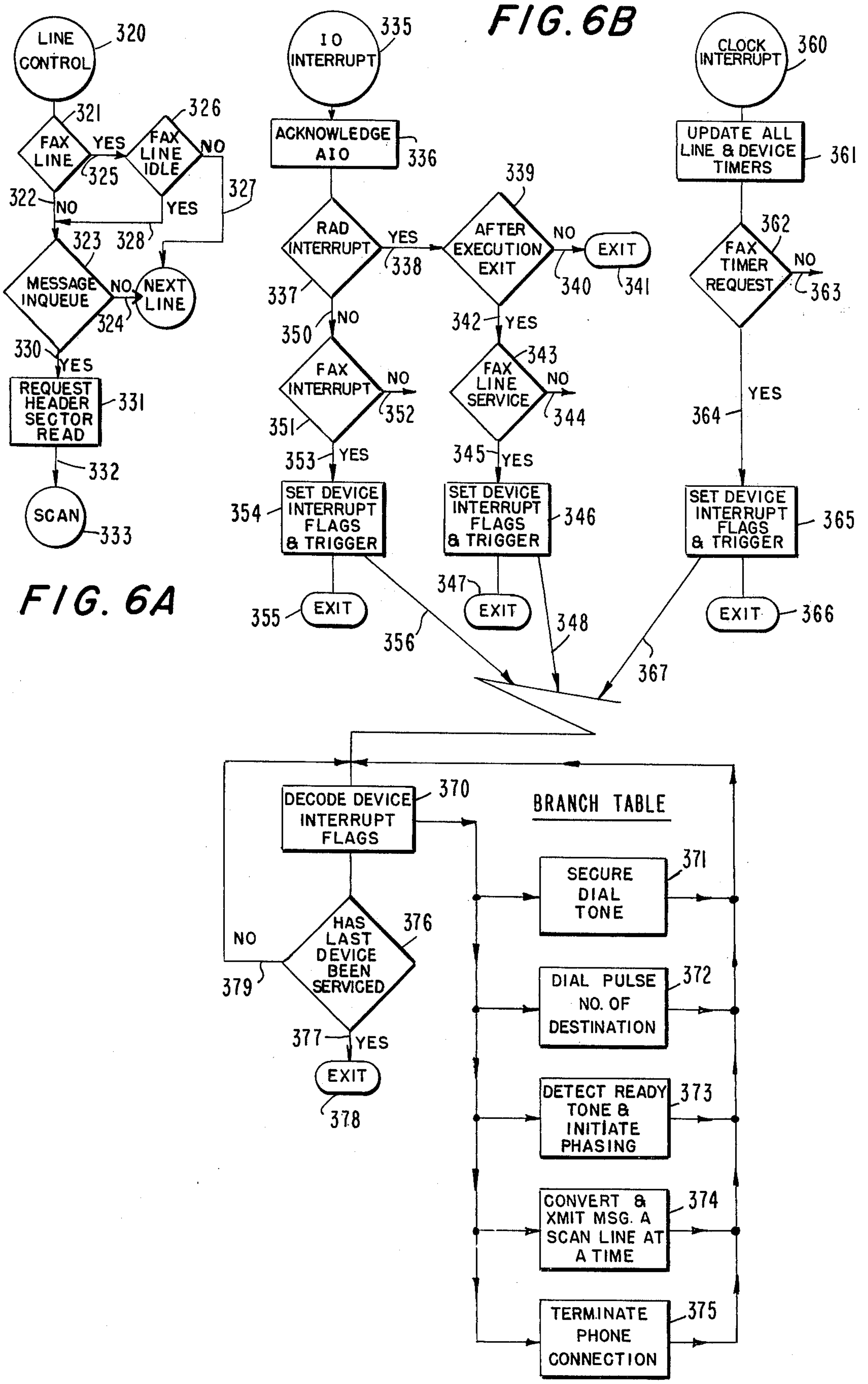
FIG. 6A and 6B are flow charts setting forth a highly simplified overview of the programs associated with the output operation of the instant invention in a facsimile mode.

Referring now to FIGS. 6A and 6B, there are shown flow charts setting forth a highly simplified overview of the programs associated with the output operation of the instant invention in a facsimile mode. More particularly, FIG. 6A is a flow chart illustrating the facsimile output portion of the line control program which acts to control output operations in the switched communications system according to the instant invention, while FIG. 6B is a flow chart depicting, in a highly simplified manner, an overview of the program routines rendered operative pursuant to facsimile mode operations within the instant invention as well as a plurality of interrupts which, when triggered, will initiate such program routines. As will be appreciated by those of ordinary skill in the art, all output operations within the switched store and forward communications system according to the instant invention are initiated under a line control program routine which acts to check in sequence each output line utilized in conjunction with the instant invention and more particularly acts to ascertain whether or not activity for a given output line is indicated.

If activity such as an output message for the given line being checked is indicated, the output message is read from the output queue established on the RAD and an interrupt is generated to initiate the appropriate output routine. In the case of facsimile output operations, the output line associated with the facsimile controller means 20 has been arbitrarily accorded a zero designation and hence, is the first line scanned by the line control program illustrated in a highly simplified manner in FIG. 6A. Therefore, as shown in FIG. 6A, the line control program indicated by the circular flag 320, when active initially acts to ascertain whether or not the line being tested, as indicated by the diamond 321, is the facsimile line which is associated, as aforesaid, with the facsimile controller means 10. Thus, as indicated by the diamond 321, if the facsimile output line is not being addressed, as indicated by the arrow 322 annotated No, the line control program next acts to ascertain whether or not an output message is present in the output queue established on the RAD, as indicated by the diamond 323, for whatever line is present. If no message is present in the output queue established, as indicated by the arrow 324 annotated No, the line control program moves into a scanning sequence for the next line of the plurality of output lines to be scanned. In the exemplary case of the invention presently being discussed, output lines 0 – 26 may be assumed to be utilized wherein output line 0 is devoted to the facsimile subcontroller means 8 while the remaining output lines i.e., 1 – 26, are associated with the various communication circuits connected to the TTY subcontroller means 7. Thus it will be appreciated that the line control program acts to scan each of the output lines of the instant invention in sequence and whenever a given line is unavailable, the next line in the sequence established is scanned. If, however, the facsimile output line is being addressed, as indicated by the arrow 325 annotated Yes, the facsimile output line is next tested, as indicated by diamond 326, to ascertain whether or not it is in an idle condition. When the facsimile output line is not in an idle condition, as indicated by arrow 327 annotated No, the line control program moves off to scan the next line in sequence, as aforesaid. However, if the facsimile output line is idle, as indicated by arrow 328 annotated Yes, a test for a message in queue is initiated in the manner indicated by diamond 323 as described above.

If a message is present within the output queue, as indicated by the arrow 330 annotated Yes, a request is made, under program control as indicated by rectangle 331, that the header sector or first sector for the message queue established be read. Thereafter, as indicated by arrow 332, the line control program illustrated in FIG. 6A acts to continue the scan so that the next output line in the sequence is scanned. This is indicated by the circular flag 333 and hence it will be appreciated by those of ordinary skill in the art that the line control program acts to scan each output line to ascertain whether or not the same is up or available for output operations. If the line is not up, the line control program immediately moves to the next output line in sequence and this will continue in a sequential manner until all output lines employed within the instant invention have been tested. If a line up, or it is another line, the line control program next moves to ascertain whether a message has been established in the output queue associated with that line. If no message is present, the line control continues scanning; however, if a message has been established in the queue, the line control program requests the first sector of the message queue containing the output header be read and then immediately moves on to continue scananing.

If it is assumed that a message to be output in a facsimile mode was established in the output queue for the zero line tested during the line control program illustrated in FIG. 6A, the request that the header sector of the output queue established for the zero line be read, indicated by rectangle 331, will cause the appropriate RAD device to be energized, under program control and the header sector thereof appropriately addressed and read. Upon the completion of the reading operation being carried out by the RAD peripheral indicated by block 4 in FIG. 1, the RAD device would typically generate an IO interrupt. When such an IO interrupt is generated, as indicated by the circular flag 335 in FIG. 6B, the program control established would initially cause the interrupt to be acknowledged as indicated by the rectangle 336 and status information associated with the interrupting input/output device would be stored in a register in the manner well known to those of ordinary skill in the art. Once the interrupt generated by the input/output device has been acknowledged, the program initiated by the intput/output interrupt generated ascertains from the status information stored whether or not the interrupt was generated by one of the RAD devices as indicated by the diamond 337. If the interrupt was generated by the RAD peripheral, as indicated by the arrow 338 annotated Yes, the program next ascertains from the flag information stored whether or not an after execution exit was requested by the routine which initiated the read operation. This is indicated by the diamond 339 in FIG. 6B and seeks to ascertain why the interrupt generated by a RAD peripheral took place. Thus, if an after execution exit was requested by a given routine such as line control, the routine defines why the read operation took place and triggers an interrupt.

If the interrupt generated by the RAD peripheral is not an after exeuction exit interrupt, as indicated by the arrow 340 annotated No, the routine then in progress will clear the I/O and exit, as indicated by the oval 341. However, if an after execution exit was requested, as indicated by the arrow 342 annotated Yes, the program next defines, as indicated by the diamond 343, whether or not the reading of the sector on the RAD had occurred in response to a service request for the facsimile output line which may have been generated in response to the software indicated by rectangle 331 in FIG. 6A or other software routines which would cause subsequent message sectors of an output queue associated with the facsimile output line to be read. If the read interrupt was not generated in response to a facsimile line service request, as indicated by the arrow 344 annotated No, the program would turn to processing operations associated with non-facsimile output operations. However, if an after execution exit was generated in response to a fax line service request, as indicated by the arrow 345 annotated Yes, a branch table entry is set to One, as will be further described below, the status flags associated therewith are established in core and the interrupt is triggered in the manner indicated by the rectangle 346. The routine in progress then exits in the manner indicated by the oval flag 347 while the triggering of the interrupt is indicated by the arrow 348. Thus, it will be appreciated that any time an IO interrupt from the RAD is generated upon the completion of the reading of a section and in response to a facsimile line service requirement, appropriate status flags therefor are established, a branch table entry is set to 1 and the interrupt per se is triggered.

Returning now to the diamond 337 in FIG. 6B, it will be seen that if the IO interrupt generated to cause the initiation of the interrupt routine being discussed was not generated by a RAD peripheral, as indicated by the arrow 350 annotated NO, the program initiated upon the detection of the interrupt then ascertains, as indicated by diamond 351, whether or not the interrupt was generated by the facsimile subcontroller means 8 in response to a condition at the facsimile controller means 10. Such an interrupt, it will be appreciated, might occur in response to the detection of ready tone or the like. If the interrupt generated was not a RAD interrupt and is also not a facsimile line interrupt, as indicated by the arrow 352 annotated No, the program then in progress will turn to other approproate processing operations such as those associated with teleprinter communications or the like. However, as indicated by the arrow 353 annotated Yes, if the IO interrupt was in fact a facsimile interrupt generated by the facsimile subcontroller means 8 in response to an occurrence at the facsimile controller means 10, the status flags therefor are established and the interrupt is software triggered in the manner indicated by the rectangle 354. Thereafter, the routine exits in the manner indicated by the oval flag 355 while the triggering of the interrupt is indicated by the arrow 356. Thus it will be appreciated by those of ordinary skill in the art that when an IO interrupt is generated by the RAD upon the completion of the reading of a sector in response to a service requirement for the facsimile controller means 10 or by the facsimile controller means 10 per se, status flags appropriate to the nature of the interrupting routine or program are established and the interrupt is triggered under software control.

The IO interrupt routines discussed in association with the circular flag 335 are all initiated as the result of an interrupt generated by hardware in the form of a peripheral connected through the common data bus means 2 and the priority bus means 3 to the input/output processor portion of the central switching means 1.

However, as will be apparent to those of ordinary skill in the art from the discussions of the operation of the instant invention set forth above, interrupts are also generated as a function of various routines which are established under software control within the central switching means 1 per se. For instance, it was seen that certain real time operations are performed by the software through the establishment of various clock timing sequences such as those associated with dialing, the issuance of stop tone and listening intervals and each of these functions is accomplished on a real time basis by setting a timer function within the central switching means 1 and generating an interrupt upon the completion of the interval set so that real time processing operations may be implemented. Thus, whenever a timing function is established and the timer times out, an interrupt is generated thereby and enters the routine indicated by the circular flag 360, annotated clock interrupt. When a clock interrupt is generated as indicated by the circular flag 360, the program routine entered initially acts, as indicated by the rectangle 361 to update all line and device timers so that appropriate status indications therefor are subsequently available. Thereafter the program initiated ascertains, as indicated by diamond 362, whether or not a timer was zeroed as a function of a program associated with facsimile output operations or relates to other operations within the switched store and forward communications system according to the instant invention. If the status information associated with the zeroed timer indication generated is indicative that it was not originated as a function of a facsimile output operation, as indicated by the arrow 363 annotated No, the routine performs processing operations appropriate to non-facsimile output operations. However, if, as indicated by the arrow 364 annotated Yes, the timer was set to zero as a function of a facsimile operation, appropriate flags for defining the nature of the interrupt are established and the interrupt is triggered in the manner indicated by the rectangle 365. Thereafter, the subroutine exits as indicated by the oval flag 366 while the triggering of an interrupt is indicated by the arrow 367. Thus it will be appreciated by those of ordinary skill in the art that whenever a service operation such as the reading of a sector on the RAD, the establishment of a real time function or a waiting interval is requested, the central switching means 1 initiates the performance of the service requested and thereafter may tend to other duties required of it within the real time system being disclosed and will not return to further process information for the service function requested until such function has been independently completed and the information requested available as indicated by the generation of an interrupt. This mode of operation renders the utilization of the central switching means 1 highly efficient on a real time basis.

Figure 7:
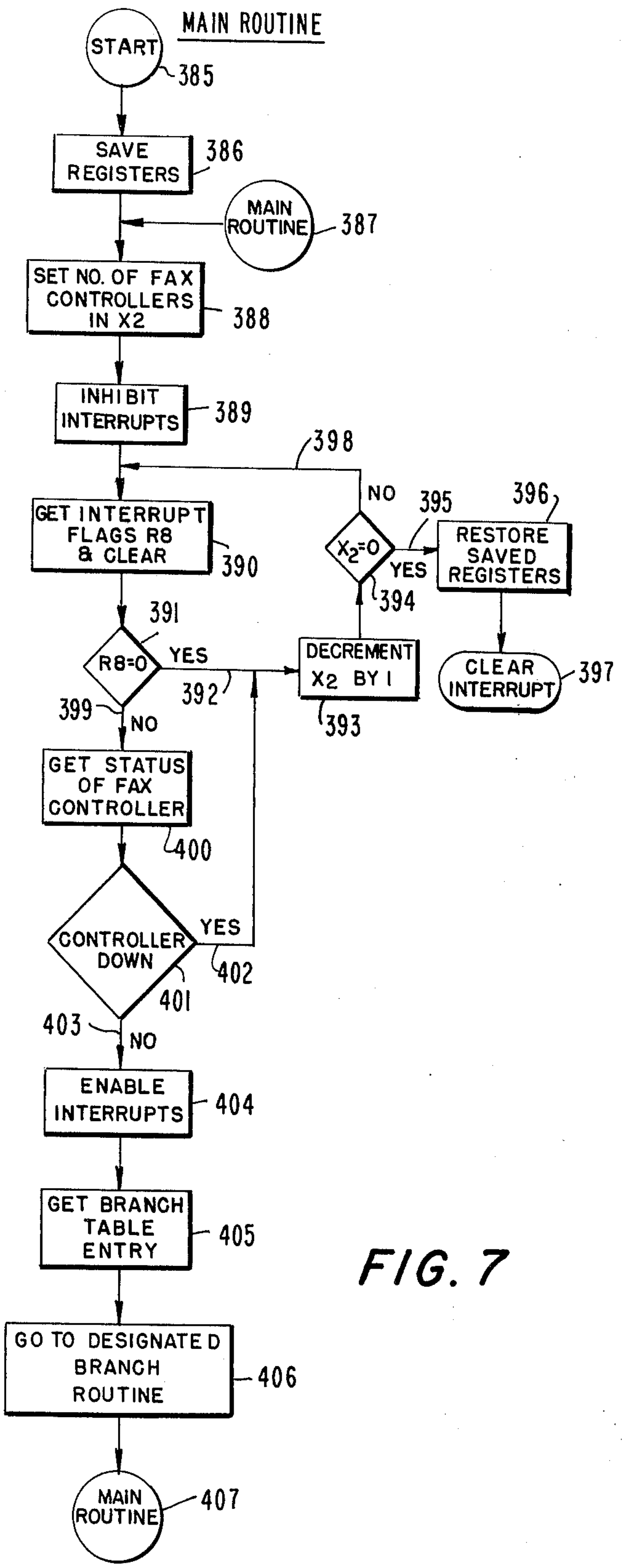
FIG. 7 is a flow chart illustrating an exemplary Main Routine program portion for controlling the output operation of the instant invention in a facsimile mode.

Whenever a facsimile output operation related interrupt is generated as indicated by any of the arrows 348, 356 or 367; the program routines rendered operative pursuant to facsimile mode operations within the instant invention, are initiated and actual facsimile outputting operations are established under program control in the manner generally indicated in the lower portion of FIG. 6B and discussed in greater detail in conjunction with FIGS. 7 and 8. Thus, whenever an interrupt is generated, as indicated by the rectangle 370, a main routine is entered which acts, as shall be seen in more detail in connection with FIG. 7, to decode the status flags associated with the interrupt generated. Thereafter, the main routine will branch to an appropriate one of the branch routines indicated generally by rectangles 371 – 375 and thereby cause actual facsimile output operations to be initiated. In addition, as indicated by the diamond 376, the program routine acts to ascertain whether or not appropriate service, as designated by the interrupt, has been completed and if such service has been completed, as indicated by the arrow 377 annotated Yes, the main routine entered into exits, as indicated by the oval flag 378 while if such service has not been completed, as indicated by the arrow 379 annotated No, re-entry into the main program is established.

Although the nature of the actions initiated during the operation of the main routine will be discussed in great detail in conjunction with FIG. 7 while the various branch table routines are discussed in conjunction with FIG. 8, a brief discussion of the overall operation and inter-relationship between the main routine and the branch table routines will here be advantageous to acquaint a reader with the nature of the program operations employed. Thus, in a typical output mode of operation, when a facsimile message is to be transmitted in the switched store and forward communications system according to the instant invention, action will be initiated through the line control program discussed in conjunction with FIG. 6A and will result in a request that the header sector in the facsimile output queue established on a RAD be read. After the header sector on the RAD is read, a RAD interrupt will be initiated and will cause an interrupt, indicated by arrow 348 in FIG. 6B to be generated under software control. The main routine indicated by the rectangle 370 will inspect the status flags associated with the interrupt and among other functions achieved through branch routines will get the appropriate phone number for the destination peripheral indicated in the header and will secure dial tone, by entering the branch table indicated by the rectangle 371. Dial tone is obtained through an issuance of an off hook instruction and a setting of a 20 second timer whereupon the main routine is re-entered. Upon a re-entry of the main routine, it wil be ascertained that the last device has been serviced, in the manner indicated by diamond 376 and therefore, as indicated by oval flag 378, the main routine will exit. Upon expiration of the 20 second real time interval established, a clock interrupt will be generated to trigger a software interrupt indicated by arrow 367 whereupon the main routine, as indicated by rectangle 370 is re-entered.

Assuming the interrupt which was generated was that which was anticipated, the branch routine will enter the portions of the branch table routines associated with rectangle 372 which causes, among other functions, the dialing of the phone number through the issuance of appropriately timed on hook and off hook instructions. In actuality, two branch tables, the first being described in connection with FIG. 8B and associated with the issuance of appropriately timed on hook instructions and the second being described in connection with FIG. 8C and being associated with the issuance of appropriately timed off hook instructions are flip flopped wherein each instruction is issued and a timer is set to achieve appropriate timing. Thereafter, the main routine is re-entered, and exited from and upon the timing out of the timer interval established, an interrupt is again generated whereupon the main routine is re-entered and flip flopping between these two branch routines, as generally indicated by the rectangle 372, is continued until the telephone number of the destination peripheral employing facsimile equipment is appropriately dialed.

Figure 8B:
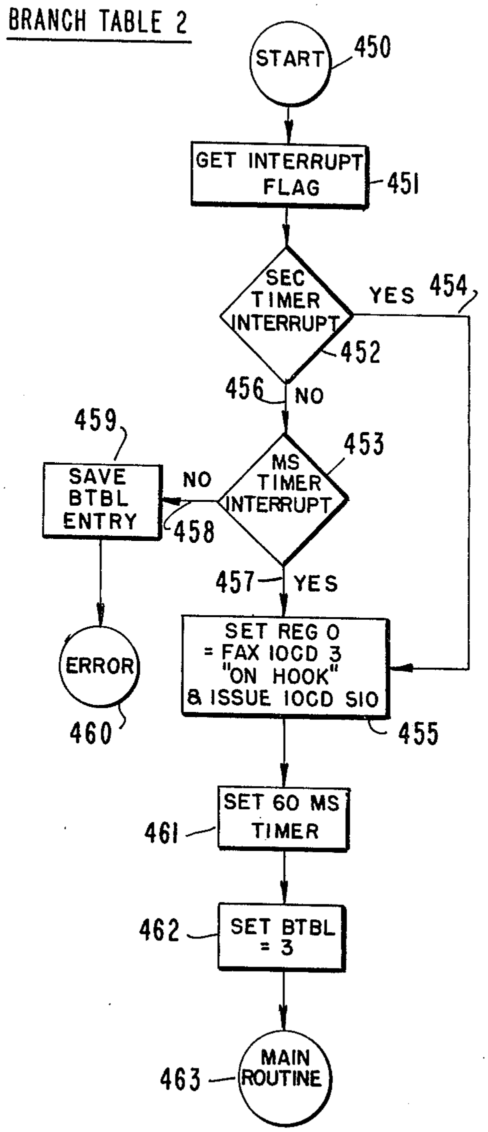
FIG. 8A – 8J are flow charts illustrating various exemplary branch routines for the Main Routine program portion depicted in FIG. 7.
Figure 8A:
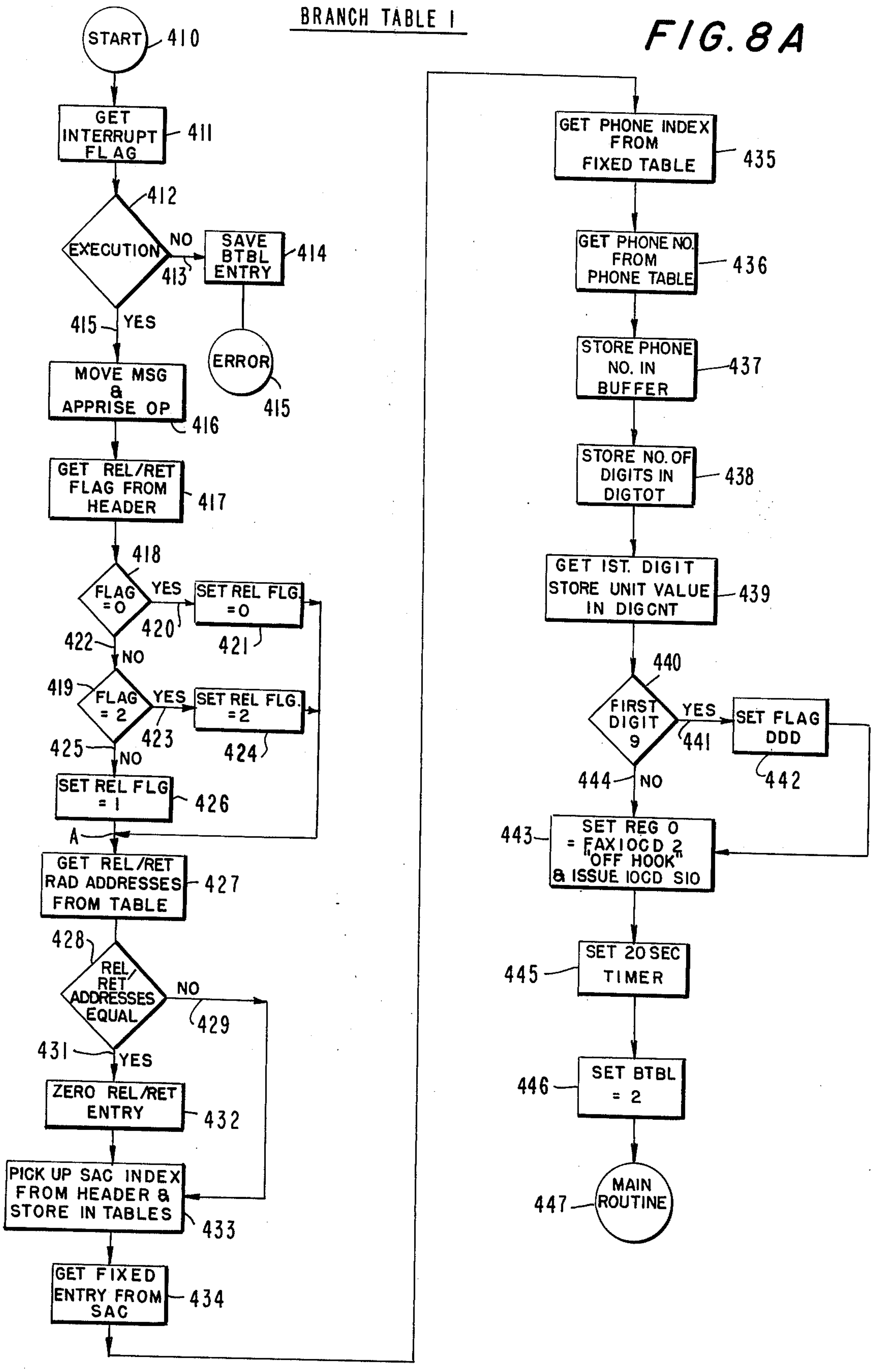
Figure 8C:
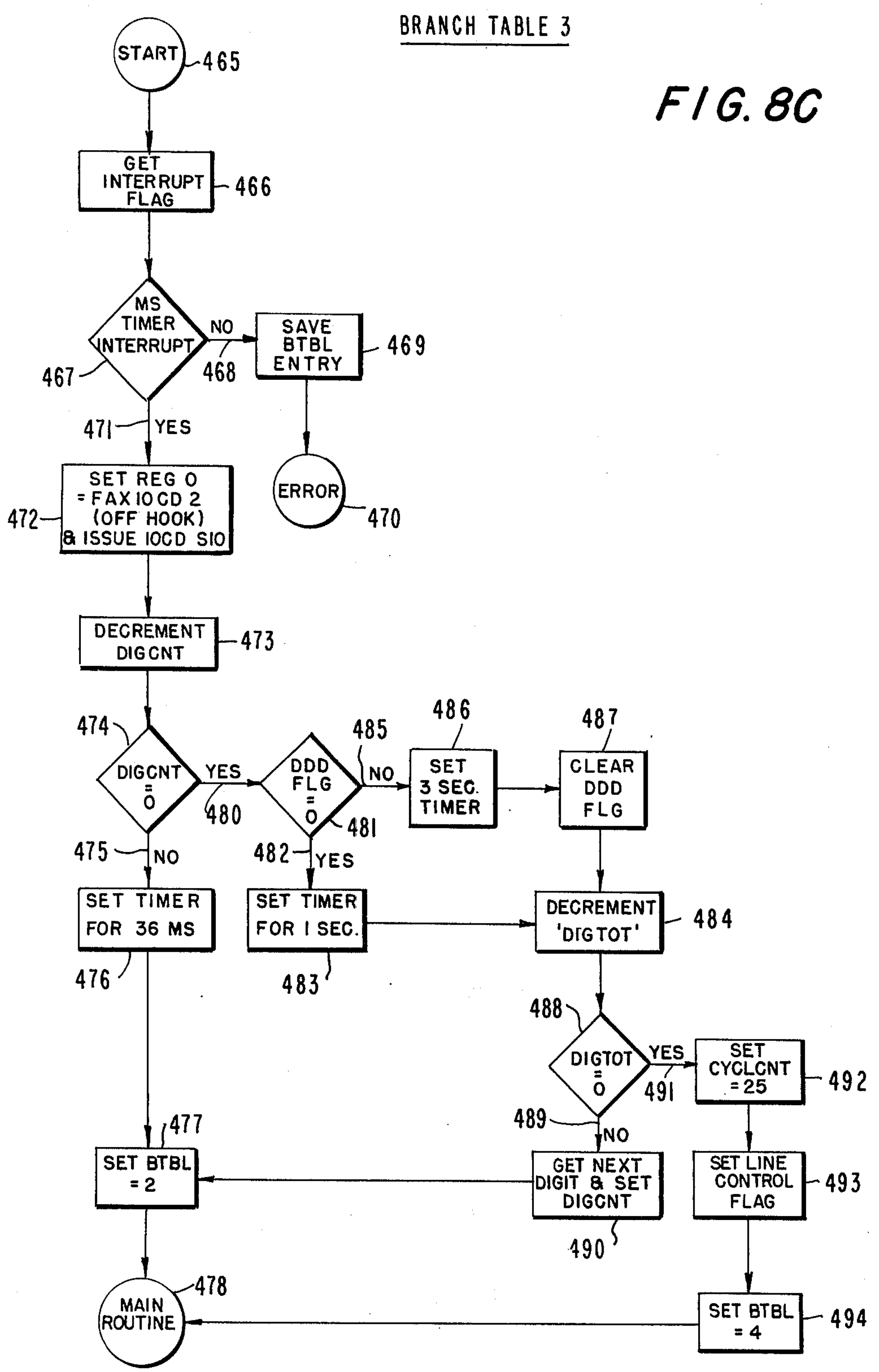
Figure 8D:
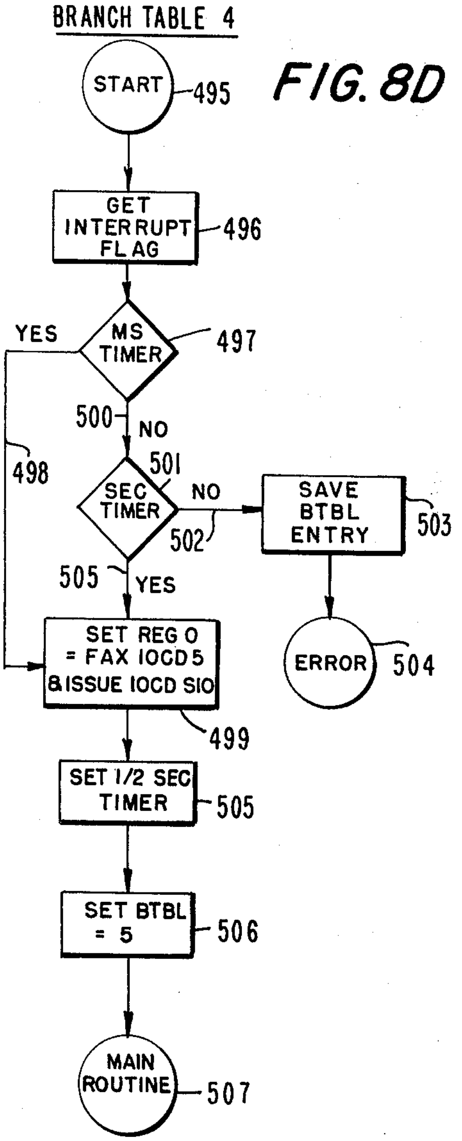
Figure 8E:
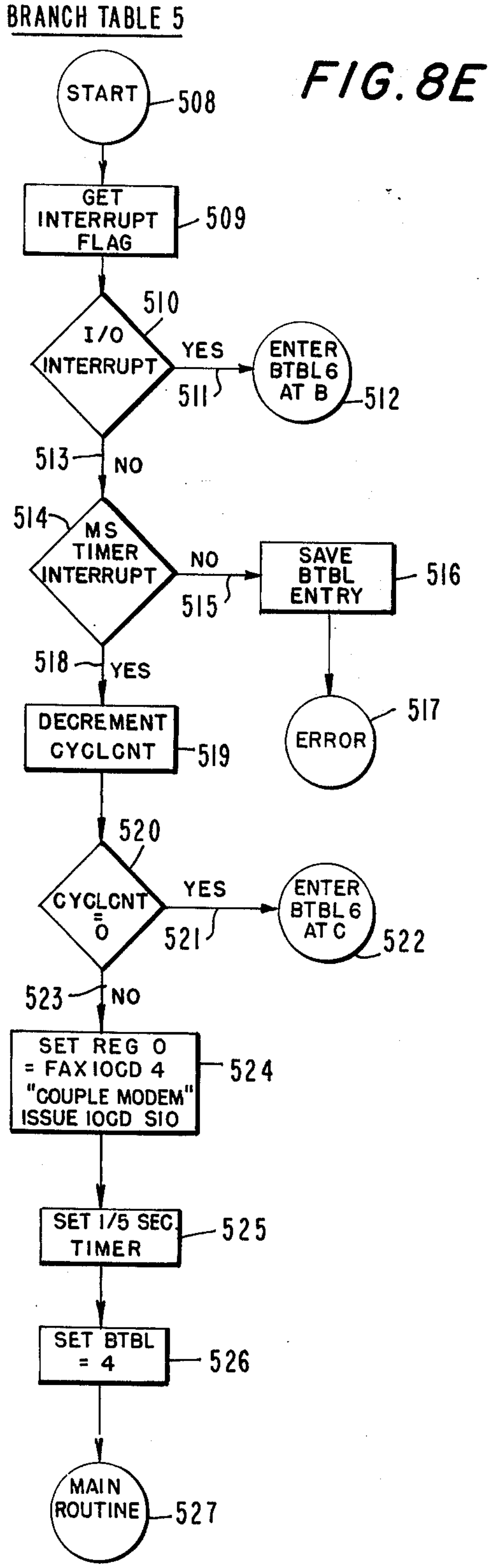
Figure 8F:
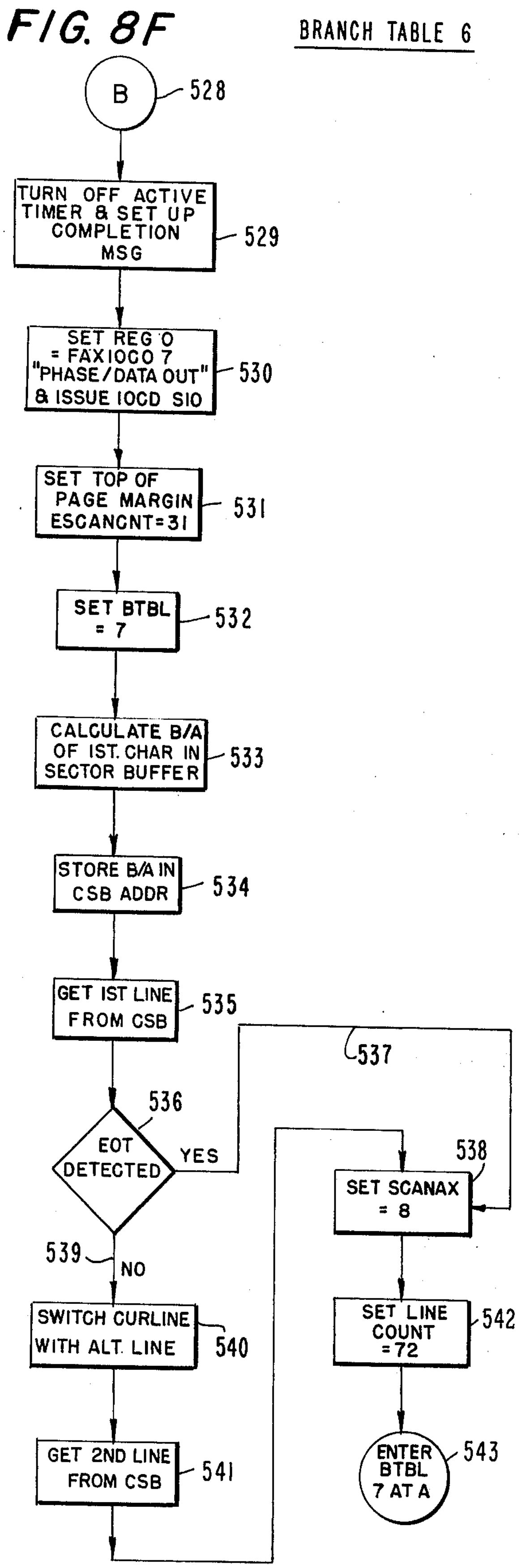
Figure 8G:
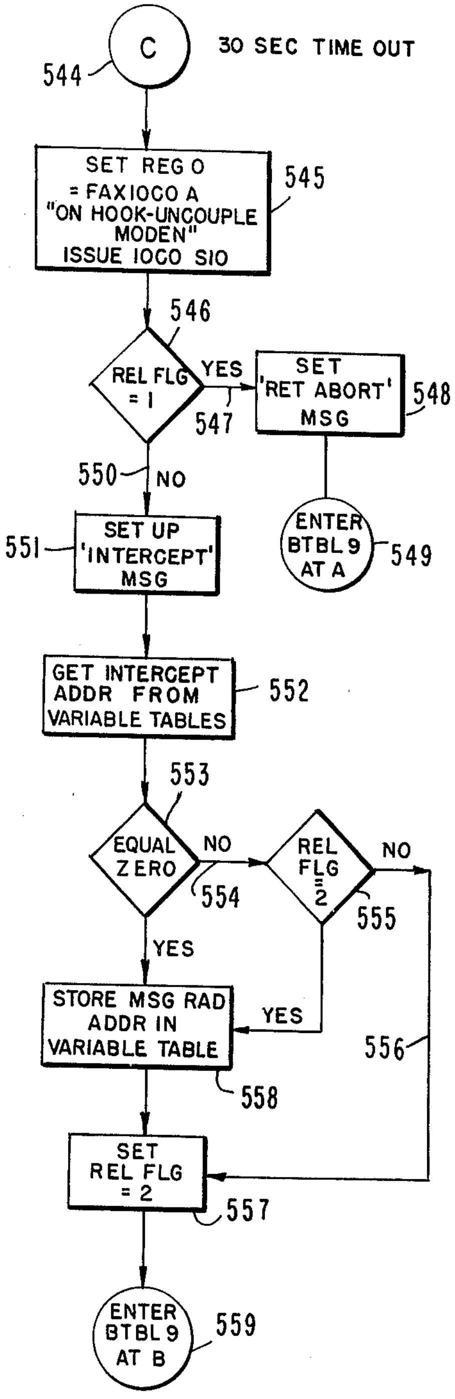
Figure 8H:
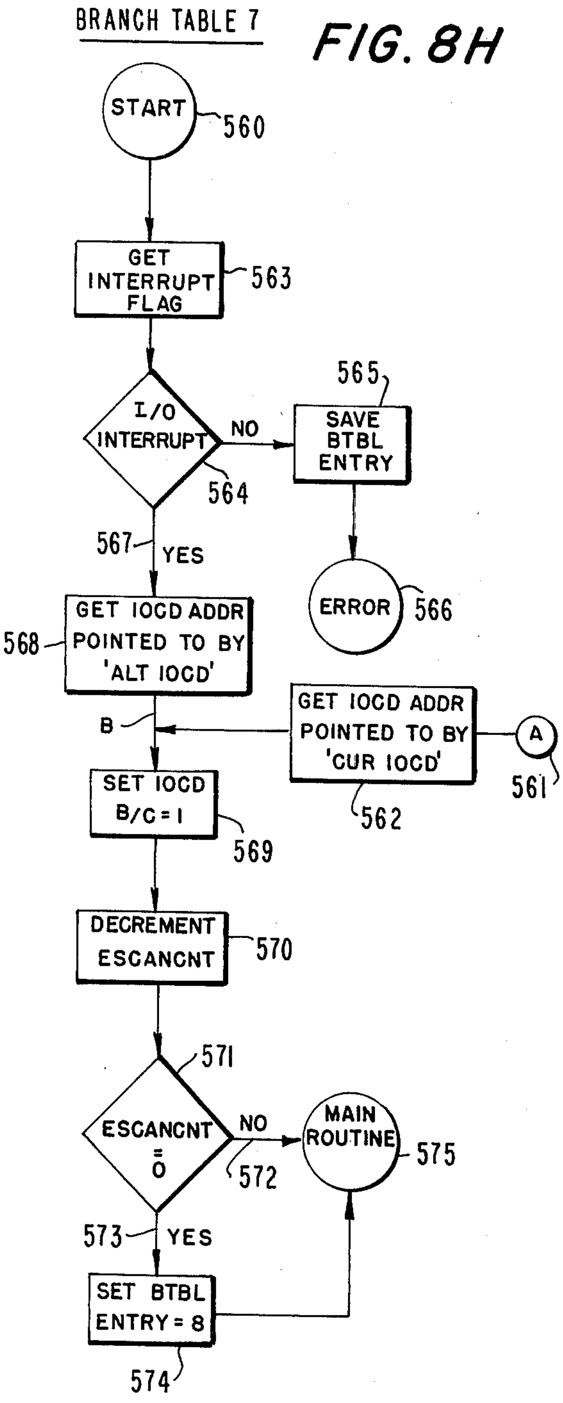

Upon the completion of dialing, the main routine is again re-entered and the interval wherein the issuance of stop tone is interleaved with listening intervals for a thirty second period, as indicated generally by the rectangle 373 is implemented through the flip flopping of a pair of branch table routines described in conjunction with FIGS. 8D and 8E. In the flip flopping of these branch table routines, appropriate orders for the establishment of a listening interval or the issuance of stop tone are issued and timers appropriate to the duration of the interval therefor are set. In addition a ready tone detect interval timer is also set through a sequence cycle counter. Each time one branch table routine has been completed, exiting from the main routine takes place until a clock timer interrupt, indicative that the interval set has expired, causes the main routine to be re-entered. Upon the detection of ready tone or the expiration of the detection interval set, interrupts are generated, and the main routine is again re-entered. In either case, another branch routine as described in detail in FIGS. 8F and 8G, and also generally indicated by the rectangle 373 in FIG. 6B is initiated. If the ready tone detection interval established has expired without appropriate detection of ready tone, a hang up procedure indicated generally by rectangle 375 is entered while if ready tone has been detected, branch routines indicated generally by the rectangle 374 and described in detail in connection with FIGS. 8F, 8H and 8I are entered into and cause message information to be translated to the facsimile controller means 10 in the manner detailed in connection with FIG. 5. Upon completion of forwarding of the last message byte, the main routine is re-entered and the telephone connection is terminated, in the manner indicated generally by the rectangle 375 wherein, as now will be appreciated by those of ordinary skill in the art, stop tone is issued for an appropriate inveral while a timer is set. The main routine is re-entered and then exited and upon the expiration of the timer interval set a clock interrupt is generated whereupon the main routine is re-entered, the actual telephone communication link is terminated through a branching operation to the branch table indicated by rectangle 375 and the equipment is re-initialized. Thereafter, an exit operation takes place from the main routine and the software awaits a new cycle facsimile output operations.

Thus it will be appreciated by those of ordinary skill in the art that the software associated with facsimile output operations, as generally illustrated in FIG. 6B, causes the generation of an interrupt whenever a desired condition has been obtained. Thereafter, the interrupt generated results in the entry of a main routine which, in essence, keeps track of the last event in the designated sequence of events required for facsimile output operations and branches to an appropriate branch table for achieving the next event in such sequence. Upon completion of the functions required of a given branch table routine, the main routine is reentered so that exit conditions or entry to a new branch table routine may be initiated. If an exit operation occurs, the main routine will be subsequently re-entered through the generation of an appropriate interrupt as indicated by one of the arrows 348, 356 and 367 while if a new branch table routine is entered, the events initiated thereby under program control are caused to occur. Thus, it will be seen that the overall operation of the program routines rendered operative pursuant to facsimile mode operations within the instant invention are such that entry to a main routine indicated by the rectangle 370 may be caused by the generation of an IO or other interrupt or by the completion of a designated one of the branch routines indicated by the rectangles 371 – 375. Each time the main routine is entered, a branch routine is either entered to cause the events defined thereby to occur or the main routine is exited pending the occurrence of a designated interrupt. Accordingly, in this mannner, entry into the main routine will initially cause dial tone to be secured in the manner generally indicated by the rectangle 371 and subsequently the telephone number of a designated remotely located peripheral employing facsimile information is dialed through the issuance of appropriately timed on hook and off hook instructions, as indicated by the rectangle 372. After the telephone number has been dialed, a ready tone detect interval as indicated by the rectangle 373, is initiated wherein stop tone is interleaved with listening periods for an appropriate interval of time. Should ready tone not be detected during the interval established, the termination of the attempt to transmit facsimile information occurs in the manner indicated by rectangle 375 while if ready tone is appropriately detected, phasing, followed by the processing of message information in the manner described in conjunction with FIG. 5 occurs until all such message information has been transmitted. Thereafter, stop tone is broadcast for a designated interval and the telephone communications link established is terminated. Accordingly, it will be appreciated that the facsimile output portion of the line control program illustrated in FIG. 6A acts to cause the header sector of the output queue established for the facsimile subcontroller means 8 to be read subsequent to each establishment of a message queue therefor on the RAD. Furthermore, this action, is complemented by the program routines illustrated, in a highly simplified manner, in FIG. 6B which are rendered operative pursuant to facsimile mode operations within the instant invention in that any time an interrupt associated with facsimile mode operation is generated, a main routine is entered pursuant to the generation of such interrupt and the appropriately sequenced events requisite to facsimile mode operations are initiated under program control.

MAIN ROUTINE PROCESSING OPERATIONS

Referring now to FIG. 7 there is shown a flow chart illustrating an exemplary main routine program portion for controlling the output of the instant invention in a facsimile mode in accordance with the generalized operation of block 370 depicted in FIG. 6B. The main routine generally illustrated by the flow chart in FIG. 7 performs the principal function of searching the controller table for activity, transferring operations to an appropriate branch table routine and to clear the external interrupt which may have been generated to cause the main routine to be entered. As the main routine illustrated in FIG. 7 may be entered in response to the generation of an interrupt or the completion of a cycle within a designated branch table routine, two modes of entry into the main routine are available. Thus, the first mode of entry, as indicated by the circular flag 385 annotated Start, is the entry point into the main routine whenever entrance in response to an interrupt occurs.

Under these circumstances, as indicated by the rectangle 386, the first program step initiated is to save the contents of all registers within the central switching means 1. This initial step is necessary because, as will be appreciated by those of ordinary skill in the art, an interrupt will take priority over many internal processing operations which may have been occurring within the central switching means 1 and hence the contents of any registers which may have been employed for such processing operations must be saved so that these operations may be returned to upon the completion of the program sequence of operations initiated in response to the interrupt. The second entry point into the main routine, as indicated by the circular flag 387, provides entry into the main routine for other than interrupt operations such as when one of the branch table routines indicated generally in FIG. 6B has been completed. The circular flag 387 provides a more direct entry into the main routine illustrated in FIG. 7 additional that the read step of saving all information in all registers, as indicated of the rectangle 387, is bypassed as this function would have already been achieved in response to the generation of the interrupt which initially caused entry into the main routine and hence the same need not be again performed when entry occurs through a return from a branch operation or the like.

Once the main body of the main routine has been entered, the initial step performed, as indicated, by the rectangle 388, is to set the total number of the facsimile controller means 10 into a register so that the same may be identified for the purposes of the programmed sequence of events which is to subsequently occur. As will be appreciated by those of ordinary skill in the art, since only a single facsimile controller means 10 is employed within the exemplary embodiment of the instant invention presently being discussed, the total number of facsimile controller means set in the step indicated by rectangle 388 would be one; however, in larger communicationss systems according to the instant invention, a greater number of facsimile controller means may be desired to facilitate multi-device facsimile communications and hence the main routine being described in conjunction with FIG. 7 could be readily employed, under these circumstances, to identify the current active controller and also as an index to the various controller tables. The next program step performed by the main routine, after the active controller has been identified by the program step indicated by the rectangle 388 is to inhibit all interrupts in the manner indicated by the rectangle 389. This is done to protect against any loss of control during the searching algorithm initiated by the main routine. Once the program steps indicated in the main routine by the rectangles 386, 388 and 389 have been completed to achieve the necessary housekeeping functions which must precede data processing within the main routine depicted in FIG. 7, actual information processing may occur.

The first processing step which takes place within the main routine depicted in FIG. 7 is to get the interrupt status flags associated with the interrupt which originally triggered the main routine. This processing step is indicated by the rectangle 390 and corresponds to the CSTAT1 table entry in the program materials provided. Once the interrupt flag is obtained, established within a register R8 and cleared by the program step indicated by the rectangle 390, the status of the flag is tested to ascertain whether or not it is in a Zero condition. This testing step is indicated by the diamond 391 and it will be appreciated by those of ordinary skill in the art that if the flag is down, i.e., R8 equals 0, either the triggering was faulty due to an error or the main routine was re-entered at a point indicated by the circular flag 387 after the completion of device servicing by one of the branch tables, to be described below. Thus, the test indicated by the diamond 391 corresponds, in essence, to the test indicated by diamond 376 in FIG. 6B. Therefore, it will be appreciated by those of ordinary skill in the art that when an indication that the interrupt flag is down is obtained, as indicated by the arrow 392 annotated Yes, exiting from the main routine should occur. Therefore, whenever the status flag is down, as indicated by the arrow 392, the index of facsimile controllers present is decremented by one as indicated by the rectangle 393 and the condition of the controller index $X_2$ is tested, as indicated by diamond 394, to ascertain whether or not the same equal to Zero.

The processing steps indicated by rectangles 393 and 394 are employed in deference to a direct exit because, as will be apparent to those of ordinary skill in the art, more than one facsimile controller means may be employed within the instant invention and in such cases a decrementing to test whether a device completion has been obtained for the remaining controllers through subsequent loops is required. However, when only a single facsimile controller means is employed as is the case for the exemplary embodiment being discussed, the decrementing indicated by rectangle 393 will invariably result in an $X_2=0$ indication when the test indicated by the diamond 394 is performed. When this condition obtains, as indicated by the arrow 395 annotated Yes, the registers saved during the program step indicated by rectangel 386 are restored, as indicated by the rectangle 396 and thereafter the interrupt is cleared, as indicated by the oval flag 397 whereupon previous processing not associated with facsimile operations may be resumed by the central switching means 1. However, in cases where more than one controller was being employed, the test conducted by diamond 394 may not result in a Zero indication, as indicated by the arrow 398 annotated No. Under these conditions, as will be readily appreciated by those of ordinary skill in the art, a second loop or minor loop operation through the processing steps indicated by rectangle 393 and diamond 391 is initiated to achieve appropriate processing in such other controllers.

Should the test conducted by the diamond 391 be indicative, however, that the interrupt flag is up or $R_8$ is not equal to 0, the program will proceed along the path indicated by the arrow 399 annotated No. This condition is indicative that an interrupt has triggered the main routine and the condition required thereby has not been cleared. Therefore, the main routine next acts, as indicated by the rectangle 400, to obtain the status of the facsimile controller means 10 to ascertain whether or not the same is available for processing. Once the status of the facsimile controller means 10 is obtained, the status flag thereof is tested in the manner indicated by diamond 401 to ascertain whether or not the same is in a down or up condition. If the facsimile controller means 10 is down, as indicated by the arrow 402 annotated Yes, the controller table is decremented in the manner described in conjunction with rectangle 393 and thereafter a restoring of the saved registers and a clearing of the interrupt pursuant to an exit routine is initiated in the manner described anent rectangle 396 and oval flag 397. However, should the facsimile controller means 10 be in an up condition and thus available for processing, as indicated by the arrow 403 annotated No, the interrupts inhibited during the processing step indicated by the rectangle 389 are released or enabled as indicated by the rectangle 404 and thereafter, as indicated by the rectangle 405, a branch table entry is obtained from an appropriate register therefor. As shall be seen below, each time a branch table routine is processed, that branch routine acts to set up an appropriate value in the buffer maintained as a branch table so that the main routine during a subsequent cycle will cause branching to shift to the next appropriate branch table in the sequence established. This will be seen in greater detail in conjunction with the various branch table routines described in conjunction with FIG. 8; however, it is here sufficient to appreciate that during a clearing operation at the completion of all branch table routines, the branch table is cleared. Thereafter when a RAD interrupt goes off pursuant to a facsimile line service request upon the reading of a header sector as indicated by rectangle 346 in FIG. 6B, the branch table index is set to 1 to cause branching to shift to the first branch table whenever the main routine is initiated by an interrupt or the like. Thus, for the first cycle through the main routine depicted in FIG. 7, the branch table entry of 1 which is definitive of the first branch table will be present within the appropriate buffer and obtained in the processing step indicated by the rectangle 405.

After the branch table entry has been obtained in the manner indicated by the rectangle 405, the branch routine to the branch table indicated in the table is initiated in the manner indicated by the rectangle 406. Thereafter, as indicated by the circular flag 407, the main routine will be re-entered and it should be appreciated by those of ordinary skill in the art that the entry point defined by the circular flag 407 corresponds to that identified by the circular flag 387. Thus it will be appreciated by those of ordinary skill in the art that the main routine which is entered upon the generation of an interrupt or through a return operation from a branch table, as indicated in FIG. 6B, acts to save registers employed during processing prior to the interrupt, sets the total number of facsimile controllers in the system, inhibits interrupts during the searching algorithm and thereafter fetches the status flags associated with the interrupt and ascertains whether or not the controller function required thereby has been completed. If the controller function has not been completed, the main routine then acts to check the status of the controller to ascertain whether or not the same is in an up condition and if it is in an up condition, the main routine then releases the inhibited interrupts, gets the appropriate branch table entry and causes branching to that branch routine to occur. The branch routines which are enabled to cause appropriate issuance of orders and the processing of data within the facsimile controller means 10 are described in connection with FIGS. 8A–8J.

THE BRANCH TABLE ROUTINES

Referring now to FIGS. 8A–8J, there are shown various flow charts illustrating exemplary branch routines employed in association with the main program routine to cause the requisite orders and data bytes to be issued to the facsimile controller means 10 to initiate and control the various cycles of operation thereof in the sequence required for facsimile mode output operations, as described above. Furthermore, such cycles of operation are caused to occur in an appropriately timed manner and in a sequence established by various cycles through the main program routine which causes appropriate branching to designated branch table routines in accordance with branch table entries established by previous branch routines. Turning now to FIG. 8A, there is shown a generalized flow chart illustrating the processing steps initiated by the branch table 1 routine. In essence, the branch table 1 routine program portion depicted in FIG. 8A is the first routine to be executed when activity is detected by the main program. The functions performed by the branch table 1 routine involve the setting up of an appropriate message buffer, the establishment of appropriate tables, the initiation of the first Off Hook order to the facsimile controller means 10 which acts, as aforesaid, to cause dial tone to be secured and to establish an appropriate entry in the buffer employed by the main routine so that subsequent branching to branch routine 2 occurs. AS indicated by the circular flag 410, the branch table 1 routine is initiated by getting the status flag associated with an interrupt which triggered the main routine. This is done, as indicated by the rectangle 411, to ensure that triggering occurred from an anticipated source and hence is not a result of an error. Once the status flag is obtained, it is tested to ensure it reflects an after execution exit status. This is indicated by the diamond 412, it being appreciated by those of ordinary skill in the art that this status is necessary to ensure that the function associated with the interrupt is a completed function in the form of a timing out of an appropriate timer or the completion of a read cycle from the RAD. Should such an after execution status not be present as indicated by the arrow 413 annotated No, the flag is deemed to be invalid, the computer operator is notified via a diagnostic message, the branch table entry remains the same and the routine returns to the main program. This is generally indicated in FIG. 8A by the rectangle 414 which indicates a saving of the branch table entry into the branch table buffer. This action allows the main routine to be re-entered and upon the generation of a valid interrupt, the branch table buffer will be in the condition previously established so that normal processing can occur when an after execution status is obtained. Thereafter, a return to the main routine is achieved through an error loop subroutine generally indicated by the circular flag 415 and referred to as SA in the attached program materials. The processing of the message, however, continues when the appropriate after execution flag appears within the interrupt status conditions fetched and hence as soon as an appropriate condition is indicated a return to branch table 1 occurs whereupon a valid after execution flag will eventually be obtained.

If the testing of the flag for an after execution status, as indicated by the diamond 412 is affirmative, as indicated by the arrow 415 annotated Yes, the message originally read from the RAD and loaded into the line block buffer means 303 as shown in FIG. 5, is moved, under program control, into the facsimile message buffer 305 in the manner indicated by the rectangle 416. As it will be appreciated by those of ordinary skill in the art that the initial entry into the main routine would occur as a result of an interrupt generated upon the completion of the reading of the header sector from a RAD, it will be seen that the header sector was loaded into the line block buffer means 303 upon the generation of the interrupt. Therefore, the program step indicated by the rectangle 416 merely serves to move the information read from this sector of the RAD from the line block buffer means 303 to the facsimile message buffer 305 shown in FIG. 5. In addition, as is also indicated by the rectangle 416, the computer operator at the central switching station is apprised that the facsimile controller means 10 has gone active and information present within the header is employed to further advise the operator as to the nature of the destination peripheral defined, the message number for that destination peripheral and the time at which the facsimile controller means 10 has been rendered active.

Thereafter, as indicated by the rectangle 417, the relieval/retrieval flag is removed from the header information now stored in the facsimile message buffer 305. The flag is then tested to ascertain whether or not a relieval, retrieval or a normally processed message is being acted upon. This is accomplished, as indicated by diamonds 418 and 419, by a testing of the retrieval/relieval flag set as to value to asertain the nature thereof. More particuarly, the diamond 418 acts to test whether or not the relieval/retrieval flag obtained from the header is equal to o wherein a 0 designation is representative that neither a relieval or retrieval condition exists and hence the facsimile message being processed is a normal first attempt at transmission. If this condition obtains, the relieval flag, as indicated by the rectangle 421, is set to Zero and the branch table 1 routine is rejoined at point A. However, if the test for a Zero status flag condition indicated by the diamond 418 is negative, as indicated by the arrow 422 annotated No, the value for the flag designation obtained is tested as to whether or not the same is equal to 2. If the flag designation obtained is not Zero and is equal to 2, a relieval condition, as defined above, is present and therefore, as indicated by the arrow 423 annotated Yes, the relieval flag is set equal to 2 in the manner indicated by the rectangle 424 and thereafter the program is rejoined at Point A. If, however, the flag value tested is not equal to Zero, as ascertained by the step indicated by the diamond 418, and is not equal to 2 as indicated by the test performed by the step indicated by the diamond 419; a retrieval condition ie., where the value of the flag must be 1 is indicated. Therefore, as indicated by the arrow 425 annotated No, the relieval flag is set equal to 1 in the manner indicated by the rectangle 426 and the program routine associated with branch table 1 is again rejoined at Point A. Accordingly, it will be appreciated by those of ordinary skill in the art that the program steps indicated by diamonds 418, 419 and rectangles 421, 424 and 426 act to establish whether the value of the relieval/retrieval flag present in the header is 0 whereupon the operation is a first transmission attempt, equal to 2 wherein the operation is a relieval corresponding to a second or further attempt to transmit a given message or the value of a flag is other than Zero or 2 indicating that the message has been already transmitted and a second transmission thereof is being requested. In any event, an appropriate flag is set whose value is indicative of the nature of the transaction about to occur.

Once the history of the message about to be conveyed is designated by the setting of an appropriate value in a relieval flag, the RAD address of any message which must be relieved or retrieved for the facsimile line is obtained from a table in the manner indicated by the rectangle annotated 427. In the switched communications system according to the instant invention a relieval/retrieval table is maintained for each output line and hence one such table would be maintained for the zero input line associated with the facsimile controller means 10. In this table is stored the RAD addresses of any line 0 message for which transmission was attempted and intercept occurred due to an inability to transmit a given message. Therefore, these RAD addresses are effectively a list defining messages which must be subsequently sent when the facsimile controller means output line is available therefor. Any RAD address maintained in this table is checked against the RAD address of the current message being processed in branch table 1, as indicated by diamond 428, to ascertain whether or not the present message being processed is the same as that stored and hence indicate whether or not a relieval/retrieval transaction is presently taking place. If the addresses compared within the program step indicated by the diamond 428 are unequal, as indicated by the arrow 429 annotated No, the rel/ret address stored in the appropriate table is maintained in its present form. However, if the two addresses compared are equal, as indicated by the arrow 431 annotated Yes, the value stored in the table is zeroed as such favorable comparison is plainly indicative that the rel/ret operation indicated in the table is presently taking place. The zeroing of the entry in the rel/ret table maintained for the facsimile controller output lines is indicated by the rectangle 432.

The next step of the branch table 1 routine, as indicated by rectangle 433, is to pick up the destination SAC index from the header now present in the facsimile message buffer 305, as shown in FIG. 5, and to enter the same in the table maintained for this purpose and referred to as SACIXTBL. There are two terminal tables, referred to in the main program as terminal table A and terminal table B for each destination SAC and thus each SAC has a double word entry wherein terminal table A represents fixed information designating the type of terminal, the actual EBCDIC SAC for that terminal and the entry into the telephone index maintained for destination peripherals employing facsimile equipment. Conversely, table B, represents variable information associated with the destination peripheral and contains such information as how many messages have come in from this terminal, how many messages have gone out for this terminal, whether the terminal is up or down, whether the terminal is busy, and similar other information which changes with respect to each of the destination peripherals. Once this information has been stored in an appropriate table, the fixed information associated with terminal table A is taken from the table as indicated by the rectangle 434, and the entry therein to the telephone index table is obtained, in the manner indicated by the rectangle 435, and employed to get the telephone number from the telephone table, in the mannner indicated by the rectangle 436 so that the actual telephone number for the destination peripheral employing facsimile equipment as defined in the output header is secured. The telephone number thus obtained is then stored in an appropriate buffer maintained for this purpose in the manner indicated by the rectangle 437. As the number of digits within the telephone number obtained for the destination peripheral employing facsimile equipment may vary depending upon the location of the peripheral and/or whether access to such peripheral is obtained through an internal or external telephone network, the actual number of digits within the telephone number is stored in an appropriate register, in the manner indicated by the rectangle 438. The buffer employed to store the number of digits in the telephone number of the destination peripheral is referred to as DIGTOT hereinafter.

After the telephone number for the specified destination peripheral is obtained and stored in a buffer as indicated by the rectangle 437 and the total number of digits in this telephone number is stored in the DIGTOT buffer in the manner indicated by the rectangle 438, the first digit of the telephone number stored is fetched and the value thereof stored in another buffer referred to as DIGCNT. The value of the first digit of the telephone number now stored in the buffer DIGCNT is tested by the program step indicated by the diamond 440 to ascertain whether or not the same corresponds to a 9. As will be appreciated by those of ordinary skill in the art, agencies or companies employing internal telephone networks have systems which are generally arranged in such manner that a party using such a network may dial internally by directly dialing a desired extension in the form of a multidigit number which normally does not exceed five digits while access to an outside line is obtained by first dialing the digit 9 and thereafter waiting until dial tone is secured whereupon the actual public telephone number desired may be dialed. Therefore, to accommodate such systems, the first digit of the telephone number obtained, as now stored in the buffer referred to as DIGCNT, is tested as to whether or not its unit value is equal to the numeral nine. If the test conducted is indicative that a 9 is present, as indicated by the arrow 441 annotated Yes, an appropriate flag is set as indicated by the rectangle 442. Thereafter, as indicated by the block 443, a register designated 0 is set equal to the address of the facsimile input output command double word 2 which is associated with an Off Hook order and the SIO command associated therewith is issued. The manner in which the Off Hook order is responded to by the facsimile controller means 10 was described in conjunction with the order register illustred in FIG. 3; therefore, it is here sufficient to merely appreciate that the initial Off Hook order issued is calculated to cause the data access arrangement 22 to go Off Hook and eventually acquire dial tone. If, however, the first digit is not a nine, as indicated by the arrow 444 annotated No, the zero register is immediately set in the manner described above so that an Off Hook order will be issued.

Upon issuance of the Off Hook order in the manner indicated by the rectangle 443, a 20 second timer is set within the central switching means 1 so that, in effect, the establishment of a 20 second interval for acquiring dial tone is initiated. The setting of the clock timer is indicated by the rectangle 445. After the clock timer is set, the branch table buffer is set equal to 2 in the manner indicated by the rectangle 446 and the branch table 1 routine returns to the main program routine in the manner indicated by the circular flag 447. When the main routine, illustrated in FIG. 7 is re-entered, it will now be appreciated that an exit routine thereform will occur and the interrupt will be cleared in the manner indicated by the oval flag 397 since the test indicated by diamond 391 will now show R8 = 0. However, an interrupt will be subsequently generated when the clock timer set by the action indicated by the rectangle 445 in FIG. 8A times out. When the main routine is again reentered in response to the interrupt generated, the main routine will cause branching to branch table 2 due to the setting of the branch table buffer accomplished by the action indicated by the rectangle 446. In addition, it will be appreciated by those of ordinary skill in the art that an Off Hook instruction has been issued to the facsimile controller means 10 and will persist for the 20 second interval established by the clock timers so that dial tone will be acquired and after the expiration of such 20 second interval a blind dialing technique may be initiated.

Referring now to FIG. 8B, there is shown a flow chart schematically representing the program steps initiated in association with the On Hook portion of the On Hook-Off Hook dialing technique employed within the instant invention. However, prior to the actual description of the flow chart depicted in FIG. 8B, it should be recalled that dialing within the instant invention is accomplished by sequentially applying On Hook and Off Hook instructions to the data access arrangement 22 in such manner that each unit of a digit is dialed by going On Hook for 60 ms. and Off Hook for 40 ms. with approximately a one second Off Hook interval provided in between digits. This is accomplished in accordance with the teachings of the instant invention, as shall be seen below, by essentially flip flopping between branch tables 2 and 3, to be described below, to achieve dialing functions wherein the On Hook order and the timing therefor results from the actions of branch table 2 and the Off Hook order and the timing therefor results from the actions of branch table 3 and each flip flop between branch programs is achieved through an interrupt and the main routine described in conjunction with FIG. 7.

Upon the termination of the 20 second timing interval established by the action indicated by the block 445 and branch table 1, an interrupt is generated which causes the main routine to be entered and branching action to occur causing an initiation of an entry into the branch table 2 routine illustrated in FIG. 8B. Turning now specifically to the branch table 2 routine, it will be seen, that when this routine is entered as indicated by the circular flag 450, the first action conducted thereby is to get the status flags associated with the interrupt so that the nature of the interrupt may be analyzed. This action is indicated by the rectangle 451 and is initiated as the first step of this branch routine as is also the case for the majority of other branch routines to ensure the presence of an expected interrupt. Once the status flag associated with the interrupt is obtained in the manner indicated by the rectangle 451, it is tested through actions initiated by the functions associated with diamonds 452 and 453 to ascertain whether or not a timer interrupt is associated with a second or millisecond timer. This action is required, since Off Hook instructions associated with the dialing of the units of a given digit result in the setting of millisecond timers while Off Hook instructions defining different digits of a telephone number result in the setting, as shall be seen below, of a second timer so that an interval of 1 second wherein an Off Hook condition exists is established between the various digits of a telephone number.

Thus, as indicated by the diamond 452, the status flag associated with the interrupt is initially tested to ascertain whether or not it was generated at the expiration of a second timer and if affirmative test results are indicated, as indicated by the arrow 454 annotated Yes, register 0 is set with the address of facsimile input/output double word 3 which results in the issuance of an On Hook order and subsequently the SIO and On Hook command associated therewith are issued in the manner indicated by the rectangle 455. If the test of the flag conducted, as indicated by the diamond 452, is negative and indicates that the interrupt was not generated by a second timer, as indicated by the arrow 456 annotated No, the interrupt flag is again tested, in the manner indicated by the diamond 453, to ascertain whether or not the same resulted from the timing out of a millisecond timer. If the result of the test is affirmative, as indicated by the arrow 457 annotated Yes, register 0 is again set to the address of the facsimile input/output command double word 3 whereupon an On Hook instruction is issued in the manner indicated by the rectangle 455. However, if the result of the millisecond test conducted is also negative, as indicated by arrow 458, the same error condition and resetting of the interrupt as well as an advisory message to the computer operator described in association with branch table 1 for erroneous interrupt is initiated by the action indicated by the rectangle 459 and the circular flag 460. This action was described in conjunction with rectangle 414 and circular flag 415 illustrated in FIG. 8A and will not be here reiterated, it being appreciated by those of ordinary skill in the art that identical functions as there described are here initiated and results in a clearing of the interrupt and a saving of the contents of the tables established.

Once the On Hook instruction has been issued in the manner indicatd by the rectangle 455, a 60 millisecond timer is set in the manner indicated by rectangle 461, a branch table 3 entry is inserted into the branch table buffer as indicated by the rectangle 462 and a return to the main routine is initiated as indicated by the circular flag 463. The main routine will be entered and promptly exited from as device servicing has been completed while the facsimile controller means 10 will go On Hook and stay On Hook until this condition is subsequently changed to thereby achieve the first half cycle of the dialing associated with a unit of a digit in a telephone number. When the 60 millisecond timer set through the action indicated by the rectangle 461 times out, an interrupt will be generated whereupon the main routine described in conjunction with FIG. 7 is again entered. As processing through the main routine progresses in the manner described in conjunction with FIG. 7, branching will occur to branch table 3 as this entry was established in the branch table index due to the action indicated by the rectangle 462. Therefore, once the 60 millisecond timer times out, branch table 3 will be entered to achieve the Off Hook portion of the dialing cycle being discussed, it being appreciated that if the last unit of a digit was dialed an Off Hook condition established by branch table 3 will persist for 1 second while if an intermediary unit within a multi-unit digit is being dialed such Off Hook condition will only persist for 40 milliseconds.

A flow chart illustrating the operation of the branch table 3 program routine is illustrated in FIG. 8C and it will be appreciated by those of ordinary skill in the art that when this branch table is entered, processing will be initiated at the point indicated by the circular flag 465. The initial action which takes place in the branch table 3 routine illustrated in FIG. 8C is to get the interrupt flag associated with the interrupt which triggered the main routine, in the manner indicatd by rectangle 466 so that the same may be inspected to ascertain whether or not the interrupt derived from an expected condition which in this case results upon a timing out of the 60 millisecond timer set in branch table 2. Once the interrupt flag is obtained in the manner indicated by the rectangle 466, it is tested in the manner indicated by the diamond 467 to ascertain whether or not such interrupt resulted from a timing out of the millisecond timer. If the result of the test indicated by the diamond 467 is negative, as indicated by the arrow 468 annotated No, the branch table entry is saved and a return to the main routine is initiated through an error routine in precisely the same manner described in conjunction with rectangle 414 and circular flag 415 shown in FIG. 8a. This action is here indicated by the rectangle 469 and the circular flag 470. If however, the test conducted for a millisecond timer is affirmative, it may be assumed that triggering for branch table 3 occurred pursuant to a timing out of the 60 millisecond timer set in branch table 2 and hence that the action of branch table 3 is appropriate to the Off Hook dialing portion of a unit or digit. This condition is indicated by the arrow 471 annotated Yes.

Once a millisecond timer has been ascertained register 0 is set to the address of facsimile input/output command double word 2, which results in the issuance of an Off Hook order and this order is issued in the manner indicated by the rectangle 472. Since the result of the action indicated by the rectangle 472 is the issuance of an Off Hook order it will be appreciated by those of ordinary skill in the art that one unit of a digit has been dialed and accordingly, as indicated by the rectangle 473, the unit value of the digit stored in the DIGCNT buffer is decremented in the manner indicated by the rectangle 473.

Since the entry into the branch table 3 routine depicted in FIG. 8C was initialized in response to a timer interrupt associated with the 60 millisecond timer set in branch table 2 and since branch table 3 results in the issuance of an Off Hook order, it will be appreciated by those of ordinary skill in the art that the On Hook/Off Hook sequence established by the flip flopping of branch table routines 2 and 3 results in the dialing of one unit of a digit. This unit of a digit, however, may correspond merely to one unit of a digit in which case succeeding units of that digit must be dialed, it may correspond to the last unit of a digit in which case, interdigit timing appropriate to dialing is required and if such unit does correspond to the last unit of a digit, the digit thereby dialed may or may not correspond to a specialized digit within the telephone number such as a first digit 9 or alternatively may correspond to the last digit of the telephone number being dialed. Accordingly, any of these conditions if present must be ascertained within the routine illustrated in FIG. 3 so that an appropriate timer may be set to define interunit or interdigit intervals prior to a return to branch table 2 or if the last digit of a telephone number has been dialed, exiting from the flop flop sequence must occur in favor of an entry into a branch table associated with ready tone detection. These conditions are tested for and the appropriate action is taken by the remaining portions of the flow chart depicted in FIG. 3 prior to a return to the main routine.

More particularly, as indicated by the diamond 474, the value of the register DIGCNT or digit count which contains the value of the digit presently being operated upon and was just decremented, as indicated by the rectangle 473, is tested to ascertain whether or not the value reflected therein is equal to Zero. If such value is present, it will be seen that one digit of the telephone number being dialed has been completed by the action of branch table routines in issuing an Off Hook order. However, if the value of the DIGCNT or digit count register is not equal to Zero, it will be seen that only one unit value of the digit being operated upon has been completed and more flip flop cycles between branch table routines 2 and 3 are necessary to complete the total unit value of the digit presently being dialed. Therefore, assuming initially that the value tested in the digit count register is not equal to zero as indicated by the arrow 475 annotated No, a millisecond timer is set for 36 milliseconds, as indicated by the rectangle 476, to establish an appropriate interunit timing interval prior to the issuance of the next On Hook instruction by a cycling through branch table 2, the branch table index for the main routine is set for branch table 2, as indicated by the rectangle 477, and thereafter a return to the main routine is initiated as indicated by the circular flag 478.

Under these conditions, it will be appreciated by those of ordinary skill in the art, that the main routine will be re-entered and thereafter an exit therefrom will occur since device service has been completed. However, upon the expiration of the 36 millisecond timing interval established by the action indicated by rectangle 476, a millisecond timer interrupt will be generated, the main routine will be re-entered, and branching to branch table 2 will occur due to the action indicated by the rectangle 477. In this manner, each unit value of the digit value set in the digit count register of DIGCNT is dialed by a flip flopping between the routine illustrated for branch tables 2 and 3 wherein entry and exiting from each branch table routine occurs through the main routine and the main routine exits whenever a timer cycle is in process while the timing out of a timer previously set causes the main routine to be entered through an interrupt sequence. Thus, each unit of the value for the digit set in the digit count or DIGCNT register will be dialed through a flip flopping of branch tables 2 and 3 until the test indicated by the diamond 474 indicates that the value in the digit count or DIGCNT register is equal to zero.

When the value in the DIGCNT or digit count register is equal to Zero, as indicated by the arrow 480, the value of the DDD flag, as indicated by the diamond 481, is tested to ascertain whether or not the same has a zero value. This flag, it will be recalled from the discussion of FIG. 8A, is set for the first digit of the telephone number when the same is equal to a 9 and hence is associated with the acquisition of an outside line from an internal telephone network which requires, as aforesaid, a greater interdigit interval than ordinary digits in a telephone number. Thus, as will be recalled from a discussion of the diamond 440 and the rectangle 442 in branch table 1 illustrated in FIG. 8A, whenever the value of the first digit which is set into the digit count or DIGCNT register is a 9, the DDD flag is set. If the DDD flag is down, the test indicated by the diamond 481 will be affirmative and, as indicated by the arrow 482 annotated Yes, a normal interdigit timing interval of one second is set in the manner indicated by the rectangle 483. Therefore, as the test conducted by diamond 474 has indicated that the last unit of a digit has been dialed, while the test conducted by diamond 481 has indicated that this digit is not a 9 and the action indicated by the rectangle 483 has set an appropriate interdigit time interval before a return to branch table 2 for a dialing of a subsequent digit may be initiated, the value in the digit total or DIGTOT register is decremented by one in the manner indicated by the rectangle 484. The DIGTOT or digit total register, it will be recalled, was set with the total number of digits in the telephone number secured from the telephone table in the manner indicated by the rectangle 438 in FIG. 8A and hence the decrementing thereof after all units of the first digit or any subsequent digit have been dialed, as indicated by the test conducted by the diamond 474, is appropriate so that the DIGTOT register currently reflects the total number of digits which remain to be dialed in the telephone number being acted upon.

When, however, the test conducted by the diamond 481 is indicative that the DDD flag is not Zero and hence was set in recognition that the initial digit of the telephone number being dialed was a 9, in the manner indicated by the arrow 485 annotated No, a 3 second timer is set in the manner indicated by the square 486 to provide an appropriate interdigit interval between the 9 and the remaining digits constituting the actual telephone number to be dialed to ensure an acquisition of an outside line prior to the initiation of the dialing of the remaining digits in the telephone number. Thereafter, as indicated by the square 487, the DDD flag is cleared and the value in the DIGTOT register is decremented in the manner indicated by the rectangle 484. Thus it will be appreciated by those of ordinary skill in the art that whenever the test conducted by the diamond 474 is indicative that the last unit of a digit has been dialed, the digit is further tested as to whether or not it was a first digit having a value of 9. If such a first digit is present, a 3 second interval for the acquisition of an outside line is established and the flag is cleared while if no first digit 9 was present, a normal interdigit interval of one second is established and in either event, the value stored in the DIGTOT register is reduced to reflect the condition that one digit has been dialed by the last cycle through branch table 3.

Thereafter, as indicated by the diamond 488, the value stored in the digit total or DIGTOT register is tested to ascertain whether or not the same is equal to a zero. If the value stored in the DIGTOT register is equal to a zero, it will be seen that the entire telephone number has been dialed while if such value is not equal to a zero, as indicated by the arrow 489 annotated No, the digit whose value was just completed was not the last digit in the telephone number to be dialed and hence dialing of additional digits must be completed before the dialing sequence and flip flopping of branch tables 2 and 3 is terminated. Therefore, if the test indicated by the diamond 488 is negative, as indicated by the arrow 489 annotated No, the value of the next digit is obtained and set into the digit count or DIGCNT register in the manner indicated by the rectangle 490. The actual telephone number being dialed, it will be recalled, is stored in a buffer through the action indicated by the rectangle 437 in FIG. 8A and hence this value as pointed to by the current state of the DIGTOT register is obtained and employed to set an appropriate digit value into the digit count register in the manner required by the rectangle 490. Thereafter, as indicated by rectangle 477, a branch table 2 entry is established in the buffer for the main routine and the main routine is re-entered in the manner indicated by the circular flag 478.

When the main routine is re-entered, as will now be appreciated by those of ordinary skill in the art, an exit routine will occur because the service requested has been completed. Subsequently a clock interrupt will be generated whenever the 1 second or 3 second interval established by rectangle 483 or square 486 expires. This interrupt will initiate the main routine which in turn will branch back to branch table 2 due to the setting action indicated by rectangle 477 so that a new flip flopping cycle will be initiated for the next unit value of the next digit in the telephone number being dialed.

When the test of the value established in the DIGTOT register is indicative that all of the digits have been dialed, as indicated by the arrow 491 annotated Yes, a cycle count or CYCLCNT register is set to 25 in the manner indicated by the rectangle 492. The cycle count register is employed for the purpose of establishing a flip flopping interval between branch tables 4 and 5, in a manner to be seen below, so that listening intervals may be interleaved with an issuing of stop tone for the 30 second interval established, as described above, for the acquisition of ready tone indicating that a desired facsimile transceiver in a ready to receive condition has been contacted by the telephone link established through the dialing sequence. This cycle count register is decremented each time a flip flop cycle occurs and when the same has been fully decremented to zero, the 30 second interval arbitrarily established for the acquisition of ready tone will have expired. After the cycle count register is set to 25 in the manner indicated by rectangle 492, a line control flag is set in the manner indicated by the rectangle 493 to accommodate embodiments of this invention employing more than one facsimile controller means 10. More particularly, as will be readily appreciated by those of ordinary skill in the art, switched store and forward communications systems such as are disclosed in accordance with the instant invention may include more than one facsimile controller means 10 and it will be further appreciated that the real time mode of operation employed for the central switching means would allow each such facsimile controller means 10 to be actuated in a substantially simultaneous manner for most portions of the various cycles of operation required thereby. However, during dialing precise timing associated with the issuance of On Hook and Off Hook orders to a given facsimile controller means 10 is critical since excessive On Hook periods could result in hanging up while excessive Off Hook periods could result in confusion between interunit and interdigit dialing periods. For this reason, any time a dialing sequence is initiated in a multifacsimile controller configuration, all lines associated with controllers not being operated upon are set with a busy status control flag so that dialing sequences are not initiated at more than one facsimile controller at a time. Therefore, when the test conducted in response to the action indicated by diamond 488 is zero, a dialing sequence has been completed and hence the busy status associated with other controllers may be removed. This is the function achieved by the setting of a line control flag in the manner indicated by the rectangle 493. It will be appreciated, however, that in the instant embodiment of the invention only one line associated with a facsimile controller means is being employed and hence the action of this flag is not germaine.

After the line control flags are set in the manner indicated by the rectangle 493, the branch table register for the main routine is set to branch table 4 so that the next entry into the main routine will cause the ready tone detection interval to be initiated. Thereafter, the main routine is re-entered in the manner indicated by the circular flag 478. When the main routine is reentered, as will now be appreciated by those of ordinary skill in the art, an exit routine will be initiated due to the device done status thereof. However, when the time interval set by the second timer, which in this case would result from the action reflected by the rectangle 483 expires, an interrupt will be generated, the main routine will be entered and branching will initiate an entry into the branch table 4 routine due to the action indicated by the rectangle 494.

Thus it will be appreciated by those of ordinary skill in the art that the branch table 3 routine obtains control from a timer interrupt established by the On Hook action of branch table 2. If the controller's interrupt flag reflects something other than a timer interrupt, an error message is sent to the computer operator and control is returned to the main program. If the interrupt flag is valid, register zero is set to equal the input/output command double word address of the FAXIOCD 2 (DAA Off Hook) and control is passed to the start input/output subroutine whereupon the Off Hook order is issued. In addition, the unit value stored in the DIGCNT register, which contains the digit now being dialed, is decremented by 1. Should the value stored in the DIGCNT register not equal Zero, a timer is set for 36 milliseconds in the controller's time out table entry, the controller's branch table entry is set equal to 2 and control is returned to the main program. When DIGCNT is equal to zero, one digit of the telephone number has been completely issued. If the DDD flag is on, an outside telephone connection is required and a 3 second timer is set. Otherwise, an interdigit timing interval of 1 second is set in the controller 's time out entry. The value of the DIGTOT buffer, which reflects the total number of digits to be dialed is decremented by one and the resultant value present is ascertained. If the value of DIGTOT is not equal to zero, the next digit to be dialed is extracted from the buffer and placed in the DIGCNT register. The routine accomplishes this by linking to the appropriate subroutine ($S_1$), in the referenced Appendix B. The controller's branch table entry is set to equal 2 and control is passed back to the main program. When the value of the DIGTOT register equals zero, the complete telephone number has been dialed. The ready tone detection cycling interval is now readied through the use of a register referred to as cycle count of CYCLCNT which is employed, as shall be seen below, to count the number of ready tone detect cycles and this register is initialized to a count of 25. The branch table entry is then set to equal 4 to ready the branch table buffer for the next cycling of the main routine and control is returned to the main program. Thus, in this manner, branch tables 2 and 3 are flip flopped to achieve a dialing of any telephone number containing any number of digits through the issuance of appropriately timed On Hook and Off Hook orders and the flip flopping of branch tables 2 and 3 in a timed sequence accomplished by the setting of various timers and the generation of appropriate interrupts to re-enter the main routine upon the expiration of the timing intervals set.

Once the telephone number has been dialed, the ready tone detection interval is initiated, wherein listening periods having a predetermined interval are interleaved with the issuance of stop tone having a predetermined interval for approximately a 30 second period. If ready tone is not detected within this period of time, as was explained above, the facsimile controller means 10 is caused to hang up so that subsequent attempts through relieval routines may be initiated in an effort to successfully transmit the designated message. The first portion of the ready tone detection interval is controlled by the branching of the main routine into branch table 4 upon the expiration of the last timer set in branch table 3. Branch table 4 controls the listening interval during which ready tone may be detected and a flow chart illustrating the action which takes place during this routine is shown in FIG. 8D. Referring now to FIG. 8D, it will be seen that when branch table 4 is entered at the point indicated by the circular flag 495 annotated Start, the initial action of this routine, as was the case for previous branch table routines, is to get the status flags associated with the interrupt responsible for triggering it so that the same may be tested to ensure that this is an anticipated interrupt and does not derive from a malfunction or the like.

When the status flags associated with the interrupt are secured in the manner indicated by the rectangle 496, they are tested to assure that they derived from the timing out of an appropriate timer. Thus, if the interrupt was initiated as a result of the action taken by branch table 3, it will be seen that a 1 second timer will have originated the interrupt while if such an interrupt was generated in response to flip flopping between branch table routines 4 and 5, the interrupt will have resulted due to the timing out of a millisecond timer set during branch table 5, in a manner to be seen below. Therefore, as indicated by the diamond 497, the status flag associated with the interrupt is first tested to ascertain whether or not it was associated with a millisecond timer (one-fifth of a second) and if the result of the test conducted is affirmative, as indicated by the arrow 498 annotated Yes, register Zero, as indicated by the rectangle 499, is set with the address of the facsimile input/output command double word five which is responsible for issuing orders for enabling the ready tone detector means and uncoupling the modem in the manner described in conjunction with the order register illustrated in FIG. 3. However, if the results of the test conducted by the diamond 497 are negative, as indicated by the arrow 500 annotated No, and thereby indicate that an interrupt was not triggered in response to the timing out of a 1/5th second timer set during branch table 5, the status flags are next tested in the manner indicated by the diamond 501 to ascertain whether or not the interrupt was triggered as a result of the termination of the dialing sequence, due to the 1 second timer set under these conditions by branch table 3. If the result is negative, as indicated by the arrow 502 annotated No, the same resetting and error routine, here indicated by the rectangle 503 and the circular flag 504 is initiated as was discussed in conjunction with branch table 1 in association with the rectangle 414 and the circular flag 415 whereupon the computer operator is apprised of the error condition and the various programs in progress are maintained. However, if the test indicated by the diamond 501 is affirmative, as indicated by the arrow 505 annotated Yes, an enable ready tone detector order and an uncouple modem order are issued, in the manner indicated by the rectangle 499 as the interrupt which gained entry to branch table 4 has an appropriate origin.

After the enable ready tone detector order and the uncouple modem order have been set for issuance in the manner indicated by the rectangle 499, a half second timer is set in the manner indicated by the rectangle 505 to establish an appropriate duration for the listening interval established in the facsimile controller means 10 due to the action indicated by the rectangle 499. Thereafter, as indicated by the rectangle 506, the branch table buffer entry for the main routine is set to five and the main routine is re-entered in the manner indicated by the circular flag 507. As now will be appreciated by those of ordinary skill in the art, when the main routine is re-entered exiting therefrom will occur due to the service completed indication present. However, when the half second timer set by the action indicated by the rectangle 505 times out, an interrupt will be generated, the main routine will be re-entered, and subsequently, a branch operation to branch table 5, as set through the action indicated by rectangle 506, will occur. Thus, it will be seen that branch table 4 is entered upon the dialing of the full telephone number and this routine is primarily responsible for initiating the listening interval within the ready tone detection cycle described previously. The routine gains control through a timer interrupt flag which may have been set as a result of action taken in either branch table routines 3 or 5 and if the interrupt flag reflects something other than an appropriate timer interrupt, an error message is sent to the computer operator. When an appropriate timer interrupt flag is detected, the facsimile controller means 10 must begin to listen for ready tone from a destination facsimile device and hence initiate a listening interval within the ready tone detect cycle. This routine will issue orders to the facsimile controller means 10 to enable the ready tone detector means therein and uncouple the modem from the telephone line established. In addition, a one-half second timer is set and the branch table entry is changed to branch table 5 whereupon control is returned to the main program.

The portion of the ready tone detect cycle wherein stop tone is issued for one-fifth of a second intervals and each interval is interleaved with a listening interval established by branch table 4 is controlled by branch table 5 whose flow chart is illustrated in FIG. 8E. Referring now to FIG. 8E, it will be appreciated by those of ordinary skill in the art that the routine for branch table 5 will normally be entered as a result of the interrupt generated in response to the timing out of the half second timer established during branch table 4. When branch table 5 is entered as indicated by the circular flag 508, it first acts to set the status flags associated with the interrupt which triggered it, in the manner indicated by the rectangle 509, so that the nature of the interrupt may be checked to ensure that it originated from an expected source. In this case, the source of the interrupt may be the half second timer set in branch table 4 and this will be the normal case during the first few entries into branch table 5. However, as shall be seen below, an interrupt will also be generated which will give access to branch table 5 when ready tone is detected. Therefore, in actuality, the interrupt giving access through the main routine to branch table 5 could derive from an IO interrupt or a millisecond timing interrupt and each of these conditions must be ascertained and distinguished. Furthermore, it will be recalled that The ready tone detection sequence comprises listening intervals alternated with stop tone broadcasting intervals and that branch table 5, as shall be seen below, enable the second half or stop tone issuing interval of each cycle. Therefore, branch table 5 must also tend to the decrementing of the count in the cycle count register which was initially established at 25.

Once the status flag associated with the interrupt initiating entry into branch table 5 has been obtained in the manner indicated by rectangle 509, the status flag is tested, in the manner indicated by the diamond 510, to ascertain whether or not the same comprises an IO interrupt. As will be appreciated by those of ordinary skill in the art from the description of the order register depicted in FIG. 3, an IO interrupt will here be produced if ready tone is detected. Therefore, as indicated by the arrow 511 annotated Yes, if an IO interrupt is indicated, a branch action, as indicated by the circular flag 512 to branch table 6 immediately occurs. Entry into branch table 6 at point B indicated by the circular flag 512, will cause orders to be issued which initiate phasing and subsequent information transmission in a manner to be described below. If the result of the test represented by the diamond 510 is negative, as indicated by the arrow 513 annotated No, it will be apparent that ready tone has not been detected and the interrupt, if it derived from a proper source, is the result of the millisecond timer set in branch table 4. This means that the listening interval associated with branch table 4 should terminate. Therefore, if the result of the status flag test represented by diamond 510 is negative, as indicated by the arrow 513 annotated No, the status flag is then tested to ascertain whether or not the same derives from the timing out of a millisecond timer in the manner indicated by diamond 514. If the result of this test is negative, as indicated by the arrow 515 annotated No, an error sequence indicated by the rectangle 516 and the circular flag 517 is initiated in the same manner described in conjunction with the rectangle 503 and the circular flag 504 in FIG. 8D. However, if the result of this test is affirmative, as indicated by the arrow 518 annotated Yes, this is the second half of one interleaved cycle within the ready tone detect sequence and accordingly the count present in the cycle count or CYCLCNT register should be decremented in the manner indicated by the rectangle 519.

It will be recalled from the description of FIG. 8C that the CYCLCNT register was set to 25 by the action indicated by rectangle 492 in FIG. 8C when it was ascertained that the telephone number to the designated destination peripheral has been completely dialed and that the time interval defined by the 25 flip flop cycles between branch tables 4 and 5 will approximately equal the 30 second interval established for ready tone to be detected. Therefore, as entry into branch table 5 initiates the completion of one flip flop cycle, the decrementing of the cycle count register in the manner indicated by rectangle 519 is appropriate in that one cycle of the 25 cycles required for the 30 second interval established has been completed. After the cycle count register is decremented in the manner indicated by the rectangle 519, the value present in this register is tested to ascertain whether the same has been decremented to zero in the manner indicated by the diamond 520. If the count within the cycle count register is equal to zero, as will be appreciated by those or ordinary skill in the art, 25 flip flop cycles between branch tables 4 and 5 have been completed and hence the 30 second interval allowed for ready tone detection has expired. Therefore, as indicated by the arrow 521 annotated Yes, whenever the test indicated by the diamond 520 is affirmative immediate branching takes place to a different point in branch table 6, annotated C within the circular flag 522. This point of entry into branch table 6, as shall be seen below, in conjunction with FIG. 8G is appropriate to the timing out of the ready tone detection interval and causes a hang up sequence to be initiated as well as the setting of a relieval flag so that subsequent attempts may be made to transmit the message.

If the test indicated by diamond 520 is indicative that the cycle count is not equal to zero, as indicated by the arrow 523 annotated No, register 0 is set to the address of the facsimile input/output command double word 4, as indicated by the rectangle 524, which results in the issuance of a couple modem instruction to the facsimile controller means 10. It will be appreciated by those of ordinary skill in the art that in the interval being discussed, an open door interlock control level is synthesized at the facsimile controller means 10 and hence the facsimile chassis means 20 therein will cause stop tone to issue as soon as the couple modem instruction is received and decoded. Thereafter, as indicated by rectangle 525, a one-fifth second timer is set to thereby establish an appropriate interval for stop tone to be broadcast, the branch table entry, for the main routine is set to 4 as indicated by rectangle 526, and the main routine is re-entered in the manner indicated by the circular flag 527. When the main routine is re-entered, exiting therefrom will promptly occur since a device done status is reflected. However, when the one-fifth second timer times out, an interrupt will be generated thereby which will cause the main routine to be re-entered whereupon branch table 4 will be entered for a second cycle. Thus in this manner, flip flopping occurs between branch tables 4 and 5 and this will continue, as will be readily appreciated by those of ordinary skill in the art until ready tone is detected or the 30 second interval established for ready tone detection expires. If ready tone is detected, the test indicated by diamond 510 will be affirmative and branch table 6 entered at point B in the manner indicated by the oval flag 512. Conversely, if the 30 second timing interval established for the detection of ready tone times out in the manner indicated by diamond 520, branch table 6 will be entered at point C and a hang up routine in favor of subsequent relieval attempts will be initiated.

Thus, the responsibility of the branch table 5 routine illustrated in FIG. 8E is to send stop tone to control the ready tone detect cycle, to enable a proper response to the detection of ready tone and to enable an appropriate response to the timing out of the 30 second interval allowed for the detection of ready tone. Accordingly, it will be appreciated by those of ordinary skill in the art that the ready tone detection interval in which listening intervals having a duration of ½ second are interleaved with the broadcasting of stop tone for an interval of one-fifth second are controlled by the flop flopping of branch tables 4 and 5 through the conjoint action of interrupts generated in response to the timers set in the branch tables and the main program routine. In addition, branch table 5 acts to respond to the detection of ready tone to cause a branching operation through an appropriate point in branch table 6 as well as appropriately responding to the timing out of the ready tone detection interval by causing a secondary branch to another appropriate point within branch table 6.

Referring now to FIG. 8F, there is shown the portion of branch table 6 which is entered upon the detection of ready tone through a direct branch operation from branch table 5 when an input/output interrupt is detected by the test indicated by diamond 510 in FIG. 8E. It should be noted that both the B entry point to branch table 6 shown in FIG. 8F and the C entry point to branch table 6 illustrated in FIG. 8G are directly entered from a branch operation initiated in response to predetermined conditions in branch table 5 and hence no interrupt and entry through the main routine is initiated therefor. When the B portion of branch table 6, whose flow chart is illustrated in FIG. 8F, is entered at the point indicated by the circular flag 528 annotated B, this routine initially acts, as indicated by rectangle 529, to turn off the active timer and to set up a completion message to the computer operator at the central station. The ready tone detection listening interval, in this case, is being timed by the action of the one half second timer which was initially set in branch table 4 as indicated by rectangle 505. Therefore, as indicated by rectangle 529 the timer is reset so no interrupt will occur as ready tone has been detected under the conditions imposed for a branch operation to the B portion of branch table 6. In addition, as ready tone has been detected, communication to a defined destination peripheral in an appropriate condition to receive a facsimile communication is assured and hence a completion message to the computer operator in the form of a print-out indicating that the appropriately numbered message of the day has gone active and is complete at a given time is set up. Thereafter, as indicated by the rectangle 530, register 0 is set for facsimile input/output command double word 7 which causes the ready tone interrupt to be acknowledged and the issuance of a closed door interlock order in the manner discussed above. This means, as will be recalled, that as all other ready conditions within the facsimile chassis means 20 in the facsimile controller means 10 have been otherwise completed, the 15 second phasing interval will be automatically established thereby. Thereafter, as indicated by the rectangle 531, a register referred to as ESCANCNT which is devoted to the generation of 31 scan lines of white information to provide an appropriate top margin for the facsimile document information transmitted is set. Once the top of the page margin requirements have been set in the appropriate register in the manner indicated by the rectangle 531, a branch table entry to branch table 7 is established for the main routine in the manner indicated by rectangle 532 so that when the main routine is again re-entered branching to branch table 7 will occur. It should be here noted that re-entry to the main routine does not derive as a function of an exit routine from branch table 6, but instead branch table 6 causes entry into branch table 7 directly. However, as shall be seen below, as branch table 7 proceeds, the main routine is re-entered in such manner that if all the lines for the margin at the top of the page, as set in the manner indicated by the rectangle 531, have been completed, branch table 7 causes branching from the main routine to branch table 8; while, if such condition does not obtian a re-entry to branch table 7 will occur through the main routine due to the condition established by rectangle 532 in branch table 6 so that the completion of the top of the margin on each page may continue.

After the foregoing housekeeping functions have been completed, the byte address of the first data character in the header sector read and now stored in the facsimile message buffer 305, as shown in FIG. 5, is calculated in the manner indicated by the rectangle 533. As will be appreciated by those of ordinary skill in the art, the location of the first data character stored within the facsimile message buffer 305 will vary depending upon the nature of the initial information contained therein such as the length of the header or the like. Once this location is calculated in the manner indicated by the rectangle 533, this byte address is stored in an address register for the facsimile message buffer 305 in the manner indicated by the rectangle 534. Thereafter, as indicated by the rectangle 335, the first line of information is extracted from the facsimile message buffer 305 and inserted into the line buffer means 306, for instance, as shown in FIG. 5. Thus, as will be appreciated by those of ordinary skill in the art, the action indicated by the rectangle 535 acts to fill the first line buffer which will hereinafter be referred to as the current line buffer. When any of the line buffer means 306 or 307 are loaded from the facsimile buffer means 305, each character inserted is tested to ascertain whether or not it comprises an end of text (EOT) character. Once an end of text (EOT) character is detected, a flip flop is set to indicate that this character has been read. The condition of this flip flop is next tested as indicated by the diamond 536, and it will be appreciated by those of ordinary skill in the art that this action is appropriate each time a line buffer is filled to ascertain whether or not an end of text character (EOT) is present indicating that the complete message has now been processed or further loading of the line buffer from the facsimile message buffer 305 is necessary to pull the full message.

If the test conducted by the diamond 536 is affirmative, as indicated by the arrows 537 annotated Yes, a scan index register is set to 8 in the manner indicated by the rectangle 538. It will be appreciated by those of ordinary skill in the art from a recollection of the data translation relied upon within the instant invention, as described in conjunction with FIG. 5, that each line of message information loaded into one of the line buffer means 306 and 307 is digitally encoded through a 7×9 matrix encoding scheme into 7 line scans of facsimile information followed by two scan lines of white information which serves as interline spacing. Therefore, a scan line index is set to 8 and, as shall be seen in conjunction with branch table 8, this scan line index is immediately decremented so that the scan line buffer indication may be employed to ascertian which of the 7 scan lines for a given line of message information in EBCDIC is present for encoding purposes. Thus, although nine lines of facsimile scan line information are provided for each line of message information, the last two lines are white information associated with interline spacing which must be accommodated in facsimile modes of operation, as aforesaid, and hence the scan line index buffer set in the manner indicated by rectangle 538 acts to effect an appropriate seven scan line recordkeeping function.

If no end of text character (EOT) is detected by the test indicated by the diamond 536, as indicated by the arrows 539 annotated No, it will be appreciated by those of ordinary skill in the art that the end of the message was not loaded into the line buffer filled during the step indicated by rectangle 535. Therefore, under these circumstances, as indicated by the rectangle 540, line buffer filling is switched from the current line buffer means, assumed to be line buffer means 306 for the step indicated by rectangle 535, to the alternate line buffer means which in a consistent manner may here be assumed to be line buffer 307 as illustrated in FIG. 5 so that effective flip flop loading of the two line buffer means is accomplished. After the active line buffer designation is switched in the manner indicated by the rectangle 540 the second line of information is obtained from the facsimile message buffer 305 and loaded into the active line buffer means which is now the alternate line buffer, here assumed to be line buffer means 307. Therefore, under these conditions, two line buffer means are now full and the scan index is again set to 8 in the manner indicated by the rectangle 538.

Once the line buffer means have been filled in the manner discussed in conjunction with flow chart elements 535 – 538, another buffer is set to an allowable line count of 72 in the manner indicated by the rectangle 542. As will be appreciated by those of ordinary skill in the art from the descriptive materials set forth above, the instant invention prohibits the transmission of more than 72 lines of message information per independent facsimile transmission operation, i.e., that corresponding to a page which is transmitted in a single transaction, and hence, the buffer set in accordance with the step indicated by the rectangle 542 is employed to maintain a count of the number of lines of message information processed. Thereafter, as indicated by the circular flag 543 branch table 7 is directly entered at point A without sequencing through the main routine.

Accordingly, it will be seen that the portion of branch table 6 depicted in FIG. 8F acts in response to the detection of ready tone to acknowledge that ready tone has been detected when an IO interrupt is presented, to deactivate the ready tone timing means associated with the ready tone detection interval and to cause the facsimile controller means 10 to begin phasing. Once the 15 second phasing cycle has commenced, the routine will set up for data transmission. This is done by setting the ESCANCNT buffer for the top of page margin count equal to 31, calculating the byte address of the first message character in the facsimile message buffer means to be transmitted, setting the branch table entry for the main routine equal to 7, filling both line buffer means 306 and 307 if possible and setting the scan index to 8 as well as setting the maximum number of lines in the line count buffer to 72. Control is then transferred to the empty scan line controller routine designated branch table 7. However, prior to a discussion of branch table 7, the second portion of branch table 6, shown in FIG. 8G, devoted to the timing out of the timing interval will be briefly discussed.

Referring now to FIG. 8G there is shown a flow chart of the portion of branch table 6 entered whenever the cycle count test indicated by diamond 520 in branch table 5 is affirmative. This portion of the branch table 6 routine is devoted to intercepting an attempted transmission to a remotely located facsimile peripheral, hanging up, and the establishment of a relieval sequence. Accordingly, when the portion of branch table 6 illsutrated by the flow chart in FIG. 8G is directly entered from branch table 5 in the manner discussed above, it is entered at the point indicated by the circular flag 544 annotated C. As entry into this table is indicative that the cycle counter has run through 25 cycles without ready tone detection and hence the 30 second interval established for ready tone detection has terminated, this portion of branch table 6 acts immediately, as indicated by rectangle 545 to set register 0 to facsimile input/output double word A which is effective to issue an On Hook order and an Uncouple Modem order to the facsimile controller means 10. Thereafter, as indicated by the diamond 546, the relieval/retrieval flag is tested to determine whether or not the same has been set equal to a 1. If the result is affirmative, as indicated by the arrow 547 annotated Yes, it is indicative, as aforesaid, that a retrieval operation initiated at the behest of the computer operator was in process. Under these conditions, as indicated by the rectangle 548, a retrieval abort message is provided to the computer operator and thereafter as indicated by the circular flag 549 branch table 9 is directly entered at point A to achieve system resetting in a manner further described below.

If, however, the results of the test, indicated by diamond 546, are negative, as indicated by the arrow 550 annotated No, it is clear that the message transmission about to be intercepted is either a first attempt or a relieval operation, i.e., a secondary or greater attempt to transmit a designated message. Under these conditions, as indicated by the rectangle 551, an intercept advisory message is provided to the computer operator and thereafter the relieval information contained in the variable information table, i.e., table B, is obtained from the memory in the manner indicated by the rectangle 552; it being recalled that table B or the variable information table maintained for the terminal is updated each time an attempt at message transmission is intercepted so that the same may reflect various attempts to transmit the associated message to a defined destination peripheral. Once this information is obtained from table B, it is tested in the manner indicated by diamond 553 to ascertain whether or not the same is equal to a cleared condition or more particularly to ascertain if a first attempt at transmission was present or a subsequent attempt was conducted under the auspices of relieval techniques. If the intercept address is not cleared, as indicated by the arrow 554 annotated No, the relieval flag is tested to ascertain whether or not it is set to a 2 value to indicate a relieval condition. This test condition is indicated by the diamond 555 and if the results thereof are negative, as indicated by the arrow 556 annotated No, the relieval flag is immediately set to 2 as indicated by the rectangle 557 to indicate the appropriate relieval condition. Similarly, if the test indicated by diamonds 553 or 555 are affirmative, indicating that the attempt to broadcast the facsimile message was a first attempt or that the relieval flag was not set, respectively, the variable message table or table B in the output header is updated to reflect an intercept condition associated with the attempt to transmit the message in the manner indicated by rectangle 558. Thereafter, the relieval flag is set in the manner described in association with the rectangle 557. After the relieval flag is set in the manner indicated by rectangle 557, direct entry into branch table 9 at point B for the resetting functions provided therein is initiated in the manner indicated by the circular flag 559.

Thus, when cycle count times out and provides a zero indication, the message transmission is terminated by the issuance of On Hook and Uncouple Modem orders. In addition, the routine sets up the intercept message in the message buffer to inform the operator and before going to the clean up routine associated with branch table 9, the intercept status is checked for the destination peripheral. If the variable message table for the terminal reflects a RAD address in the intercept location, the current RAD address is stored in the intercept location and the relieval under way bit is cleared. If, however, the message was not under intercept, the message is put under intercept. Once these checks are made, the clean up routine associated with entry point B in branch table 9 is initiated.

Referring now to FIG. 8H there is shown a flow chart for branch table 7 and it will be recalled that this branch table is directly entered upon termination of the portion of branch table 6 illustrated in FIG. 8F. In essence, branch table 7, as illustrated by the flow chart depicted in FIG. 8H, is responsible for outputting white lines of information which are served for either the top of the page as margin or the interline spacing required intermediate each seven lines of facsimile information forwarded to the facsimile controller means 10. The number of lines of white information produced in response to the action of the flow chart illustrated in FIG. 8H will be a function of the setting of the register ESCANCNT or the empty scan count register, which, as will be seen below, is decremented by the control seized in the branch table 7 routine for each white scan line generated until the same has been decremented to zero. If it is assumed that ready tone was detected and the portion of branch table 6 depicted by the flow chart of FIG. 8F entered, it will be recalled that the branch table 7, illustrated in FIG. 8H is entered at point A after the ESCANCNT buffer has been set equal to 31 by the portion of the branch table 6 routine indicated by rectangle 531 while, as shall be seen hereinafter, when lines of facsimile information are being output under the control of branch table 8, the ESCANCNT register is set to 2 and branch table 7 is reentered at point A to provide two lines of white scan information to thereby provide appropriate interline spacing. However, once branch table 7 is entered and output operations associated with the production of one scan line of white information has occurred, subsequent re-entry for the production of succeeding scan lines of white information occurs in response to the generation of an interrupt and a branch operation through the main program routine. Under these conditions branch table 7 is entered at the point indicated by the circular flag 560 annotated Start. Regardless of the point of entry, the branch table 7 routine as shown in FIG. 8H acts to output all white scan line elements to the facsimile controller means 10 wherein the number of white scan lines provided is determined by the contents of the ESCANCNT register. The routine's responsibility is to output the white margin at the top of the page, the two white scan lines between message lines and eight white scan lines to indicate an empty message line. It is the calling routine's responsibility to put the controller's index into the $X_2$ register, the empty scan line count into the controller's entry to the ESCANCNT register, set the branch table to 7 and branch to entry point A in the flow chart illustrated for branch table 7. Entry point A sets the byte count of the input/output command double word pointed to by the current input/output command double table to 1. Since each scan buffer, i.e., scan line buffer means 311 or 312 as shown in FIG. 5, contains 56 bit positions of leading white space for the left hand margin and the facsimile controller means 10 always extends the last element over the full scan line, as aforesaid, this will cause a complete scan line of white to be transmitted by the facsimile controller means 10.

The count in the ESCANCNT register is decremented and if not equal to zero, the branch table returns to the main routine for subsequent re-entry while if a zero count is detected, branching to branch table 8 takes place for the actual outputting associated with lines of facsimile message information.

Referring now specifically to FIG. 8H, it will be seen that two entry points to the flow chart for branch table 7 are available, the first being indicated by the circular flag 560 annotated Start and the second being indicated by the circular flag 561 annotated A. These two points of entry differ in that the A entry point designated by the circular flag 561 is employed for direct entry into the flow chart illustrated in FIG. 8H as when branch table 7 is directly entered from the portion of branch table 6 illustrated in FIG. 8F or direct entry is achieved from branch table 8 in a manner to be described hereinafter. However, when branch table 7 is entered from the main routine, as occurs for successive entries after the first, the starting point indicated by the circular flag 560 is employed. When entry is achieved through a direct branching operation from another branch table such as branch table 6 or 8, the branch routine is entered at the location indicated by the circular flag 561, the address of the input/output command double word pointed to by the current input/output command double word table is obtained in the manner indicated by the rectangle 562, and the main portion of the flow chart illustrated in FIG. 8H is joined at point B.

Conversely, when branch table 7 is entered from the main routine at the Start point indicated by the circular flag 560, the first step of the program, as indicated by the rectangle 563, is to get the status flags associated with the triggering interrupt to ensure that the interrupt originates from an appropriate source in much the same way as was done for all other branch table routines wherein entry is achieved through an interrupt. Thereafter, as indicated by the diamond 564, the status flag is tested to ascertain whether or not it derives from an IO interrupt. An IO interrupt, as will be appreciated by those of ordinary skill in the art, would be expected each time a count done output is provided by the facsimile controller means 10 at the end of a line scan. If an IO interrupt is not detected by the testing operation indicated by the diamond 564, a branch operation to save the branch table entry is initiated and followed by an error routine, as indicated by rectangle 565 and circular flag 566 in precisely the same manner as was discussed for previous branch table routines triggered in response to an erroneous or unanticipated interrupt. However, if the test indicated by the diamond 564 produces an affirmative result, as indicated by the arrow 567 annotated Yes, the input/output command double word address pointed to by the alternate input/output command double word table is obtained in the manner indicated by the rectangle 568 and the main portion of the flow chart is joined at point B in the same manner as if entry took place from point A, indicated by the circular flag 561. Thus, it will be appreciated by those of ordinary skill in the art that when branch table 7 is entered directly through a branching operation the current address of the input/output command double word pointed to by the current input/output command double word table is obtained while if entry to branch table 7 is achieved through an interrupt, the origin of the interrupt is first checked and thereafter, the input/output command double word address pointed to by the alternate input/output command double word table is obtained so that the first time through branch table 7, the current input/output command double word table is employed while for the second time through as well as all succeeding times cycles, the alternate input/output command double word table is employed. It will be noted, however, that for interline spacing only two cycles through branch table 7 occur while for the top of the page margin, control thereby through repetitive processing employing the alternate input/output command double word table is relied upon.

After the address of the appropriate input/output command double word is obtained through the action indicated by rectangles 562 or 568, the byte count of the input/output command double word, as indicated by the rectangle 569, is set to in the manner indicated by the rectangle 569. Therefore, since each scan line buffer contains white information in the initial 56 bit positions thereof and the controller always extends the last element issued over the full scan line, as aforesaid, this will cause a complete scan line of white information to be issued by the facsimile controller means 10 to a remotely located receive mode peripheral employing facsimile equipment. Thereafter, as one scan line of white information appropriate for either margin or interline spacing has been outputted, the count maintained within the ESCANCNT buffer is decremented by one in the manner indicated by the rectangle 570. This register, as aforesaid, will have been set to a count of 31 if the top margin of a page is being acted upon or a count of 2 if interline spacing information is being output. After the count within the ESCANCNT buffer is decremented, the state of this register is tested, as indicated by the diamond 571 to ascertain whether or not the same is zero.

If a zero condition is not present, as indicated by the arrow 572 annotated No, the main routine will be entered as indicated by the circular flag 575. Subsequently exiting from the main routine will occur followed by re-entry and branching to branch table 7 in response to an input/output interrupt being generated to indicate that the processing of a complete scan line of white information has been completed by the facsimile controller means 10. However, if the count within the ESCANCNT buffer is zero, as indicated by the arrow 573 annotated Yes, the branch table for the main routine is set to 8, as indicated by the rectangle 574, and the main routine is again entered as indicated by the circular flag 575. This means that either the top margin is completed or appropriate interline spacing comprising two scan lines of white information, as aforesaid, have been completed and hence the main routine is entered, exited from and re-entered so that branch table 8 is entered therefrom when an input/output interrupt is generated in association with the processing of the last scan line of white information by the facsimile controller means 10. Thus it will be appreciated by those of ordinary skill in the art that the branch table 7 routine illustrated in FIG. 8H acts to cause single scan lines of white information to be processed by the facsimile controller means 10 by a forwarding of a single byte of white information thereto and the number of scan lines of white information processed thereby is controlled by the setting of the ESCANCNT buffer together with the decrementing thereof for each cycle through branch table 7. After the top margin information or the interline spacing required have been provided by branch table 7, actual processing of facsimile information is intiated through the operation of branch table 8.

Referring now to FIG. 8I, there is shown a flow chart which schematically represents the branch table 8 routine. The principal functions of branch table 8 are associated with the forwarding of facsimile converted message information to the facsimile controller means 10. More particularly, branch table 8 achieves the functions of setting the byte count in the input/output command double word for keeping track of which scan line is being processed when processing for a given message line is completed, it sets the empty scan line register ESCANCNT to 2. Thereafter a return to branch table 7 is initiated so that two white scan lines of information, here associated with interline spacing, may be output to the facsimile controller means 10. Branch table 8 is ordinarily entered from the main program routine when a byte count equals zero interrupt has occurred following the outputting of a scan line and it is timed to refill a scan line buffer with scan elements. The byte count equals zero interrupt signals the completion of the action initiated by the input/output command double word pointed to by the controller's entry into the current input/output command double word table. Therefore, the next input/output command double word in the command chain is pointed to by the alternate input-/output command double word table.

Upon entry, this routine expects a register to contain the controller's index to the tables and the scan line index table entry to contain the scan line count per line buffer defining the current scan line sent to the facsimile controller means 10 wherein a count of 8 to 1 may be present, 8 being the first empty scan of a line. The scan line index table entry is decremented and if equal to zero will indicate the message line is being completed, it being recalled that the scan line index table was initially set to 8 in the step of branch table 6 associated with rectangle 538 in FIG. 8F and hence the immediate decrementing thereof in association with the branch table is appropriate so that seven scan lines for a line of message information actually employed together with two lines of white information devoted to interline spacing. If the message line has not been completed, as indicated by a non-zero condition in the scan line index table, the count stored therein is employed to locate the address of the conversion table so that appropriate encoding will result. The current input/output command double word and the alternate input/output double word entries are switched to indicate the word address of the scan line buffer and the byte address of the message line buffer along with the address of the proper conversion table are passed to a packing routine (SCANCNV) which acts to pack and fill the scan line buffer. The routine then returns to the main program.

Additionally, if the line pointed to in the controller's entry in the current line table is completed and there are additional message lines to be outputted, a check is made to see if an end of sector was encountered while filling the line buffer pointed to by the line address table. If so, a finish the line routine (FINISHLN) is initiated before continuing further. The controller's entry to the current line and alternate line address tables are then switched. If the next message line will not exceed the 72 line limit established for a page of message information, a get the next line subroutine (GETLINE) is initiated to start filling the alternate line buffer. If the byte count of the current line is zero, as may be caused by a carriage return character, line feed character, or the combination thereof, the empty scan count buffer is set to 8 and the scan index is set to 1; however, for other conditions the empty scan count buffer is set to 2 to provide for the pair of white scan lines between characters and the scan index is reset to 8. The routine then sets the entry in the branch table buffer maintained for the main program to 7 and goes to entry point A thereof. When the last message line is sent, the byte count of the input/output command double word pointed to by the current input/output command double word table will be charged to 1 to ensure an all white byte is left in the controller's buffers so that the facsimile controller means 10 may continue outputting the same until a scan line is completed. The controller's entry in the timer table is set to 4 seconds, the branch table entry is set to 9 for the clean up routine and the routine returns to the main program. If there are ever more then 72 lines per message, the operator is apprised that an end of page was encountered before the end of message and normal last message line action is taken.

Referring now particularly to FIG. 8I, branch table 8 is entered at the point indicated by the circular flag 580 annotated Start, and it will be appreciated by those of ordinary skill in the art that entry to branch table 8 initially occurs through the main routine in response to an IO interrupt generated in association with the last all white scan line (ESCANCNT = 0) output by branch table 7. Once branch table 8 has been entered the routine initially acts to get the status flag associated with the interrupt causing entry thereinto in the manner indicated by rectangle 581 to ascertain whether or not such interrupt derives from an anticipated source, which in this case would be an IO interrupt indicating the end of an all white scan line, in the manner aforesaid. The status of the flag is tested to ascertain whether or not it comprises an IO interrupt in the manner indicated by diamond 582. If an IO interrupt is not detected, as indicated by the arrow 583 annotated No, the branch table entry is saved, as indicated by the rectangle 584, and an error routine, as indicated by the circular flag 585, is entered to initiate the same pause and announcement sequence previously mentioned in regard to all branch tables entered through an interrupt sequence. However, if the test indicated by the diamond 582 is affirmative to assure that an IO interrupt is in fact present, as indicated by the arrow 586 annotated Yes, the scan index buffer is immediately decremented in the manner indicated by the rectangle 587. The scan index buffer, it will be recalled from a review of the step indicated by the rectangle 538 in FIG. 8F, was originally initiated at a count of 8 even though only 7 scan lines of encoded information are provided for each line of message information. Therefore, the immediate decrementing of this register in the manner indicated by rectangle 587 will result in an appropriate count being maintained therein for the first and each subsequent scan line of each seven scan line sequence appropriate for the encoding of a line of message information into seven lines of digital information which are decodable into individual scan lines of information by the facsimile controller means 10.

Upon the decrementing of the scan line index, as indicated by the rectangle 587, the count of this register is tested to ascertain whether or not the same is equal to zero in the manner indicated by the diamond 588. If the test indicated by the diamond 588 is negative, as indicated by the arrow 589 annotated No, the active input/output command double word table, i.e., current scan or alternate scan, is switched as indicated by the rectangle 590 to indicate the byte address of the scan line buffer which is next to be filled. Thereafter, as indicated by the rectangle 591, the byte address of the next scan line buffer to be filled is obtained from the input/output command double word table so that the proper address for the conversion table may be obtained. This byte address, as indicated by the rectangle 592, is converted to a word address and incremented by 2 so that the first 56 bit positions thereof will not be filled but are retained in an all zero state to accommodate an all white left hand margin of 28 scan elements, as aforesaid. Thereafter, as indicated by the rectangle 593, the appropriate conversion table address for the scan line to be processed is obtained and then the byte address of the line buffer means, i.e., 306 or 307 in FIG. 5, is obtained in the manner indicated by the rectangle 594 so the program is apprised of which line buffer means is being used for filling purposes. Thereafter, the line information is converted to appropriate scan line information for the scan line being processed, in the manner indicated by rectangle 595, as a function of subroutine $S_4$, contained in the referenced Appendix B, so that the appropriate one of the scan line buffer means 311 or 312 in FIG. 5 may be packed. The main routine, as indicated by the circular flag 596 is then re-entered so that an exit routine may be initiated and upon the outputting of the entire scan line in process, an interrupt will be generated to return processing through the main routine to the branch table 8 routine illustrated in FIG. 8I.

If the just described portion of branch table 8, illustrated in FIG. 8I, is assumed to be associated with the first line of message information output after branch table 7 has completed its control of the facsimile controller means 10 for the 31 scan lines of white information serving as the top margin, it will be appreciated that this portion of the flow chart in FIG. 8 will be cycled through 7 times corresponding to seven facsimile scan lines for each line of message information loaded. Thus, until the test indicated by the diamond 588 results in an affirmative indication, the portion of branch table 8 associated with rectangles 590 – 595 will cause the filling in flip flop fashion of the scan line buffer means 311 and 312 with appropriately coded information representing scan elements corresponding to the seven scan lines necessary for the encoding of a line of message information. Furthermore, the active input/output command double word will be alternated so that information forwarded from the scan line buffers 311 and 312 will be flip flopped in such manner that seven scan lines of information are provided to the facsimile controller means 10 in sequence and as soon as information from one scan line buffer has been processed a new filling of that buffer with appropriately encoded scan line information for the scan line assigned thereto is initiated. However, after seven scan lines have been stuffed into the scan line buffer means 311 and 312 and are progressed through the alternation of appropriate input/output command double words, facsimile information for a given line of message information from one of the line buffers 306 and 307 will have been completed, branch table 7 should be returned to so that two lines of white interline information may be output and processing for the next message line of message information obtained from an alternate one of the line buffer means 306 and 307 should be initiated.

Upon the completion of processing of seven scan lines of information in the manner indicated by rectangles 590 – 595, the test indicated by the diamond 588 will be affirmative. Under these conditions, as indicated by the arrows 599, a given message line has been completed and two lines of white information appropriate for interline spacing must be provided. However, prior to implementing this function, certain other tests are performed to ascertain the nature of available data yet to be processed in the facsimile message buffer 305 and that loaded into the appropriate line buffer means 306 and 307. More particularly, as indicated by the arrow 599 annotated Yes, branch table 8, under these conditions branches and initially acts, as indicated by rectangle 600 to get the end of message flag or the end of text character associated with the message being processed.

Once the end of message flag is obtained as indicated by the rectangle 600, it is tested to ascertain whether or not more message lines remain for processing. This testing condition is indicated by the diamond 601. If an end of text condition is indicated by the test conducted, as indicated by the arrow 602 annotated Yes, the remaining byte count from the active line buffer is obtained, in the manner indicated by the rectangle 603, so that the number of bytes which remain in the line buffer and must be processed to complete processing of the message may be determined. Once the byte count is obtained in the manner indicated by the rectangle 603, the byte count obtained is tested in the manner indicated by diamond 604 to ascertain whether or not the same is zero.

If a byte count equals zero condition is indicated, a condition where both the end of message and all bytes of message information present in the line buffers have been processed is present and hence a hang up routine may be initiated; however, should the byte count not be equal to zero, continued processing of the remaining line of information in the alternate line buffer must take place until all bytes of message information loaded therein have been processed. Thus, as indicated by the arrow 605 annotated No and the circular flag 606 annotated 8A, processing of the remaining bytes in the remaining line buffer after an active end of message flag is detected is continued by the portion of the branch table 8 routine indicated by the second circular flag 607 annotated 8A which corresponds to the circular flag 606 and is vertically disposed below the diamond 601 and discussed below. However, if the byte count is equal to a zero, as indicated by the arrow 608 annotated Yes, it will be indicative that the line buffer whose contents were tested is not only associated with an end of text character but in addition thereto all bytes of information present in the message were loaded in this line buffer and have been processed. Under these conditions, white bytes must be loaded into the facsimile controller means 10 so that the same may be continued throughout the line being processed as well as for an additional two lines of information and then a hang up routine initiated. This is achieved, in the routine associated with branch table 8, by setting the byte count of the current input/output command double word to 2 in the manner indicated by the rectangle 609, setting a 4 second timer, as indicated by rectangle 611, to allow the two lines of white information which will result by the action indicated by the rectangle 609 to be processed as well as an appropriate interval for stop tone generation, and thereafter by setting the branch table buffer for the main routine to branch table 9 in the manner indicated by rectangle 611. Thereafter, as indicated by the circular flag 612, the main routine will be re-entered. The re-entry of the main routine will cuase, in the now familiar manner, an exit from the main routine until such time as an interrupt is generated by the four second timer set. Subsequently, the main routine will be re-entered and branching to branch 9 will occur due to the action of rectangle 611 to cause a hang up sequence in the manner described below. Thus it will be apparent to those of ordinary skill in the art that when the last scan line of a line of message information has been processed, as indicated by the arrow 599 annotated Yes, the end of message flag will be obtained to ascertain whether or not it has been set to indicate the presence of an end of text condition. If it has been set, the byte count from the remaining line buffer is obtained and tested in the manner indicated by rectangle 603 and diamond 604 to ascertain whether or not any bytes of information for that message remain to be processed. If all bytes of message information have not been processed, processing is continued in the manner indicated by circular flags 606 and 607. However, if all bytes of information have been processed, the byte count of the current input/output command double word is set to 2 so that two white lines of information will be output. A four second timer is set in the manner indicated by the rctangle 610 and the branch table for the main routine is set to branch table 9 so that upon the expiration of the timer an interrupt will be generated and cause the main routine to branch table 9 to thereby cause a hang up sequence to be initiated.

If the testing sequence indicated by the diamond 601 is negative, as indicated by the arrow 613 annotated No, it will be apparent that the end of message flag has not been set in response to a reading of this character from the facsimile message buffer 305 and hence additional lines of message information remain to be processed. Therefore, as there are more lines of message information to be processed, a check is made to ascertain if an end of sector (EOS) condition was encountered while filling the active line buffer or the line buffer pointed to by the line address table. This is accomplished by getting the end of sector flag associated with the line buffer in the manner indicated by the rectangle 614 and testing the same to ascertain whether or not the flag is set to a condition indicating that the last character in the RAD sector loaded into the facsimile message buffer 305 has been loaded in the manner indicated by the diamond 615. If the end of sector flag is set, as indicated by the arrow 616 annotated Yes, the RAD read flag is tested, in the manner indicated by the diamond 617, to ascertain whether or not a RAD read operation has been completed. From the description of FIG. 5, it will be recalled that each of the line buffers 306 and 307 is filled from the facsimile message buffer 305 and that the facsimile message buffer 305 is a 90 word buffer which holds an entire sector of RAD information. Therefore, it will be apparent that if an end of sector flag is set within one of the line buffers 306 or 307, the last message line from a previously loaded RAD sector will have been withdrawn from the facsimile message buffer 305 and hence, a new sector should have been loaded thereinto. Thus, should the RAD read complete test indicated by the diamond 617 be negative, as indicated by the arrow 618 annotated No, it will be apparent to those of ordinary skill in the art that an error has occurred in the reading of message information in the sector of the RAD. Accordingly, as indicated by the rectangle 619, a RAD error message is set up for output purposes to an operator and thereafter, the close out sequence of events indicated by the rectangles 609 – 611 and the return to the main routine indicated by the circular flag 612, all as previously discussed, is initiated so that the message information transmitted thus far is appropriately terminated and a clean up and hang up sequence of events are initiated.

However, if the RAD read complete test indicated by the diamond 617 is affirmative, as indicted by the arrow 602 annotated Yes, it will be apparent that any remaining portion of a line being output will have been loaded into the 90 word facsimile message buffer 305 from a succeeding RAD read operation, as aforesaid. For instance, as was discussed above, message information is logged on the RAD in 90 word sectors and when the last portion of a RAD sector is processed, an end of sector flag is set. However, when this flag is detected, it may not define a complete line of message information loaded in one of the line buffer means 306 or 307 as defined intermediate character return and/or line feed characters or the like. Therefore, the last loading of a line buffer may in fact not comprise a whole line as the terminal portion thereof may in fact be loaded on the next RAD sector linked thereto. Under these conditions, as indicated by the arrow 620 annotated Yes, and the rectangle 621, any remaining portion of the line which is present in the next RAD sector read is obtained and thereafter, as indicated by the rectangle 622, the active line buffer is switched to achieve the appropriate loading of the alternate line buffer means. Similarly, if an end of sector condition was not indicated by the test conducted in association with the diamond 615, as indicated by the arrow 623 annotated No, the active buffer is switched in the manner indicated by rectangle 622 to cause the active buffer being loaded to be alternated with that employed for the adjacent line and that from which processing is presently occurring. In similar manner, as indicated by the circular flags 606 and 607, whenever an end of message character is present in a line of information being processed, as indicated by the arrow 602, but all of the bytes for that line have not been processed, as indicated by the arrow 605 associated with diamond 604, entry into the branch table 8 routine is branched to the point indicated by the circular flag 607 so that the remaining number of bytes to be processed are loaded in an alternate line buffer due to the switching of the active buffer in the manner indicated by the rectangle 622.

Regardless of the mode of entry of line information associated with the program step indicated by the rectangle 622, i.e., normal message information not associated with an end of message or end of sector indication, addition line information red from a subsequent sector on the RAD, or additional byte information associated with the detection of an end of message or end of text condition; the active line buffer is alternated in the manner indicated by rectangle 622. Therefore, as a new line of information is loaded for processing purposes, the line count register is decremented by one in the manner indicated by the rectangle 624. The line count register was initialized to a count of 72, in conjunction with rectangle 542 of the portion of branch table 6 illustrated in FIG. 8F which is enabled subsequent to ready tone detection within the ready tone detection interval. Furthermore, it will be recalled that lines of message information for facsimile mode transmission are limited to 72 lines. This is normally accomplished for lengthy messages in facsimile mode header analysis so that, under ordinary circumstances, no facsimile message being output from the facsimile output queue would exceed 72 lines. However, this constraint is checked by the program to ensure that each message output in facsimile mode is limited to 72 lines of message information and therefore a line count buffer is initialized at 72 prior to the transmission of any facsimile information and each time a line of information is loaded into one of the line buffers 306 or 307 the count within the line count buffer is decremented in the manner indicated by the rectangle 624. Thereafter, as indicated by the diamond 625, the state of the count in the line count buffer is tested to ascertain whether or not the same is equal to a zero. If the test indicated by diamond 625 is affirmative, as indicated by the arrow 626 annotated Yes, a message is built for the computer operator indicating that the message is too long, in the manner indicated by the rectangle 627, and automatic message termination occurs in the manner indicated by rectangles 609 – 611 and the circular flag 612 so that, in effect, the computer operator is apprised that a message of excessive length is present, and the message is automatically truncated by the outputting of two white lines of information in the manner indicated by the rectangle 609 and the setting up of the hang up routine associated with branch table 9 in the manner indicated by the rectangle 611.

However, if the test of the line count indicated by the diamond 625 is not equal to zero, as indicated by the arrow 628 annotated No, the line information loaded is appropriate for processing. Therefore, the information present within the active line buffer is tested to ascertain whether valid message information is present therein or an empty line of information corresponding to spacing information for formatting or the like has been loaded. This is accomplished, by obtaining the byte count from the active line buffer in the manner indicated by rectangle 629, and testing the byte count condition obtained to ascertain whether or not the same is equal to zero in the manner indicated by the diamond 630. If the test indicated by the diamond 630 is affirmative, as indicated by the arrow 631 annotated yes, it will be apparent that a blank text line has been loaded for formatting purposes or the like. Therefore, a return to branch table 7 for the purposes of forwarding a number of white scan lines equal to the setting of the empty scan counter register (ESCANCNT) is appropriate.

This is accomplished, as indicated in FIG. 8I, by setting the ESCANCNT register equal to 8 in the manner indicated by the rectangle 632, setting the scan line index register equal to one in the manner indicated by the rectangle 633, and setting the branch table entry to 7 in the manner indicated by the rectangle 634 whereupon branch table 7 may be directly entered at the point of entry indicated by the circular flag 561 annotated A. The branch table buffer for the main routine is initialized to branch table 7 so that as branch table 7 is cycled a return to branch table 7 will occur through the main routine until such time as the ESCANCNT register has been decremented to zero. It should also be noted that although nine scan lines are normally utilized for a line of message information wherein the first seven of such lines, as aforesaid, are employed for actual encoded scan line information while the last two lines of information are utilized for white scan line information associated with interline spacing and the like, the empty scan count register is here only set to 8 in the manner indicated by the rectangle 632 so that for an empty line, only eight lines of white information will be output. This foreshortening for formatting purposes is not, however, noticeable as a blank line of message information is being outputted and represents a more efficient use of both the transmitting and receiving equipment employed in association with the instant invention. It should also be noted that the scan line index is set to one in the manner indicated by the rectangle 633 so that after branch table 7 has caused eight lines of white scan line information to be output and hence has decremented the ESCANCNT register to zero, branch table 8 will be re-entered and the one value established in the scan line index due to the action indicated by the rectangle 633 will be present so that when this scan line index is decremented prior to testing in the manner associated with rectangle 587 and diamond 588, an immediate branch for the next line will occur.

Should the test indicated by the diamond 530 result in a negative indication, as indicated by the arrow 635 annotated No, it will be apparent to those of ordinary skill in the art that message information has been loaded into the active buffer and is appropriate for processing. Further, as the decrementing of the scan line index to zero, as indicated by the arrow 599 in response to the test conducted by the diamond 588, may be assumed to have been associated with the outputting of seven lines of facsimile information representing a line of message information, the empty scan count register (ESCANCNT) is set to 2, as indicated by the rectangle 636, so that upon a return to branch table 7, two empty scan lines associated with the interline spacing may be provided.

Additionally, as indicated by the rectangle 637, the scan line index is reset to 8 so that when branch table 8 is again re-entered subsequent to the outputting of two white scan lines through the action of branch table 7, as aforesaid, the scan line index buffer will be set to an appropriate value for immediate decrementing followed by the outputting of seven scan lines of information. Thereafter, the branch table buffer for the main routine is set to 7 so that, as aforesaid, after branch table 7 has been initially entered at Point A for the outputting of a first all white scan line it will be re-entered from the main routine for the outputting of the second scan line. The branch table routine 8, as illustrated in FIG. 8I, then initializes a Get Line routine, as indicated by the rectangle 638, which acts to extract the next data line from the facsimile message buffer means 305. The Get Line routine is referenced subroutine $S_2$ in the aforementioned Appendix B program materials. After the Get Line subroutine is initiated, branch table 8 causes a re-entry into branch table 7 at Point A therein for the outputting of white scan lines of information in the manner there described. This is indicated in FIG. 8I by the appropriately annotated circular flag 639.

Thus it will be seen that branch table 8 obtains control as soon as the top margin is output by branch table 7 and acts to control the outputting of each of seven scan lines associated with a line of message information while keeping track of which scan line is being processed and decrementing the scan line index each time a given scan line has been completed. After seven scan lines corresponding to the information content of a message line have been output, branch table 8 acts to ascertain whether more line information is to be transmitted, if an end of sector condition is present, if the line count is appropriate for the issuance of more lines of message information in facsimile format and thereafter appropriately increments the empty scan line count register (ESCANCNT) for two scan lines of white information and returns control, for the purposes of outputting two white lines of scan information representing interline spacing, to branch table 7. Furthermore, each line of message information is inspected as to content and should it be ascertained that an empty message line has been presented for formatting purposes or the like, control is immediately transferred to branch table 7 for the outputting of eight scan lines of white information to accommodate the formatting information recorded. After an end of message condition has been detected and all bytes loaded into the line buffer have been processed, two scan lines of white information are output, a 4 second timer is initialized and the branch table entry for the main routine is set for branch table 9 whereupon the main routine is re-entered. This causes, in a manner which will now be apparent, an exit to occur from the main routine due to the device service condition established and upon the expiration of the interval established by the four second timer, the main routine will be re-entered through an interrupt whereupon a branch operation to branch table 9 for a close out and hang up sequence will occur.

Figure 8J:
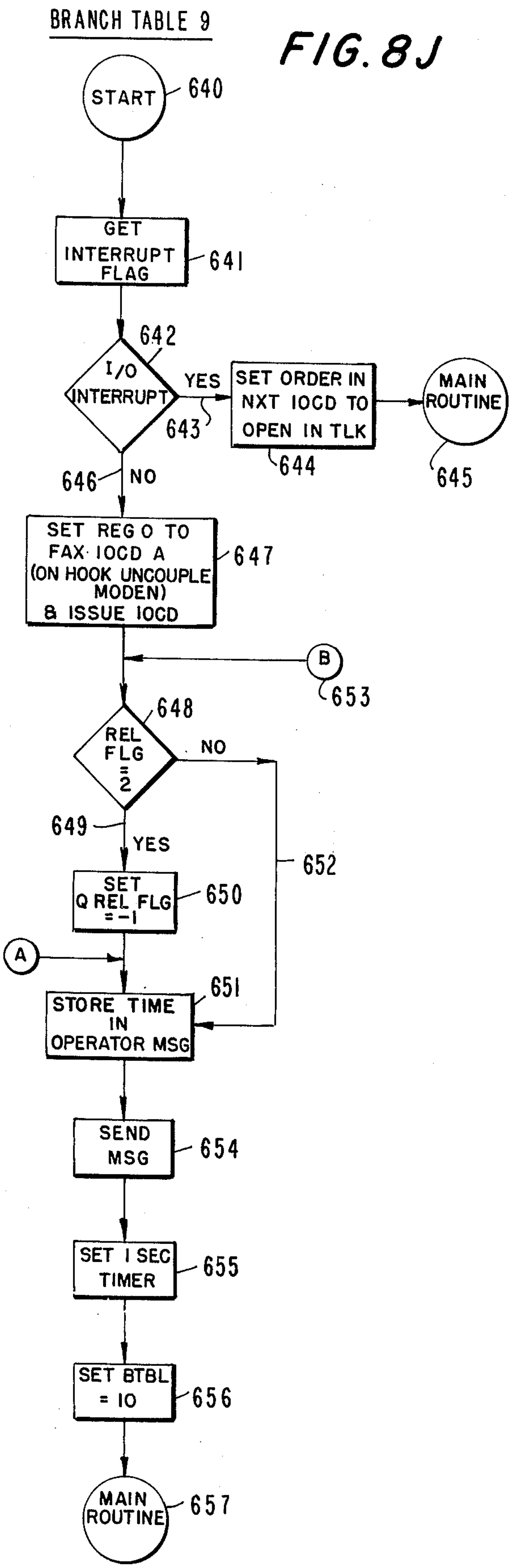
Figure 8I:
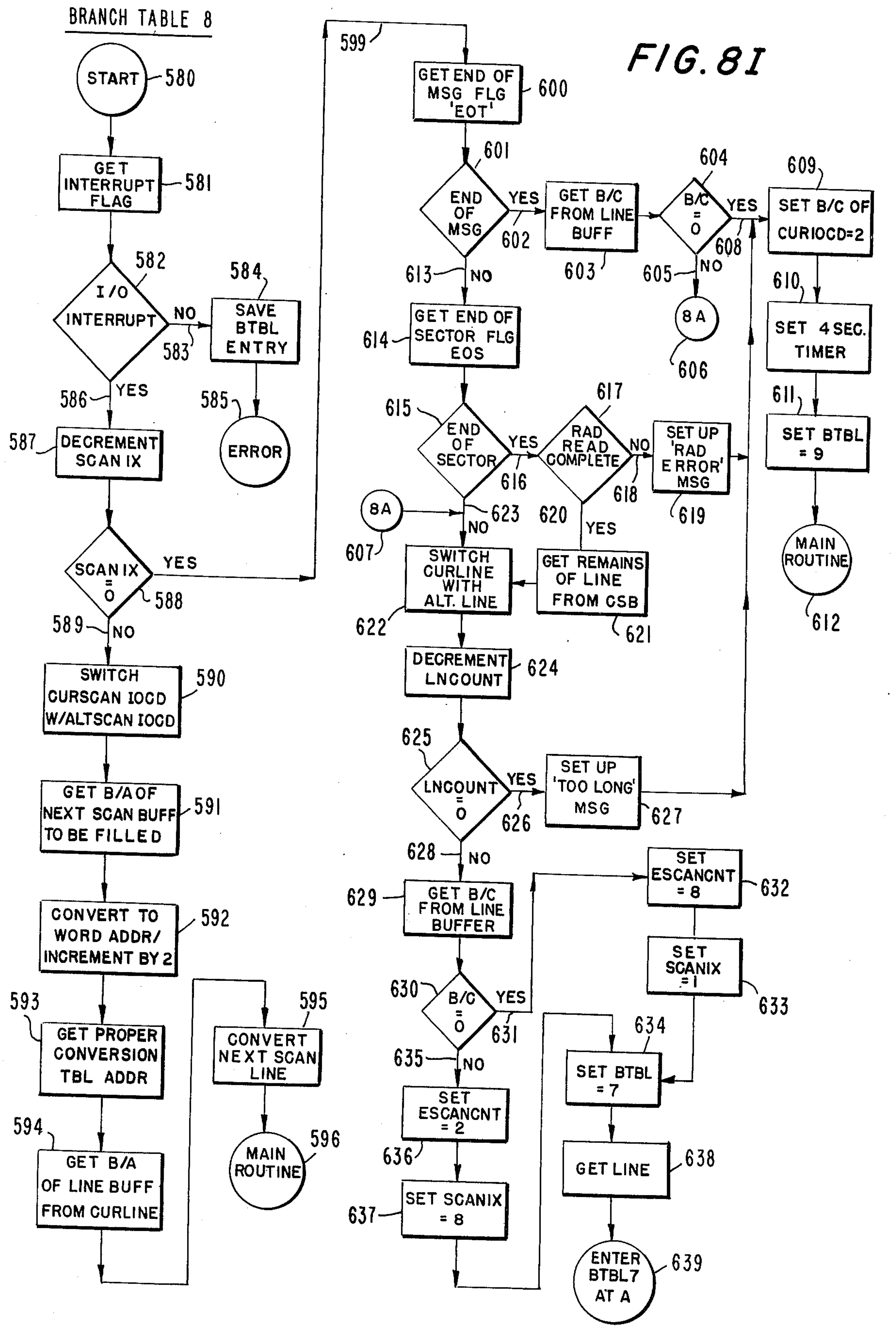

Referring now to FIG. 8J, there is shown a flow chart schematically representing the program steps of operation initiated under the control of branch table 9. This branch table, it will be recalled, is entered for a hang up and close out sequence each time message processing has been completed. The routine is responsible for terminating the transmission and informing the computer operator that the message was completed, intercepted, truncated or the like through the message previously built. The routine gains control when a timer or an IO interrupt goes off. If an IO interrupt is present, the alternate input/output command double word is changed to point to an open door interlock order and control is returned to the main program whereupon stop tone is generated. If a timer flag is present, the routine will terminate transmission by the issuance of an On Hook and an uncouple modem order sequence. Thereafter, branch table 10, not shown herein, is initiated. Upon return, the routine queues a request to send a message to the operator, the message being built, as mentioned above, during previous routines. In addition, the routine checks to see if the instant attempt at transmission is a relieval message or under intercept. If so, a request for relieval is made while if such is not the case, the message was not previously under intercept and relieval is not required.

Referring now to FIG. 8J, it will be seen that the branch table 9 routine is entered from the main routine at the point indicated by the circular flag 640 annotated Start. The first step of the branch table 9 routine, as indicated by the rectangle 641, is to get the status flags associated with the triggering interrupt, in the manner indicated by rectangle 641, so that the origin of the interrupt may be ascertained. Thereafter, as indicated by the diamond 642, the status flag is tested to ascertain whether an IO interrupt is present. In the case of branch table 9, it will be recalled that in a normal facsimile mode of processing, entry from branch table 8 will occur in response to the timing out of a 4 second timer set thereby in conjunction with block 610 and hence when this timer times out an interrupt will be generated to cause an entry to the main routine which has its branch table buffer set to branch table 9 due to the action in the terminal portion of branch table 8 associated with rectangle 611. However, as the terminal portion of branch table 8 associated with rectangles 609 – 611 is effective in terminating the flow of facsimile information to the facsimile controller means 10 and to set the branch table for the main routine to branch table 9 while returning to the main routine in the manner indicated by the circular flag 612, it will be appreciated by those of ordinary skill in the art that an interrupt will be generated by the facsimile controller means 10 when the last white line of information forwarded thereto has been forwarded. This interrupt will take the form of a byte count equal to zero interrupt which is, as will be appreciated by those of ordinary skill in the art, an IO interrupt employed to apprise the central switching means 1 that the facsimile controller means 10 has completed the processing of information forwarded thereto. Thus, anticipated interrupts causing entry into branch table 9 may take the form of an IO interrupt or a timer interrupt wherein the IO interrupt would be issued by the facsimile controller means at the completion of processing of the facsimile scan information forwarded thereto and hence would ordinarily be expected to precede the timer interrupt associated with the 4 second timer established at the terminal portion of branch table 8. Thus, both the expected interrupts causing entry to branch table 9 will occur at the completion of the forwarding of facsimile information to the facsimile controller means 10 as well as at the completion of processing of such information by the facsimile controller means 10 and hence branch table 9 is appropriately entered at the close out portion of the facsimile transmission operation.

As indicated by the diamond 642, the nature of the interrupt is initially tested to ascertain whether or not such an interrupt is an IO interrupt or another form of interrupt which would normally be expected to take the form of a timer interrupt generated at the termination of the four second interval established. If the results of the test indicated by the diamond 642 are affirmative, as indicated by the arrow 643 annotated Yes, the logic is assured that the interrupt causing entry into branch table 9 results from a byte count equals zero indication from the facsimile controller means 10. Therefore, as indicated by the rectangle 644, an order is set in the next input/output command double word to cause an open door interlock order to be issued to the facsimile controller means 10. Such an open door interlock order, when decoded at the facsimile controller means 10 will cause one of the ready conditions monitored thereby to go low whereupon stop tone will be automatically issued by the facsimile chassis means 20 due to a clamping of the modem therein to a stop tone level. Upon the issuance of the open door interlock order in the manner indicated by the rectangle 644, the main routine is re-entered in the manner indicated by the circular flag 645. Thereafter, as will now be appreciated by those of ordinary skill in the art, exiting from the main routine will occur pending the generation of an interrupt as a result of the clock timer set for the four second interval by the terminal portion of branch table 8 associated with rectangle 610. Thus, the action of branch table 9 thus far described is precipitated in response to a byte count equals zero interrupt generated by the facsimile controller means 10 after the last scan line of facsimile information forwarded thereto has been processed and it will be appreciated that the issuance of an open door interlock order thereto in the manner indicated by the rectangle 644 will cause the facsimile controller means 10 to issue stop tone on the line and such stop tone will be continuously issued by the facsimile controller means 10 until such time as the modem thereof is uncoupled and/or the telephone link previously established is terminated. It will also be appreciated that the issuance of stop tone by the facsimile controller means 10 will be detected at the receiving site, and cause the operation of the receive mode transceiver to terminate and an audible signal to be issued to the operator thereof advising that the facsimile transmission has been completed.

When the 4 second timer set at the terminal portion of branch table 8 times out, a new interrupt will be generated and since the branch table of the main routine is set to branch table 9, branch table 9 will be re-entered in the manner aforesaid. Under these conditions, the test indicated by the diamond 642 will be negative as the status flags associated with the interrupt would be indicative that a timer interrupt was present rather than an IO interrupt. Therefore, as indicated by the arrow 646 annotated No, and rectangle 647, register 0 is set to facsimile input/output command double word A which causes, as aforesaid, an On Hook order and an uncouple modem order to be issued to the facsimile controller means 10 when the IO routine for this command double word is entered. When the facsimile controller means 10 receives the On Hook and uncouple modem orders, the broadcasting of stop tone as well as the telephone link established to the remotely contacted peripheral employing facsimile equipment is terminated so that as far as the facsimile controller means 10 is concerned, its operative role has been completed.

Thereafter, as part of a general housekeeping scheme, branch table 9 acts to test the status of the relieval flag in the manner indicated by the diamond 648 to ascertain whether or not the same is set equal to a 2. A 2 indication is set for a relieval flag, as aforesaid, and is indicative that a message is under intercept or that this was a relieval operation. Therefore, whenever an affirmative result obtains from the test indicated by diamond 648, as indicated by the arrow 649 annotated Yes, the queue relieval flat is set to −1 in the manner indicated by the rectangle 650 to effectively queue a request for the relieval of any other messages which may be under intercept for the terminal to which a facsimile communication has just terminated. Thereafter, as indicated by the rectangle 651, the time is set in a message for the computer operator so the time out on the operation will be indicated.

If the test indicated by the diamond 648 is negative to thereby indicate that the instant attempt at transmission is not a relieval message under intercept, further relieval operations for that terminal need not be required. Therefore, program routine in process moves directly to the step indicated by the rectangle 651 in the manner indicated by arrow 652. Additionally, the portion of the branch table 9 routine initiated by the diamond 648 forms a part of the general clean up and close out routine which is entered when a message is placed under intercept and hence entry at this point, as indicated by the oval glag 653, will occur when messages are placed under intercept as for instance when ready tone is not detected within the 30 second interval established. Thus, for instance, the portion of branch table 6 illustrated in FIG. 8D branches directly to this entry point in branch table 9.

After the time is stored in the message in the manner indicated by the rectangle 651, the message formed is sent to the computer operator in the manner indicated by the rectangle 654. Thereafter, as indicated by the rectangle 655, a 1 second timer is set to allow the On Hook order to become effective at the facsimile controller means 10 and the branch table buffer for the main routine is set to 10 in the manner indicated by rectangle 656. A flow chart for branch table 10 has not been illustrated herein; however, a full appreciation thereof is readily available by way of reference to Appendix B, supra. Here, however it is sufficient to appreciate that this routine re-initializes all flags, address pointers and input/output command double words for the facsimile controller means 10 which has just completed the hardware reinitializing. Clean up action includes setting both alternating input/output command double words to order code Couple Modem, setting the entry in the alternate input/output command double word to the record. Also the peripheral status flag for the facsimile controller means 10 is set to zero indicating a not busy status, the branch table entry is set to zero, the end of text register is cleared, line count is set to 72 and the entry in the end of sector table is made zero.

After a branch table 10 entry is set in the buffer for the main routine, the main routine is re-entered as indicated by the circular flag 657 and through an exit routine, branch table 10 is entered, the housekeeping functions achieved thereby are completed and subsequently, the main routine is entered and exited from whereupon new cycles of operation may be initiated.

Accordingly, it will be appreciated by those of ordinary skill in the art that in normal modes of operation, branch table 9 as illustrated in FIG. 8H is entered through an IO interrupt when the facsimile controller means 10 has completed processing the last byte of facsimile information forwarded thereto. Entry under these circumstances causes an open door interlock order to be issued to the facsimile controller means 10 whereupon stop tone is generated. Subsequently, after a four second timer has timed out, branch table 9 is again re-entered. However, this time the status associated with the timer interrupt causes On Hook and Uncouple Modem orders to be issued to the facsimile controller means 10. Thereafter, the relieval status of the message just processed is checked and if that message was placed under intercept, relieval operations for the terminal to which transmission had just terminated are queued. Finally, clean up operations are initiated in the terminal portions of branch routine 9 whereupon an exiting from the routine occurs and subsequently the facsimile mode of transmission under discussion is terminated after appropriate software has been re-initialized.

CONCLUSION

The switched store and forward communications system according to the instant invention provides a highly versatile communications system wherein any of a plurality of teleprinter or teletypewriter peripherals may be given access to the system and input information thereto destined for one or more peripherals which may take the form of teleprinter or teletypewriter peripherals or facsimile peripherals which are contacted through public and/or private telephone communications links on a selective basis. The input information from a transmitting peripheral is stored under the control of a central switching system which acts to inspect the destination information associated therewith and log acceptable information on a high speed storage device. Therafter, the information logged is arranged in output queues for transmission to a designated peripheral. Due to the store and forward nature of the system as a whole, should subsequent transmission be requested or necessitated due to a present unavailability of a destination peripheral, such information is maintained in an available state for subsequent transmission attempts through the relieval and retrieval techniques set forth herein.

If a destination peripheral employing facsimile equipment is designated, facsimile controller means in accordance with the present invention is enabled and destination information associated with the facsimile peripheral defined is provided thereto in the form of orders appropriate to enable a dialing function at said facsimile controller means. In response to this destination information, telephone communication to the defined facsimile peripheral is initiated by said facsimile controller means and an indication is provided thereby to the central switching system when a communication link to the defined facsimile peripheral has been established and the defined facsimile peripheral is in a ready condition to receive facsimile information. A phasing relationship is then enabled and phasing information is exchanged between said facsimile controller means and the defined facsimile peripheral. Thereafter stored information destined for the facsimile peripheral defined is transformed into a digital signal capable of being decoded into a baseband signal and is applied to said facsimile controller means. The digital signals applied to the facsimile controller means are decoded into an analog baseband signal which is then transformed into a suitable facsimile format and transmitted to said defined facsimile peripheral over the telephone link established. Upon transmission of all the stored information for said defined facsimile peripheral, the communication link established is terminated and the software and hardware are reinitialized for subsequent operation.

In the instant invention, message information input to the system is accepted in a digital format and forwarded either in the digital format received or in a decodable facsimile format depending upon whether the designated destination peripheral defined is a facsimile location or a digital location. More particularly, in the exemplary embodiment of the invention disclosed, TTY peripherals in the form of teleprinter or teletypewriter stations serve to transmit and receive message information in the form of an 8 bit ASCII code commonly used by peripherals of this type. When this information is received within the central switching means it is transformed into an EBCDIC format for processing purposes. For destination peripherals employing teleprinter or teletypewriter apparatus, the message information is transformed into an 8 bit ASCII code acceptable thereto prior to transmission; however, when a destination peripheral employing facsimile equipment is defined, the message information stored in an EBCDIC format is software encoded into a digital representation of an analog baseband signal prior to forwarding so that the same may be decoded by the facsimile controller means into an analog baseband signal which may be directly applied as a synthesized scanner output to the modulator section of the facsimile electronics employed therein. This mode of data translation is highly advantageous because the TTY equipments employed may receive and transmit message information directly in the code format acceptable thereto, the facsimile controller means processes a digital signal which is decodable into an analog baseband signal which in turn may be applied directly to the modem of facsimile equipment employing any of the well known modulating techniques while the internal processing of the message information in an EBCDIC format allows other peripherals to be connected within the instant invention and directly receive message information in a format most suitable thereto. However, it will be appreciated by those of ordinary skill in the art that the various modes of data translation set forth herein could be readily modified to meet the needs of less general applications. For instance, message information could be processed within the central switching means in an 8 bit ASCII code format so that data conversion to and from an EBCDIC code representation is avoided and message decoding into a suitable facsimile format could be accomplished by hardware which is directly associated with the facsimile controller means 10 or perhaps each destination peripheral employing facsimile equipment. Furthermore, should a system be designed which is to accommodate only one form of facsimile transmission on a long term basis, the provision of message information in a format decodable into an analog baseband signal may be modified in favor of an information format which is directly decodable into a designated modulated signal or otherwise a selected digital format for facsimile purposes could be elected.

The controller apparatus provided in accordance with the instant invention allows the exemplary switched store and forward communications system set forth to transmit message information to facsimile equipment present at designated receive only peripherals. Thus, the controller apparatus acts to accept destination information and message information from the switched store and forward communications system and responds to the destination information provided to establish a communication relationship with a designated facsimile peripheral. After said communications relationship has been established, it acts to convert message information forwarded thereto into a facsimile format, transmits said message information in a facsimile format to said designated facsimile peripheral and thereafter acts to terminate said communications relationship. The controller apparatus provided is responsive to the switched communications system for accepting control information and message information from a switching system and for responding to said control information to establish a communications link to a designated facsimile peripheral, to indicate when said communications link has been established and to issue identification information to said designated facsimile peripheral. Thereafter, message information is converted into a facsimile format, transmitted in a facsimile format to the designated facsimile peripheral and the communications link established is subsequently terminated. Although the exemplary embodiment of the facsimile controller means set forth herein has been described in great detail to provide a reader with a full appreciation of exemplary structure, function and operative relationship within the communications system set forth; it will be appreciated by those of ordinary skill in the art that many modifications and variations in the exemplary embodiment may be achieved without the exercise of invention. For instance, the controller apparatus set forth herein has been configured, to a large degree, to interface with the switched store and forward communications system through specialized communication controller means here represented by the facsimile subcontroller means 8 and the facsimile subcontroller means 8 was in turn selected on the basis of its compatibility with a central switching means 1 in the form of a Sigma Computer system. Therefore, it will be appreciated by those of ordinary skill in the art that should other forms of central switching systems be employed, the facsimile subcontroller means 8 would take other forms and hence the structural configuration of the facsimile controller means 10 would be modified to suit the structural requirements and input/output modes of the switching system elected and the facsimile subcontroller means 8 used in conjunction therewith. Furthermore, the mode of organization and structure employed within the facsimile controller means 10 disclosed in specie herein was selected on the basis of an exemplary embodiment which exhibits substantial flexibility and efficiency. Therefore, On Hook and Off Hook dialing techniques through a data access arrangement were employed instead of dialing apparatus which is responsive to dialing codes provided under software control and the presence of a contacted facsimile peripheral in a ready condition is relied upon to indicate both the successful establishment of a communications link and the ready condition of a receive mode transceiver. However, it will be appreciated by those of ordinary skill in the art that busy signal detection circuitry, answer code detection networks and ready tone detection apparatus could be separately incorporated into the controller means according to the instant invention without any deviation from the inventive concepts set forth herein if any or all of the combined detection sequences employed herein were desired to be separately implemented. Furthermore, it will be appreciated that the various techniques for decoding digital information which is representative of facsimile scan information, as set forth herein, is to a large degree, a function of the encoding techniques selected and hence could be modified should other encoding formats be chosen. In addition, the switched store and forward communications system according to the instant invention was disclosed, in regard to its facsimile output functions, as a single port, single device system and it will be readily appreciated by those of ordinary skill in the art that both multiport and multidevice implementations of the instant invention are readily available.

The software controlled switching apparatus for the switched communications system according to the instant invention, as set forth herein, is active, as now will be apparent to those of ordinary skill in the art, to ascertain when a designated destination peripheral comprises facsimile apparatus and whenever such a designated destination peripheral is ascertained to transform message information designated therefor into a digital code which is decodable into an analog baseband signal. Therefore, the exemplary program materials set forth in conjunction with the disclosure of the switched store and forward communications system set forth herein acts initially to recognize message information destined for a facsimile peripheral, to enable the facsimile controller apparatus whenever such recognition occurs, to issue destination information to said facsimile controller means to cause a communications link to be established and thereafter issues message information to said facsimile controller means for appropriate transmission. This information is developed, under software control once message information in a format acceptable to peripheral equipment employing teleprinter or teletypewriter apparatus has been received and identified as being destined for a peripheral employing facsimile equipment. However, as will be readily appreciated by those of ordinary skill in the art, the exemplary program material set forth herein functions, to a large degree, to provide input, control, order and data information in a form and a sequence required by the specific subcontroller, controller, and facsimile equipment selected and hence may be readily varied in a manner well known to those of ordinary skill in the art should alternate equipment be selected. Similarly, the nature of the program routines set forth turns to a substantial degree on the nature of the central switching equipment selected and has been organized, to a large degree, to be supplemental in format to the program sequences required for the operation of a switched store and forward teleprinter or teletypewriter communications system. Therefore, should any of these design considerations or parameters be modified, such program materials would also be modified, in the manner well known to those of ordinary skill in the art, and such modifications could be implemented without the exercise of inventive skill.

While the invention has been described in connection with an exemplary embodiment thereof, it will be understood that many modifications thereof will be readily apparent to those of ordinary skill in the art; and that this specification is intended to cover any adaptations or variations thereof. Therefore, it is manifestly intended that this invention be only limited by the claims and the equivalents thereof.

What is claimed is:

1. Information translating apparatus comprising:

means for receiving input message information in an ASCII code format; and means for selectively translating said input message information into a digital code format representative of a dot matrix encoding of said input message information, said digital code being decodable into a synthesized analog baseband signal.

2. The information translating apparatus according to claim 1 wherein said means for selectively translating input message information into a digital code format representative of a dot matrix encoding of said input message information comprises:

means for separating said input message information into lines of message information;

means for performing a dot matrix encoding of each line of message information into a digital code; and means for selectively forwarding portions of the resulting digital code so that the same may be decoded into a synthesized analog baseband signal.

3. The information translating apparatus according to claim 2 wherein said means for selectively forwarding acts on a demand basis to forward portions of said resulting digital code as said portions are requested by a facsimile decoding and transmitting device.

4. The information translating apparatus according to claim 3 wherein said means for performing dot matrix encoding of each line of message information into a digital code comprises means for dividing each line of input message information representing a line of alphanumeric character information into a plurality of lines of raster scan information and means for developing a digital signal representing the dot matrix code equivalents for each line of raster scan information for said line of alphanumeric character information.

5. The information translating apparatus according to claim 4 wherein at least one of said plurality of lines of raster scan information is representative of spacing information.

6. Information translating apparatus comprising:

means for receiving input information in a format acceptable to teleprinter means, said input information including message information to be conveyed and destination information defining the locations of peripherals to which said message information is to be conveyed; and means for selectively translating said message into a digital code format representative of a matrix encoding of said message information, said digital code being decodable into a synthesized analog baseband signal.

7. The information translating apparatus according to claim 6 additionally comprising means for analyzing said destination information present in information received and for enabling said means for selectively translating whenever said defined location includes a peripheral having a requirement for an information format derivable from a synthesized analog baseband signal.

8. The information translating apparatus according to claim 7 wherein said means for analyzing additionally includes means for limiting message information present in an individual message to a predetermined number of lines of message information.

9. The information translating apparatus according to claim 8 wherein said means for analyzing acts to form an additional message for the same destination whenever message information associated with an individual message exceeds said predetermined number of lines, said additional message comprising lines of message information exceeding said predetermined number of lines and each additional message formed also being limited to said predetermined number of lines by said means for analyzing.

10. The information translating apparatus according to claim 7 wherein said means for receiving includes information storage means, said input information being written on said information storage means for storage and subsequent forwarding.

11. The information translating apparatus according to claim 10 wherein said information storage means includes designated storage locations, each storage location accepting a predetermined number of units of information for storage purposes, said means for receiving input information accumulating input information as the same is received and upon receipt of said predetermined number of units of information, causing the same to be written in a designated storage location.

12. The information translating apparatus according to claim 11 wherein all destination information associated with a given message is initially written within a single storage location with sufficient message information to fill said storage location, said means for analyzing causing said signal storage location to be read and writing information in individual storage locations for each destination location defined by the destination information associated with said given message, each individual storage location written by said means for analyzing including said sufficient message information originally written in said single storage location and destination information defining only a single location of a destination peripheral.

13. The information translating apparatus according to claim 12 wherein each individual storage location written by said means for analyzing additionally includes information cross linking that location to other locations containing additional message information whereupon message queues are formed for each destination peripheral specified in the input information received and information cross linking that location to other locations containing destination information defining other peripheral locations whereupon an output queue is formed for input message information received.

14. The information translating apparatus according to claim 7 wherein means for selectively translating said message into a digital code format representative of a matrix encoding of said message information comprises:

first, second and third buffer means;

means for loading a predetermined number of units of received message information into said first buffer means;

means for reading message information corresponding to lines of alphanumeric character information in sequence from said first buffer means and loading each line read in sequence into said second buffer means;

means for performing a dot matrix encoding employing a plurality of raster scan lines for message information loaded in said second buffer means and providing digitally coded signals representing each raster line scan produced;

means for loading in sequence digitally coded signals representing a given raster line scan of said plurality of raster line scans of message information loaded in said second buffer means into said third buffer means; and means for selectively forwarding portions of said digitally coded signals loaded into said third buffer means so that the same may be decoded into a synthesized analog baseband signal.

15. The information translating apparatus according to claim 14 wherein said means for reading message information corresponding to lines of alphanumeric character information in sequence from said first buffer means additionally acts to limit the number of alphanumeric characters read for a line of alphanumeric character information to a predetermined number of characters and information in a given line of alphanumeric character information exceeding said predetermined number of characters being treated as a second line of alphanumeric character information.

16. The information translating apparatus according to claim 14 wherein said means for loading in sequence digitally coded signals representing a given raster line scan of said plurality of raster line scans of message information additionally acts to keep track of which raster line scan of said plurality has been loaded as digitally coded signals into said third buffer means and when digitally coded signals representing the last raster line scan of said plurality have been loaded into said third buffer means to cause said means for reading to load new information corresponding to a next line of alphanumeric character information from said first buffer means into said second buffer means.

17. The information translating apparatus according to claim 14 wherein said means for reading message information corresponding to lines of alphanumeric character information in sequence from said first buffer means and loading each line read in sequence into said second buffer means additionally acts to monitor remaining lines of alphanumeric character information in said buffer means and when the last line of information has been read therefrom causes said means for loading a predetermined number of units of received message information to load a next predetermined number of units of received message information into said first buffer means if any units of received message information remain to be loaded into said first buffer means.

18. The information translating apparatus according to claim 14 wherein said means for selectively forwarding causes new digitally coded signals representing a next raster line scan to be loaded into said third buffer means after the last portion of digitally coded signals presently loaded therein have been selectively forwarded.

19. The information translating apparatus according to claim 18 wherein said means for loading in sequence digitally coded signals representing a given raster line scan of said plurality of raster line scans of message information additionally acts to keep track of which raster line scan of said plurality has been loaded as digitally coded signals into said third buffer means and when digitally coded signals representing the last raster line scan of said plurality have been loaded into said third buffer means to cause said means for reading to load new information corresponding to a next line of alphanumeric character information from said first buffer means into said second buffer means.

20. The information translating apparatus according to claim 18 wherein said means for reading message information corresponding to lines of alphanumeric character information in sequence from said first buffer means and loading each line read in sequence into said second buffer means additionally acts to monitor remaining lines of alphanumeric character information in said buffer means and when the last line of information has been read therefrom causes said means for loading a predetermined number of units of received message information to load a next predetermined number of units of received message information into said first buffer means if any units of received message information remain to be loaded into said first buffer means.

21. The information translating apparatus according to claim 19 wherein said means for reading message information corresponding to lines of alphanumeric character information in sequence from said first buffer means and loading each line read in sequence into said second buffer means additionally acts to monitor remaining lines of alphanumeric character information in said buffer means and when the last line of information has been read therefrom causes said means for loading a predetermined number of units of received message information to load a next predetermined number of units of received message information into said first buffer means if any units of received message information remain to be loaded into said first buffer means.

22. The information translating apparatus according to claim 21 wherein said means for reading message information corresponding to lines of alphanumeric character information in sequence from said first buffer means additionally acts to limit the number of alphanumeric characters read for a line of alphanumeric character information to a predetermined number of characters and information in a given line of alphanumeric character information exceeding said predetermined number of characters being treated as a second line of alphanumeric character information.

23. The information translating apparatus according to claim 14 wherein said means for analyzing additionally includes means for limiting message information present in an individual message to a predetermined number of lines of message information.

24. The information translating apparatus according to claim 23 wherein said means for analyzing acts to form an additional message for the same destination whenever message information associated with an individual message exceeds said predetermined number of lines, said additional message comprising lines of message information exceeding said predetermined number of lines and each additional message formed also being limited to said predetermined number of lines by said means for analyzing.

25. The information translating apparatus according to claim 14 wherein said means for receiving includes information storage means, said input information being written on said information storage means for storage and subsequent forwarding.

26. The information translating apparatus according to claim 25 wherein said information storage means includes designated storage locations, each storage location accepting a predetermined number of units of information for storage purposes, said means for receiving input information accumulating input information as the same is received and upon receipt of said predetermined number of units of information, causing the same to be written in a designated storage location.

27. The information translating apparatus according to claim 26 wherein all destination information associated with a given message is initially written within a single storage location with sufficient message information to fill said storage location, said means for analyzing causing said single storage location to be read and writing information in individual storage locations for each destination location defined by the destination information associated with said given message, each individual storage location written by said means for analyzing including said sufficient message information originally written in said single storage location and destination information defining only a single location of a destination peripheral.

28. The information translating apparatus according to claim 27 wherein said means for loading a predetermined number of units of received message information into said first buffer means acts to read individual storage locations of message queues in line queues for defined locations including peripherals having a requirement for an information format derivable from a synthesized analog baseband signal, the information stored in an individual storage location being read and fully loaded in said first buffer means during a single operation of said means for loading a predetermined number of units of received message information.

29. The information translating apparatus according to claim 28 wherein said means for loading a predetermined number of units acts to read and load storage locations of a message queue in sequence.

30. The information translating apparatus according to claim 29 wherein said means for analyzing additionally includes means for limiting message information present in an individual message to a predetermined number of lines of message information.

31. The information translating apparatus according to claim 30 wherein said means for loading in sequence digitally coded signals representing a given raster line scan of said plurality of raster line scans of message information additionally acts to keep track of which raster line scan of said plurality has been loaded as digitally coded signals into said third buffer means and when digitally coded signals representing the last raster line scan of said plurality have been loaded into said third buffer means to cause said means for reading to load new information corresponding to a next line of alphanumeric character information from said first buffer means into said second buffer means.

32. The information translating apparatus according to claim 31 wherein said means for reading message information corresponding to lines of alphanumeric character information in sequence from said first buffer means and loading each line read in sequence into said second buffer means additionally acts to monitor remaining lines of alphanumeric character information in said buffer means and when the last line of information has been read therefrom causes said means for loading a predetermined number of units of received message information to load a next predetermined number of units of received message information into said first buffer means if any units of received message information remain to be loaded into said first buffer means.

33. The information translating apparatus according to claim 32 wherein said means for selectively forwarding causes new digitally coded signals representing a next raster line scan to be loaded into said third buffer means after the last portion of digitally coded signals presently loaded therein have been selectively forwarded.

34. The information translating apparatus according to claim 33 wherein said means for analyzing acts to form an additional message for the same destination whenever message information associated with an individual message exceeds said predetermined number of lines, said additional message comprising lines of message information exceeding said predetermined number of lines and each additional message formed also being limited to said predetermined number of lines by said means for analyzing.

35. The information translating apparatus according to claim 7 additionaly comprising means for controlling the operation of a facsimile communications device operative over telephone networks, said facsimile communications device responsive, when enabled, to said digital code to transmit facsimile signals, to "On Hook" and "Off Hook" orders to connect and disconnect from said telephone networks and to issue advisory tone information when coupled to said telephone networks but not fully enabled.

36. The information translating apparatus according to claim 35 wherein said means for controlling the operation of a facsimile device comprises:

means responsive to said destination information and said means for analyzing for issuing an Off Hook order for the purposes of an acquisition of dial tone; and means responsive to an issuance of an initial Off Hook order and the expiration of a selected interval of time sufficient to assure an acquisition of dial tone for issuing an appropriately timed and ordered sequence of On Hook and Off Hook orders to synthesize dialing of a telephone access code assigned to said location defined by said destination information.

37. The information translating apparatus according to claim 36 wherein said means for issuing an appropriately timed and order sequence of On Hook and Off Hook orders to synthesize dialing comprises:

means for developing a telephone access code assigned to said location defined by said destination information;

digit total and digit value register means;

means for loading a value representing the number of digits in said telephone access code into said digit total register means;

means for individually loading the unit value of each digit in said telephone access code into said digit value register means in the order in which said digits appear in said telephone access code;

means for issuing an On Hook order, an Off Hook order and decrementing the value present in said digit value register means until the value in said digit value register means equals a reference value, said On Hook order persisting for a first interval and said Off Hook order persisting for a second interval when said value in said digit value register is other than said reference value and said Off Hook order persisting for a third interval when said value in said digit value register means equals said reference value; and means for decrementing the value in the digit total register means and loading the unit value of the next digit in the telephone access code into said digit value register means each time the value in said digit value register means equals said reference value until said value in the digit total register means equals a reference value.

38. The information translating apparatus according to claim 37 wherein said Off Hook order persists for a fourth interval when the value loaded into said digit value register means for the first digit of said telephone access code equals a selected value.

39. The information translating apparatus according to claim 36 wherein said means for controlling additionally comprises:

means responsive to the completion of the issuance of On Hook and Off Hook orders for the dialing of a telephone access code to issue orders for repetitively coupling and partially enabling said facsimile communications device and thereafter causing the uncoupling thereof from said telephone networks, said repetition of orders persisting for a predetermined period whereupon said advisory tone information followed by a listening interval are repeated for said predetermined period.

40. The information translating apparatus according to claim 39 wherein said means for controlling additionally includes:

means responsive to an answer indication within said predetermined period from the location whose telephone access code was dialed for issuing orders for fully enabling said facsimile communications device and thereafter forwarding said digitally coded message information thereto; and means responsive to an absence of an answer indication upon an expiration of said predetermined period for issuing an On Hook order.

41. The information translating apparatus according to claim 40 wherein said means responsive to an answer indication within said predetermined period additionally acts to issue an On Hook order at the completion of forwarding said digitally coded message information.

42. The information translating apparatus according to claim 37 wherein said means for controlling additionally comprises:

means responsive to the completion of the issuance of On Hook and Off Hook orders for the dialing of a telephone access code to issue orders for repetitively coupling and partially enabling said facsimile communications device and thereafter causing the uncoupling thereof from said telephone networks, said repetition of orders persisting for a predetermined period whereupon said advisory tone information followed by a listening interval are repeated for said predetermined period.

43. The information translating apparatus according to claim 42 wherein said means for controlling additionally includes:

means responsive to an answer indication within said predetermined period from the location whose telephone access code was dialed for issuing orders for fully enabling said facsimile communications device and thereafter forwarding said digitally coded message information thereto; and means responsive to an absence of an answer indication upon an expiration of said predetermined period for issuing an On Hook order.

44. The information translating apparatus according to claim 43 wherein said means responsive to an answer indication within said predetermined period additionally acts to issue an On Hook order at the completion of forwarding said digitally coded message information.

45. The information translating apparatus according to claim 44 wherein said Off Hook order persists for a fourth interval when the values loaded into said digit value register means for the first digit of said telephone access code equals a selected value.

46. The information translating apparatus according to claim 36 wherein said means for analyzing additionally includes means for limiting message information present in an individual message to a predetermined number of lines of message information.

47. The information translating apparatus according to claim 36 wherein said means for receiving includes information storage means, said input information being written on said information storage means for storage and subsequent forwarding.

48. The information translating apparatus according to claim 36 wherein means for selectively translating said message into a digital code format representative of a matrix encoding of said message information comprises:

first, second and third buffer means;

means for loading a predetermined number of units of received message information into said first buffer means;

means for reading message information corresponding to lines of alphanumeric character information in sequence from said first buffer means and loading each line read in sequence into said second buffer means;

means for performing a dot matrix encoding employing a plurality of raster scan lines for message information loaded in said second buffer means and providing digitally coded signals representing each raster line scan produced;

means for loading in sequence digitally coded signals representing a given raster line scan of said plurality of raster line scans of message information loaded in said second buffer means into said third buffer means; and means for selectively forwarding portions of said digitally coded signals loaded into said third buffer means so that the same may be decoded into a synthesized analog baseband signal.

49. The information translating apparatus according to claim 48 wherein said means for receiving includes information storage means, said input information being written on said information storage means for storage and subsequent forwarding.

50. The information translating apparatus according to claim 49 wherein said means for analyzing additionally includes means for limiting message information present in an individual message to a predetermined number of lines of message information.

51. The information translating apparatus according to claim 50 wherein said means for issuing an appropriately timed and order sequence of On Hook and Off Hook orders to synthesize dialing comprises:

means for developing a telephone access code assigned to said location defined by said destination information;

digit total and digit value register means;

means for loading a value representing the number of digits in said telephone access code into said digit total register means;

means for individually loading the unit value of each digit in said telephone access code into said digit value register means in the order in which said digits appear in said telephone access code;

means for issuing an On Hook order, and Off Hook order and decrementing the value present in said digit value register means until the value in said digit value register means equals a reference value, said On Hook order persisting for a first interval and said Off Hook order persisting for a second interval when said value in said digit value register is other than said reference value and said Off Hook order persisting for a third interval when said value in said digit value register means equals said reference value; and means for decrementing the value in the digit total register means and loading the unit value of the next digit in the telephone access code into said digit value register means each time the value in said digit value register means equals said reference value until said value in the digit total register means equals a reference value.

52. The information translating apparatus according to claim 51 wherein said means for controlling additionally comprises:

means responsive to the completion of the issuance of On Hook and Off Hook orders for the dialing of a telephone access code to issue orders for repetitively coupling and partially enabling said facsimile communications device and thereafter causing the uncoupling thereof from said telephone networks, said repetition of orders persisting for a predetermined period whereupon said advisory tone information followed by a listening interval are repeated for said predetermined period.

53. The information translating apparatus according to claim 52 wherein said means for controlling additionally includes:

means responsive to an answer indication within said predetermined period from the location whose telephone access code was dialed for issuing orders for fully enabling said facsimile communications device and thereafter forwarding said digitally coded message information thereto; and means responsive to an absence of an answer indication upon an expiration of said predetermined period for issuing an On Hook order.

54. The information translating apparatus according to claim 53 wherein said means responsive to an answer indication within said predetermined period additionally acts to issue an On Hook order at the completion of forwarding said digitally coded message information.

55. The information translating apparatus according to claim 54 wherein said Off Hook order persists for a fourth interval when the values loaded into said digit value register means for the first digit of said telephone access code equals a selected value.

56. The information translating apparatus according to claim 55 wherein said means for analyzing acts to form an additional message for the same destination whenever message information associated with an individual message exceeds said predetermined number of lines, said additional message comprising lines of message information exceeding said predetermined number of lines and each additional message formed also being limited to said predetermined number of lines by said means for analyzing.

57. The information translating apparatus according to claim 56 wherein said means for reading message information corresponding to lines of alphanumeric character information in sequence from said first buffer means additionally acts to limit the number of alphanumeric characters read for a line of alphanumeric character information to a predetermined number of characters and information in a given line of alphanumeric character information exceeding said predetermined number of characters being treated as a second line of alphanumeric character information.

58. The information translating apparatus according to claim 57 wherein said means for loading in sequence digitally coded signals representing a given raster line scan of said plurality of raster line scans of mesage information additionally acts to keep track of which raster line scan of said plurality has been loaded as digitally coded signals into said third buffer means and when digitally coded signals representing the last raster line scan of said plurality have been loaded into said third buffer means to cause said means for reading to load new information corresponding to a next line of alphanumeric character information from said first buffer means into said second buffer means.

59. The information translating apparatus according to claim 58 wherein said means for reading message information corresponding to lines of alphanumeric character information in sequence from said first buffer means and loading each line read in sequence into said second buffer means additionally acts to monitor remaining lines of alphanumeric character information in said buffer means and when the last line of information has been read therefrom causes said means for loading a predetermined number of units of received message information to load a next predetermined number of units of received message information into said first buffer means if any units of received message information remain to be loaded into said first buffer means.

60. The information translating apparatus according to claim 59 wherein said means for selectively forwarding causes new digitally coded signals representing a next raster line scan to be loaded into said third buffer means after the last portion of digitally coded signals presently loaded therein have been selectively forwarded.

61. A method of information translation comprising the steps of:

receiving input information in a format acceptable to teleprinter means, said input information including message information to be conveyed and destination information defining the locations of peripherals to which said message information is to be conveyed;

analyzing said destination information present in said input information to ascertain if a destination peripheral having a requirement for an information format derivable from a synthesized analog baseband signal is defined; and selectively translating message information into a digital code format decodable into a synthesized analog baseband signal when a destination peripheral having a requirement for an information format derivable from a synthesized baseband signal is ascertained, said selective translation of message information being achieved by performing a dot matrix encoding of said message information.

62. The method of information translation according to claim 61 additionally comprising the step of limiting message information which is selectively translated and associated with an individual message to a predetermined number of lines of message information.

63. The method of information translation according to claim 62 wherein whenever an individual message is limited to said predetermined number of lines of message information, said method of information translation includes the additional step of forming remaining lines of message information in said individual message units into an additional message for the same destination peripheral.

64. The method of information translation according to claim 61 wherein the step of receiving input information includes the steps of:

accumulating a predetermined number of units of input information for storage purposes;

storing each predetermined number of units of message information accumulated in designated storage locations on an information storage means; and cross linking designated storage locations employed for various portions of an individual message to form a message queue.

65. The method of information translation according to claim 64 wherein all destination information associated with an individual message is initially logged in a single designated storage location together with sufficient message information to fill said storage location, the method of information translation additionally comprising the step of relogging destination information in such manner that destination information specifying individual destination peripherals together with said sufficient message information is stored in individual storage locations, and each such storage location being cross-linked to storage locations having other destination information therein as well as those containing message information.

66. The method of information translation according to claim 61 wherein the step of selectively translating message information into a digital code format comprises the steps of:

loading a predetermined number of units of received message information into a first buffer;

reading message information corresponding to lines of alphanumeric character information in sequence from said first buffer and inserting each line read in sequence into a second buffer;

performing a dot matrix encoding employing a plurality of raster scan lines for message information loaded in said second buffer and providing digitally coded signals representing each raster line scan produced;

writing in sequence digitally coded signals representing a given line scan of said plurality of raster line scans of message information inserted in said second buffer into a third buffer; and selectively forwarding portions of said digitally coded signals written in said third buffer so that the same may be decoded into a synthesized analog baseband signal.

67. The method of information translation according to claim 61 additionally comprising the step of controlling the operation of a facsimile communications device operative over telephone networks, said facsimile communications device responsive, when enabled, to said digital code format to transmit facsimile signals, to On Hook and Off Hook orders to connect and disconnect from said telephone networks and to issue advisory tone information when coupled to said telephone networks but not fully enabled.

68. The method of information translation according to claim 67 wherein the step of controlling the operation of a facsimile communications device includes the steps of:

issuing an Off Hook order for the purposes of an acquisition of dial tone in response to a detection of destination information defining a peripheral having a requirement for an information format derivable from a synthesized analog baseband signal;

maintaining said Off Hook order for a period which is sufficient to assure an acquisition of dial tone; and issuing an appropriately timed and ordered sequence of On Hook and Off Hook orders to synthesize dialing of a telephone access codes assigned to the location defined by said destination information.

69. The method of information translation according to claim 68 wherein the step of controlling additionally comprises the steps of issuing orders at the completion of the dialing order sequence for repetitively coupling and partially enabling said facsimile communications device and thereafter causing the uncoupling thereof from said telephone networks, said repetition of orders persisting for a predetermined period whereupon said advisory line information followed by a listening interval are repeated for said predetermined period.

70. The method of information translation according to claim 69 wherein the step of controlling additionally comprises the steps of:

issuing orders for fully enabling said facsimile communications device and thereafter forwarding digitally coded message information thereto if an answer indication from the destination peripheral whose telephone access code was dialed is received within said predetermined period; and issuing an On Hook order if an answer indication is not received prior to an expiration of said predetermined period.

* * * * *